US012465979B2

(12) United States Patent
Tarrant et al.

(10) Patent No.: US 12,465,979 B2
(45) Date of Patent: Nov. 11, 2025

(54) THREE-DIMENSIONAL PRINTER COMPONENTS

(71) Applicant: Velo3D, Inc., Fremont, CA (US)

(72) Inventors: Dean Albert Tarrant, Gilroy, CA (US); Joseph Andrew Tralongo, El Cajon, CA (US); Benyamin Buller, Cupertino, CA (US); Richard Romano, San Jose, CA (US); Thomas Brezoczky, Los Gatos, CA (US); Anatolii Vitanov, Milpitas, CA (US); Erel Milshtein, Morgan Hill, CA (US); Gregory Ferguson Brown, San Jose, CA (US); Robert Martinson, Palo Alto, CA (US); Daniel Christiansen, Mountain View, CA (US); Alex Brudny, San Jose, CA (US)

(73) Assignee: VELO3D, INC., Fremont, CA (US)

( * ) Notice: Subject to any disclaimer, the term of this patent is extended or adjusted under 35 U.S.C. 154(b) by 100 days.

(21) Appl. No.: 18/434,272

(22) Filed: Feb. 6, 2024

(65) Prior Publication Data

US 2024/0189912 A1 Jun. 13, 2024

Related U.S. Application Data

(63) Continuation of application No. PCT/US2022/052030, filed on Dec. 6, 2022.
(Continued)

(51) Int. Cl.
*B29C 64/236* (2017.01)
*B22F 12/00* (2021.01)
*B33Y 30/00* (2015.01)

(52) U.S. Cl.
CPC .......... *B22F 12/224* (2021.01); *B29C 64/236* (2017.08); *B33Y 30/00* (2014.12)

(58) Field of Classification Search
None
See application file for complete search history.

(56) References Cited

U.S. PATENT DOCUMENTS

2015/0239148 A1* 8/2015 Israel .................... B29C 64/106
425/375
2016/0311174 A1* 10/2016 Foley .................... B29C 64/393
(Continued)

FOREIGN PATENT DOCUMENTS

CN 206578297 U 10/2002
CN 106735196 B 5/2017
(Continued)

OTHER PUBLICATIONS

International Search Report and Written Opinion in PCT/US2022/052030 dated Apr. 17, 2023.

*Primary Examiner* — Yung-Sheng M Tsui
(74) *Attorney, Agent, or Firm* — FOLEY & LARDNER LLP

(57) ABSTRACT

The present disclosure provides three-dimensional (3D) printing systems, apparatuses, methods and non-transitory computer readable media for the production of at least one requested 3D object. The 3D printer described herein facilitates operation of a layer dispensing mechanism with high precision albeit operating in an enclosure contaminated by debris, e.g., during the 3D printing. The debris may be a byproduct of the 3D printing.

20 Claims, 49 Drawing Sheets

Related U.S. Application Data

(60) Provisional application No. 63/430,327, filed on Dec. 5, 2022, provisional application No. 63/289,779, filed on Dec. 15, 2021.

(56) References Cited

U.S. PATENT DOCUMENTS

| | | | | |
|---|---|---|---|---|
| 2019/0084240 A1* | 3/2019 | Ward, Jr. | ................. | B23Q 7/08 |
| 2019/0316344 A1* | 10/2019 | Pagani | ...................... | B25J 5/04 |

FOREIGN PATENT DOCUMENTS

| | | | | |
|---|---|---|---|---|
| CN | 206316377 U | 7/2017 | | |
| CN | 108453255 A | 8/2018 | | |
| CN | 108746620 A | 11/2018 | | |
| CN | 114506069 A * | 5/2022 | ............. | B29C 64/20 |
| WO | WO-2019/205181 A1 | 10/2019 | | |

* cited by examiner

THREE-DIMENSIONAL PRINTER COMPONENTS

PRIORITY APPLICATIONS

This application claims priority to prior-filed International Patent Application Serial No. PCT/US22/52030 filed Dec. 6, 2022 that claims priority to U.S. Provisional Patent Application Ser. No. 63/289,779 filed Dec. 15, 2021; and to U.S. Provisional Patent Application Ser. No. 63/430,327 filed Dec. 5, 2022; each of which is entirely incorporated herein by reference.

BACKGROUND

Three-dimensional (3D) printing (e.g., additive manufacturing) is a process for making a three-dimensional object of any shape from a design. The design may be in the form of a data source such as an electronic data source, or may be in the form of a hard copy. The hard copy may be a two-dimensional representation of a 3D object. The data source may be an electronic 3D model. 3D printing may be accomplished through an additive process in which successive layers of material are laid down one on top of another. This process may be controlled (e.g., computer controlled, manually controlled, or both). A 3D printer can be an industrial robot.

3D printing can generate custom parts. A variety of materials can be used in a 3D printing process including elemental metal, metal alloy, ceramic, an allotrope of elemental carbon, or polymeric material. In some 3D printing processes (e.g., additive manufacturing), a first layer of hardened material is formed (e.g., by welding powder), and thereafter successive layers of hardened material are added one by one, wherein each new layer of hardened material is added on a pre-formed layer of hardened material, until the entire designed three-dimensional structure (3D object) is layer-wise materialized.

3D models may be created with a computer aided design package, via 3D scanner, or manually. The manual modeling process of preparing geometric data for 3D computer graphics may be similar to plastic arts, such as sculpting or animating. 3D scanning is a process of analyzing and collecting digital data on the shape and appearance of a real object (e.g., real-life object). Based on this data, 3D models of the scanned object can be produced.

A number of 3D printing processes are currently available. They may differ in the manner layers are deposited to create the materialized 3D structure (e.g., hardened 3D structure). They may vary in the material or materials that are used to materialize the designed 3D object. Some methods melt, sinter, or soften material to produce the layers that form the 3D object. Examples for 3D printing methods include selective laser melting (SLM), selective laser sintering (SLS), direct metal laser sintering (DMLS) or fused deposition modeling (FDM). Other methods cure liquid materials using different technologies such as stereo lithography (SLA). In the method of laminated object manufacturing (LOM), thin layers (made inter alia of paper, polymer, or metal) are cut to shape and joined together.

At times, during the process of 3D printing, a portion of the material bed may part from the material bed (e.g. due to heating). The parted portion may form debris (e.g., floating in an atmosphere of the 3D printing processing chamber). The debris may accumulate on one or more components in the 3D printer (e.g., of the processing chamber). The debris may alter a function of at least one (e.g., mechanical) component in the 3D printer (e.g., the layer dispensing mechanism). For example, the debris may absorb, obstruct, and/or reflect a portion of the energy beam radiation. The component may not be required in the processing chamber during the entire span of the 3D printing process (e.g. when the energy beam is projected on the material bed). At times, it may be requested to reduce (e.g., avoid) a generation of debris on various components of the 3D printer (e.g., a layer dispensing mechanism). At times, it may be requested to (e.g., periodically) clean the component from the debris. At times, it may be requested to clean and/or recondition a portion of the debris. The reconditioned debris may be used by the layer dispensing mechanism (e.g., layer dispenser) during the 3D printing.

At times, during the process of dispensing pre-transformed (e.g., particulate) material as part of the 3D printing, the pre-transformed material may flow in a discontinuous manner, or cease to flow. For example, the pre-transformed (e.g., starting) material may clump up. For example, particles in the particulate material may adhere to each other. For example, the pre-transformed material may adhere to one or more surfaces of the layer dispenser (e.g., material dispenser therein). For example, the pre-transformed material may block an exit opening of the layer dispenser (e.g., material dispenser therein). At times, it may be requested to introduce energy to the pre-transformed material before and/or during its deposition to facilitate movement (e.g., flow) of the pre-transformed material (e.g., to allow non-interrupted and/or smooth deposition). At times, it may be requested to have the one or more surfaces of the layer dispenser (e.g., material dispenser therein) (e.g., which surface(s) contact the pre-transformed material) exert a low amount of friction on the pre-transformed material. At times, it may be requested to have the one or more surfaces of the layer dispenser (e.g., material dispenser therein) (e.g., which surface(s) contact the pre-transformed material) that are smooth (e.g., with a low Ra value). At times, it may be requested to have the one or more surfaces of the layer dispenser (e.g., material dispenser therein) coated with a material that alters (e.g., reduces the likelihood of) the (i) adhesion of the pre-transformed material to the surface(s) and/or (ii) friction of the pre-transformed material on the surface(s). The surface(s) may be those contacting the pre-transformed material.

The layer dispensing mechanism dispensing a planar layer as part of a material bed, may travel on railings. The railings may be subject to accumulation of starting material and/or debris (e.g., printing byproduct) during the 3D printing. Such accumulation may cause the layer dispensing mechanism to deviate from its intended path such that the resulting layer dispensed would form an exposed surface that deviates from the requested planarity.

SUMMARY

In some aspects, the present disclosure delineates methods, systems, devices, apparatuses, and/or software that alleviate the above hardships.

In an aspect, the present disclosure comprises protection (e.g., seclusion) of the component (e.g., layer dispensing mechanism or layer dispenser) during a portion of the 3D printing process. The protection can be, for example, from accumulation of starting material and/or debris. The protection may comprise a physical separation. The protection may comprise a labyrinth type railing. The layer dispensing mechanism may comprise, or be operatively coupled to, a carriage capable of keeping the layer dispensing mechanism along its intended path albeit accumulation of material on the railing. The carriage may comprise one or more wheels that push away the accumulated material on the railing during its progression on the railing. The carriage may comprise a flexible coupler capable of keeping the layer dispensing mechanism along its intended path albeit accumulation of material on the railing.

Another aspect, the present disclosure comprises cleaning the component (e.g., a layer dispensing mechanism) during at least a portion of the 3D printing process. The cleaning can be, for example, from the debris. The cleaning may comprise active or passive cleaning.

In another aspect, an apparatus for three-dimensional printing of at least one three-dimensional object comprising: a layer dispenser configured to translate and dispense a material bed, wherein the layer dispenser comprises a port (e.g., an opening port); a frame that comprises an opening and is disposed adjacent to the platform, wherein the opening the provides a passage from a first side to a second side (e.g., the opening separates a first side from a second side upon a closing of the opening), wherein the second side comprises the material bed, which layer dispenser translates through the opening; a closure that closes the opening, which closure is operatively coupled to the layer dispenser; and an energy source configured to generate an energy beam directed towards the material bed and transform at least a portion of the material bed to the at least one three-dimensional object. In some embodiments, the apparatus further comprises an ancillary chamber configured to house the layer dispenser. In some embodiments, the layer dispenser is removably housed within the ancillary chamber. In some embodiments, the ancillary chamber is configured to be coupled with a recycling system that recycles material from the layer dispenser. In some embodiments, the ancillary chamber includes a funnel portion that is configured to direct the material to the recycling system. In some embodiments, the ancillary chamber includes an opening port that is configured to direct the material to the recycling system. In some embodiments, the opening port of the ancillary chamber is within an opening port region of the ancillary chamber. In some embodiments, the opening port region of the ancillary chamber comprises walls that converge toward the opening port. In some embodiments, the opening port region of the ancillary chamber comprises a port flushing component that is configured to facilitate flushing the opening port region of the excess material using a flow of gas. In some embodiments, the port flushing component comprises an inlet configured to accept the flow of gas from a gas source and an outlet configured to direct the flow of gas out of the opening port region. In some embodiments, the outlet is coupled to the recycling system via at least one coupling member. In some embodiments, the port flushing component is coupled to the ancillary chamber via a connector. In some embodiments, the apparatus further comprises an ancillary chamber configured to direct excess material from the layer dispenser toward a recycling system. In some embodiments, the apparatus further comprises at least one detector that is configured to detect the excess material transported from the ancillary chamber to the recycling system. In some embodiments, the at least one detector is configured to detect an amount of the material, FLS of one or more particles of the material, a velocity of the flow of material, and/or a chemical nature of the material. In some embodiments, the at least one detector device comprises a detector that is configured to detect electromagnetic radiation or acoustic signal. In some embodiments, the at least one detector device comprises an emitter that is configured to emit the electromagnetic radiation or the acoustic signal. In some embodiments, the at least one detector device is configured to provide information related to an efficiency of one or more filters of the recycling system. In some embodiments, the layer dispensing mechanism is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a system for forming a three-dimensional object comprising: a layer dispenser configured to dispense a material for a material bed; a platform disposed in a first side of the system, the platform configured to support the material bed, wherein the layer dispenser is configured to translate through a frame comprising an opening that facilitates passage from (e.g., and is positioned between) the first side and a second side of the system; a closure that closes the opening, wherein the closure is operatively coupled to the layer dispenser; an energy source that generates an energy beam configured to transform at least a portion of the material bed; and at least one controller that is operatively coupled to one or more of the layer dispenser, the closure, and the energy source, wherein the at least one controller is programmed to direct performance operations comprising: operation (i) convey the layer dispenser through the opening from the first side to the second side, operation (ii) direct the layer dispenser to dispense the material to form the material bed, operation (iii) retract the layer dispenser from the second side to the first side, operation (iv) direct the closure to close the opening, and operation (v) direct the energy source to direct the energy beam to at least the portion of the material bed to form at least a portion of the three-dimensional object.

In another aspect, a computer software product for three-dimensional printing of at least one three-dimensional object, comprising a non-transitory computer-readable medium/media in which program instructions are stored, which instructions, when read by a computer, cause the computer to perform operations comprising: operation (a) directing a layer dispenser to convey through an opening from a first side of the opening to a second side of the opening, wherein the layer dispenser comprises an internal cavity; operation (b) directing the layer dispenser to dispense a material to form a material bed; operation (c) directing the layer dispenser to retract from the second side to the first side; operation (d) directing a closure to close the opening; and operation (e) directing an energy beam to transform at least a portion of the material bed to form at least a portion of the at least one three-dimensional object.

In another aspect, an apparatus for three-dimensional printing of at least one three-dimensional object comprising at least one controller that is programmed to perform the following operations: operation (a) convey a layer dispenser through an opening from a first side of the opening to a second side of the opening, wherein the layer dispenser comprises an internal cavity or an opening port; operation (b) direct the layer dispenser to dispense a material to form a material bed; operation (c) retract the layer dispenser from the second side to the first side; operation (d) direct a closure to close the opening; and operation (e) direct an energy beam to transform at least a portion of the material bed to form at least a portion of the three-dimensional object, wherein the controller is operatively coupled to the layer dispenser, opening, closure and the energy beam. In some embodiments, the at least one controller is a multiplicity of controllers. In some embodiments, at least two of operation (a), operation (b), operation (c), operation (d) and operation (e) are directed by the same controller. In some embodiments, at least two of operation (a), operation (b), operation (c), operation (d) and operation (e) are directed by different controllers.

In another aspect, a method for generating a three-dimensional object comprising: (a) conveying a layer dispenser through an opening from a first side of the opening to a second side of the opening, wherein the first side is separated from the second side upon a closing of the opening, wherein the layer dispenser comprises an opening port or an internal cavity; (b) (optionally) retracting the layer dispenser from the second side of the opening to the first side of the opening and closing the opening; and (c) forming at least a portion of the three-dimensional object at the second side of the opening. In some embodiment, the method comprises (d) closing the opening during the 3D printing. In some embodiments, the conveying further comprises moving from a first position to a second position. In some embodiments, the first position is on the first side of the opening. In some embodiments, the second position is on the second side of the opening. In some embodiments, the first position is within an ancillary chamber. In some embodiments, the second position is within a processing chamber. In some embodiments, the second position is adjacent to a platform. In some embodiments, conveying further comprises utilizing a shaft. In some embodiments, retracting further comprises utilizing a shaft. In some embodiments, the method further comprises sensing a need to dispense a layer of material. In some embodiments, the method further comprises detecting a completion of dispensing a layer of material (e.g., at the second side of the opening). In some embodiments, the closing of the opening further comprises a sliding a door. In some embodiments, the closing of the opening further comprises a rolling door. In some embodiments, the closing of the opening further comprises a moving shield. In some embodiments, the moving shield is connected to the layer dispenser. In some embodiments, the conveying further comprises exposing the opening. In some embodiments, the opening further comprises a window. In some embodiments, the opening has a minimum opening. In some embodiments, the minimum opening corresponds to an amount of exposure that is equal to a height of the layer dispenser. In some embodiments, the opening has a minimum opening. In some embodiments, the minimum opening corresponds to an amount of exposure that is equal to a FLS (e.g., width) of the layer dispenser.

In another aspect, an apparatus for three-dimensional printing of at least one three-dimensional object comprising: a frame comprising an opening that provides a passage from a first side to a second side (e.g., an opening that separates a first side and a second side upon closure); a movable layer dispenser configured to shape a material bed, wherein the layer dispenser comprises an opening port, wherein the second side is configured to support the material bed; a shaft coupled to a layer dispenser, which shaft is utilized to move the layer dispenser from the first side to the second side; a channel disposed in the shaft, which channel is configured to transit a material to or from the layer dispenser; and an energy source configured to generate an energy beam directed towards the material bed and transform at least a portion of the material bed to the at least one three-dimensional object. In some embodiments, the layer dispensing mechanism is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, an apparatus for three-dimensional printing of at least one three-dimensional object comprising: a frame comprising an opening that provides a passage from a first side to a second side (e.g., an opening that separates a first side and a second side upon closure), the second side configured to accommodate a material bed; a layer dispenser configured to form the material bed, wherein the layer dispenser comprises an opening port; a shaft coupled to the layer dispenser and configured to move the layer dispenser from the first side to the second side; a bearing disposed adjacent to shaft, which bearing facilitates a movement of the shaft; an optional cleaning mechanism encircling the shaft and disposed between the layer dispenser and the bearing, wherein the cleaning mechanism is configured to clean the shaft; and an energy source configured to generate an energy beam that is directed towards the material bed and transform at least a portion of the material bed to the at least one three-dimensional object. In some embodiments, the layer dispensing mechanism is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a system for forming a multi layered object comprising: a frame around an opening that facilitates passage from a first side to a second side (e.g., an opening that separates a first side and a second side upon closure); a layer dispenser that forms a material bed, wherein the layer dispenser comprises a port (e.g., an opening port), wherein the second side comprises the material bed; a shaft connected to a layer dispenser, which shaft is utilized to move the layer dispenser from the first side to the second side (e.g., through the opening); a channel disposed in the shaft which channel is fluidly connected to the layer dispenser; an energy source that is configured to generate an energy beam, which energy beam transforms at least a portion of the material bed to the multi layered object; and at least one controller that is operatively coupled to one or more of the layer dispenser, frame, opening, shaft, and the energy source, which at least one controller is programmed to direct performance of operations comprising: operation (i) transit a material through the channel to or from the layer dispenser; operation (ii) direct the shaft to convey the layer dispenser through the opening from a first side to the second side, operation (iii) direct the layer dispenser to dispense a material to form a material bed, operation (iv) direct the shaft to retract the layer dispenser from the second side to the first side, operation (v) close the opening, and operation (vi) direct the energy beam to transform at least a portion of the material bed to form at least a portion of the multi layered object.

In another aspect, a system for forming a multi layered object comprising: a frame around an opening that provides a passage from a first side to a second side (e.g., that separates a first side and a second side on closure); a movable layer dispenser that forms a material bed, which layer dispenser comprises an opening port or an internal cavity, wherein the second side comprises the material bed; a shaft connected to the layer dispenser, which shaft is utilized to move the layer dispenser from the first side to the second side; a bearing disposed adjacent to the shaft, which bearing facilitates a movement of the shaft; a cleaning mechanism encircling at least a portion of the shaft and disposed between the layer dispenser and the bearing, wherein the cleaning mechanism cleans the shaft; an energy source that generates an energy beam that transforms at least a portion of the material bed to the multi layered object; and at least one controller that is operatively coupled to the layer dispenser, wherein the at least one controller is programmed to direct performance operations comprising: operation (i) direct the layer dispenser to dispense a material to form a material bed, operation (ii) direct moving the shaft to retract the layer dispenser from the second side to the first side close the opening, and operation (iii) direct the energy beam to transform at least a portion of the material bed to form at least portion of the multi layered object.

In another aspect, an apparatus for three-dimensional printing of at least one three-dimensional object comprising at least one controller that is programmed to perform operations comprising: operation (a) transit a material through a channel disposed in a shaft, to or from a layer dispenser, wherein the layer dispenser comprises an opening port or an internal cavity; operation (b) direct the shaft to convey the layer dispenser through an opening from a first side of the opening to the second side of the opening; operation (c) direct the layer dispenser to dispense a material to form a material bed; operation (d) direct the shaft to retract the layer dispenser from the second side to the first side and close the opening; and operation (e) direct an energy beam to transform at least a portion of the material bed to form at least a portion of the at least one three-dimensional object, wherein the at least one controller is operatively coupled to one or more of the layer dispenser, channel, shaft, opening and the energy beam. In some embodiments, the at least one controller is a multiplicity of controllers. In some embodiments, at least two of operation (a), operation (b), operation (c), operation (d), and operation (e) are directed by the same controller. In some embodiments, at least two of operation (a), operation (b), operation (c), operation (d), and operation (e) are directed by different controllers.

In another aspect, an apparatus for three-dimensional printing of at least one three-dimensional object comprising at least one controller that is programmed to perform operations comprising: operation (a) direct a layer dispenser to dispense a material to form a material bed, wherein the layer dispenser comprises an internal cavity or an opening port; operation (b) direct moving a shaft to retract the layer dispenser from a second side of an opening to a first side of the opening and close the opening; operation (c) direct a cleaning mechanism encircling the shaft to clean the shaft; and operation (d) direct an energy beam to transform at least a portion of the material bed to form at least portion of the at least one three-dimensional object, and wherein the at least one controller is operatively coupled to one or more of the layer dispenser, shaft, opening and the energy beam. In some embodiments, the at least one controller is a multiplicity of controllers. In some embodiments, at least two of operation (a), operation (b), operation (c), and operation (d) are directed by the same controller. In some embodiments, at least two of operation (a), operation (b), operation (c), and operation (d) are directed by different controllers.

In another aspect, a computer software product for three-dimensional printing of at least one three-dimensional object, comprising a non-transitory computer-readable medium/media in which program instructions are stored, which instructions, when read by a computer, cause the computer to perform operations comprising: operation (a) direct transiting a material through a channel disposed in a shaft, to or from a layer dispenser, wherein the layer dispenser comprises an opening port; operation (b) directing the shaft to convey the layer dispenser through an opening from a first side of the opening to the second side of the opening; operation (c) directing the layer dispenser to dispense a material to form a material bed; operation (d) directing the shaft to retract the layer dispenser from the second side to the first side and close the opening; and operation (e) directing an energy beam to transform at least a portion of the material bed to form at least a portion of the at least one three-dimensional object.

In another aspect, a computer software product for three-dimensional printing of at least one three-dimensional object, comprising a non-transitory computer-readable medium/media in which program instructions are stored, which instructions, when read by a computer, cause the computer to perform operations comprising: operation (a) directing a layer dispenser to dispense a material to form a material bed, wherein the layer dispenser comprises an internal cavity; operation (b) directing moving a shaft to retract the layer dispenser from a second side of an opening to a first side of the opening and close the opening operation (c) directing a cleaning mechanism encircling the shaft to clean the shaft; and operation (d) directing an energy beam to transform at least a portion of the material bed to form at least portion of the at least one three-dimensional object.

In another aspect, a method for generating a three-dimensional object comprising: (a) transiting a material through a channel disposed in a shaft that is coupled to a layer dispenser, which transiting is to or from the layer dispenser, which layer dispenser comprises an opening port; and (b) utilizing the shaft to move the layer dispenser, which layer dispenser forms a material bed for generating the three-dimensional object. In some embodiments, the channel further comprises an internal portion. In some embodiments, the channel further comprises an external portion. In some embodiments, the internal portion of the channel is disposed within the shaft. In some embodiments, the external portion of the channel is disposed external to the shaft. In some embodiments, the material is gas. In some embodiments, the gas has a pressure that is different from ambient pressure. In some embodiments, the different is above. In some embodiments, the different is below. In some embodiments, the material is a powder material. In some embodiments, the method further comprises receiving the material from a bulk reservoir. In some embodiments, the method further comprises transiting gas through the channel. In some embodiments, the utilizing the shaft further comprises using an actuator coupled to the shaft to move the shaft.

In another aspect, a method for generating a three-dimensional object comprises: (a) moving a shaft comprising a bearing, which shaft is operatively coupled to a layer dispenser that comprises an opening port, which layer dispenser forms a material bed for generating the three-dimensional object; and (b) cleaning the shaft of debris using a cleaning mechanism encircling the shaft. In some embodiments, the bearing is a mechanical bearing. In some embodiments, the bearing is a gas bearing. In some embodiments, the bearing is an element that facilitates directional motion of the shaft. In some embodiments, the bearing is charged with at least one compressed gas. In some embodiments, the at least one compressed gas is inert. In some embodiments, the bearing blows the at least one compressed gas to the shaft. In some embodiments, the bearing is disposed adjacent to the shaft. In some embodiments, the cleaning mechanism encircles the shaft. In some embodiments, the bearing comprises balls that contact the shaft at one or more points. In some embodiments, the cleaning mechanism is disposed laterally between the layer dispenser and the shaft. In some embodiments, the cleaning mechanism is passive. In some embodiments, the cleaning mechanism is active. In some embodiments, the cleaning mechanism contacts the shaft. In some embodiments, the cleaning mechanism contacting the shaft seals the shaft from the debris. In some embodiments, the cleaning mechanism contacting the shaft comprises using a bellow. In some embodiments, the cleaning mechanism is integrated in the bearing. In some embodiments, the cleaning mechanism is separate from the bearing. In some embodiments, the debris comprises soot. In some embodiments, the debris comprises pre-transformed material. In some embodiments, the debris comprises powder. In some embodiments, the moving the shaft comprises retracting the shaft from a second side of an opening to a first side of the opening. In some embodiments, the retracting further comprises depositing debris on the first side of the opening. In some embodiments, the cleaning mechanism further comprises blowing gas. In some embodiments, the blowing is continuous. In some embodiments, the blowing is continuous during a three-dimensional printing operation. In some embodiments, the blowing comprises blowing using variable gas pressure. In some embodiments, the blowing using variable gas pressure is during a three-dimensional printing operation. In some embodiments, the cleaning mechanism further comprises transiting compressed gas. In some embodiments, the cleaning mechanism is disposed in a first position and the bearing is disposed in a second position that is farther from the layer dispenser as compared to the first position.

In another aspect, an apparatus for three-dimensional printing of at least one three-dimensional object comprising at least one controller that is collectively or separately programmed to perform operations comprising: operation (a) direct a layer dispenser to translate in a trajectory above a platform to form a material bed, which layer dispenser comprises an exit opening through which a pre-transformed material exits to form the material bed, which translate comprises: (i) direct moving a shaft that is operatively coupled to the layer dispenser to facilitate the translation of the layer dispenser, which shaft translates through a hole in a partition; (ii) direct reducing the amount of pre-transformed material that migrates through the hole; and operation (b) direct generating of at least a portion of the at least one three-dimensional object from at least a portion of the material bed. In some embodiments, the at least one controller is operatively coupled to an energy beam and is programmed to direct the energy beam to transform the at least a portion of the material bed to form the at least a portion of the three-dimensional object.

In another aspect, a computer software product for three-dimensional printing of at least one three-dimensional object, comprising a non-transitory computer-readable medium/media in which program instructions are stored, which instructions, when read by a computer, cause the computer to perform operations comprising: operation (a) directing a layer dispenser to translate in a trajectory above a platform to form a material bed, which layer dispenser comprises an exit opening through which a pre-transformed material exits to form the material bed, which translate comprises: (i) directing moving a shaft that is operatively coupled to the layer dispenser to facilitate the translation of the layer dispenser, which shaft translates through an opening in a partition; (ii) directing reducing an amount of pre-transformed material that migrates through the opening; and operation (b) directing generating at least a portion of the at least one three-dimensional object from at least a portion of the material bed. In some embodiments, the computer software where the operations further comprise directing an energy beam to transform the at least a portion of the material bed to form the at least a portion of the three-dimensional object. In some embodiments, the energy beam is operatively coupled to the material bed.

In another aspect, a method for generating a three-dimensional object, comprising: (a) translating a layer dispenser in a trajectory adjacent to (e.g., above) a platform to form a material bed, which layer dispenser comprises an exit opening through which a pre-transformed material exits to form the material bed, which translating comprising: (i) moving a shaft that is operatively coupled to the layer dispenser to facilitate translation of the layer dispenser, which shaft translates through an opening in a partition; (ii) reducing an amount of pre-transformed material that migrates through the opening; and (b) generating at least a portion of the three-dimensional object from at least a portion of the material bed. In some embodiments, the method further comprises using a seal to reduce the amount of pre-transformed material that migrates through the partition. In some embodiments, the seal comprises a bellow, a bearing, or an air flow. In some embodiments, the moving the shaft comprises using an actuator. In some embodiments, the actuator comprises a drive mechanism. In some embodiments, the actuator comprises a linear motor. In some embodiments, the actuator comprises a timing belt. In some embodiments, the actuator comprises a lead screw. In some embodiments, the actuator comprises a rack and a pinion. In some embodiments, the actuator comprises a mechanism that exhibits linear motion. In some embodiments, the method further comprises vibrating at least one component of the layer dispenser during the translating. In some embodiments, the translation is through an obstruction that reversibly opens. In some embodiments, the obstruction comprises a sliding mechanism. In some embodiments, the obstruction comprises a flap door. In some embodiments, the obstruction comprises a plurality of flap doors. In some embodiments, the vibrating is performed during a first portion of a translation cycle that includes translating the layer dispenser from a first end of the material bed to a second end of the material bed that opposes the first end. In some embodiments, the vibrating is performed for a section of the first portion of the translation cycle. In some embodiments, the vibrating comprises moving back and forth along a trajectory. In some embodiments, the movement cycle comprises the moving back and forth. In some embodiments, the movement cycle repeats at least twice during the vibrating. In some embodiments, the vibrating comprises moving and stopping along a trajectory. In some embodiments, the movement cycle comprises the moving stopping. In some embodiments, the movement cycle repeats at least twice during the vibrating. In some embodiments, the vibrating comprises a moving while varying a velocity of the moving along a trajectory. In some embodiments, the movement cycle comprises the varying the velocity. In some embodiments, the movement cycle repeats at least twice during the vibrating. In some embodiments, the vibrating comprises a moving while varying an acceleration of the moving along a trajectory. In some embodiments, the movement cycle comprises the varying the acceleration. In some embodiments, the movement cycle repeats at least twice during the vibrating. In some embodiments, the vibrating comprises a moving while varying an acceleration of the moving along a trajectory. In some embodiments, the vibrating comprises a stuttered movement along a trajectory. In some embodiments, the translation cycle comprises a second portion which comprises translating the layer dispenser from the second end of the material bed to the first end of the material bed.

In another aspect, an apparatus for three-dimensional printing of at least one three-dimensional object, comprising: a platform configured to accommodate a material bed comprising a pre-transformed material; a layer dispenser (e.g., layer dispensing mechanism) that is configured to translate in a trajectory above the platform to dispense the pre-transformed material to form the material bed, which layer dispenser comprises an exit opening port; a partition comprising a hole, which partition is operatively coupled to the layer dispenser; a shaft operatively coupled to the partition, which shaft is configured to travel through the hole; and a seal disposed adjacent to or in the hole, which seal is operatively coupled to the shaft, which seal is configured to reduce an amount of pre-transformed material that travels from one side of the hole to a second side of the hole that opposes the one side of the hole. In some embodiments, the seal engulfs a cross section of the shaft. In some embodiments, the hole has a gas leak rate of at most about 0.01 liters per minute. In some embodiments, the seal is expandable on translation of the shaft. In some embodiments, the seal is contractible on translation of the shaft. In some embodiments, the seal comprises a bellow. In some embodiments, the bellow is operative for at least one million cycles. In some embodiments, the bellow is operative for at least one million cycles while keeping a gas leak rate of at most about 0.01 liters per minute. In some embodiments, the bellow is operative at a pressure of 0.5 PSI above an atmospheric pressure. In some embodiments, the bellow extends to an end of the shaft. In some embodiments, the end of the shaft opposes the layer dispenser. In some embodiments, the layer dispensing mechanism is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a system for forming at least one three-dimensional object, comprising: a platform configured to accommodate a material bed comprising a pre-transformed material; a layer dispenser that is configured to translates in a trajectory adjacent to (e.g., above) the platform to form the material bed, which layer dispenser comprises an exit opening port; a partition comprising a hole, which partition is operatively coupled to the layer dispenser; a shaft operatively, coupled to the partition, which shaft is configured to travel through the hole; a seal disposed adjacent to the hole, which seal is operatively coupled to the shaft, which seal is configured to reduce an amount of pre-transformed material that travels from one side of the hole to a second side of the hole that opposes the one side; and at least one controller that is operatively coupled to the layer dispenser, and the shaft, which at least one controller is programmed to direct performance of operations comprising: operation (i) direct moving the shaft to move in at least a first direction; operation (ii) direct the layer dispenser to dispense the pre-transformed material to form the material bed, and operation (iii) direct generating at least a portion of the at least one three-dimensional object from at least a portion of the material bed. In some embodiments, the shaft is operatively coupled to the layer dispenser. In some embodiments, the system further comprises an energy source that is configured to generate an energy beam that transforms at least a portion of the material bed to form the three-dimensional object. In some embodiments, the at least one controller is operatively coupled to the energy beam and is programmed to direct the energy beam to transform the at least a portion of the material bed to form the at least a portion of the at least one three-dimensional object. In some embodiments, the at least two of operations (i), (ii) and (iii) are directed by the same controller. In some embodiments, the at least one controller is a plurality of controllers. In some embodiments, the at least two of operations (i), (ii) and (iii) are directed by different controllers.

In another aspect, an apparatus for three-dimensional printing of at least one three-dimensional object comprises: an enclosure configured to accommodate a platform (e.g., and a material bed comprising a pre-transformed material); a layer dispenser comprising at least one component configured to perform one or more operations comprising (i) provide the pre-transformed material towards the platform (e.g., to form the material bed), or (ii) planarize an exposed surface of a material bed that comprises the pre-transformed material, which at least one component of the layer dispenser is operatively coupled to the platform (e.g., and/or to the material bed); and at least one actuator operatively coupled to the at least one component (e.g., and to the layer dispenser), which at least one actuator is configured to stutter (e.g., vibrate) the at least one component by moving the at least one component (e.g., and the layer dispenser) in a repetitive cycle along a trajectory to facilitate an operation of the at least one component (e.g., facilitate formation of the material bed), and wherein the at least one component (e.g., and layer dispenser) progresses in a direction along the trajectory. In some embodiments, the apparatus further comprises an energy source configured to generate an energy beam that transforms at least a portion of the material bed to form at least a section of the three-dimensional object. In some embodiments, the layer dispenser comprises an opening. In some embodiments, the at least one component comprises a material dispenser. In some embodiments, the repetitive cycle comprises at least two repetitions of a movement mode. In some embodiments, the movement mode comprises (I) a varying acceleration (II) a varying velocity, (III) a varying direction of the moving, or (IV) moving and halting. In some embodiments, the varying direction of the moving is along the trajectory. In some embodiments, the varying direction of the moving comprises a back and forth movement along the trajectory. In some embodiments, the layer dispenser comprises an exit opening port through which the pre-transformed material exits towards the platform (e.g., to form the material bed). In some embodiments, the at least one component comprises a leveler. In some embodiments, the leveler comprises a blade. In some embodiments, a shaft is operatively coupled to the actuator and the at least one component, which shaft facilitates translation of the layer dispenser. In some embodiments, the layer dispenser is configured to progress in a direction. In some embodiments, the at least one component of the layer dispenser comprises a bottom portion that is configured to retain the pre-transformed material therein (e.g., in the at least one component). In some embodiments, the bottom portion comprises a lip that projects therefrom. In some embodiments, the lip at least partially defines an opening through which the pre-transformed material is configured to exit the layer dispenser. In some embodiments, the at least one actuator is configured to vibrate such that pre-transformed material exits the opening upon vibrating. In some embodiments, the vibrating causes the at least one component of the layer dispenser to start and stop multiple times. In some embodiments, vibrate the at least one component it configured to facilitate formation of a planar exposed surface that deviates from average planarity by at most 200 micrometers, 20 micrometers, or 5 micrometers. In some embodiments, the at least one component comprises a material dispenser, and wherein the vibrate the at least one component it configured to facilitate a uniformity of at most about 20%, which uniformity percentage is calculated as a percentage of (i) dividing a deviation of a volume of pre-transformed material per unit area dispensed by the material dispenser, over (ii) an average volume per unit area that is dispensed by the material dispenser. In some embodiments, vibrating the at least one component it configured to facilitate a planar exposed surface having a standard deviation of a thickness of at most 250 micrometers. In some embodiments, the at least one component is a material dispenser. In some embodiments, the vibrating the at least one component it configured to facilitate a planar exposed surface having a standard deviation of a thickness of at most 50 micrometers. In some embodiments, the at least one component is a leveler. In some embodiments, configured to facilitate comprises using deposition. In some embodiments, configured to facilitate comprises using planarization. In some embodiments, the at least one component is devoid of moving parts (e.g., that move during the operation of the at least one component, and/or during the printing). In some embodiments, the at least one component is configured to facilitate homogenous distribution of the pre-transformed material above the platform (e.g., during its operation, e.g., during a cycle of material dispersion above the platform). In some embodiments, the apparatus further comprises a linear encoder or a linear actuator, wherein the at least one component is operatively coupled to the linear encoder and/or a linear actuator, and wherein the linear encoder or a linear actuator are configured to facilitate translation of the at least one component. In some embodiments, the layer dispensing mechanism (e.g., layer dispenser) is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a system for forming at least one three-dimensional object comprises: an enclosure configured to accommodate a platform (e.g., and a material bed comprising a pre-transformed material); at least one component of a layer dispenser configured to perform one or more operations comprising (I) provide the pre-transformed material (e.g., to form the material bed), or (II) planarize an exposed surface of a material bed comprising the pre-transformed material, which layer dispenser is operatively coupled to the platform (e.g., and/or to the material bed); an actuator operatively coupled to the (e.g., and to the layer dispenser), which actuator is configured to translate the at least one component in a forward and backward direction along a trajectory; and at least one controller that is operatively coupled to the layer dispenser, which at least one controller is programmed to perform operations comprising: operation (i) direct the at least one component (e.g., and the layer dispenser) to (a) provide the pre-transformed material (e.g., to form the material bed), and/or (b) planarize an exposed surface of a material bed comprising the pre-transformed material, (ii) direct the actuator to translate the at least one component along a trajectory to vibrate the at least one component by moving it in a repetitive cycle, and (iii) direct generating at least a section of the three-dimensional object from the pre-transformed material (e.g., from at least a portion of the material bed). In some embodiments, the system further comprises an energy source that is configured to generate an energy beam that transforms at least a portion of the material bed to form the three-dimensional object. In some embodiments, the at least one controller is operatively coupled to the energy beam and is programmed to direct the energy beam to transform the at least a portion of the material bed to form the at least a portion of the three-dimensional object. In some embodiments, the repetitive cycle comprises at least two repetitions of a movement mode. In some embodiments, the movement mode comprises (I) a varying acceleration (II) a varying velocity, (III) a varying direction of the moving, or (IV) moving and halting. In some embodiments, the varying direction of the moving is along the trajectory. In some embodiments, the varying direction of the moving comprises a back and forth movement along the trajectory. In some embodiments, the at least two of (i), (ii), and (iii) are directed by the same controller. In some embodiments, the at least one controller is a plurality of controllers. In some embodiments, the at least two of (i), (ii), and (iii) are directed by different controllers. In some embodiments, using the at least one component facilitates forming a planar exposed surface that deviates from average planarity by at most about 200 micrometers, 20 micrometers, or 5 micrometers. In some embodiments, using the at least one component facilitates homogenous distribution of the pre-transformed material above the platform (e.g., during operation of a material dispenser). In some embodiments, the at least one component comprises a material dispenser, a leveler, or a material remover.

In another aspect, an apparatus for three-dimensional printing of at least one three-dimensional object comprising at least one controller that is programmed to perform operations comprising: operation (a) direct at least one component of a layer dispenser to (i) provide the pre-transformed material towards the platform (e.g., to form a material bed), and/or (ii) planarize an exposed surface of a material bed that comprises the pre-transformed material; operation (b) direct vibrating the at least one component by moving it in a repetitive cycle along a trajectory (wherein layer dispenser progresses in a direction along the trajectory); and operation (c) direct generating at least a section of the three-dimensional object from the pre-transformed material (e.g., from at least a portion of the material bed). In some embodiments, the at least two of operation (a), operation (b), and operation (c) are directed by the same controller. In some embodiments, the at least one controller is a plurality of controllers. In some embodiments, at least two of operation (a), operation (b), and operation (c) are directed by different controllers. In some embodiments, the repetitive cycle comprises at least two repetitions of a movement mode. In some embodiments, the movement mode comprises (I) a varying acceleration (II) a varying velocity, (III) a varying direction of the moving, or (IV) moving and halting. In some embodiments, the varying direction of the moving is along the trajectory. In some embodiments, the varying direction of the moving comprises a back and forth movement along the trajectory. In some embodiments, using the at least one component facilitates forming a planar exposed surface that deviates from average planarity by at most about 200 micrometers, 20 micrometers, or 5 micrometers. In some embodiments, using the at least one component facilitates homogenous distribution of the pre-transformed material above the platform (e.g., during operation of a material dispenser). In some embodiments, the at least one component comprises a material dispenser, a leveler, or a material remover.

In another aspect, a computer software product for three-dimensional printing of at least one three-dimensional object, comprising a non-transitory computer-readable medium/media in which program instructions are stored, which instructions, when read by a computer, cause the computer to perform operations comprising: operation (a) directing using at least one component of a layer dispenser to provide a pre-transformed material towards a platform (e.g., to form a material bed); operation (b) directing translation of the at least one component to vibrate along a trajectory by moving it in a repetitive cycle, wherein layer dispenser progresses in a direction along the trajectory; and operation (c) directing generation of at least a portion of the three-dimensional object from the pre-transformed material (e.g., from at least a portion of the material bed).

In another aspect, a method for three-dimensional printing of at least one three-dimensional object comprises: (a) using at least one component of a layer dispenser to (i) provide the pre-transformed material towards the platform, and/or (ii) planarize an exposed surface of a material bed that comprises the pre-transformed material; (b) vibrating the at least one component by moving it in a repetitive cycle along a trajectory; and (c) generating at least a section of the three-dimensional object from the pre-transformed material. In some embodiments, the repetitive cycle comprises at least two repetitions of a movement mode. In some embodiments, the movement mode comprises (I) a varying acceleration (II) a varying velocity, (III) a varying direction of the moving, or (IV) moving and halting. In some embodiments, the varying direction of the moving is along the trajectory. In some embodiments, the varying direction of the moving comprises a back-and-forth movement along the trajectory. In some embodiments, the layer dispenser progresses in a direction along the trajectory. In some embodiments, the repetitive cycle comprises at least two repetitions of a movement mode. In some embodiments, using the at least one component facilitates formation of a planar exposed surface that deviates from average planarity by at most about 200 micrometers, 20 micrometers, or 5 micrometers. In some embodiments, using the at least one component facilitates homogenous distribution of the pre-transformed material above the platform (e.g., during operation of the material dispenser). In some embodiments, the at least one component comprises a material dispenser, and wherein vibrating the at least one component facilitates a uniformity of at most about 20%, which uniformity percentage is calculated as a percentage of (i) dividing a deviation of a volume of pre-transformed material per unit area dispensed by the material dispenser, over (ii) an average volume per unit area that is dispensed by the material dispenser. In some embodiments, vibrating the at least one component it facilitates a planar exposed surface having a standard deviation of a thickness of at most 250 micrometers. In some embodiments, the at least one component is a material dispenser. In some embodiments, vibrating the at least one component it facilitates a planar exposed surface having a standard deviation of a thickness of at most 50 micrometers. In some embodiments, the at least one component is a leveler.

In another aspect, a method for generating a three-dimensional object comprises: (a) aligning at least a portion of a first opening end of a channel with at least a portion of an exit opening of a bulk reservoir comprising a pre-transformed material; (b) aligning at least a portion of a second opening end of the channel with at least a portion of an entry opening of a material dispenser, which channel facilitates flow of the pre-transformed material towards the material dispenser; (c) conveying the pre-transformed material from the bulk reservoir to the material dispenser through the channel; and (d) dispensing a portion of the pre-transformed material from the material dispenser to form at least a portion of the three-dimensional object. In some embodiments, the method further comprises irradiating a portion of the material bed with an energy beam to form at least a section of the three-dimensional object. In some embodiments, facilitates flow comprises being slanted with respect to a planar exposed surface of the material bed, a platform on which the material bed rests, and/or a normal to the gravitational field vector. In some embodiments, facilitates flow comprises having an internal surface that has a reduced friction with the pre-transformed material. In some embodiments, the reduced friction comprises a polished, a non-attractive, or a repulsive surface. In some embodiments, the non-attractive or repulsive is relative to the pre-transformed material. In some embodiments, facilitates flow comprises expands towards the material dispenser. In some embodiments, expands comprises expands in volume. In some embodiments, the channel is a perforation in a plate. In some embodiments, the channel is a lateral gap between two or more plates. In some embodiments, the channel comprises a uniform shape. In some embodiments, the channel comprises a non-uniform shape. In some embodiments, the conveying continues until the channel becomes congested with pre-transformed material. In some embodiments, the channel comprises at least two diverging surfaces. In some embodiments, the channel comprises at least two parallel surfaces. In some embodiments, a first cross-section of the first opening end of the channel is different than a second cross-section of the second opening end of the channel. In some embodiments, the first cross section is smaller than the second cross section. In some embodiments, the first cross section and/or the second cross section is a horizontal cross section. In some embodiments, conveying the pre-transformed material forms a mound of the pre-transformed material in the material dispenser. In some embodiments, the at least one void is formed adjacent to the mound of material in the material dispenser. In some embodiments, the void is free of pre-transformed material. In some embodiments, the void is formed according to an angle of repose of the pre-transformed material. In some embodiments, the method further comprises translating the channel to at least partially align with the at least one void to empty the channel. In some embodiments, the method further comprises translating the channel to at least partially align with the at least one void. In some embodiments, the pre-transformed material congested in the channel at least partially fills up the at least one void. In some embodiments, the translating facilitates closure of the exit opening of the bulk reservoir. In some embodiments, during the dispensing, the channel is empty of pre-transformed material. In some embodiments, a wall of the channel facilitates flow of the pre-transformed material. In some embodiments, the wall of the channel is coated with a polished material. In some embodiments, the plate translates to a third position. In some embodiments, the third position facilitates closure of an exit opening of a bulk reservoir and closure of an entrance opening of a material dispensing mechanism. In some embodiments, the second position of the plate facilitates closure of an exit opening of a bulk reservoir. In some embodiments, the method further comprises moving the channel to form the aligning in operation (a) and/or in operation (b). In some embodiments, the moving comprises moving a perforated plate. In some embodiments, the channel comprises a perforation in the perforated plate. In some embodiments, the moving comprises moving a plurality of plates. In some embodiments, the channel comprises a lateral gap between at least two of the plurality of plates.

In another aspect, an apparatus for three-dimensional printing of at least one three-dimensional object comprises: a channel comprising a first opening end and a second opening end, the channel configured to convey a pre-transformed material from the first opening end to the second opening end, which channel facilitates flow of the pre-transformed material from the first opening end to the second opening end, wherein the first opening end opposes the second opening end; a material dispenser that is configured to dispense the pre-transformed material to form a material bed, which material dispenser comprises an entry opening, wherein a portion of the entry opening is configured to at least partially align with a portion of the second opening end of the channel to facilitate flow of the pre-transformed material from the channel to the material dispenser, wherein the material dispenser is operatively coupled to the channel; and a bulk reservoir comprising an exit opening, which bulk reservoir comprises the pre-transformed material, wherein a portion of the exit opening is configured to at least partially align with a portion of the first opening end of the channel to facilitate flow of the pre-transformed material from the bulk reservoir to the channel, which bulk reservoir is operatively coupled to the channel. In some embodiments, the apparatus further comprises an energy source configured to generate an energy beam that transforms at least a portion of the material bed to form at least a section of the three-dimensional object. In some embodiments, the energy beam is operatively coupled to the material bed. In some embodiments, the channel facilitates flow of pre-transformed material from the bulk reservoir to the material dispenser. In some embodiments, the material dispenser dispenses a portion of the pre-transformed material to form a material bed. In some embodiments, the material dispenser is included in a layer dispensing mechanism. In some embodiments, the layer dispensing mechanism is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a system for forming at least one three-dimensional object comprises: an enclosure configured to accommodate a material bed comprising a pre-transformed material; a material dispenser that is configured to translate and dispense the pre-transformed material to form the material bed, which material dispenser comprises an entry opening, wherein the material dispenser is operatively coupled to the enclosure; a channel comprising a first opening end and a second opening end that opposes the first opening end, which channel is operatively coupled to the material dispenser; a bulk reservoir comprising an exit opening, which bulk reservoir is configured to accommodate the pre-transformed material, which bulk reservoir is operatively coupled to the channel; and at least one controller that is operatively coupled to the layer dispenser, which at least one controller is programmed to direct performance of the following operations: operation (i) direct aligning at least a portion of the first opening end of the channel with at least a portion of the exit opening of the bulk reservoir to facilitate flow of the pre-transformed material from the bulk reservoir to the channel, (ii) direct aligning at least a portion of the second opening end of the channel with at least a portion of the entry opening of the material dispenser to facilitate flow of the pre-transformed material from the channel to the material dispenser, and (iii) direct dispensing a portion of the pre-transformed material from the material dispenser to facilitate formation of at least a portion of the three-dimensional object. In some embodiments, the system further comprises an energy source that is configured to generate an energy beam that transforms at least a portion of the material bed to form the three-dimensional object. In some embodiments, the at least one controller is operatively coupled to the energy beam and is programmed to direct the energy beam to transform the at least a portion of the material bed to form the at least a portion of the three-dimensional object. In some embodiments, the at least two of operations (i), (ii), and (iii) are directed by the same controller. In some embodiments, the at least one controller is a plurality of controllers. In some embodiments, the at least two (e.g., two or more) of operations (i), (ii), and (iii) are directed by different controllers.

In another aspect, an apparatus for three-dimensional printing of at least one three-dimensional object comprises at least one controller that is programmed to perform the following operations: operation (a) direct aligning at least a portion of a first opening end of a channel with at least a portion of an exit opening of a bulk reservoir to facilitate flow of a pre-transformed material from the bulk reservoir to the channel, wherein the channel and the bulk reservoir are operatively coupled to the controller; operation (b) direct aligning at least a portion of a second opening end of the channel with at least apportion of an entry opening of a material dispenser to facilitate flow of the pre-transformed material from the channel to the material dispenser, wherein the second opening end of the channel opposes the first opening end of the channel, wherein the material dispenser is operatively coupled to the controller; and operation (c) direct dispensing a portion of the pre-transformed material from the material dispenser to facilitate the printing of at least a section of the three-dimensional object. In some embodiments, the at least one controller is programed to direct an energy beam to transform at least a portion of the material bed to form the at least a section of the three-dimensional object. In some embodiments, the energy beam is operatively coupled to the controller. In some embodiments, the controller is operatively coupled to the material bed. In some embodiments, the at least two of operation (a), operation (b), and operation (c) are directed by the same controller. In some embodiments, the at least one controller is a plurality of controllers. In some embodiments, the at least two of operation (a), operation (b), and operation (c) are directed by different controllers.

In another aspect, a computer software product for three-dimensional printing of at least one three-dimensional object comprises a non-transitory computer-readable medium/media in which program instructions are stored, which instructions, when read by a computer, cause the computer to perform operations comprising: operation (a) directing aligning of at least a portion of a first opening end of a channel with at least a portion of an exit opening of a bulk reservoir comprising a pre-transformed material to facilitate flow of a pre-transformed material from the bulk reservoir to the channel; operation (b) directing aligning of at least a portion of a second opening end of the channel with at least apportion of an entry opening of a material dispenser to facilitate flow of the pre-transformed material from the channel to the material dispenser; operation (c) directing dispensing of a portion of the pre-transformed material from the material dispenser to print at least a section of the three-dimensional object. In some embodiments, to print at least a section of the three-dimensional object comprises directing an energy beam to transform at least a portion of the material bed to form the at least a section of the three-dimensional object. In another aspect, a method for generating a three-dimensional object comprises: (a) forming a channel adjacent to a material dispenser, which channel has a first opening at a first channel end and a second opening at a second channel end, which channel is configured to facilitate conveyance of a pre-transformed material; (b) conveying the pre-transformed material to the material dispenser through the channel; (c) disrupting the channel; and (d) dispensing a portion of the pre-transformed material from the material dispenser to form at least a portion of the three-dimensional object. In some embodiments, the method further comprises forming the channel from a bulk reservoir to the material dispenser. In some embodiments, from the bulk reservoir to the material dispenser comprises from an exit opening of the bulk reservoir to an entrance opening of the material dispenser. In some embodiments, conveying the pre-transformed material is from the bulk reservoir to the material dispenser through the channel. In some embodiments, the method further comprises irradiating a portion of the pre-transformed material with an energy beam to form the at least the portion of the three-dimensional object. In some embodiments, the channel at least in part operatively couples to (e.g., merges with) an entrance opening of the material dispenser. In some embodiments, the channel is a continuation of the entrance opening of the material dispenser. In some embodiments, the disrupting the channel comprises eliminating the channel. In some embodiments, the disrupting the channel comprises moving the channel. In some embodiments, the disrupting the channel comprises altering an internal volume and/or shape of the channel. In some embodiments, the method further comprises shutting the exit opening of the bulk reservoir. In some embodiments, the method further comprises translating the material dispenser. In some embodiments, the disrupting the channel is during and/or after translating the material dispenser. In some embodiments, translating the material dispenser is coordinated with shutting of the exit opening of the bulk reservoir. In some embodiments, translating the material dispenser is while shutting of the exit opening of the bulk reservoir. In some embodiments, disrupting the channel is during and/or after shutting the exit opening of the bulk reservoir. In some embodiments, conveying the pre-transformed material is during and/or after disrupting the channel. In some embodiments, conveying the pre-transformed material relates to (e.g., causes, or results in) disruption of the channel in (c). In some embodiments, the bulk reservoir is stationary during the dispensing. In some embodiments, the method further comprising translating the material dispenser during the dispensing. In some embodiments, translating comprises laterally translating. In some embodiments, the method further comprises aligning at least a portion of the first opening of the channel with at least a portion of the exit opening of the bulk reservoir. In some embodiments, the method further comprises aligning at least a portion of the second opening of the channel with at least a portion of an entry opening of the material dispenser. In some embodiments, forming the channel comprises translating a plate that comprises one side of the channel. In some embodiments, translating the plate comprises laterally translating the plate. In some embodiments, translating the plate is towards the material dispenser. In some embodiments, translating the plate is towards a side of the material dispenser. In some embodiments, translating the plate is towards an entrance opening of the material dispenser. In some embodiments, a second side of the channel comprises at least a portion of the entrance opening of the material dispenser. In some embodiments, the method further comprises aligning at least a portion of the second opening of the second channel end with at least a portion of an entry opening of the material dispenser. In some embodiments, the aligning is before the conveying. In some embodiments, facilitate the flow of the pre-transformed material comprises being slanted with respect to (i) a planar exposed surface of the material bed, (ii) a platform on which the material bed rests, and/or (iii) a normal to the gravitational field vector. In some embodiments, facilitate the flow comprises having an internal surface that has a reduced friction with the pre-transformed material. In some embodiments, the reduced friction comprises a polished, a non-attractive, or a repulsive surface. In some embodiments, the non-attractive or repulsive is relative to the pre-transformed material. In some embodiments, facilitate the flow comprises and expands towards the material dispenser. In some embodiments, expands comprises expands in volume. In some embodiments, the method further comprises shutting the exit opening of the bulk reservoir upon disengagement of the first opening of the channel from the exit opening of the bulk reservoir. In some embodiments, the shutting is with at least a portion of the plate. In some embodiments, the channel comprises a uniform shape. In some embodiments, the channel comprises a non-uniform shape. In some embodiments, the conveying continues until the channel becomes clogged with pre-transformed material. In some embodiments, the channel comprises at least two diverging surfaces. In some embodiments, the channel has no rotational symmetry axis (e.g. that comprises its entry and exit). In some embodiments, the channel comprises at least two parallel surfaces. In some embodiments, a first cross-section of the first opening of the first channel end is different than a second cross-section of the second opening of the second channel end. In some embodiments, the first cross section is smaller than the second cross section. In some embodiments, the first cross section and/or the second cross section is a horizontal cross section. In some embodiments, conveying the pre-transformed material comprises forming a mound of the pre-transformed material in the material dispenser. In some embodiments, the method further comprises forming at least one void adjacent to the mound of material in the material dispenser. In some embodiments, the void is free of the pre-transformed material. In some embodiments, the void is formed according to an angle of repose of the pre-transformed material. In another aspect, an apparatus for three-dimensional printing of at least one three-dimensional object comprises: a material dispenser that is configured to dispense the pre-transformed material to form a material bed, which material dispenser has a side comprising an entrance opening; and a plate configured to translate with respect to the material dispenser, which plate comprises a plate opening that is configured to at least partially align to form a channel that facilitates a flow of the pre-transformed material to the material dispenser. In some embodiments, the apparatus further comprises a bulk reservoir comprising an exit opening. In some embodiments, the bulk reservoir is configured to enclose a pre-transformed material. In some embodiments, the plate is configured to translate with respect to the bulk reservoir. In some embodiments, the plate opening is configured to at least partially align with the exit opening of the bulk reservoir to form a channel that facilitates a flow of the pre-transformed material from the bulk reservoir to the material dispenser. In some embodiments, further comprising at least one auxiliary member adjacent the bulk reservoir that is configured to close the exit opening of the bulk reservoir or the entrance opening of the material dispenser upon movement of the at least one auxiliary member with respect to the plate. In some embodiments, the entrance opening is defined by a wall of the material dispenser. In some embodiments, the at least a portion of an internal surface of the wall is configured to facilitate flow of the pre-transformed material. In some embodiments, at least a portion of the internal surface of is coated with a polished material. In some embodiments, at least a portion of the internal surface is polished. In some embodiments, at least a portion of the internal surface has a Ra (arithmetic average of the roughness profile) value of at most 50 micrometers ($\mu m$), 10 $\mu m$, 5 $\mu m$, or 1 $\mu m$. In some embodiments, the plate is configured to disrupt the channel upon movement of the plate with respect to the bulk reservoir and/or the material dispenser. In some embodiments, disrupting the channel comprises disrupting a position, a cross sectional shape, a cross sectional area, a volume, and/or an existence of the channel. In some embodiments, the channel facilitates the flow of the pre-transformed material from a first end of the plate opening to a second end of the plate opening. In some embodiments, the first end opposes the second end. In some embodiments, the first end of the plate opening and at least part of the exit opening of the bulk reservoir form at least part of the channel. In some embodiments, the second end of the plate opening and at least part of the entrance opening of the material dispenser form at least part of the channel. In some embodiments, a first cross-section of the first end of the plate opening is different than a second cross-section of the second end of the plate opening. In some embodiments, the first cross section is smaller than the second cross section. In some embodiments, the first cross section and/or the second cross section is a horizontal cross section. In some embodiments, the plate includes a first portion and a second portion. In some embodiments, the first or second portion is configured to close the exit opening of the bulk reservoir when the plate opening is not at least partially aligned with the exit and entrance openings. In some embodiments, the side is configured not to (a) face an exposed surface of the material bed or (b) face away from the exposed surface of the material bed. In some embodiments, the side is configured to be normal to an exposed surface of the material bed. In some embodiments, the side is configured to be non-parallel to an exposed surface of the material bed. In some embodiments, the channel comprises a uniform shape. In some embodiments, the channel comprises a non-uniform shape. In some embodiments, the channel is at least partially defined by at least two diverging surfaces. In some embodiments, the channel has no rotational symmetry axis (e.g. that comprises its entry and exit). In some embodiments, the channel is at least partially defined by at least two parallel surfaces. In some embodiments, the at least one wall of the channel facilitates flow of the pre-transformed material. In some embodiments, the at least one wall of the channel is coated with a polished material. In some embodiments, the at least one wall of the channel is polished. In some embodiments, the at least one wall of the channel has a Ra value of at most 50 micrometers (μm), 10 μm, 5 μm, or 1 μm. In some embodiments, the first or second portion is at least partially supported by a support member adjacent the material dispenser. In some embodiments, an internal surface of the angled slot is coated with a polished material. In some embodiments, an internal surface of the angled slot is polished. In some embodiments, an internal surface of the angled slot has a Ra value of at most 50 micrometers (μm), 10 μm, 5 μm, or 1 μm. In some embodiments, the at least one wall and/or internal surface has a Ra value of a smooth surface as disclosed herein. In some embodiments, the apparatus further comprises an energy source configured to generate an energy beam that transforms at least a portion of the pre-transformed material to form at least a section of the at least one three-dimensional object. In some embodiments, each of the exit and entrance openings have a slot shape. In some embodiments, the entrance and exit openings have the same cross-section shape. In some embodiments, the plate opening is an angled slot. In some embodiments, the plate is fixedly coupled with the material dispenser. In some embodiments, the plate and the material dispenser are translatable with respect to the bulk reservoir.

In another aspect, a system for forming at least one three-dimensional object comprises: a material dispenser that is configured to dispense the pre-transformed material to form the at least one three-dimensional object, which material dispenser has a side comprising an entrance opening; a plate configured to translate with respect to the material dispenser, which plate comprises a plate opening that is configured to at least partially align with the exit and entrance openings to form a channel that facilitates a flow of the pre-transformed material to the material dispenser; and at least one controller that is operatively coupled to the plate, which the at least one controller is collectively or individually programmed to direct the following operations: operation (a) moving the plate to form a channel to the material dispenser to facilitate conveying the pre-transformed material to the material dispenser through the channel; and operation (b) moving the plate to disrupt the channel. In some embodiments, the system further comprises a bulk reservoir comprising an exit opening, which bulk reservoir is configured to enclose a pre-transformed material. In some embodiments, the plate is configured to translate with respect to the bulk reservoir. In some embodiments, the plate opening that is configured to at least partially align with the exit and entrance openings to form a channel that facilitates a flow of the pre-transformed material from the bulk reservoir to the material dispenser. In some embodiments, moving the plate to form a channel is from the bulk reservoir to the material dispenser to facilitate conveying the pre-transformed material from the bulk reservoir to the material dispenser through the channel. In some embodiments, the system further comprises an energy source that is configured to generate an energy beam that transforms at least a portion of the pre-transformed material to form the at least one three-dimensional object. In some embodiments, the at least one controller is operatively coupled to the energy beam and is programmed to direct the energy beam to transform the at least a portion of the pre-transformed material to form the at least one three-dimensional object. In some embodiments, the at least one controller is programmed to direct dispensing a portion of the pre-transformed material from the material dispenser to form at least the portion of the three-dimensional object. In some embodiments, the at least one controller is further programmed to direct shutting the exit opening of the bulk reservoir. In some embodiments, shutting the exit opening of the bulk reservoir comprises moving the plate. In some embodiments, shutting the exit opening of the bulk reservoir is during and/or after (b). In some embodiments, the at least one controller is programmed to direct (e.g., laterally) translating the material dispenser. In some embodiments, translating the material dispenser is coordinated with moving the plate. In some embodiments, the system further comprises a sensor configured to sense the position of the plate. In some embodiments, the at least one controller is programmed to direct moving the plate in accordance with a current and/or a requested position of the plate considering an input from the sensor. In some embodiments, the at least two of the operations are directed by the same controller. In some embodiments, the at least two of the operations are directed by the different controllers. In some embodiments, moving the movable plate in operation (a) comprises moving the material dispenser with the plate with respect to the bulk reservoir.

In another aspect, an apparatus for three-dimensional printing of at least one three-dimensional object comprises at least one controller that is collectively or individually programmed to perform the following operations: operation (a) moving a plate that includes a plate opening to form a channel that facilitates conveyance of a pre-transformed material to an entrance opening (e.g., on a side of) a material dispenser, which the at least one three-dimensional object is printed from the pre-transformed material; and operation (b) moving the plate to disrupt the channel. In some embodiments, moving the plate comprises laterally moving the plate. In some embodiments, moving the plate is between a material dispenser and a bulk reservoir. In some embodiments, the plate opening at least partially forms the channel that facilitates conveyance of a pre-transformed material from an exit opening of the bulk reservoir to the entrance opening of the material dispenser. In some embodiments, moving the plate comprises laterally moving the plate. In some embodiments, moving the plate comprises at least partially aligning the plate opening with respect to the exit opening of the bulk reservoir. In some embodiments, the at least one controller is programmed to direct an energy beam to transform at least a portion of the pre-transformed material to form the at least one three-dimensional object. In some embodiments, the at least one controller is programmed to direct dispensing a portion of the pre-transformed material from the material dispenser to form at least a layer of a material bed. In some embodiments, the dispensing is during and/or after operation (b). In some embodiments, moving the plate is coordinated with moving the material dispenser. In some embodiments, the at least one controller is further programmed to direct shutting the exit opening of the bulk reservoir. In some embodiments, shutting the exit opening of the bulk reservoir comprises translating the plate. In some embodiments, shutting the exit opening of the bulk reservoir is during and/or after operation (b). In some embodiments, the at least one controller is programmed to direct moving the plate in accordance with a current and/or a requested position of the plate (e.g., considering an input from a sensor). In some embodiments, (b) comprises occluding the exit opening of the bulk reservoir using the plate. In some embodiments, the at least one controller is programed to direct an energy beam to transform at least a portion of the material bed to form the at least one three-dimensional object. In some embodiments, the energy beam is operatively coupled to the controller. In some embodiments, the operations (a) and (b) are directed by the same controller. In some embodiments, the operations (a) and (b) are directed by the different controllers.

In another aspect, a computer software product for three-dimensional printing of at least one three-dimensional object comprises a non-transitory computer-readable medium/media in which program instructions are stored, which instructions, when read by a computer, cause the computer to perform operations comprising: operation (a) moving a plate towards a material dispenser, wherein the plate includes a plate opening that forms a channel that facilitates conveyance of a pre-transformed material to an entrance opening (e.g., on a side of) the material dispenser, which the at least one three-dimensional object is printed from the pre-transformed material; and operation (b) moving the plate to disrupt the channel. In some embodiments, moving the plate is between the material dispenser and a bulk reservoir. In some embodiments, the plate opening forms a channel that facilitates conveyance of a pre-transformed material from an exit opening of the bulk reservoir to an entrance opening of the material dispenser. In some embodiments, the non-transitory computer-readable medium/media causes a computer to direct operations (a) and (b). In some embodiments, the program instructions causes a first computer to direct operation (a), and a second computer to direct operation (b). In some embodiments, the program instructions causes a first computer to direct operation (a), and a second computer to direct operation (b). In some embodiments, the non-transitory computer-readable media comprise a first non-transitory computer-readable medium and a second non-transitory computer-readable medium. In some embodiments, the first non-transitory computer-readable medium causes a computer to direct operation (a), and the second non-transitory computer-readable medium causes the computer to direct operation (b). In some embodiments, a first non-transitory computer-readable medium cause a first computer to direct operation (a), and a second non-transitory computer-readable medium causes a second computer to direct operation (b).

In another aspect, an apparatus for three-dimensional printing of at least one three-dimensional object, the apparatus comprises: a processing chamber configured to enclose the at least one three-dimensional object; a mechanism configured to perform at least one operation in the processing chamber (e.g., during the printing); and an ancillary chamber configured to house the mechanism, wherein the mechanism is configured to translate between the processing chamber and the ancillary chamber through an opening (e.g., during the printing). In some embodiments, the mechanism configured to (i) perform at least one operation in the processing chamber during the printing, and/or (ii) translate between the processing chamber and the ancillary chamber through the opening, during at least part of the printing process. In some embodiments, during at least part of the printing process comprises when the at least one three-dimensional object is not being formed. In some embodiments, during at least part of the printing process comprises when an energy beam is not printing the at least one three-dimensional object. In some embodiments, during at least part of the printing process comprises when an energy beam is not operational in printing the at least one three-dimensional object. In some embodiments, during at least part of the printing process comprises when an energy beam is not transforming a pre-transformed material to a transformed material during printing of the at least one three-dimensional object. In some embodiments, the mechanism is a layer forming device configured to form at least one layer of material of a material bed. In some embodiments, the mechanism comprises an opening or a blade. In some embodiments, the mechanism is a dispenser that is configured to dispense a pre-transformed material to form the at least one three-dimensional object. In some embodiments, the processing chamber is configured to enclose the at least one three-dimensional object during printing of the at least one three-dimensional object. In some embodiments, the mechanism is configured to translate between the processing chamber and the ancillary chamber through the opening during printing of the at least one three-dimensional object. In some embodiments, the ancillary chamber is configured to house the mechanism when the apparatus is not performing the at least one operation. In some embodiments, the ancillary chamber and the processing chamber are integrated. In some embodiments, the ancillary chamber and the processing chamber engage and/or disengage (e.g., reversibly engageable and separable). In some embodiments, the apparatus further comprises a closure that is configured to close the opening. In some embodiments, the closure reduces an exposure of the mechanism housed in the ancillary chamber from: a debris, a gas flow, a plasma, radiation, gas pressure, and/or a reactive agent that is present in the processing chamber. In some embodiments, the closure comprises a flapping, rolling, sliding door, or revolving door. In some embodiments, the closure is gas tight. In some embodiments, the closure is gas permeable. In some embodiments, the closure is a physical barrier. In some embodiments, the closure comprises a first closure portion of the processing chamber, and a second closure portion of the ancillary chamber. In some embodiments, the ancillary chamber is configured to disengage from the processing chamber during printing of the at least one three-dimensional object (e.g., upon closure of the first closure and/or the second closure). In some embodiments, the ancillary chamber is configured to disengage from the processing chamber during printing of the at least one three-dimensional object without (e.g., substantially) disrupting the printing. In some embodiments, the printing is in a non-reactive atmosphere. In some embodiments, the printing is under positive pressure. In some embodiments, the closure is operatively coupled to the mechanism. In some embodiments, the apparatus further comprises a platform configured to support the at least one three-dimensional object. In some embodiments, the apparatus further comprises a build module. In some embodiments, the platform is translatable within the build module. In some embodiments, the build module is reversibly engaged with the processing chamber. In some embodiments, the apparatus further comprises an energy source configured to generate an energy beam that transforms at least a portion of the pre-transformed material to print the at least one three-dimensional object. In some embodiments, the apparatus further comprises a recycling system that is configured to recycle a portion of the pre-transformed material. In some embodiments, the recycling system is configured to recycle a portion of the pre-transformed material for printing a subsequent three-dimensional object. In some embodiments, the ancillary chamber comprises an opening port that provides access for the portion of the pre-transformed material from the ancillary chamber to the recycling system. In some embodiments, the opening port is within an opening port region of the ancillary chamber. In some embodiments, the ancillary chamber includes a funnel portion that is configured to direct the portion of the pre-transformed material to the opening port. In some embodiments, the funnel portion comprises one or more walls that converge toward the opening port. In some embodiments, a region comprising the opening port comprises a port flushing component that is configured to provide a flow of at least one gas that flushes the portion of the pre-transformed material through the region. In some embodiments, the port flushing component comprises an inlet configured to accept the flow of the at least one gas from a gas source into the region, and an outlet configured to direct the flow of gas out of the region. In some embodiments, the outlet is coupled to the recycling system via at least one coupling member. In some embodiments, the port flushing component is coupled to the ancillary chamber via a connector. In some embodiments, the port flushing component is directly coupled to the ancillary chamber. In some embodiments, the apparatus further comprises at least one detector that is configured to detect a portion of pre-transformed material transported from the ancillary chamber to a recycling system. In some embodiments, the at least one detector is configured to detect an amount of the portion of the pre-transformed material, sizes of particles of the portion of the pre-transformed material, a velocity of the flow of the portion of the pre-transformed material, and/or a chemical nature of the portion of the pre-transformed material. In some embodiments, the at least one detector is configured to detect electromagnetic radiation and/or acoustic signal. In some embodiments, the apparatus further comprises an emitter that is configured to emit the electromagnetic radiation and/or the acoustic signal. In some embodiments, the at least one detector is configured to provide information related to an efficiency of one or more filters of the recycling system. In some embodiments, the mechanism is configured to translate in a direction over the material bed. In some embodiments, the mechanism is configured to vibrate, stutter, oscillate, jitter, fluctuate, pulsate, and/or flutter during the translating. In some embodiments, the mechanism is configured to perform an uneven movement during the translating. In some embodiments, the uneven movement is repeated twice or more during the translating. In some embodiments, the uneven movement is repeated during a translating cycle. In some embodiments, the mechanism comprises at least one of a material dispenser, a material remover, or a leveler. In some embodiments, the mechanism comprises a material dispenser having a bottom portion that is configured to retain a portion of a pre-transformed material therein. In some embodiments, the mechanism is configured to translate in a manner that imparts kinetic energy to a pre-transformed material that (i) comes into contact with the mechanism, and/or (ii) is carried by the mechanism. In some embodiments, the material dispenser comprises a lip and an exit opening. In some embodiments, the lip extends from the bottom portion and ends at the exit opening. In some embodiments, the material dispenser is configured to move in a motion that causes the portion of the pre-transformed material within the bottom portion to exit the exit opening. In some embodiments, the motion comprises a modulated motion. In some embodiments, the modulated motion is repetitive. In some embodiments, the modulated motion comprises a vibrating, stuttering, oscillating, jittering, fluctuating, pulsating, and/or fluttering motion. In some embodiments, the apparatus further comprises one or more actuators that are configured to cause the modulated motion. In some embodiments, the ancillary chamber includes a partition that separates the mechanism from the one or more actuators. In some embodiments, the one or more actuators are external to the ancillary chamber. In some embodiments, the partition is configured to reduce an amount of a pre-transformed material that contacts the one or more actuators. In some embodiments, the processing chamber is configured to have a first atmosphere and the ancillary chamber is configured to have a second atmosphere. In some embodiments, during the printing of the at least one three-dimensional object, the first atmosphere is the same as the second atmosphere. In some embodiments, the material dispenser is included in a layer dispensing mechanism. In some embodiments, the layer dispensing mechanism is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a method for printing at least one three-dimensional object, the method comprises: (a) using a mechanism to perform at least one operation in a processing chamber (e.g., as part of printing the at least one three-dimensional object); (b) translating the mechanism to an ancillary chamber through an opening disposed between the processing chamber and the ancillary chamber; and (c) closing the opening using a closure when (e.g., after) the mechanism is positioned within the ancillary chamber. In some embodiments, the at least one three-dimensional object is printed in the processing chamber during the printing. In some embodiments, the closure separates the processing chamber from the ancillary chamber. In some embodiments, the mechanism comprises an opening or a blade. In some embodiments, the closure separates an atmosphere of the processing chamber from an atmosphere of the ancillary chamber. In some embodiments, the mechanism comprises a material dispenser. In some embodiments, using the mechanism comprises dispensing a pre-transformed material (e.g., using the material dispenser). In some embodiments, using the mechanism comprises planarizing an exposed surface of a material bed (e.g., using a material remover and/or a leveler). In some embodiments, the mechanism comprises a layer dispenser. In some embodiments, using the mechanism comprises dispensing a layer of pre-transformed material (e.g., using the layer dispenser). In some embodiments, the layer dispenser comprises a material dispenser, a material remover, or a leveler. In some embodiments, the pre-transformed material is used to form the at least one three-dimensional object. In some embodiments, dispensing the pre-transformed material forms a layer of a material bed. In some embodiments, the at least one three-dimensional object is formed from at least a portion of the material bed. In some embodiments, the method further comprises transforming a portion of the pre-transformed material to a transformed material to form the at least one three-dimensional object. In some embodiments, the closing the opening is at least during the transforming. In some embodiments, the method further comprises engaging and/or disengaging the processing chamber and the ancillary chamber. In some embodiments, closing the opening comprises reducing an exposure of the mechanism housed in the ancillary chamber from: a debris, gas flow, plasma, radiation, gas pressure, and/or a reactive agent that is present in the processing chamber. In some embodiments, closing the opening comprises flapping, rolling, sliding, or revolving the closure. In some embodiments, closing the opening comprises separating the ancillary chamber from the processing chamber. In some embodiments, the closure is gas tight. In some embodiments, the closure is gas permeable. In some embodiments, closing the opening comprises closing the ancillary chamber and closing the processing chamber. In some embodiments, closing the opening comprises closing the ancillary chamber and closing the processing chamber simultaneously. In some embodiments, closing the opening comprises closing the ancillary chamber and closing the processing chamber sequentially. In some embodiments, closing the opening comprises coordinating (i) closing the ancillary chamber and (ii) closing of the processing chamber sequentially. In some embodiments, the closure comprises a first closure portion of the processing chamber, and a second closure portion of the ancillary chamber. In some embodiments, the method further comprises disengaging the ancillary chamber from the processing chamber. In some embodiments, the disengaging is before, after, or during printing of the at least one three-dimensional object. In some embodiments, the disengaging is during printing of the at least one three-dimensional object (e.g., without disrupting the printing). In some embodiments, the printing is in a non-reactive atmosphere. In some embodiments, the printing is under positive pressure. In some embodiments, the method further comprises transforming at least a portion of the pre-transformed material to a transformed material using an energy beam. In some embodiments, the transforming is at or above a platform. Above the platform comprises (i) in a material bed, or (ii) in an atmosphere. In some embodiments, dispensing the pre-transformed material is towards a platform, wherein the at least one three-dimensional object is formed from the pre-transformed material. In some embodiments, dispensing comprises streaming. In some embodiments, the forming layer of the material bed comprises forming the material bed adjacent and/or on the platform. In some embodiments, the 3D object is anchored to the platform, e.g., during the printing. In some embodiments, the 3D object is not anchored to the platform, e.g., during the printing. In some embodiments, the layer is formed on a previously dispensed material bed on a platform. In some embodiments, the method further comprises translating a platform within a build module. In some embodiments, the build module is reversibly engaged with the processing chamber. In some embodiments, the method further comprises recycling at least a portion of the pre-transformed material using a recycling system. In some embodiments, the method further comprises facilitating conveyance of the at least a portion of the pre-transformed material to the recycling system through an opening port of the ancillary chamber. In some embodiments, the conveyance is through a funnel portion that is coupled to the ancillary chamber, which funnel portion facilitates directing the recycled portion of the pre-transformed material to the opening port. In some embodiments, the method further comprises flushing the opening port with a flow of at least one gas that flushes a recycled portion of the pre-transformed material through a region comprising the opening port. In some embodiments, the region includes an enclosed region. In some embodiments, the region includes in a channel. In some embodiments, an inlet of the port flushing component accepts the flow of the at least one gas from a gas source (e.g., in the region). In some embodiments, an outlet of the port flushing component directs the flow of the at least one gas out of the region. In some embodiments, the method further comprises detecting the recycled portion of the pre-transformed material transported from the ancillary chamber to a recycling system using at least one detector. In some embodiments, the at least one detector detects an amount of the recycled portion of the pre-transformed material, sizes of particles of the recycled portion of the pre-transformed material, a velocity of the flow of the recycled portion of the pre-transformed material, and/or a chemical nature of the recycled portion of the pre-transformed material. In some embodiments, dispensing the pre-transformed material comprises translating a material dispenser in a direction that is substantially parallel to a platform surface. In some embodiments, the platform is disposed in the processing chamber, or in a build module coupled to the processing chamber. In some embodiments, using the mechanism comprises modulating at least a component of the mechanism. In some embodiments, the modulating comprises a repetitive modulation. In some embodiments, the modulating is during usage of the mechanism to perform the at least one operation in the processing chamber as part of printing of the three-dimensional object. In some embodiments, the at least one operation comprises translating the mechanism. In some embodiments, the at least one operation comprises dispensing a pre-transformed material. In some embodiments, the at least one operation comprises planarizing an exposed surface of a material bed. In some embodiments, the at least one operation comprises using a blade. In some embodiments, the modulating comprises vibrating, stuttering, oscillating, jittering, fluctuating, pulsating, and/or fluttering the at least the component of the mechanism. In some embodiments, the modulating results in performing an uneven movement of the mechanism during its translation. In some embodiments, the uneven movement is repeated at least twice during the translation of the mechanism. In some embodiments, the uneven movement is repeated during a translating cycle of the mechanism. In some embodiments, the mechanism is configured to translate in a manner that imparts kinetic energy to a pre-transformed material that (i) contacts the mechanism, and/or (ii) is carried by the mechanism. In some embodiments, the material dispenser comprises a lip and an exit opening. In some embodiments, the lip extends from the bottom portion and ends at the exit opening. In some embodiments, the method further comprises moving the material dispenser in a motion that causes the portion of the pre-transformed material within the bottom portion to exit the exit opening (e.g., fall from the bottom portion). In some embodiments, the motion comprises a modulated motion. In some embodiments, the modulated motion is repetitive. In some embodiments, the modulated motion comprises vibrating, stuttering, oscillating, jittering, fluctuating, pulsating, and/or fluttering motion. In some embodiments, the method further comprises using one or more actuators to impart a modulated motion.

In another aspect, a system for forming a three-dimensional object, the system comprises: one or more controllers that are collectively or separately configured to direct: (a) using a mechanism to perform at least one operation in a processing chamber as part of printing the three-dimensional object; (b) translating the mechanism to an ancillary chamber through an opening disposed between the processing chamber and the ancillary chamber; and (c) closing the opening using a closure after the mechanism is positioned within the ancillary chamber. In some embodiments, the mechanism includes a material dispenser. In some embodiments, the one or more controllers is configured to direct moving the material dispenser in a motion that causes a pre-transformed material to exit the material dispenser. In some embodiments, the one or more controllers is configured to direct using one or more actuators to impart a modulated motion to the material dispenser. In some embodiments, the one or more controllers is configured to direct the one or more actuators to impart a translation motion to the material dispenser. In some embodiments, the at least two of the one or more controllers directing (a) to (c) are different controllers. In some embodiments, the at least two of the one or more controllers directing (a) to (c) are the same controller. In some embodiments, the one or more controllers is further configured to direct at least one energy source to generate and direct at least one energy beam at a pre-transformed material in the processing chamber. In some embodiments, the one or more controllers is further configured to direct movement of a platform supporting the three-dimensional object. In some embodiments, the one or more controllers is configured to direct the platform to vertically translate.

In another aspect, a computer software product comprises at least one non-transitory computer-readable medium/media in which program instructions are stored, which program instructions, when read by at least one computer, cause the at least one computer to direct (a) using a mechanism to perform at least one operation in a processing chamber as part of printing the three-dimensional object; (b) translating the mechanism to an ancillary chamber through an opening disposed between the processing chamber and the ancillary chamber; and (c) closing the opening using a closure after the mechanism is positioned within the ancillary chamber. In some embodiments, a non-transitory computer-readable medium causes a computer to direct operations (a) to (c). In some embodiments, the program instructions cause a first computer to direct at least one of operations (a) to (c), and a second computer to direct another at least one of operations (a) to (c). In some embodiments, the program instructions cause a first computer to direct operation (a), a second computer to direct operation (b), and a third computer to direct operation (c). In some embodiments, a first non-transitory computer-readable medium causes a computer to direct at least one of operations (a) to (c), and a second non-transitory computer-readable medium causes the computer to direct another at least one of operations (a) to (c). In some embodiments, a first non-transitory computer-readable medium causes a computer to direct operation (a), a second non-transitory computer-readable medium causes the computer to direct operation (b), and a third non-transitory computer-readable medium causes the computer to direct operation (c). In some embodiments, a first non-transitory computer-readable medium causes a first computer to direct at least one of operations (a) to (c), and a second non-transitory computer-readable medium causes a second computer to direct another at least one of operations (a) to (c). In some embodiments, a first non-transitory computer-readable medium causes a first computer to direct operation (a), a second non-transitory computer-readable medium causes a second computer to direct operation (b), and a third non-transitory computer-readable medium causes a third computer to direct operation (c).

In another aspect, a method of printing a three-dimensional object, the method comprises: (a) transforming at least a portion of a material bed to a transformed material that forms at least a portion of the three-dimensional object, wherein the transforming causes debris to form (i) on the exposed surface of the material bed, (ii) in the material bed, and/or (iii) on the exposed surface of the material bed and in the material bed; and (b) mixing a portion of the material bed that comprises: (I) a portion of the exposed surface of the material bed, and (II) the debris. In some embodiments, the mixing comprises a chaotic movement. In some embodiments, the chaotic movement comprises circular, swirling, agitated, rough, irregular, disordered, disorganized, cyclonic, spiraling, vortex, or agitated movement. In some embodiments, the mixing comprises laminar, vertical, horizontal, or angular movement. In some embodiments, the mixing comprises a predictable movement. In some embodiments, the mixing comprises a movement that is complex. In some embodiments, the method further comprises forming the material bed by dispensing a second layer of pre-transformed material on a first layer of pre-transformed material. In some embodiments, the method further comprises removing at least a portion of the debris during and/or after the mixing. In some embodiments, the method further comprises removing at least a portion of the material bed during and/or after the mixing. In some embodiments, the method further comprises dispensing a pre-transformed material bed after the transforming and/or before the mixing. In some embodiments, the method further comprises removing a percentage of the debris after and/or during the mixing. In some embodiments, the percentage is at least 90 percent of the debris. In some embodiments, the percentage is at least 95 percent of the debris. In some embodiments, the percentage is at least 99 percent of the debris. In some embodiments, the removing comprises attracting. In some embodiments, the removing is without contacting the exposed surface of the material bed. In some embodiments, the removing comprises using gas flow, electrostatic force, or magnetic force for the removing. In some embodiments, the gas flow comprises vacuum. In some embodiments, the method further comprises planarizing an exposed surface of the material bed after and/or during the mixing. In some embodiments, the removing the at least a portion of the debris further comprises removing at least a portion of a pre-transformed material from the material bed. In some embodiments, the debris comprises a debris particle having an irregular shape. In some embodiments, the debris comprises agglomerated, sintered and/or fused pre-transformed particles. In some embodiments, the debris comprises debris particles having larger cross-sectional widths than particles of pre-transformed material, which larger is by at least two times a fundamental length scale of the pre-transformed material. In some embodiments, the mixing is caused by the attracting. In some embodiments, the mixing causes at least a portion of the debris to move within a fraction of the material bed that is affected by the attractive force. In some embodiments, the attracting is to and/or through an internal compartment of a material remover. In some embodiments, the attracting comprising forming a chaotic (e.g., comprising turbulent) movement. In some embodiments, the mixing comprises using a chaotic flow on and/or within the material bed. In some embodiments, the chaotic flow is within a portion of the material bed that comprises the exposed surface of the material bed. In some embodiments, the mixing comprises a chaotic flow within an atmosphere above the material bed. In some embodiments, the chaotic flow contacts the portion of the exposed surface of the material bed. In some embodiments, the transforming and/or mixing is at a pressure above an ambient pressure.

In another aspect, an apparatus for three-dimensional printing of at least one three-dimensional object, the apparatus comprises: an energy source configured to generate an energy beam that transforms at least a portion of a material bed to a transformed material as part of the at least one three-dimensional object during a transformation operation, wherein the transformation operation causes debris to form (i) on the exposed surface of the material bed, (ii) in the material bed, and/or (iii) on the exposed surface of the material bed and in the material bed; and a mechanism configured to mix at least a portion of a material bed that comprises: (I) a portion of the exposed surface of the material bed and (II) the debris, which mechanism comprises an opening that is configured to facilitate transit of the debris into and/or through the mechanism. In some embodiments, the mechanism is configured to operate at a positive pressure that is above ambient pressure, e.g., during the printing and/or mixing of the at least a portion of the material bed. In some embodiments, the apparatus further comprises a material dispenser configured to dispense at least one layer of pre-transformed material as part of the material bed. In some embodiments, the mechanism comprises an opening or a blade. In some embodiments, the mechanism is configured to planarize the exposed surface of the material bed. In some embodiments, configured to mix comprises configured to cause a chaotic movement (e.g., comprising turbulence) in a volume that comprises the at least a portion of the exposed surface of the material bed. In some embodiments, the volume comprises a gas. In some embodiments, the volume comprises a pre-transformed material of the material bed. In some embodiments, the mechanism comprises a material remover that is configured to recirculate a portion of the material bed. In some embodiments, the portion of the material bed comprises an exposed surface of the material bed. In some embodiments, the material remover is configured to remove at least a portion of the debris from the material bed. In some embodiments, the at least a portion of the debris is at least 90 percent of the debris (the percentage can be calculated weight by weight, or volume per volume). In some embodiments, the apparatus further comprises (a) a linear encoder or (b) a linear actuator, that is configured to facilitate translation of the mechanism. In some embodiments, the material remover is configured to remove at least a portion of a pre-transformed material from the material bed. In some embodiments, the material bed comprises a pre-transformed material. In some embodiments, the mechanism comprises a material remover is configured to reduce a thickness of the material bed. In some embodiments, the mechanism comprises a material remover is configured to remove at least a portion of pre-transformed material from the material bed. In some embodiments, the mechanism comprises a material remover is configured to provide an attractive force that attracts the at least a portion of the debris into the material remover. In some embodiments, the attractive force is a suction force. In some embodiments, the attractive force comprises a gas flow, a magnetic field, or an electrostatic field. In some embodiments, the material remover is operationally coupled to an attractive force source that provides the attractive force. In some embodiments, the material remover is coupled to the attractive force source via a tube or wire. In some embodiments, the material remover comprises a reservoir configured to at least temporarily retain a removed portion of the debris. In some embodiments, the material remover comprises a nozzle having at least one opening (e.g., the opening) configured to allow a removed portion of the debris to pass therethrough. In some embodiments, a diameter of the at least one opening is changeable, e.g., before, after, and/or during a dispensing and/or the printing operation. In some embodiments, the energy source is a laser and the energy beam is a laser energy beam. In some embodiments, the energy source is an electron beam source and the energy beam is an electron beam. In some embodiments, the apparatus further comprises a platform configured to support the material bed. In some embodiments, the platform is configured to vertically translate during the printing. In some embodiments, the apparatus further comprises a processing chamber configured to enclose the material bed. In some embodiments, the apparatus further comprises a material dispenser configured dispense a pre-transformed material to form the material bed. In some embodiments, the material dispenser is configured to laterally translate. In some embodiments, the material dispenser is included in a layer dispensing mechanism. In some embodiments, the layer dispensing mechanism is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a system for forming a three-dimensional object, the system comprises: one or more controllers that are collectively or separately configured to direct: (a) transforming at least a portion of a material bed to a transformed material that forms at least a portion of the three-dimensional object, wherein the transforming causes debris to form (i) on the exposed surface of the material bed, (ii) within the material bed, or (iii) on the exposed surface of the material bed and within the material bed; and (b) mixing a portion of the material bed that comprises (I) a portion of the exposed surface of the material bed and (II) the debris. In some embodiments, the mechanism comprises a material remover. In some embodiments, the one or more controllers is configured to direct the material remover to remove at least a portion of pre-transformed material from the material bed. In some embodiments, the at least two of the one or more controllers directing operations (a) and (b) are different controllers. In some embodiments, the at least two of the one or more controllers directing operations (a) and (b) are the same controller. In some embodiments, the one or more controllers is further configured to direct at least one energy source to generate and direct at least one energy beam at a pre-transformed material to form at least a portion of the three-dimensional object. In some embodiments, the one or more controllers is further configured to direct movement of a platform supporting the three-dimensional object. In some embodiments, the one or more controllers is configured to direct the platform to vertically translate.

In another aspect, a computer software product comprises at least one non-transitory computer-readable medium/media in which program instructions are stored, which program instructions, when read by at least one computer, cause the at least one computer to direct (a) transforming at least a portion of a material bed to a transformed material that forms at least a portion of the three-dimensional object, wherein the transforming causes debris to form (i) on the exposed surface of the material bed, (ii) within the material bed, or (iii) on the exposed surface of the material bed and within the material bed; and (b) mixing a portion of the material bed that comprises (I) a portion of the exposed surface of the material bed and (II) the debris. In some embodiments, the program instructions cause a computer to direct operations (a) and (b). In some embodiments, the program instructions cause a first computer to direct operation (a), and a second computer to direct operation (b). In some embodiments, the program instructions cause a first computer to direct operation (a), and a second computer to direct operation (b). In some embodiments, a first non-transitory computer-readable medium causes a computer to direct operation (a), and a second non-transitory computer-readable medium causes the computer to direct operation (b). In some embodiments, a first non-transitory computer-readable medium cause a first computer to direct operation (a), and a second non-transitory computer-readable medium causes a second computer to direct operation (b).

In another aspect, an apparatus for printing at least one three-dimensional object, the apparatus comprises: a first enclosure side that is separated from a second enclosure side by a partition, which partition includes an opening that is closable and openable by the partition; a platform configured to support the at least one three-dimensional object during its printing from a pre-transformed material, which platform is disposed in the first enclosure side; at least one shaft configured to at least partially move between the first enclosure side and second enclosure side through the opening (e.g., wherein between in inclusive to include the second enclosure side and the first enclosure side); and at least one channel disposed in the at least one shaft, the channel configured to guide the pre-transformed material (i) towards the platform, (ii) away from the platform, or (iii) towards and away from the platform. In some embodiments, at least partially move between the first enclosure side and second enclosure side comprises moving at least a fraction of the at least one shaft between the first enclosure side and the second enclosure side. In some embodiments, at least partially move between the first enclosure side and second enclosure side excludes moving the entirety of the at least one shaft between the first enclosure side and the second enclosure side. In some embodiments, at least partially move between the first enclosure side and second enclosure side includes moving the entirety of the at least one shaft between the first enclosure side and the second enclosure side. In some embodiments, the at least one shaft comprises a first shaft and a second shaft. In some embodiments, the at least one channel comprises a first channel (e.g., disposed within the first shaft), and a second channel (e.g., disposed within the second shaft). In some embodiments, the first channel is configured to guide the pre-transformed material towards the platform (e.g., through at least one mechanism). In some embodiments, the second channel is configured to guide the pre-transformed material away from the platform. In some embodiments, the first shaft and the second shaft are the same shaft. In some embodiments, the first channel and second channel are configured within the same shaft. In some embodiments, the first channel and second channel are configured in different shafts. In some embodiments, the at least one mechanism is a layer forming device. In some embodiments, the first channel and second channel are configured to guide the pre-transformed material from and/or to the layer forming device (e.g., separately or collectively, e.g., simultaneously or sequentially). In some embodiments, the at least one mechanism further comprises a (e.g., linear) actuator or a (e.g., linear) encoder, that separately or collectively are configured to facilitate movement of one or more of the at least one shaft. In some embodiments, the encoder and/or actuator facilitates the movement of a shaft. In some embodiments, the encoder and/or actuator facilitates the movement of two or more shafts. In some embodiments, the first channel and second channel are configured within the same shaft. In some embodiments, the at least one shaft is a plurality of shafts. In some embodiments, the first channel and second channel are each configured within different shafts. In some embodiments, the at least one shaft further comprises at least one channel that is configured to facilitate movement of at least one gas towards or away from the platform. In some embodiments, the at least one shaft is operatively coupled to at least one mechanism that is used during the printing. In some embodiments, the at least one channel is operatively coupled to the at least one mechanism and is configured to guide the pre-transformed material to and/or from the at least one mechanism. In some embodiments, the at least one mechanism comprises a layer forming device. In some embodiments, the at least one channel is configured to guide the pre-transformed material to at least one component of the layer forming device. In some embodiments, the at least one component comprises a layer dispenser, a material remover, or a leveler. In some embodiments, the at least one channel comprises a first channel and a second channel. In some embodiments, the first channel is configured to guide the pre-transformed material to the material dispenser. In some embodiments, a second channel is configured to guide the pre-transformed material from the material remover. In some embodiments, the apparatus further comprises an energy source configured to generate an energy beam that transforms the pre-transformed material bed to a transformed material to print the at least one three-dimensional object. In some embodiments, the energy source is configured to generate the energy beam that includes radiation comprising at least one of electromagnetic, electron, positron, proton, plasma, or ionic radiation. In some embodiments, the layer forming device comprises a material dispenser, a material remover, or a leveler. In some embodiments, the material dispenser is configured dispense the pre-transformed material. In some embodiments, the material remover is configured to remove a portion of the pre-transformed. In some embodiments, the leveler is configured to planarize a material bed formed on dispensing the pre-transformed material towards the platform. In some embodiments, the first chamber side and the second chamber side are configured to have the same atmosphere during the printing. In some embodiments, the first chamber side and the second chamber side are configured to have different atmospheres on closure of the partition. In some embodiments, the partition is gas tight. In some embodiments, the partition is gas permeable. In some embodiments, the partition forms a physical separation between the first enclosure side and the second enclosure side. In some embodiments, the partition reduces an amount of debris, pre-transformed material, radiation, plasma, reactive agent, and/or gas to travel from the first enclosure side to the second enclosure side upon closure of the partition. In some embodiments, the closure is configured to close the opening when (a) the at least one mechanism is positioned within the second enclosure side, (b) the pre-transformed material is being transformed, and/or (c) the at least one mechanism is positioned within the second enclosure side and the pre-transformed material is being transformed. In some embodiments, the closure is configured to close the opening when the at least one mechanism is in a parked mode. In some embodiments, the first chamber side is an ancillary chamber. In some embodiments, the second chamber side is a processing chamber. In some embodiments, the at least one shaft is operatively coupled to an actuator. In some embodiments, the actuator is a linear actuator. In some embodiments, the actuator is configured to linearly translate the at least one shaft in a direction that is substantially parallel to a surface of the platform. In some embodiments, during the printing, the platform is configured to vertically translate in a direction that is substantially perpendicular to a direction of translation of the at least one shaft. In some embodiments, the apparatus further comprises at least one controller that is operatively coupled to the at least one shaft. In some embodiments, the at least one controller is configured to translate the at least one shaft. In some embodiments, the apparatus further comprises at least one controller operatively coupled to at least one component of the at least one mechanism. In some embodiments, the at least one controller is configured to operate at least one component of the at least one mechanism, which at least one component of the at least mechanism is operatively coupled to the at least one shaft. In some embodiments, the at least one mechanism comprises an opening or a blade. In some embodiments, the first chamber side is operatively coupled to a recycling system that recycles an excess of pre-transformed during and/or after the printing. In some embodiments, the second chamber side comprises a funnel portion that is configured to direct the excess of the pre-transformed material to the recycling system. In some embodiments, the second chamber side includes an opening port that is configured to direct the excess the pre-transformed material to the recycling system. In some embodiments, the opening port is disposed within a region comprising the opening port of the second chamber side. In some embodiments, the region comprises a port flushing component that is configured to flush the region from the excess of pre-transformed material using a flow of at least one gas. In some embodiments, the port flushing component comprises an inlet configured to accept the flow of the at least one gas from a gas source and an outlet configured to direct the flow of the at least one gas out of the region. In some embodiments, the outlet is coupled to the recycling system via at least one coupling member. In some embodiments, the port flushing component is coupled to the second chamber side via a connector. In some embodiments, the apparatus further comprises at least one detector that is configured to detect the excess of pre-transformed material transported from the second chamber side to the recycling system. In some embodiments, the at least one detector is configured to detect an amount of the pre-transformed material, sizes of particles of the pre-transformed material, a velocity of the flow of the pre-transformed material, and/or a chemical nature of the pre-transformed material. In some embodiments, the at least one detector is configured to detect an amount of a debris, sizes of particles of the debris, a velocity of the flow of the debris, and/or a chemical nature of the debris. In some embodiments, the at least one detector comprises a detector that is configured to detect electromagnetic radiation or an acoustic signal. In some embodiments, the at least one detector comprises an emitter that is configured to emit the electromagnetic radiation or the acoustic signal. In some embodiments, the at least one detector is configured to provide information related to an efficiency of one or more filters of the recycling system. In some embodiments, the port flushing component is configured to direct a flow of at least one gas in a direction that is non-parallel relative to a direction of a flow of pre-transformed material and/or debris from the second chamber side toward the port flushing component. In some embodiments, the port flushing component is configured to direct a flow of at least one gas in a direction that is substantially orthogonal relative to a direction of a flow of pre-transformed material and/or debris from the first chamber side toward the port flushing component. In some embodiments, the apparatus further comprises a bulk reservoir configured to supply the pre-transformed material to a material dispenser that is operatively coupled to the at least one shaft. In some embodiments, the layer dispenser (e.g., the layer dispensing mechanism) is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a method for printing at least one three-dimensional object comprises: (a) moving at least a fraction of at least one shaft from a first enclosure side to second enclosure side and/or vice versa through an opening, which first enclosure side comprises a platform supporting the at least one three-dimensional object during its printing from a pre-transformed material, which first enclosure side is separated from a second enclosure side by a partition, which partition includes the opening that is closable and openable by the partition; and (b) guiding a pre-transformed material (i) towards a platform, (ii) away from the platform, or (iii) towards and away from the platform, which guiding is through at least one channel disposed in the at least one shaft. In some embodiments, the fraction of at least one shaft excludes the entirety of the at least one shaft. In some embodiments, at least one channel comprises a first channel and a second channel. In some embodiments, guiding the pre-transformed material towards the platform in the first channel, guiding the pre-transformed material away from the platform in the second channel. In some embodiments, first channel and the second channel are disposed in a shaft. In some embodiments, at least one shaft is a plurality of shafts. In some embodiments, the first channel and the second channel are each disposed in a different shaft of the plurality of shafts. In some embodiments, guiding is to and/or away from a layer forming device. In some embodiments, further comprising guiding at least one gas towards or away from the platform through the at least one channel. In some embodiments, the method further comprises using at least one mechanism coupled to the at least one shaft and/or at least one channel, which using is during the printing. In some embodiments, the method further comprises guiding the pre-transformed material to and/or from the at least one mechanism (e.g., on its way to the platform). In some embodiments, the at least one mechanism is a layer forming device. In some embodiments, the at least one channel is configured to guide the pre-transformed material to at least one component of the layer forming device. In some embodiments, the at least one component comprises a layer dispenser, a material remover, or a leveler. In some embodiments, the at least one channel comprises a first channel and a second channel. In some embodiments, guiding is through the first channel to the material dispenser, and from the material remover through the second channel. In some embodiments, using an energy beam to transform the pre-transformed material bed to a transformed material to print the at least one three-dimensional object. In some embodiments, the layer forming device includes at least one of a material dispenser, a material remover, or a leveler. In some embodiments, the method further comprises dispensing the pre-transformed material towards the platform using the material dispenser. In some embodiments, the method further comprises removing a portion of the pre-transformed using the material remover. In some embodiments, the method further comprises planarizing a material bed using the leveler is. In some embodiments, the material bed is formed by dispensing the pre-transformed material towards the platform. In some embodiments, the method further comprises closing the opening using a closure, when (a) the apparatus is positioned within the second enclosure side, (b) the pre-transformed material is being transformed, or (c) the apparatus is positioned within the second enclosure side and the pre-transformed material is being transformed. In some embodiments, the method further comprises closing the opening when the at least one mechanism is in a parked mode. In some embodiments, the first chamber side is an ancillary chamber. In some embodiments, the second chamber side is a processing chamber. In some embodiments, the method further comprises translating (e.g., linearly) the at least one shaft in a direction (e.g., that is substantially parallel) to an exposed surface of the platform. In some embodiments, the method further comprises translating the platform (e.g., vertically), e.g., during the printing. In some embodiments, translating is in a direction that is substantially perpendicular to a direction of translation of the at least one shaft. In some embodiments, the method further comprises controlling translation of the at least one shaft (e.g., manually and/or automatically, before, during, and/or after the printing). In some embodiments, the method further comprises controlling the operation of at least one component of the at least one mechanism. In some embodiments, the method further comprises recycling an excess of pre-transformed during and/or after the printing, e.g., using a recycling mechanism. In some embodiments, the method further comprises flushing an opening of recycling mechanism, e.g., by flowing a gas through a volume that comprises the opening of the recycling mechanism. In some embodiments, the method further comprises detecting an excess of pre-transformed material transported from the second chamber side to the recycling system. In some embodiments, detecting comprises detecting: an amount of the pre-transformed material, sizes of particles of the pre-transformed material, a velocity of the flow of the pre-transformed material, or a chemical nature of the pre-transformed material. In some embodiments, detecting comprises detecting an amount of a debris, sizes of particles of the debris, a velocity of the flow of the debris, or a chemical nature of the debris. In some embodiments, detecting comprises detecting an electromagnetic radiation or an acoustic signal. In some embodiments, the method further comprises emitting the electromagnetic radiation or the acoustic signal, e.g., using the detector. In some embodiments, the method further comprises providing information related to an efficiency of one or more filters of the recycling system. In some embodiments, the method further comprises directing a flow of at least one gas in the port flushing component in a direction that is non-parallel relative to a direction of a flow of pre-transformed material and/or debris from the second chamber side toward the port flushing component. In some embodiments, the method further comprises flowing of at least one gas in the port flushing component in a direction that is substantially orthogonal relative to a direction of a flow of pre-transformed material and/or debris from the first chamber side toward the port flushing component. In some embodiments, the method further comprises supplying the pre-transformed material from a bulk reservoir to a material dispenser that is operatively coupled to the at least one shaft.

In another aspect, an apparatus for three-dimensional printing of at least one three-dimensional object, the apparatus comprises: an enclosure configured to enclose the at least one three-dimensional object during its printing; a mechanism configured to perform at least one operation in the enclosure (e.g., during the printing), which mechanism is disposed in the enclosure (e.g., and comprises an opening, a roller, a plate, or a blade); and an actuator configured to translate the mechanism and that is operatively coupled to the mechanism, which actuator is disposed externally to the enclosure. In some embodiments, the mechanism comprises a material dispenser configured to dispense a pre-transformed material that is used to print the at least one three-dimensional object. In some embodiments, the apparatus further comprises at least one controller operatively coupled to at least one of the actuator and the mechanism. In some embodiments, the controller is programmed to collectively or separately perform one or more of (i) direct the mechanism to perform the at least one operation, and (ii) direct the actuator to translate the mechanism. In some embodiments, the mechanism comprises an opening or a blade. In some embodiments, the mechanism comprises a layer dispensing mechanism configured to dispense a planar layer of pre-transformed material to form a material bed that is used to print the at least one three-dimensional object. In some embodiments, the actuator comprises a linear actuator. In some embodiments, the shaft is operatively coupled to a linear encoder. In some embodiments, the apparatus further comprises at least one shaft. In some embodiments, the actuator is coupled to the mechanism through the at least one shaft. In some embodiments, the actuator is configured to translate the mechanism by translating the at least one shaft. In some embodiments, the at least one shaft comprises at least one channel configured to transport the pre-transformed material therethrough. In some embodiments, the at least one shaft comprises at least bellow. In some embodiments, the at least one bellow is configured to allow a gas leak rate from the enclosure of at most 0.01 liters per minute. In some embodiments, the at least one bellow preserves its operative conditions for at least one million cycles. In some embodiments, the at least one bellow is configured to operate at a pressure above an ambient pressure. In some embodiments, a first fraction of the at least one shaft is disposed in the enclosure and a second fraction of the at least one shaft is disposed out of the enclosure (e.g., before, after, and/or during operation of the at least one shaft). In some embodiments, the at least one shaft is configured to translate through an opening in the enclosure. In some embodiments, the opening is configured to facilitate a gas leak rate from the enclosure of at most 0.01 liters per minute. In some embodiments, the opening is configured to facilitate the gas leak rate for at least one million cycles (e.g., of operations of any of the components of the apparatus). In some embodiments, the seal is configured to facilitate the gas leak rate for at least one million cycles. The cycles may comprise back and forth translation of: the at least one shaft, the encoder, the mechanism, or any combination thereof. The back and forth translation may be with respect to a platform disposed in the enclosure. In some embodiments, the mechanism and/or at least one shaft is configured to operate at a pressure above an ambient pressure. In some embodiments, the pressure above ambient is at least 0.5 pounds per square inch (PSI) above the ambient pressure. In some embodiments, the at least one bellow is disposed in the enclosure and/or outside of the enclosure. In some embodiments, the at least one shaft is operatively coupled to an opening in a wall of the enclosure. In some embodiments, the opening is configured to preserve and/or facilitate a gas leak rate of at most about 0.01 liters per minute. In some embodiments, the opening comprises a seal. In some embodiments, the seal is a passive seal or a dynamic seal. In some embodiments, the dynamic seal comprises a gas flow. In some embodiments, the opening comprises a guiding mechanism and/or a gas flow. In some embodiments, the guiding mechanism comprises a bearing (e.g., ball bearing or air bearing). In some embodiments, the layer dispensing mechanism is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a method for printing at least one three-dimensional object comprises: (a) translating a mechanism to perform at least one operation as part of the printing in an enclosure, which mechanism is disposed in the enclosure (e.g., which mechanism comprises an opening, a roller, a plate, or a blade); and (b) using an actuator for translating the mechanism (e.g., during the printing), which actuator is disposed external to the enclosure. In some embodiments, the mechanism comprises a material dispenser. In some embodiments, the method further comprises dispensing a pre-transformed material that is used to print the at least one three-dimensional object. In some embodiments, the dispensing comprises using the material dispenser. In some embodiments, the mechanism comprises an opening or a blade. In some embodiments, the mechanism comprises a material dispenser. In some embodiments, the method further comprises dispensing a planar layer of pre-transformed material to form a material bed that is used to print the at least one three-dimensional object. In some embodiments, the actuator comprises a linear actuator. In some embodiments, the translating the mechanism is at least in part by using a linear encoder. In some embodiments, the translating the mechanism comprises translating at least one shaft that is operatively coupled to the actuator and/or to the mechanism. In some embodiments, the operatively coupled is physically connected. In some embodiments, operatively coupled is electronically connected. In some embodiments, operatively coupled comprises connected to allow communication. In some embodiments, operatively coupled comprises connected to allow signal transmission. In some embodiments, the method further comprises using an energy beam to translate a pre-transformed material to a transformed material to print the at least one three-dimensional object. In some embodiments, the method further comprises vertically translating a platform to support the at least one three-dimensional object during its printing. In some embodiments, the method further comprises controlling the actuator by at least one controller that is operatively coupled to the actuator and is programmed to direct using the actuator. In some embodiments, the at least one controller is programmed to direct using at least one component of the mechanism. In some embodiments, using the actuator comprises translating the at least one shaft for translating the mechanism. In some embodiments, translating the at least one shaft is through an opening in the enclosure. In some embodiments, the method further comprises sealing the opening using a seal. In some embodiments, sealing comprises passively sealing. In some embodiments, the method further comprises facilitating a gas leak rate through the opening (e.g., out of the enclosure), which rate is at most 0.01 liters per minute. In some embodiments, using the seal is for at least one million cycles (e.g., of any of the method operations). In some embodiments, translating the (i) at least one shaft and/or (ii) mechanism, is at a pressure above an ambient pressure residing in the enclosure (e.g., during printing). In some embodiments, the pressure above ambient is at least 0.5 pounds per square inch (PSI) above the ambient pressure. The cycles may comprise back and forth translation of: the at least one shaft, the encoder, the mechanism, or any combination thereof. The back and forth translation may be with respect to a platform disposed in the enclosure.

In another aspect, an apparatus for three-dimensional printing of at least one three-dimensional object, the apparatus comprises: a platform configured to support the at least one three-dimensional object during its printing; a shaft that is configured to translate towards and/or away from the platform, which shaft is disposed adjacent to the platform; and a bellow that is configured to operate at a positive pressure above an atmospheric pressure, which bellow is operatively coupled to the shaft. In some embodiments, the shaft is operatively coupled to a mechanism used during the printing, which mechanism comprises an opening. In some embodiments, the apparatus further comprises at least one controller operatively coupled to at least one of the platform, shaft, and the bellow. In some embodiments, the controller is programmed to collectively or separately perform one or more of (i) direct the platform to vertically translate during the printing, and (ii) direct the shaft to translate during the printing. In some embodiments, the apparatus further comprises a layer dispensing mechanism configured to dispense a planar layer of pre-transformed material to form a material bed that is used to print the at least one three-dimensional object. In some embodiments, the layer dispensing mechanism is operatively coupled to the shaft. In some embodiments, the apparatus further comprises a linear actuator or a linear encoder configured to translate the shaft. In some embodiments, the shaft is configured to translate using a linear actuator. In some embodiments, the shaft is configured to translate using a linear encoder. In some embodiments, the shaft comprises at least one channel configured to transport a pre-transformed material therethrough, which pre-transformed material is used in printing the at least one three-dimensional object. In some embodiments, the pressure above ambient is at least 0.5 pounds per square inch (PSI) above the ambient pressure. In some embodiments, the shaft is configured to translate during the printing. In some embodiments, the platform is disposed in an enclosure. In some embodiments, during the printing, the pressure in the enclosure is above an ambient pressure. In some embodiments, above ambient is at least 0.5 pounds per square inch (PSI) above the ambient pressure. In some embodiments, the bellow is disposed in the enclosure and/or outside of the enclosure. In some embodiments, the bellow is configured to allow a gas leak rate from the enclosure of at most 0.01 liters per minute. In some embodiments, the leak is to an environment external to the enclosure. In some embodiments, the bellow preserves its operative conditions for at least one million cycles. In some embodiments, the shaft is disposed in the enclosure and/or outside of the enclosure. In some embodiments, the at least one shaft is operatively coupled to an opening in a wall of the enclosure. In some embodiments, the opening has a gas leak rate of at most about 0.01 liters per minute. In some embodiments, the opening comprises a seal. In some embodiments, the seal is a passive seal or a dynamic seal. In some embodiments, the dynamic seal comprises a gas flow. In some embodiments, the opening comprises a guiding mechanism and/or a gas flow. In some embodiments, the guiding mechanism comprises a bearing (e.g., ball bearing or air bearing). In some embodiments, the bellow is a metal bellow. In some embodiments, the metal comprises an elemental metal or a metal alloy. In some embodiments, the shaft is translated using an actuator that is operatively coupled to the shaft, which actuator is disposed outside of the enclosure. In some embodiments, the bellow facilitates translation of the shaft while separating an internal atmosphere of the enclosure, from an atmosphere external to the enclosure where the actuator is located in an atmosphere external to the enclosure. In some embodiments, during the printing a pressure of the internal atmosphere is above ambient pressure. In some embodiments, during the printing, a pressure of the external atmosphere is an ambient pressure. In some embodiments, the layer dispensing mechanism is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a method for three-dimensional printing of at least one three-dimensional object, the apparatus comprises: (a) using a platform to facilitate printing of the at least one three-dimensional object; (b) translating a shaft towards and/or away from the platform; and (c) contracting and/or stretching a bellow that is configured to operate at a positive pressure above an atmospheric pressure. In some embodiments, the method further comprises using the shaft to translate a mechanism used during the printing, which shaft is operatively coupled to the mechanism, which mechanism comprises an opening. In some embodiments, the method further comprises flowing the pre-transformed material through the shaft. In some embodiments, the method further comprises dispensing pre-transformed material towards the platform, which pre-transformed material is used to print the at least one three-dimensional object. In some embodiments, dispensing the pre-transformed material comprises flowing the pre-transformed material through the shaft. In some embodiments, the method further comprises using a linear actuator for translating the shaft. In some embodiments, further comprising using a linear encoder for translating the shaft. In some embodiments, the shaft comprises at least one channel. In some embodiments, the method further comprises transporting a pre-transformed material through the at least one channel, which pre-transformed material is used in printing the at least one three-dimensional object. In some embodiments, the pressure above ambient is at least 0.5 pounds per square inch (PSI) above an ambient pressure. In some embodiments, translating the shaft is during the printing. In some embodiments, the platform is disposed in an enclosure. In some embodiments, the bellow is disposed in the enclosure and/or outside of the enclosure. In some embodiments, the bellow is leaking gas in a rate of at most 0.01 liters per minute. In some embodiments, the gas is leaking from an internal atmosphere of the enclosure to an environment external to the enclosure. In some embodiments, wherein contracting and/or stretching the bellow is while preserving its operative conditions for at least one million cycles. In some embodiments, the shaft is disposed in the enclosure and/or outside of the enclosure. In some embodiments, the at least one shaft is operatively coupled to an opening in a wall of the enclosure. In some embodiments, the opening comprises a seal. In some embodiments, the seal is a passive seal or a dynamic seal. In some embodiments, the dynamic seal comprises a gas flow. In some embodiments, the opening comprises a guiding mechanism and/or a gas flow. In some embodiments, the guiding mechanism comprises a bearing (e.g., ball bearing or air bearing). In some embodiments, the bellow is a metal bellow. In some embodiments, the metal comprises an elemental metal or a metal alloy. In some embodiments, the method further comprises irradiating an energy beam towards a platform to transform a pre-transformed material to a transformed material to form the at least one three-dimensional object. In some embodiments, facilitate printing comprises supporting the three-dimensional object during the printing. In some embodiments, facilitate printing comprises during the printing supporting a pre-transformed material from which the three-dimensional object is printed. In some embodiments, facilitate printing comprises during the printing supporting a material bed from which the three-dimensional object is printed. In some embodiments, using the platform to facilitate printing comprises translating the platform during the printing. In some embodiments, translating comprises vertically translating. In some embodiments, the method further comprises controlling the actuator by at least one controller that is operatively coupled to the actuator and is programmed to direct using the actuator. In some embodiments, the at least one controller is programmed to direct using at least one component of the apparatus.

In another aspect, an apparatus for three-dimensional printing of at least one three-dimensional object, comprises: a bulk reservoir comprising an exit opening, which bulk reservoir is configured to enclose a pre-transformed material; a material dispenser that is configured to dispense the pre-transformed material to form a material bed, which material dispenser has a side comprising an entrance opening; and a plate having a plate opening that is at least partially configured to form a channel configured to facilitate a flow of the pre-transformed material from the bulk reservoir to the material dispenser, wherein (i) the plate is translatable with respect to the bulk reservoir and/or the material dispenser, (ii) a first portion of the plate is configured to close the exit opening of the bulk reservoir, (iii) a second portion of the plate is configured to close the entrance opening of the material dispenser, or (iv) a combination of at least two of (i), (ii) and (iii). In some embodiments, the plate is configured to shut and/or open the exit opening of the bulk reservoir upon movement of the plate with respect to the bulk reservoir and/or the material dispenser. In some embodiments, the entrance opening is defined by a wall of the material dispenser. In some embodiments, at least a portion of an internal surface of the wall is configured to facilitate flow of the pre-transformed material. In some embodiments, at least a portion of the internal surface of is coated with a polished material. In some embodiments, at least a portion of the internal surface is polished. In some embodiments, at least a portion of the internal surface has a Ra value of at most 50 micrometers ($\mu m$), 10 $\mu m$, 5 $\mu m$, or 1 $\mu m$. In some embodiments, the internal surface has a Ra value of a smooth surface as disclosed herein. In some embodiments, the plate is configured to disrupt the channel upon movement of the plate with respect to the bulk reservoir and/or the material dispenser. In some embodiments, disrupting the channel comprises disrupting a position, a cross sectional shape, a cross sectional area, a volume, and/or an existence of the channel. In some embodiments, the channel facilitates the flow of the pre-transformed material from a first end of the plate opening to a second end of the plate opening. In some embodiments, the first end opposes the second end. In some embodiments, the first end of the plate opening and at least part of the exit opening of the bulk reservoir form at least part of the channel. In some embodiments, the second end of the plate opening and at least part of the entrance opening of the material dispenser form at least part of the channel. In some embodiments, a first cross-section of the first end of the plate opening is different than a second cross-section of the second end of the plate opening. In some embodiments, the first cross section is smaller than the second cross section. In some embodiments, the first cross section and/or the second cross section is a horizontal cross section. In some embodiments, the entrance opening is disposed at a side of the material dispenser. In some embodiments, the side is configured not to (a) face an exposed surface of the material bed or (b) face away from the exposed surface of the material bed. In some embodiments, the side is configured to be normal to an exposed surface of the material bed. In some embodiments, the side is configured to be non-parallel to an exposed surface of the material bed. In some embodiments, the channel comprises a uniform shape. In some embodiments, the channel comprises a non-uniform shape. In some embodiments, the channel is at least partially defined by at least two diverging surfaces. In some embodiments, the channel has no rotational symmetry axis (e.g. that comprises its entry and exit). In some embodiments, the channel is at least partially defined by at least two parallel surfaces. In some embodiments, at least one wall of the channel facilitates flow of the pre-transformed material. In some embodiments, the at least one wall of the channel is coated with a polished material. In some embodiments, the at least one wall of the channel is polished. In some embodiments, the at least one wall of the channel has a Ra value of at most 50 micrometers ($\mu m$), 10 $\mu m$, 5 $\mu m$, or 1 $\mu m$. In some embodiments, the apparatus further comprises a channel member between the plate and the material dispenser. In some embodiments, the channel member comprises an angled slot that partially forms the channel. In some embodiments, an internal surface of the angled slot is coated with a polished material. In some embodiments, an internal surface of the angled slot is polished. In some embodiments, an internal surface of the angled slot has a Ra value of at most 50 micrometers ($\mu m$), 10 $\mu m$, 5 $\mu m$, or 1 $\mu m$. In some embodiments, the at least one wall and/or internal surface has a Ra value of a smooth surface as disclosed herein. In some embodiments, the apparatus further comprises an energy source configured to generate an energy beam that transforms at least a portion of the pre-transformed material to form at least a section of the at least one three-dimensional object. In some embodiments, each of the exit and entrance openings have a slot shape. In some embodiments, the entrance and exit openings have the same cross-section shape. In some embodiments, the apparatus further comprises a channel member between the plate and the material dispenser. In some embodiments, the channel member comprises an angled slot that partially forms the channel. In some embodiments, the entrance opening, exit opening and angled slot have the same cross-section shape. In some embodiments, the plate is fixedly coupled with the material dispenser. In some embodiments, the plate and the material dispenser are translatable with respect to the bulk reservoir. In some embodiments, the material dispenser is included in a layer dispensing mechanism. In some embodiments, the layer dispensing mechanism is configured to translate along railings, and wherein the apparatus comprises the railings configured to reduce accumulation of the pre-transformed (e.g., starting) material and/or debris on the railing during the printing. In some embodiments, the railings are coupled to a physical protection configured to reduce the accumulation of the pre-transformed material and/or debris on the railing during the printing. The physical protection may comprise a labyrinth. In some embodiments, the layer dispensing mechanism may comprise, or be operatively coupled to, a carriage capable of keeping the layer dispensing mechanism along its intended path albeit any accumulation of the pre-transformed (e.g., starting) material and/or debris on the railing. In some embodiments, the carriage comprises one or more wheels configured to push away the accumulated pre-transformed (e.g., starting) material and/or debris on the railing, wherein pushing aways is during progression of the one or more wheels along the railing. In some embodiments, the carriage comprises a flexible coupler configured to maintain the layer dispensing mechanism along its intended path albeit accumulation of pre-transformed (e.g., starting) material and/or debris on the railing during printing.

In another aspect, a system for three-dimensional printing of at least one three-dimensional object comprises: an enclosure configured to enclose the at least one three-dimensional object during the printing, the at least one three-dimensional object printed from a first portion of a pre-transformed material, the enclosure comprises: a funnel portion configured to facilitate a flow of a second portion of the pre-transformed material in a first direction towards an exit opening of the funnel portion, which exit opening is configured to provide access out of the enclosure; a port flushing component coupled with the funnel portion and at least partially defining a channel that intersects with the exit opening; and at least one pump configured to direct a flow of gas (i) through the channel of the port flushing component and (ii) past the exit opening, which channel is configured to (I) direct the flow of gas in a second direction substantially non-parallel to the first direction and (II) facilitate displacement of the second portion of the pre-transformed material out of the exit opening through the channel. In some embodiments, the channel is at least partially defined by a tube. In some embodiments, the flow of gas facilitates displacement of the second portion of the pre-transformed material out of the exit opening through the channel. In some embodiments, the enclosure is configured to accommodate a positive pressure. In some embodiments, the positive pressure is of at least 0.5 pounds per square inch (PSI) above an ambient atmosphere. In some embodiments, the system further comprises a recycling system configured to recycle the second portion of the pre-transformed material during the printing. In some embodiments, the exit opening of the funnel portion provides access to the to the recycling system. In some embodiments, the recycling system comprises at least one filter configured to reduce an amount of debris within the second portion of the pre-transformed material. In some embodiments, the system further comprises a layer dispenser configured to provide a layer of the pre-transformed material within the enclosure. In some embodiments, the layer dispenser comprises at least one component configured to perform one or more operations comprise: (i) providing the pre-transformed material towards a platform, or (ii) planarizing an exposed surface of a material bed that comprises the pre-transformed material. In some embodiments, the system further comprises a linear encoder or a linear actuator, wherein the at least one component is operatively coupled to the linear encoder and/or the linear actuator, and wherein the linear encoder or the linear actuator is configured to facilitate translation of the at least one component within the enclosure. In some embodiments, the system further comprises a platform configured to support the first portion of the pre-transformed material within the enclosure. In some embodiments, the at least one pump is configured to provide a pressure to the second portion of the pre-transformed material within the funnel portion, wherein the pressure is provided in a direction that is substantially parallel to the first direction. In some embodiments, the pressure comprises a second flow of gas. In some embodiments, the funnel portion is integrally formed with the enclosure. In some embodiments, the funnel portion comprises a piece that is coupled with the enclosure. In some embodiments, the funnel portion is coupled with the enclosure via a connector. In some embodiments, the first direction is substantially orthogonal to the second direction. In some embodiments, the funnel portion is part of an ancillary chamber of the enclosure. In some embodiments, the system further comprises one or more detector devices configured to detect the second portion of the pre-transformed material that exits the exit opening and/or flows in the channel. In some embodiments, the one or more detector devices is coupled with the funnel portion, the port flushing component, or one or more connectors coupling the funnel portion with the port flushing component, and/or one more connector channels coupling the port flushing component with a recycling system. In some embodiments, the one or more detector devices is configured to detect (a) an amount of the pre-transformed material, (b) fundamental length scale of one or more particles of the pre-transformed material, (c) a velocity of a flow of pre-transformed material, and/or (d) a chemical nature of the pre-transformed material exiting the exit opening. In some embodiments, the second portion is a remainder of the pre-transformed material that did not form the at least one three-dimensional object or is not part of a material bed. In some embodiments, the second portion is used at least in part to print the at least one three-dimensional object. In some embodiments, the system used is after recycling the second portion.

In another aspect, a method of printing of at least one three-dimensional object, the method comprises: (a) using a funnel portion to guide a first portion of a pre-transformed material from an enclosure by directing the first portion of the pre-transformed material (i) in a first direction through a funnel portion comprising an exit opening and (ii) through a channel operatively coupled to the exit opening, wherein the at least one three-dimensional object is printed in the enclosure from a second portion of a three-transformed material; and (b) flowing a gas in the channel past the exit opening in a second direction that is non-parallel to the first direction, and (c) displacing the first portion of the pre-transformed material from the exit opening of the funnel portion. In some embodiments, causing the first portion of the pre-transformed material to transit from the enclosure to the funnel portion comprises causing a material dispenser within the enclosure to dispense material, wherein the first portion of the pre-transformed material that transits to the funnel portion comprises an excess of the pre-transformed material from the printing. In some embodiments, operatively coupled comprises fluidly connected to allow flow of gas and/or the first portion of the pre-transformed material. In some embodiments, displacing the second portion is during (b). In some embodiments, displacing the second portion is by flowing the gas past the exit opening. In some embodiments, the first portion is a remainder of the pre-transformed material that did not form the at least one three-dimensional object. In some embodiments, the method further comprises at least in part using the first portion to print the at least one three-dimensional object. In some embodiments, using is after recycling the first portion. In some embodiments, the first direction is substantially orthogonal to the second direction. In some embodiments, the method further comprises providing a pressure to the first portion of the pre-transformed material within the funnel portion, wherein the pressure is provided in a direction that is substantially parallel to the first direction. In some embodiments, providing the pressure comprises applying a second flow of gas through the funnel portion toward the exit opening. In some embodiments, the method further comprises directing the first portion of the pre-transformed material to a recycling system using the flow of gas. In some embodiments, the method further comprises filtering the first portion of the pre-transformed material using one or more filters of the recycling system. In some embodiments, the method further comprises using a recycled portion of the pre-transformed material from the recycling system during the printing operation or a subsequent printing. In some embodiments, method further comprises applying a positive pressure within the enclosure before, after, and/or during the printing. In some embodiments, the positive pressure is at least 0.5 pounds per square inch (PSI). In some embodiments, flowing a gas in the channel past the exit opening comprises flowing the gas through a head space within the channel, the head space corresponding to a space that is not occupied by the first portion of the pre-transformed material within the channel. In some embodiments, the method further comprises detecting an amount of the pre-transformed material, a fundamental length scale of one or more particles of the pre-transformed material, a velocity of a flow of the pre-transformed material, and/or a chemical nature of the pre-transformed material exiting the exit opening using one or more detector devices.

In another aspect, an apparatus for three-dimensional printing of at least one three-dimensional object comprises at least one controller that is programmed to perform the following operations: operation (a): direct flowing a gas in a channel past an exit opening of a funnel portion, wherein the exit opening is operationally coupled to the channel, wherein a flow of the gas is in a second direction that is non-parallel to a first direction of a flow of a first portion of a pre-transformed material within the funnel portion, wherein the funnel portion facilitates flow of a first portion of a pre-transformed material through the exit opening to the channel, which flow of gas expels the first portion from the exit opening through the channel; operation (b): direct detecting at least one characteristic of the first portion of the pre-transformed material in the channel; and operation (c) adjusting at least one characteristic of the gas based on the detecting. In some embodiments, the at least one controller is programed to direct operation (b) prior to, during, or after operation (a). In some embodiments, the at least one characteristic of the gas comprises flow velocity, pressure, flow resistivity, oxygen content, or humidity content. In some embodiments, the at least one characteristic of the first portion of the pre-transformed material comprises (i) an amount of the pre-transformed material, (ii) a fundamental length scale of one or more particles of the pre-transformed material, (iii) a velocity of a flow of pre-transformed material, and/or (iv) a chemical nature of the pre-transformed material. In some embodiments, the chemical nature comprises humidity or oxygen content. In some embodiments, the at least one controller is programed to perform operation (c): directing a material dispenser within an enclosure to dispense the first portion of the pre-transformed material. In some embodiments, the first portion of the pre-transformed material that transits to the funnel portion comprises excess pre-transformed material from a printing operation. In some embodiments, the at least one controller is programed to perform operation (e): directing at least one energy beam at a target surface within an enclosure, wherein the at least one energy beam is configured to transform a second pre-transformed material to a transformed material as part of the at least one three-dimensional object. In some embodiments, operation (a) and operation (b) are directed by the same controller. In some embodiments, operation (a) and operation (b) are directed by different controllers. In some embodiments, the adjusting comprises using closed loop control scheme.

In another aspect, a computer software product for three-dimensional printing of at least one three-dimensional object, comprising a non-transitory computer-readable medium/media in which program instructions are stored, which program instructions, when read by at least one computer, cause the at least one computer to perform operations comprises: operation (a): direct flowing a gas in a channel past an exit opening of a funnel portion, wherein the exit opening is operationally coupled to the channel, wherein a flow of the gas is in a second direction that is non-parallel to a first direction of a flow of a first portion of a pre-transformed material within the funnel portion, wherein the funnel portion facilitates flow of a first portion of a pre-transformed material through the exit opening to the channel, which flow of gas expels the first portion from the exit opening through the channel; and operation (b): direct detecting at least one characteristic of the first portion of the pre-transformed material in the channel. In some embodiments, the program instructions cause the at least one computer to further perform operation (c): causing a material dispenser within an enclosure to dispense material, wherein the first portion of the pre-transformed material that transits to the funnel portion comprises excess pre-transformed material from a printing operation. In some embodiments, the program instructions cause the at least one computer to further perform operation (d): causing one or more detectors to detect pre-transformed material exiting the exit opening. In some embodiments, the program instructions cause the at least one computer to receive data from the one or more detectors related to an amount of pre-transformed material, size of particles of the pre-transformed material, a velocity of a flow of pre-transformed material, and/or a chemical nature of the pre-transformed material exiting the exit opening. In some embodiments, the program instructions cause the at least one computer to perform operation (e): causing one or more energy sources direct at least one energy beam at a target surface within an enclosure, wherein the at least one energy beam is configured to transform the pre-transformed material to a transformed material as part of the at least one three-dimensional object. In some embodiments, program instructions cause the at least one computer to perform operation (b) prior to, during, or after operation (a). In some embodiments, computer software product causes a first computer to perform operation (a) and a second computer to perform operation (b), wherein the first computer is different than the second computer. In some embodiments, computer software product causes a computer to perform operation (a) and operation (b). In some embodiments, the program instructions further cause the at least one computer to perform operation (c) adjusting at least one characteristic of the gas based on the detecting. In some embodiments, operation (b) further comprises direct detecting at least one characteristic of a gas in the channel, the at least one characteristic of the gas comprises flow velocity, pressure, flow resistivity, oxygen content, or humidity content. In some embodiments, the at least one characteristic of the first portion of the pre-transformed material comprises (i) an amount of the pre-transformed material, (ii) a fundamental length scale of one or more particles of the pre-transformed material, (iii) a velocity of a flow of pre-transformed material, and/or (iv) a chemical nature of the pre-transformed material. In some embodiments, the chemical nature comprises humidity or oxygen content. In some embodiments, the program instructions further the at least one computer to perform operation (c): directing a material dispenser within an enclosure to dispense a second portion of the pre-transformed material. To print at least a section of the three-dimensional object may comprise directing an energy beam to transform at least a portion of the material bed to form the at least a section of the three-dimensional object.

In another aspect, a device for directed traversal in an environment contaminated by debris, the device comprises: a carriage (e.g., carrier); a wheel coupled to the carriage, the wheel configured to engage with a railing having a long axis along which the wheel is configured to traverse, the wheel configured to push debris away as it traverses along the railing, which coupling of the wheel to the carriage is configured to facilitate displacement along the long axis of the railing when a remainder of the debris along the railing has not been fully pushed away. In some embodiments, the processing chamber (I) is coupled to an ancillary chamber attached to it, the carriage being configured to be disposed in the ancillary chamber when idle, (II) is operatively coupled to a filtering system comprising a high-efficiency particulate arrestance (HEPA) filter, (III) is operatively coupled to a port flushing component configured to provide a flow of gas to flush material through the port lushing component, or (IV) any combination of (I) (II) and (III). In some embodiments, the dispenser utilizes a vibrational movement during operation to dispense pre-transformed material. In some embodiments, the layer dispensing mechanism is configured to move abruptly to remove excess of pre-transformed material collected during operation. In some embodiments, the remover (i) is operatively coupled to an attractive force source sufficient to attract the pre-transformed material from the target surface, (ii) has a nozzle having an asymmetric vertical cross section, or (iii) any combination. In some embodiments, the railing has a vertical cross section that is convex. In some embodiments, the vertical cross section comprises an isosceles triangle, or substantially an isosceles triangle. In some embodiments, the wheel has a concave crevice along a curved external surface to compliment, or substantially complement, with the railing. In some embodiments, complementing the railing facilitates pushing away any debris accumulated on the railing during traversal of the wheel along the railing. In some embodiments, the concave crevice comprises a curvature that is configured to substantially complement a convex surface of the railing devoid of curvature. In some embodiments, the concave crevice is configured to minimally contact the railing. In some embodiments, the concave crevice comprises at least one curvature and where the railing is devoid of curvature. In some embodiments, the wheel has a concave crevice along its outer envelope. In some embodiments, the wheel is a wheel bearing. In some embodiments, the railing is configured to protect the wheel from the debris during its displacement along the railing, including when the wheel is not displaced along the railing (e.g., when the wheel is stationary along the railing). In some embodiments, the carriage is a compliant carriage. In some embodiments, the carriage is configured to carry a layer dispensing mechanism configured to dispense a planar layer of pre-transformed material as part of a material bed from which one or more three-dimensional objects are printed in a printing cycle. In some embodiments, the layer dispensing mechanism is configured to move abruptly to remove excess of pre-transformed material collected during operation. In some embodiments, the carriage is configured to carry one or more mechanisms comprises: a material dispenser, a material leveler, or a material remover. In some embodiments, the carriage is configured to connect a plurality of wheels comprising the wheel. In some embodiments, the plurality of wheels is an odd number of wheels. In some embodiments, the plurality of wheels is an even number of wheels. In some embodiments, each pair of wheels in the plurality of wheels is coupled to a flexible coupler. In some embodiments, the flexible coupler comprises a spring. In some embodiments, the flexible coupler is elastically flexible. In some embodiments, the carriage comprises an elemental metal, metal alloy, an allotrope of elemental carbon, or a ceramic. In some embodiments, the carriage comprises a transparent material or an opaque material. In some embodiments, the carriage comprises a window that facilitates maintenance. In some embodiments, maintenance comprises (i) maintenance of the carriage, (ii) maintenance of the flexible coupler, (iii) maintenance of one or more wheels, (iv) maintenance of the railing, or (v) maintenance of any other component of the device. In some embodiments, the carriage comprises a crevice that is configured to engage with a stopper once the carriage reaches an end of the wheel, the stopper being configured to prevent the carriage from continuing translating beyond the stopper. In some embodiments, the carriage comprises wipers disposed at opposing sides of the wheel, the wipers being configured to wipe away the debris from the railing. In some embodiments, the opposing sides of the wheel are along the propagation direction of the wheel. In some embodiments, the wipers comprise a soft material. In some embodiments, the soft material comprises a sponge, or cloth. In some embodiments, the cloth comprises felt. In some embodiments, the carriage is operatively coupled to an actuator. In some embodiments, the actuator is disposed externally to the environment, and where the carriage comprises a clamp configured to engage with a belt that engages with a gear coupled to the actuator. In some embodiments, the actuator comprises a motor. In some embodiments, the environment is enclosed in an enclosure. In some embodiments, the environment comprises a gas having at least one characteristic different from that of an ambient environment external to the enclosure. In some embodiments, the at least one characteristic comprising (i) a reactive agent, or (ii) a pressure. In some embodiments, the device is configured to operate under an atmosphere depleted of a reactive agent relative to its concentration in an ambient atmosphere external to the device, the reactive agent being configured to react with a reactive species at least during three-dimensional printing, the reactive species comprising the debris, a starting material of the three-dimensional printing, or a product of the three-dimensional printing. In some embodiments, the reactive agent comprises oxygen, or water. In some embodiments, the device is configured to operate under a positive pressured atmosphere relative to an ambient atmosphere external to the device. In some embodiments, the environment comprises an inert environment. In some embodiments, the environment is of a processing chamber of a three-dimensional printer. In some embodiments, the processing chamber (I) is coupled to an ancillary chamber attached to it, the carriage being configured to be disposed in the ancillary chamber when idle, (II) is operatively coupled to a filtering system comprising a high-efficiency particulate arrestance filter, (III) is operatively coupled to a port flushing component configured to provide a flow of gas to flush material through the port lushing component, or (IV) any combination of (I) (II) and (III). In some embodiments, the processing chamber is configured to support positive pressure above ambient pressure external to the processing chamber. In some embodiments, the processing chamber is configured to support positive pressure above about one atmosphere. In some embodiments, the processing chamber is configured for layerwise printing of a three-dimensional object. In some embodiments, the three-dimensional object comprises an elemental metal, metal alloy, an allotrope of elemental carbon, or a ceramic. In some embodiments, the three-dimensional printer is configured to use an energy beam comprising a laser beam or an electron gun. In some embodiments, the device is operatively coupled to an energy source and/or a scanner configured to direct an energy beam to impinge on the material bed during the three-dimensional printing to transform the pre-transformed material to the transformed material that forms at least a portion of a three-dimensional object, and where the energy beam has a beam profile configured to be altered at least one time during the printing. In some embodiments, during the printing comprises during printing of a layer of transformed material as part of a 3D object. In some embodiments, alteration of the beam profile comprises alteration of a type of the beam profile. In some embodiments, the type of the beam profile comprises: a gaussian beam profile, a top hat beam profile, or a doughnut beam profile. In some embodiments, the type of the beam profile comprises: (i) physical alteration or (ii) alteration via a computational scheme. In some embodiments, the debris comprises an elemental metal, metal alloy, an allotrope of elemental carbon, or a ceramic. In some embodiments, the debris comprises soot, or unused starting material for a three-dimensional printing process. In some embodiments, the environment is of an enclosure comprising a processing chamber of a three-dimensional printer configured to print one or more three-dimensional objects. In some embodiments, the device is configured to facilitate three-dimensional printing that comprises deposition of pre-transformed material on a target surface. In some embodiments, the target surface comprises (i) an exposed surface of a material bed or (ii) a surface of the build platform. In some embodiments, the device is configured to operatively couple to a remover configured to remove a portion of deposited pre-transformed material from the target surface to generate a planar layer of pre-transformed material as part of a material bed utilized for three-dimensional printing. In some embodiments, the remover (i) is operatively coupled to an attractive force source sufficient to attract the pre-transformed material from the target surface, (ii) has a nozzle having an asymmetric vertical cross section, or (iii) any combination of (i) and (ii). In some embodiments, (I) the attractive force comprises a magnetic, electric, electrostatic, or vacuum source, (II) the attractive force is sufficient to generate an exposed surface of a material bed that is planar or substantially planar when at least a portion of a three-dimensional object protrudes from the exposed surface, or (III) any combination of (I) and (II). In some embodiments, the remover is operatively coupled to an attractive force source sufficient to attract the pre-transformed material from the target surface. In some embodiments, the attractive force comprises a magnetic, electric, electrostatic, or vacuum source. In some embodiments, the attractive force comprises a vacuum source. In some embodiments, the device is configured to operatively couple to a recycling system that (i) recycles at least a fraction of a portion of the pre-transformed material removed by the remover and/or (ii) provides at least an other portion of the pre-transformed material utilized by a dispenser to which the device is operatively coupled to, the dispenser being configured to dispenser the pre-transformed material. In some embodiments, the portion removed by the remover is at least about 70%, 50% or 30% of the deposited pre-transformed material by a material dispenser to which the device is operatively coupled to. In some embodiments, the fraction recycled is at least about 70% or 90% of the portion removed by the remover. In some embodiments, the device is configured to facilitate deposition of pre-transformed material on the target surface at least in part by layerwise deposition. In some embodiments, the device is configured to facilitate deposition of pre-transformed material comprising powder material at least in part by being operatively coupled to a material dispenser. In some embodiments, the device is configured to deposit pre-transformed material comprising elemental metal, metal alloy, ceramic, or an allotrope of carbon. In some embodiments, the devise is configured to be disposed (e.g., be located) in a three-dimensional printer configured to facilitate gas flow away from the one or more optical windows and in a direction towards the build platform. In some embodiments, the device is configured to facilitate three-dimensional printing. In some embodiments, the three-dimensional printing comprises extruding by an extruder to facilitate printing at least one three-dimensional object in a printing cycle. In some embodiments, the device is configured to comprise, or operatively coupled to, the extruder. In some embodiments, the three-dimensional printing comprises arc welding. In some embodiments, arc welding is by an arc welder to facilitate printing the at least one three-dimensional object comprises: generating a powder stream and focusing an energy beam on the powder stream. In some embodiments, the device is configured to comprise, or operatively coupled to, the arc welder. In some embodiments, the three-dimensional printing comprises connecting particulate matter to print the at least one three-dimensional object in a printing cycle. In some embodiments, at least a portion of the particulate matter is disposed in a material bed during the three-dimensional printing using a material dispenser operatively coupled to the device, the device being configured to operatively coupled to the material dispenser and facilitate its operation. In some embodiments, the particulate matter comprises a super alloy. In some embodiments, the super alloy comprises Inconel, In718, Ti64, F357, Haynes282, GRCop-42, C22, CA6NM, or Hastelloy-X. In some embodiments, the three-dimensional printing comprises a fusing process. In some embodiments, fusing comprises (i) sintering, (ii) melting, (iii) smelting, or (iv) any combination of (i)-(iii). In some embodiments, the carriage is configured to couple to a dispenser configured to dispense pre-transformed material (e.g., starting material) as part of a three-dimensional printing process. In some embodiments, dispensing pre-transformed material at least in part generates a material bed formed on a surface of a build platform. In some embodiments, the build platform comprises at least one fundamental length scale having a value of at least about 400 mm, 600 mm, 1000 mm, 1200 mm, 1500 mm, or 1750 mm. In some embodiments, the build platform is configured to support a weight of at least about 1000 kg. In some embodiments, the build platform is configured for vertical translation having an error in vertical positioning of the vertical translation at most about 10%, 5%, or 2% of the vertical translation of the build platform. In some embodiments, the build platform is disposed in a build module comprising a seal that is a hermetic seal, the device being configured to operatively couple to the build module. In some embodiments, the seal is a gas tight seal. In some embodiments, the seal is configured to facilitate retaining for a time period an internal atmosphere in the build module that is different from an ambient atmosphere external to the build module. In some embodiments, the time period is at least a same or greater value than a time period to remove the three-dimensional objects from the build module body. In some embodiments, the internal atmosphere comprises (i) a positive pressure within the build module body relative to the ambient atmosphere or (ii) a reactive agent at a concentration lower than its concentration in the ambient atmosphere, the reactive agent being configured to at least react with reactive species during the three-dimensional printing, the reactive species comprising (a) the debris or (b) pre-transformed material of three-dimensional printing. In some embodiments, the positive pressure is of at least about 10 kilopascals (KPa), 15 KPa, or 20 KPa above the ambient pressure. In some embodiments, the pre-transformed material comprises powder. In some embodiments, the pre-transformed comprises an elemental metal, metal alloy, an allotrope of elemental carbon, or a ceramic. device where the dispenser is configured to dispense the pre-transformed material to generate, or add to, a material bed. In some embodiments, the dispenser utilizes a vibrational movement during operation to dispense pre-transformed material.

In another aspect, an apparatus for directing traversal in an environment contaminated by debris, the apparatus comprising at least one controller configured to control, or direct control of, any of the above devices; where the at least one controller is configured to (i) operatively couple to the carriage, the wheel, and the railing, and (ii) direct movement of the carriage, the wheel and the railing. In some embodiments, the at least one controller is configured to (I) operatively couple to and (II) direct: a plurality of wheels, an actuator, a motor, an energy beam, and/or a dispenser. For example, an apparatus for directing traversal in an environment contaminated by debris, the apparatus comprising at least one controller operatively coupled to a carriage, which at least one controller is configured to: direct the carriage having a wheel coupled thereto to engage with a railing having a long axis along which the wheel is configured to traverse, the wheel configured to push debris away as it traverses along the railing, which coupling of the wheel to the carriage is configured to facilitate displacement along the long axis of the railing when a remainder of the debris along the railing has not been fully pushed away.

In another aspect, non-transitory computer readable program instructions for directing traversal in an environment contaminated by debris, the non-transitory computer readable program instructions, when read by one or more processors, cause one or more processors to execute operations comprising controlling, or directing control of, any of the above devices, where the one or more processors are configured to (i) operatively couple to the carriage, the wheel, and the railing, and (ii) direct movement of the carriage, the wheel, and the railing. In some embodiments, the one or more processors are configured to operatively couple to: a plurality of wheels, an actuator, a motor, an energy beam and/or a dispenser, and where the program instructions are configured to respectively direct movement of the plurality of wheels, the actuator, the motor, the energy beam and/or the dispenser. For example, non-transitory computer readable program instructions for directing traversal in an environment contaminated by debris, the non-transitory computer readable program instructions, when read by one or more processors operatively coupled to a carriage, cause the one or more processors to execute operations comprising: directing the carriage having a wheel coupled thereto to engage with a railing having a long axis along which the wheel is configured to traverse, the wheel configured to push debris away as it traverses along the railing, which coupling of the wheel to the carriage is configured to facilitate displacement along the long axis of the railing when a remainder of the debris along the railing has not been fully pushed away.

In another aspect, a method for directing traversal in an environment contaminated by debris, the method (i) employing any of the above devices and/or (ii) executing, or directing execution of, one or more operations of any of the devices. For example, a method for directing traversal in an environment contaminated by debris, the method comprises: traversing a wheel, coupled to a carriage, along a long axis of a railing, the wheel pushing debris away as it traverses along the railing, which coupling of the wheel to the carriage facilitates displacement along the long axis of the railing when a remainder of the debris along the railing has not been fully pushed away. In some embodiments, the processing chamber (I) is coupled to an ancillary chamber attached to it, the carriage being configured to be disposed in the ancillary chamber when idle, (II) is operatively coupled to a filtering system comprising a high-efficiency particulate arrestance (HEPA) filter, (III) is operatively coupled to a port flushing component configured to provide a flow of gas to flush material through the port lushing component, or (IV) any combination of (I) (II) and (III). In some embodiments, the dispenser utilizes a vibrational movement during operation to dispense pre-transformed material. In some embodiments, the layer dispensing mechanism is configured to move abruptly to remove excess of pre-transformed material collected during operation. In some embodiments, the remover (i) is operatively coupled to an attractive force source sufficient to attract the pre-transformed material from the target surface, (ii) has a nozzle having an asymmetric vertical cross section, or (iii) any combination of (i) and (ii). In some embodiments, the shield comprises portions disposed on at least two parallel vertical planes. In some embodiments, the at least two of the layers are being overlapped in a direction perpendicular, or substantially perpendicular, to the long axis. In some embodiments, at least a portion of the layers are disposed on at least two parallel vertical planes. In some embodiments, the device comprises a first side and an opposing second side that are disposed in the direction perpendicular, or substantially perpendicular, to the long axis of the railing, the first side being devoid of the layers disposed on the second side. In some embodiments, the device is configured to allow the wheel to engage with the railing inside the device while the carriage is engaged with at least one of the layers during traversal of the wheel along the railing. In some embodiments, the layers form a labyrinth like structure to obstruct and/or shield from entry of the debris to the railing disposed in the device. In some embodiments, the railing comprises elemental metal, metal alloy, ceramic, or an allotrope of elemental carbon. In some embodiments, the railing has a vertical cross section that is convex. In some embodiments, the vertical cross section comprises an isosceles triangle, or substantially an isosceles triangle. In some embodiments, the wheel has a concave crevice along a curved external surface to compliment, or substantially complement, with the railing. In some embodiments, complementing the railing facilitates pushing away any debris accumulated on the railing during traversal of the wheel along the railing. In some embodiments, the concave crevice comprises a curvature that is configured to substantially complement a convex surface of the railing devoid of curvature. In some embodiments, the concave crevice is configured to minimally contact the railing. In some embodiments, the concave crevice comprises at least one curvature and where the railing is devoid of curvature. In some embodiments, the wheel has a concave crevice along its outer envelope. In some embodiments, the carriage is configured to carry a layer dispensing mechanism configured to dispense a planar layer of pre-transformed material as part of a material bed from which one or more three-dimensional objects are printed in a printing cycle. In some embodiments, the layer dispensing mechanism is configured to move abruptly to remove excess of pre-transformed material collected during operation. In some embodiments, the carriage is configured to carry one or more mechanisms comprises: a material dispenser, a material leveler, or a material remover. In some embodiments, the wheel is a wheel bearing. In some embodiments, the railing is configured to protect the wheel from the debris during its displacement along the railing, including when the wheel is not displaced along the railing. In some embodiments, the carriage is a compliant carriage. In some embodiments, the carriage is configured to connect a plurality of wheels comprising the wheel. In some embodiments, the plurality of wheels is an odd number of wheels. In some embodiments, the plurality of wheels is an even number of wheels. In some embodiments, each pair of wheels in the plurality of wheels is coupled to a flexible coupler. In some embodiments, the flexible coupler comprises a spring. In some embodiments, the flexible coupler is elastically flexible. In some embodiments, the carriage comprises an elemental metal, metal alloy, an allotrope of elemental carbon, or a ceramic. In some embodiments, the carriage comprises a transparent material or an opaque material. In some embodiments, the carriage comprises a window that facilitates maintenance. In some embodiments, maintenance comprises (i) maintenance of the carriage, (ii) maintenance of the flexible coupler, (iii) maintenance of one or more wheels, (iv) maintenance of the railing, or (v) maintenance of any other component of the device. In some embodiments, the carriage comprises a crevice that is configured to engage with a stopper once the carriage reaches an end of the wheel, the stopper being configured to prevent the carriage from continuing translating beyond the stopper. In some embodiments, the carriage comprises wipers disposed at opposing sides of the wheel, the wipers being configured to wipe away the debris from the railing. In some embodiments, the opposing sides of the wheel are along the propagation direction of the wheel. In some embodiments, the wipers comprise a soft material. In some embodiments, the soft material comprises a sponge, or cloth. In some embodiments, the cloth comprises felt. In some embodiments, the carriage is operatively coupled to an actuator. In some embodiments, the actuator is disposed externally to the environment, and where the carriage comprises a clamp configured to engage with a belt that engages with a gear coupled to the actuator. In some embodiments, the actuator comprises a motor. In some embodiments, the environment comprises a gas having at least one characteristic different from that of an ambient environment external to the enclosure. In some embodiments, the at least one characteristic comprising (i) a reactive agent, or (ii) a pressure. In some embodiments, the device is configured to operate under an atmosphere depleted of a reactive agent relative to its concentration in an ambient atmosphere external to the device, the reactive agent being configured to react with a reactive species at least during three-dimensional printing, the reactive species comprising the debris, a starting material of the three-dimensional printing, or a product of the three-dimensional printing. In some embodiments, the reactive agent comprises oxygen, or water. In some embodiments, the environment comprises an inert environment. In some embodiments, the environment is of a processing chamber of a three-dimensional printer. In some embodiments, the processing chamber (I) is coupled to an ancillary chamber attached to it, the carriage being configured to be disposed in the ancillary chamber when idle, (II) is operatively coupled to a filtering system comprising a high-efficiency particulate arrestance filter, (III) is operatively coupled to a port flushing component configured to provide a flow of gas to flush material through the port lushing component, or (IV) any combination of (I) (II) and (III). In some embodiments, the processing chamber is configured to support positive pressure above ambient pressure external to the processing chamber. In some embodiments, the processing chamber is configured to support positive pressure above one atmosphere. In some embodiments, the processing chamber is configured to layerwise print a three-dimensional object. In some embodiments, the three-dimensional object comprises an elemental metal, metal alloy, an allotrope of elemental carbon, or a ceramic. In some embodiments, the three-dimensional printer is configured to use an energy beam comprising a laser beam or an electron gun. In some embodiments, the device comprises, or is operatively coupled to, an energy source and/or a scanner configured to direct an energy beam to impinge on the material bed during the three-dimensional printing to transform the pre-transformed material to the transformed material that forms at least a portion of a three-dimensional object, and where the energy beam has a beam profile configured to be altered at least one time during the printing. In some embodiments, during the printing comprises during printing of a layer of transformed material as part of a three-dimensional object. In some embodiments, alteration of the beam profile comprises alteration of a type of the beam profile. In some embodiments, the type of the beam profile comprises: a gaussian beam profile, a top hat beam profile, or a doughnut beam profile. In some embodiments, the type of the beam profile comprises: (i) physical alteration or (ii) alteration via a computational scheme. In some embodiments, the debris comprises an elemental metal, metal alloy, an allotrope of elemental carbon, or a ceramic. In some embodiments, the debris comprises soot, or unused starting material of a three-dimensional printing process. In some embodiments, the environment comprises a processing chamber of a three-dimensional printer configured to print one or more three-dimensional objects in a printing cycle. In some embodiments, the carriage is configured to couple to a dispenser configured to dispense pre-transformed material. In some embodiments, the pre-transformed material comprises powder. In some embodiments, the pre-transformed comprises an elemental metal, metal alloy, an allotrope of elemental carbon, or a ceramic. In some embodiments, the dispenser is configured to dispense the pre-transformed material to generate, or add to, a powder bed. In some embodiments, the dispenser utilizes a vibrational movement during operation to dispense pre-transformed material. In some embodiments, the device is configured to facilitate three-dimensional printing that comprises deposition of pre-transformed material on a target surface. In some embodiments, the target surface comprises (i) an exposed surface of a material bed or (ii) a surface of the build platform. In some embodiments, the device is configured to operatively couple to a remover configured to remove a portion of deposited pre-transformed material from the target surface to generate a planar layer of pre-transformed material as part of a material bed utilized for three-dimensional printing. In some embodiments, the remover (i) is operatively coupled to an attractive force source sufficient to attract the pre-transformed material from the target surface, (ii) has a nozzle having an asymmetric vertical cross section, or (iii) any combination of (i) and (ii). In some embodiments, (I) the attractive force comprises a magnetic, electric, electrostatic, or vacuum source, (II) the attractive force is sufficient to generate an exposed surface of a material bed that is planar or substantially planar when at least a portion of a three-dimensional object protrudes from the exposed surface, or (III) any combination of (I) and (II). In some embodiments, the device is configured to operatively couple to a recycling system that (i) recycles at least a fraction of a portion of the pre-transformed material removed by the remover and/or (ii) provides at least an other portion of the pre-transformed material utilized by a dispenser to which the device is operatively coupled to, the dispenser being configured to dispenser the pre-transformed material. In some embodiments, the portion removed by the remover is at least about 70%, 50% or 30% of the deposited pre-transformed material by a material dispenser to which the device is operatively coupled to. In some embodiments, the fraction recycled is at least about 70% or 90% of the portion removed by the remover. In some embodiments, the device is configured to facilitate deposition of pre-transformed material on the target surface at least in part by layerwise deposition. In some embodiments, the device is configured to facilitate deposition of pre-transformed material comprising powder material at least in part by being operatively coupled to a material dispenser. In some embodiments, the device is configured to deposit pre-transformed material comprising elemental metal, metal alloy, ceramic, or an allotrope of carbon. In some embodiments, the devise is configured to be disposed in a three-dimensional printer configured to facilitate gas flow away from the one or more optical windows and in a direction towards the build platform. In some embodiments, the device is configured to facilitate three-dimensional printing. In some embodiments, the three-dimensional printing comprises extruding by an extruder to facilitate printing at least one three-dimensional object in a printing cycle. In some embodiments, the device is configured to comprise, or operatively coupled to, the extruder. In some embodiments, the three-dimensional printing comprises arc welding. In some embodiments, arc welding is by an arc welder to facilitate printing the at least one three-dimensional object comprises: generating a powder stream and focusing an energy beam on the powder stream. In some embodiments, the device is configured to comprise, or operatively coupled to, the arc welder. In some embodiments, the three-dimensional printing comprises connecting particulate matter to print the at least one three-dimensional object in a printing cycle. In some embodiments, at least a portion of the particulate matter is disposed in a material bed during the three-dimensional printing using a material dispenser operatively coupled to the device, the device being configured to operatively coupled to the material dispenser and facilitate its operation. In some embodiments, the particulate matter comprises a super alloy. In some embodiments, the super alloy comprises Inconel, In718, Ti64, F357, Haynes282, GRCop-42, C22, CA6NM, or Hastelloy-X. In some embodiments, the three-dimensional printing comprises a fusing process. In some embodiments, fusing comprises (i) sintering, (ii) melting, (iii) smelting, or (iv) any combination of (i)-(iii). In some embodiments, the carriage is configured to couple to a dispenser configured to dispense pre-transformed material (e.g., starting material) as part of a three-dimensional printing process. In some embodiments, dispense pre-transformed material at least in part generates a material bed formed on a surface of a build platform. In some embodiments, the build platform comprises at least one fundamental length scale having a value of at least about 400 mm, 600 mm, 1000 mm, 1200 mm, 1500 mm, or 1750 mm. In some embodiments, the build platform is configured to support a weight of at least about 1000 kg. In some embodiments, the build platform is configured for vertical translation having an error in vertical positioning of the vertical translation at most about 10%, 5%, or 2% of the vertical translation of the build platform. In some embodiments, the build platform is disposed in a build module comprising a seal that is a hermetic seal, the device being configured to operatively couple to the build module. In some embodiments, the seal is a gas tight seal. In some embodiments, the seal is configured to facilitate retaining for a time period an internal atmosphere in the build module that is different from an ambient atmosphere external to the build module. In some embodiments, the time period is at least a same or greater value than a time period to remove the three-dimensional objects from the build module body. In some embodiments, the internal atmosphere comprises (i) a positive pressure within the build module body relative to the ambient atmosphere or (ii) a reactive agent at a concentration lower than its concentration in the ambient atmosphere, the reactive agent being configured to at least react with reactive species during the three-dimensional printing, the reactive species comprising (a) the debris or (b) pre-transformed material of three-dimensional printing. In some embodiments, the positive pressure is of at least about 10 kilopascals (KPa), 15 KPa, or 20 KPa above the ambient pressure.

In another aspect, an apparatus for directing traversal in an environment contaminated by debris, the apparatus comprising at least one controller configured to control, or direct control of, any of the above devices; where the at least one controller is configured to (i) operatively couple to a carriage, a wheel, a railing and a shield (e.g., a covering), and (ii) direct movement of the carriage, the wheel, the railing and the shield. In some embodiments, the at least one controller is configured to (I) operatively couple to and (II) direct: an actuator, a motor, an energy beam and/or a dispenser. For example, an apparatus for directing traversal in an environment contaminated by debris, the apparatus comprising at least one controller configured to: direct control of a shield (e.g., a covering) coupled to a railing, which shield is configured protect a wheel from the debris during displacement of the wheel along the railing, which wheel is (i) coupled to a carriage and (ii) configured to engage with the railing along which the wheel is configured to directionally traverse along a long axis of the railing, the shield configured to protect the wheel from the debris by having layers that are spaced, non-contacting, and overlapping, which layers form at least one cavity in which the wheel traverses along the railing, which overlapping layers overlap in a direction different from that of the long axis.

In another aspect, non-transitory computer readable program instructions for directing traversal in an environment contaminated by debris, the non-transitory computer readable program instructions, when read by one or more processors, cause one or more processors to execute operations comprising controlling, or directing control of, any of the above devices; where the one or more processors are configured to operatively couple to: a carriage. In some embodiments, the one or more processors are configured to operatively couple to: an actuator, a motor, an energy beam and/or a dispenser. For example, non-transitory computer readable program instructions for directing traversal in an environment contaminated by debris, the non-transitory computer readable program instructions, when read by one or more processors, cause the one or more processors to execute operations comprises: directing control of a shield (e.g., a covering) coupled to a railing, which shield is configured protect a wheel from the debris during displacement of the wheel along the railing which wheel is (i) coupled to a carriage and (ii) engages with the railing along which the wheel directionally traverses along a long axis of the railing, the shield configured to protect the wheel from the debris by having layers that are spaced, non-contacting, and overlapping, which layers form at least one cavity in which the wheel traverses along the railing, which overlapping layers overlap in a direction different from that of the long axis.

In another aspect, a method for directing traversal in an environment contaminated by debris, the method (i) employing any of the above devices and/or (ii) executing, or directing execution of, one or more operations of the devices. For example, a method for directing traversal in an environment contaminated by debris, the method comprises: displacing a wheel along a railing while protecting the wheel from the debris with a shield (e.g., a covering) coupled to the railing, which wheel is (i) coupled to a carriage and (ii) engages with the railing along which the wheel directionally traverses along a long axis of the railing, the shield protecting the wheel from the debris by having layers that are spaced, non-contacting, and overlapping, which layers form at least one cavity in which the wheel traverses along the railing, which overlapping layers overlap in a direction different from that of the long axis.

In another aspect, a device for directed traversal in an environment contaminated by debris, the device comprises: a flexible coupler configured to couple wheels including a first wheel and a second wheel, the flexible coupler configured to facilitate travel of the wheels along a long axis of a railing that is imperfect and/or is contaminated by the debris, the wheels being (i) coupled to a carriage by the flexible coupler and (ii) configured to engage with the railing along which the wheels are configured to directionally traverse, the flexible coupler is configured to facilitate bearing loads that are even or substantially even, the bearing loads being on the wheels as they travel along the railing. In some embodiments, the processing chamber (I) is coupled to an ancillary chamber attached to it, the carriage being configured to be disposed in the ancillary chamber when idle, (II) is operatively coupled to a filtering system comprising a high-efficiency particulate arrestance (HEPA) filter, (III) is operatively coupled to a port flushing component configured to provide a flow of gas to flush material through the port lushing component, or (IV) any combination of (I) (II) and (III). In some embodiments, the dispenser utilizes a vibrational movement during operation to dispense pre-transformed material. In some embodiments, the layer dispensing mechanism is configured to move abruptly to remove excess of pre-transformed material collected during operation. In some embodiments, the remover (i) is operatively coupled to an attractive force source sufficient to attract the pre-transformed material from the target surface, (ii) has a nozzle having an asymmetric vertical cross section, or (iii) any combination of (i) and (ii). In some embodiments, the railing has (a) a variability in linearity of at most about 0.05 millimeters and/or (b) a variability in planarity of at most about 0.05 millimeters. In some embodiments, the flexible coupler comprises an elemental metal, or metal alloy. In some embodiments, the flexible coupler comprises aluminum. In some embodiments, the aluminum is a cast aluminum. In some embodiments, the aluminum comprises 771 TC Aluminum. In some embodiments, the carriage is configured to carry a layer dispensing mechanism configured to dispense a planar layer of pre-transformed material as part of a material bed from which one or more three-dimensional objects are printed in a printing cycle. device where the layer dispensing mechanism is configured to move abruptly to remove excess of pre-transformed material collected during operation. In some embodiments, the carriage is configured to carry one or more mechanisms comprises: a material dispenser, a material leveler, or a material remover. In some embodiments, the flexible coupler comprises one or more holes configured for one or more fasteners configured to couple the flexible coupler to the carriage. In some embodiments, the flexible coupler has a first end having a first hole and a second end having a second hole, the first end opposing the second end, the first hole being configured to connect to the first wheel, and second end being configured to connect to the second wheel. In some embodiments, the flexible coupler comprises (a) a first arm ending by a first end, and (b) a second arm ending by a second end opposing the first end, the first arm being separated from the second arm by a middle section configured to couple to the carriage. In some embodiments, the middle section is taller than the arms. In some embodiments, the flexible coupler has one width, one length, and a variability in height, the variability being along its length. In some embodiments, the flexible coupler comprises at least one dimension comprising a width or a height, with each of the at least one dimension being smaller than a length of the flexible coupler. In some embodiments, the railing has a vertical cross section that is convex. In some embodiments, the vertical cross section comprises an isosceles triangle, or substantially an isosceles triangle. In some embodiments, the wheel has a concave crevice along a curved external surface to compliment, or substantially complement, with the railing. In some embodiments, complementing the railing facilitates pushing away any debris accumulated on the railing during traversal of the wheel along the railing. In some embodiments, the concave crevice comprises a curvature that is configured to substantially complement a convex surface of the railing devoid of curvature. In some embodiments, the concave crevice is configured to minimally contact the railing. In some embodiments, the concave crevice comprises at least one curvature and where the railing is devoid of curvature. In some embodiments, the wheel has a concave crevice along its outer envelope. In some embodiments, the wheel is a wheel bearing. In some embodiments, the railing is configured to protect the wheel from the debris during its displacement along the railing, including when the wheel is not displaced along the railing. In some embodiments, the carriage is a compliant carriage. In some embodiments, the carriage is configured to connect a plurality of wheels comprising the wheel. In some embodiments, the plurality of wheels is an odd number of wheels. In some embodiments, the plurality of wheels is an even number of wheels. In some embodiments, each pair of wheels in the plurality of wheels is coupled to the flexible coupler. In some embodiments, the flexible coupler comprises a spring. In some embodiments, the flexible coupler is elastically flexible. In some embodiments, the carriage comprises an elemental metal, metal alloy, an allotrope of elemental carbon, or a ceramic. In some embodiments, the carriage comprises a transparent material or an opaque material. In some embodiments, the carriage comprises a window that facilitates maintenance. In some embodiments, maintenance comprises (i) maintenance of the carriage, (ii) maintenance of the flexible coupler, (iii) maintenance of one or more wheels, (iv) maintenance of the railing, or (v) maintenance of any other component of the device. In some embodiments, the carriage comprises a crevice that is configured to engage with a stopper once the carriage reaches an end of the wheel, the stopper being configured to prevent the carriage from continuing translating beyond the stopper. In some embodiments, the carriage comprises wipers disposed at opposing sides of the wheel, the wipers being configured to wipe away the debris from the railing. In some embodiments, the opposing sides of the wheel are along the propagation direction of the wheel. In some embodiments, the wipers comprise a soft material. In some embodiments, the soft material comprises a sponge, or cloth. In some embodiments, the cloth comprises felt. In some embodiments, the carriage is operatively coupled to an actuator. In some embodiments, the actuator is disposed externally to the environment, and where the carriage comprises a clamp configured to engage with a belt that engages with a gear coupled to the actuator. In some embodiments, the actuator comprises a motor. In some embodiments, the environment comprises a gas having at least one characteristic different from that of an ambient environment external to the enclosure. In some embodiments, the at least one characteristic comprising (i) a reactive agent, or (ii) a pressure. In some embodiments, the device is configured to operate under an atmosphere depleted of a reactive agent relative to its concentration in an ambient atmosphere external to the device, the reactive agent being configured to react with a reactive species at least during three-dimensional printing, the reactive species comprising the debris, a starting material of the three-dimensional printing, or a product of the three-dimensional printing. In some embodiments, the reactive agent comprises oxygen, or water. In some embodiments, the environment comprises an inert environment. In some embodiments, the environment is of a processing chamber of a three-dimensional printer. In some embodiments, the processing chamber (I) is coupled to an ancillary chamber attached to it, the carriage being configured to be disposed in the ancillary chamber when idle, (II) is operatively coupled to a filtering system comprising a high-efficiency particulate arrestance filter, (III) is operatively coupled to a port flushing component configured to provide a flow of gas to flush material through the port lushing component, or (IV) any combination of (I) (II) and (III). In some embodiments, the processing chamber is configured to support positive pressure above ambient pressure external to the processing chamber. In some embodiments, the processing chamber is configured to support positive pressure above one atmosphere. In some embodiments, the processing chamber is configured for layerwise printing of a three-dimensional object. In some embodiments, the three-dimensional object comprises an elemental metal, metal alloy, an allotrope of elemental carbon, or a ceramic. In some embodiments, the three-dimensional printer is configured to use an energy beam comprising a laser beam or an electron gun. In some embodiments, the debris comprises an elemental metal, metal alloy, an allotrope of elemental carbon, or a ceramic. In some embodiments, the debris comprises soot, or unused powder. In some embodiments, the environment comprises a processing chamber of a three-dimensional printer configured to print one or more three-dimensional objects in a printing cycle. In some embodiments, the carriage is configured to couple to a dispenser configured to dispense pre-transformed material. In some embodiments, the pre-transformed material comprises powder. In some embodiments, the pre-transformed comprises an elemental metal, metal alloy, an allotrope of elemental carbon, or a ceramic. In some embodiments, the dispenser is configured to dispense the pre-transformed material to generate, or add to, a powder bed. In some embodiments, the dispenser utilizes a vibrational movement during operation to dispense pre-transformed material. In some embodiments, the device is configured to facilitate three-dimensional printing that comprises deposition of pre-transformed material on a target surface. In some embodiments, the target surface comprises (i) an exposed surface of a material bed or (ii) a surface of the build platform. In some embodiments, the device is configured to operatively couple to a remover configured to remove a portion of deposited pre-transformed material from the target surface to generate a planar layer of pre-transformed material as part of a material bed utilized for three-dimensional printing. In some embodiments, the remover (i) is operatively coupled to an attractive force source sufficient to attract the pre-transformed material from the target surface, (ii) has a nozzle having an asymmetric vertical cross section, or (iii) any combination of (i) and (ii). In some embodiments, (I) the attractive force comprises a magnetic, electric, electrostatic, or vacuum source, (II) the attractive force is sufficient to generate an exposed surface of a material bed that is planar or substantially planar when at least a portion of a three-dimensional object protrudes from the exposed surface, or (III) any combination of (I) and (II). In some embodiments, the remover is operatively coupled to an attractive force source sufficient to attract the pre-transformed material from the target surface. In some embodiments, the attractive force comprises a magnetic, electric, electrostatic, or vacuum source. In some embodiments, the attractive force comprises a vacuum source. In some embodiments, the device is configured to operatively couple to a recycling system that (i) recycles at least a fraction of a portion of the pre-transformed material removed by the remover and/or (ii) provides at least an other portion of the pre-transformed material utilized by a dispenser to which the device is operatively coupled to, the dispenser being configured to dispenser the pre-transformed material. In some embodiments, the portion removed by the remover is at least about 70%, 50% or 30% of the deposited pre-transformed material by a material dispenser to which the device is operatively coupled to. In some embodiments, the fraction recycled is at least about 70% or 90% of the portion removed by the remover. In some embodiments, the device is configured to facilitate deposition of pre-transformed material on the target surface at least in part by layerwise deposition. In some embodiments, the device is configured to facilitate deposition of pre-transformed material comprising powder material at least in part by being operatively coupled to a material dispenser. In some embodiments, the device is configured to deposit pre-transformed material comprising elemental metal, metal alloy, ceramic, or an allotrope of carbon. In some embodiments, the devise is configured to be disposed in a three-dimensional printer configured to facilitate gas flow away from the one or more optical windows and in a direction towards the build platform. In some embodiments, the device is configured to facilitate three-dimensional printing. In some embodiments, the three-dimensional printing comprises extruding by an extruder to facilitate printing at least one three-dimensional object in a printing cycle. In some embodiments, the device is configured to comprise, or operatively coupled to, the extruder. In some embodiments, the three-dimensional printing comprises arc welding. In some embodiments, arc welding is by an arc welder to facilitate printing the at least one three-dimensional object comprises: generating a powder stream and focusing an energy beam on the powder stream. In some embodiments, the device is configured to comprise, or operatively coupled to, the arc welder. In some embodiments, the three-dimensional printing comprises connecting particulate matter to print the at least one three-dimensional object in a printing cycle. In some embodiments, at least a portion of the particulate matter is disposed in a material bed during the three-dimensional printing using a material dispenser operatively coupled to the device, the device being configured to operatively coupled to the material dispenser and facilitate its operation. In some embodiments, the particulate matter comprises a super alloy. In some embodiments, the super alloy comprises Inconel, In718, Ti64, F357, Haynes282, GRCop-42, C22, CA6NM, or Hastelloy-X. In some embodiments, the three-dimensional printing comprises a fusing process. In some embodiments, fusing comprises (i) sintering, (ii) melting, (iii) smelting, or (iv) any combination of (i)-(iii). In some embodiments, the carriage is configured to couple to a dispenser configured to dispense pre-transformed material (e.g., starting material) as part of a three-dimensional printing process. In some embodiments, dispense pre-transformed material at least in part generates a material bed formed on a surface of a build platform. In some embodiments, the build platform comprises at least one fundamental length scale having a value of at least about 400 mm, 600 mm, 1000 mm, 1200 mm, 1500 mm, or 1750 mm. In some embodiments, the build platform is configured to support a weight of at least about 1000 kg. In some embodiments, the build platform is configured for vertical translation having an error in vertical positioning of the vertical translation at most about 10%, 5%, or 2% of the vertical translation of the build platform. In some embodiments, the build platform is disposed in a build module comprising a seal that is a hermetic seal, the device being configured to operatively couple to the build module. In some embodiments, the seal is a gas tight seal. In some embodiments, the seal is configured to facilitate retaining for a time period an internal atmosphere in the build module that is different from an ambient atmosphere external to the build module. In some embodiments, the time period is at least a same or greater value than a time period to remove the three-dimensional objects from the build module body. In some embodiments, the internal atmosphere comprises (i) a positive pressure within the build module body relative to the ambient atmosphere or (ii) a reactive agent at a concentration lower than its concentration in the ambient atmosphere, the reactive agent being configured to at least react with reactive species during the three-dimensional printing, the reactive species comprising (a) the debris or (b) pre-transformed material of three-dimensional printing. In some embodiments, the positive pressure is of at least about 10 kilopascals (KPa), 15 KPa, or 20 KPa above the ambient pressure.

In another aspect, an apparatus for directing traversal in an environment contaminated by debris, the apparatus comprising at least one controller configured to control, or direct control of, any of the above devices; where the at least one controller is configured to (i) operatively couple to a carriage, first and second wheels, a railing and a flexible coupler, and (ii) direct movement of the carriage, the first and second wheels, the railing and the flexible coupler. In some embodiments, the at least one controller is configured to (I) operatively couple to and (II) direct: an actuator, a motor, an energy beam, and/or a dispenser. For example, an apparatus for directing traversal in an environment contaminated by debris, the apparatus comprising at least one controller configured to: direct control of a carriage coupled to a first and a second wheel, which first and second wheels are configured to be coupled to a flexible coupler, the flexible coupler configured to facilitate travel of the wheels along a long axis of a railing that is imperfect and/or is contaminated by the debris, which wheels are configured to engage with the railing along which the wheels are configured to directionally traverse, the flexible coupler is configured to facilitate even bearing loads on the wheels as they travel along the railing.

In another aspect, non-transitory computer readable program instructions for directing traversal in an environment contaminated by debris, the non-transitory computer readable program instructions, when read by one or more processors, cause one or more processors to execute operations comprising: controlling, or directing control of, any of the above devices) directing movement of a carriage. In some embodiments, the one or more processors are configured to operatively couple to: an actuator, a motor, an energy beam and/or a dispenser, and where the program instructions are configured to respectively direct the actuator, the motor, the energy beam and/or the dispenser. For example, non-transitory computer readable program instructions for directing traversal in an environment contaminated by debris, the non-transitory computer readable program instructions, when read by one or more processors, cause the one or more processors to execute operations comprising: directing control of a carriage coupled to a first and a second wheel, which first and second wheels are configured to be coupled to a flexible coupler, the flexible coupler configured to facilitate travel of the wheels along a long axis of a railing that is imperfect and/or is contaminated by the debris, which wheels (i) are coupled to a carriage by the flexible coupler and (ii) are configured to engage with the railing along which the wheels are configured to directionally traverse, the flexible coupler is configured to facilitate even bearing loads on the wheels as they travel along the railing.

In another aspect, a method for directing traversal in an environment contaminated by debris, the method (i) employing any of the above devices, and/or (ii) executing, or directing execution or, one or more operations of any of the devices. For example, a method for directing traversal in an environment contaminated by debris, the method comprises: travelling of a first wheel and a second wheel, which first and second wheels are coupled with a flexible coupler, along a long axis of a railing, the flexible coupler facilitating the travel of the first and second wheels along the long axis of the railing that is imperfect and/or is contaminated by the debris, which wheels (i) are coupled to a carriage by the flexible coupler and (ii) engage with the railing along which the wheels directionally traverse, the flexible coupler facilitating even bearing loads on the wheels as they travel along the railing.

In another aspect, a system for effectuating the methods, operations of an apparatus, operation of a device, and/or operations inscribed by a non-transitory computer readable program instructions (e.g., inscribed on a media/medium), disclosed herein.

In another aspect, device(s) (e.g., apparatus) for effectuating the methods, operations of an apparatus, and/or operations inscribed by a non-transitory computer readable program instructions (e.g., inscribed on a media/medium).

In another aspect, a system for effectuating the methods, operations of the device, operations of the apparatus, and/or operations inscribed by non-transitory computer readable program instructions (e.g., inscribed on a media/medium), disclosed herein.

In other aspects, device(s) (e.g., apparatus) for effectuating the methods, operations of an apparatus, and/or operations inscribed by non-transitory computer readable program instructions, e.g., inscribed on a media/medium.

In other aspects, systems, apparatuses (e.g., controller(s)), and/or non-transitory computer-readable program instructions (e.g., software) that implement any of the methods disclosed herein. In some embodiments, the program instructions are inscribed on at least one medium, e.g., on a medium or on media.

In other aspects, methods, systems, apparatuses (e.g., controller(s)), and/or non-transitory computer-readable program instructions (e.g., software) that implement any of the devices disclosed herein and/or any operation of these devices. In some embodiments, the program instructions is inscribed on at least one medium (e.g., on a medium or on media).

Another aspect of the present disclosure provides methods, systems, apparatuses (e.g., controller(s)), and/or non-transitory computer-readable program instructions (e.g., software) that implement any operation associated with any of the devices disclosed herein. In some embodiments, the program instructions is inscribed on at least one medium (e.g., on a medium or on media).

In another aspect, an apparatus (e.g., for printing one or more 3D objects) comprises at least one controller that is configured (e.g., programmed) to direct a mechanism used in a 3D printing methodology to implement (e.g., effectuate) any of the method and/or operations disclosed herein, wherein the controller(s) is operatively coupled to the mechanism. In some embodiments, the controller(s) implements any of the methods and/or operations disclosed herein. In some embodiments, the at least one controller comprises, or be operatively coupled to, a hierarchical control system. In some embodiments, the hierarchical control system comprises at least three, four, or five, control levels.

In another aspect, an apparatus (e.g., for printing one or more 3D objects) comprises at least one controller that is configured (e.g., programmed) to implement (e.g., effectuate), or direct implementation of, the method, process, and/or operation disclosed herein. In some embodiments, the at least one controller implements any of the methods, processes, and/or operations disclosed herein.

In another aspect, non-transitory computer readable program instructions (e.g., for printing one or more 3D objects), when read by one or more processors, are configured to execute, or direct execution of, the method, process, and/or operation disclosed herein. In some embodiments, the at least one controller implements any of the methods, processes, and/or operations disclosed herein. In some embodiments, at least a portion of the one or more processors is part of a 3D printer, outside of the 3D printer, in a location remote from the 3D printer (e.g., in the cloud).

In another aspect, a system for printing one or more 3D objects comprises an apparatus (e.g., used in a 3D printing methodology) and at least one controller that is configured (e.g., programmed) to direct operation of the apparatus, wherein the at least one controller is operatively coupled to the apparatus. In some embodiments, the apparatus includes any apparatus or device disclosed herein. In some embodiments, the at least one controller implements, or direct implementation of, any of the methods disclosed herein. In some embodiments, the at least one controller directs any apparatus (or component thereof) disclosed herein.

In some embodiments, at least two of operations of the apparatus are directed by the same controller. In some embodiments, at least two of operations of the apparatus are directed by different controllers.

In some embodiments, at least operations (e.g., instructions) are carried out by the same processor and/or by the same sub-computer software product. In some embodiments, at least two of operations (e.g., instructions) are carried out by different processors and/or sub-computer software products.

In another aspect, a computer software product, comprising a (e.g., non-transitory) computer-readable medium/media in which program instructions are stored, which instructions, when read by a computer, cause the computer to direct a mechanism used in the 3D printing process to implement (e.g., effectuate) any of the method disclosed herein, wherein the non-transitory computer-readable medium is operatively coupled to the mechanism. In some embodiments, the mechanism comprises an apparatus or an apparatus component.

In another aspect, a non-transitory computer-readable medium/media comprising machine-executable code that, upon execution by one or more computer processors, implements any of the methods and/or operations disclosed herein.

In another aspect, a non-transitory computer-readable medium/media comprising machine-executable code that, upon execution by one or more computer processors, effectuates directions of the controller(s) (e.g., as disclosed herein).

In another aspect, a computer system comprising one or more computer processors and a non-transitory computer-readable medium coupled thereto. In some embodiments, the non-transitory computer-readable medium comprises machine-executable code that, upon execution by the one or more computer processors, implements any of the methods disclosed herein and/or effectuates directions of the controller(s) disclosed herein.

In another aspect, a method for three-dimensional printing, the method comprises executing one or more operations associated with at least one configuration of the device(s) disclosed herein.

In another aspect, an apparatus for three-dimensional printing, the apparatus comprising at least one controller is configured (i) operatively couple to the device, and (ii) direct executing one or more operations associated with at least one configuration of the device(s) disclosed herein.

In another aspect, non-transitory computer readable program instructions for three-dimensional printing, the non-transitory computer readable program instructions, when read by one or more processors operatively coupled to the device, cause the one or more processors to direct executing one or more operations associated with at least one configuration of the device(s) disclosed herein.

The various embodiments in any of the above aspects are combinable, as appropriate.

Additional aspects and advantages of the present disclosure will become more readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings or figures (also "FIG." and "FIGS." herein), of which:

Figure 1:
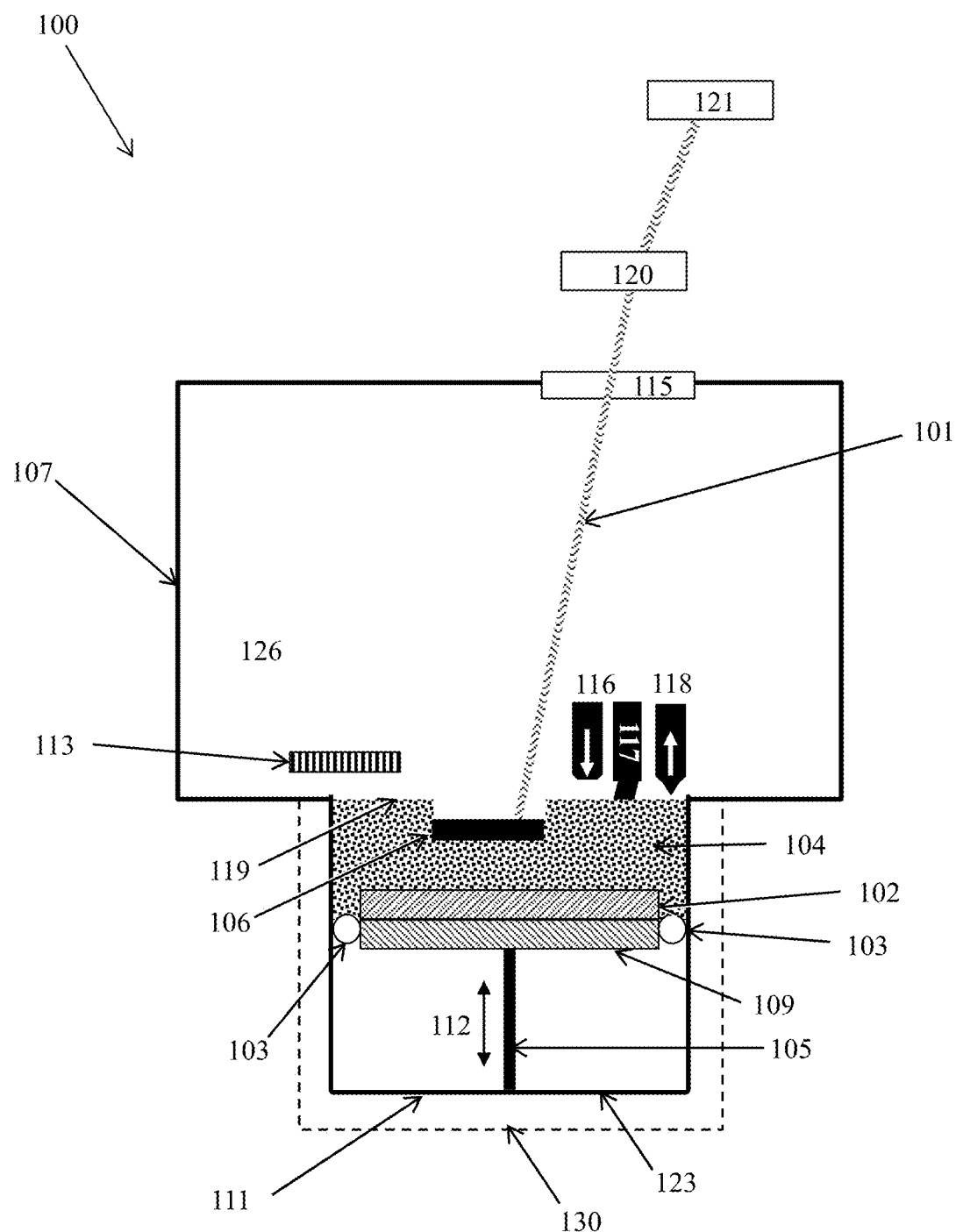
FIG. 1 schematically illustrates a side view of a three-dimensional (3D) printing system and its components.

The figures and components therein may not be drawn to scale. Various components of the figures described herein may not be drawn to scale.

DETAILED DESCRIPTION

While various embodiments of the invention have been shown, and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein might be employed. The various embodiments disclosed herein are combinable, as appropriate.

Terms such as "a", "an" and "the" are not intended to refer to only a singular entity, but include the general class of which a specific example may be used for illustration. The terminology herein is used to describe specific embodiments of the invention(s), but their usage does not delimit the invention(s).

When ranges are mentioned, the ranges are meant to be inclusive, unless otherwise specified. For example, a range between value 1 and value 2 is meant to be inclusive and include value 1 and value 2. The inclusive range will span any value from about value 1 to about value 2. The term "adjacent" or "adjacent to," as used herein, includes "next to," "adjoining," "in contact with," and "in proximity to." When ranges are mentioned (e.g., between, at least, at most, and the like) its endpoint(s) is/are also claimed. For example, when the range is from X to Y, the values of X and Y are also claimed. For example, when the range is at most Z, the value of Z is also claimed. For example, when the range is at least W, the value of W is also claimed.

The conjunction "and/or" as used herein in X and/or Y (including in the specification and claims) is meant to include (i) X, (ii) Y, and (iii) X and Y. The conjunction of "and/or" in the phrase "including X, Y, and/or Z" is meant to include any combination and plurality thereof. For example, it is meant to include the following: (1) a single X, (2) a single Y, (3) a single Z, (4) a single X and a single Y, (5) a single X and a single Z, (6) a single Y and a single Z, (7) a single X, a single Y, and a single Z, (8) a plurality of X, (9) a plurality of Y, (10) a plurality of Z, (11) a plurality of X and a single Y, (12) a plurality of X, a single Y and a single Z, (13) a plurality of X and a single Z, (14) a plurality of Y and a single X, (15) a plurality of Y, a single X, and a single Z, (16) a plurality of Y and a single Z, (17) a plurality of Z and a single X, (18) a plurality of Z, a single X, and a single Y (19) a plurality of Z and a single Y, (20) a plurality X and a plurality Y, (21) a plurality X and a plurality Z, (22) a plurality Y and a plurality Z, and (23) a plurality X, a plurality Y, and a plurality Z. The phrase "including X, Y, and/or Z" is meant to have the same meaning as "comprising X, Y, or Z."

The term "operatively coupled" or "operatively connected" refers to a first mechanism that is coupled (or connected) to a second mechanism to allow the intended operation of the second and/or first mechanism. The coupling may comprise physical or non-physical coupling. The non-physical coupling may comprise signal induced coupling (e.g., wireless coupling).

A central tendency as understood herein comprises mean, median, or mode. The mean may comprise a geometric mean.

"Real time" as understood herein may be during at least part of the printing of a 3D object. Real time may be during a print operation. Real time may be during a print cycle. Real time may comprise: during formation of (i) a 3D object, (ii) a layer of hardened material as part of the 3D object, (iii) a hatch line, or (iv) a melt pool.

The phrase "is/are structured" or "is/are configured," when modifying an article, refers to a structure of the article that is able to bring about the referred result.

Transformed material, as understood herein, is a material that underwent a physical change. The physical change can comprise a phase change. The physical change can comprise fusing (e.g., melting or sintering), connecting, or bonding (e.g., physical, or chemical bond). The physical change can be a phase transformation such as from a solid to a partially liquid, or to a liquid, phase.

The 3D printing process may comprise printing one or more layers of hardened material in a building cycle. A building cycle, as understood herein, comprises printing all (e.g., hardened, or solid) material layers of a print job, which may comprise printing one or more 3D objects above a platform and/or a base (e.g., in a single material bed).

Pre-transformed material, as understood herein, is a material before it has been transformed (e.g., once transformed) by an energy beam during an upcoming 3D printing process, e.g., it is a starting material for an upcoming 3D printing process. The pre-transformed material may be a material that was, or was not, transformed prior to its use in the upcoming 3D printing process. The pre-transformed material may be a material that was partially transformed prior to its use in the upcoming 3D printing process. The pre-transformed material may be a starting material for the upcoming 3D printing process. The pre-transformed material may be liquid, solid, or semi-solid (e.g., gel). The pre-transformed material may be a particulate material. For example, the particulate material may be a powder material. The powder material may comprise solid particles of material(s). The particulate material may comprise vesicles (e.g., containing liquid or semi-solid material). The particulate material may comprise solid or semi-solid material particles. The pre-transformed material may have been transformed by a 3D printer process prior to the upcoming 3D printing process. For example, in a first 3D printing process (having a first build cycle), powder material was used to form a 3D object. A remainder of the powder material of the first 3D printing process may become a pre-transformed material for an upcoming second 3D printing process (having a second build cycle). Thus, even though the remainder powder of the first 3D printing process may comprise transformed material (e.g., bits of sintered powder), it is still considered a pre-transformed material relative to the second 3D printing process. The remainder can be filtered and otherwise recycled for use as a pre-transformed material in the second 3D printing process.

Fundamental length scale (abbreviated herein as "FLS") can be referred herein to any suitable scale (e.g., dimension) of an object. For example, a FLS of an object may comprise a length, a width, a height, a diameter, a spherical equivalent diameter, or a diameter of a bounding sphere. In some cases, FLS may refer to an area, a volume, a shape, or a density.

Performing a reversible first operation is understood herein to mean performing the first operation and being capable of performing the opposite of that first operation (e.g., which is a second operation). For example, when a controller directs reversibly opening a shutter, that shutter can also close, and the controller can optionally direct a closure of that shutter.

The present disclosure provides three-dimensional (3D) printing apparatuses, systems, software, and methods for forming a 3D object. For example, a 3D object may be formed by sequential addition of material or joining of pre-transformed material to form a structure in a controlled manner (e.g., under manual or automated control). Pre-transformed material, as understood herein, is a material before it has been transformed during the 3D printing process. The transformation can be effectuated by utilizing an energy beam and/or flux. The pre-transformed material may be a material that was, or was not, transformed prior to its use in a 3D printing process. The pre-transformed material may be a starting material for the 3D printing process.

In some embodiments of a 3D printing process, the deposited pre-transformed material is fused, (e.g., sintered or melted), bound or otherwise connected to form at least a portion of the requested 3D object. Fusing, binding or otherwise connecting the material is collectively referred to herein as "transforming" the material. Fusing the material may refer to melting, smelting, or sintering a pre-transformed material.

At times, melting comprises liquefying the material (i.e., transforming to a liquefied state). A liquefied state refers to a state in which at least a portion of a transformed material is in a liquid state. Melting may comprise liquidizing the material (i.e., transforming to a liquidus state). A liquidus state refers to a state in which an entire transformed material is in a liquid state. The apparatuses, methods, software, and/or systems provided herein are not limited to the generation of a single 3D object, but are may be utilized to generate one or more 3D objects simultaneously (e.g., in parallel) or separately (e.g., sequentially). The multiplicity of 3D object may be formed in one or more material beds (e.g., powder bed). In some embodiments, a plurality of 3D objects is formed in one material bed. The FLS (e.g., width, depth, and/or height) of the material bed can be at least about 50 millimeters (mm), 60 mm, 70 mm, 80 mm, 90 mm, 100 mm, 200 mm, 250 mm, 280 mm, 400 mm, 500 mm, 800 mm, 900 mm, 1 meter (m), 2 m or 5 m. The FLS (e.g., width, depth, and/or height) of the material bed can be at most about 50 millimeters (mm), 60 mm, 70 mm, 80 mm, 90 mm, 100 mm, 200 mm, 250 mm, 280 mm, 400 mm, 500 mm, 800 mm, 900 mm, 1 meter (m), 2 m or 5 m. The FLS of the material bed can be between any of the afore-mentioned values (e.g., from about 50 mm to about 5 m, from about 250 mm to about 500 mm, from about 280 mm to about 1 m).

In some embodiments, 3D printing methodologies comprises extrusion, wire, granular, laminated, light polymerization, or powder bed and inkjet head 3D printing. Extrusion 3D printing can comprise robo-casting, fused deposition modeling (FDM) or fused filament fabrication (FFF). Wire 3D printing can comprise electron beam freeform fabrication (EBF3). Granular 3D printing can comprise direct metal laser sintering (DMLS), electron beam melting (EBM), selective laser melting (SLM), selective heat sintering (SHS), or selective laser sintering (SLS). Powder bed and inkjet head 3D printing can comprise plaster-based 3D printing (PP). Laminated 3D printing can comprise laminated object manufacturing (LOM). Light polymerized 3D printing can comprise stereo-lithography (SLA), digital light processing (DLP), or laminated object manufacturing (LOM). 3D printing methodologies can comprise Direct Material Deposition (DMD). The Direct Material Deposition may comprise, Laser Metal Deposition (LMD, also known as, Laser deposition welding). 3D printing methodologies can comprise powder feed, or wire deposition.

In some embodiments, the 3D printing methodologies differ from methods traditionally used in semiconductor device fabrication (e.g., vapor deposition, etching, annealing, masking, or molecular beam epitaxy). In some instances, 3D printing may further comprise one or more printing methodologies that are traditionally used in semiconductor device fabrication. 3D printing methodologies can differ from vapor deposition methods such as chemical vapor deposition, physical vapor deposition, or electrochemical deposition. In some instances, 3D printing may further include vapor deposition methods. In some embodiments, the deposited pre-transformed material within the enclosure comprises a liquid material, semi-solid material (e.g., gel), or a solid material (e.g., powder). The deposited pre-transformed material within the enclosure can be in the form of a powder, wires, sheets, or droplets. The material (e.g., pre-transformed, transformed, and/or hardened) may comprise elemental metal, metal alloy, ceramics, or an allotrope of elemental carbon. The allotrope of elemental carbon may comprise amorphous carbon, graphite, graphene, diamond, or fullerene. The fullerene may be selected from the group consisting of a spherical, elliptical, linear, and tubular fullerene. The fullerene may comprise a buckyball, or a carbon nanotube. The ceramic material may comprise cement. The ceramic material may comprise alumina, zirconia, or carbide (e.g., silicon carbide, or tungsten carbide). The ceramic material may include high performance material (HPM). The ceramic material may include a nitride (e.g., boron nitride or aluminum nitride). The material may comprise sand, glass, or stone. In some embodiments, the material may comprise an organic material, for example, a polymer or a resin (e.g., 114 W resin). The organic material may comprise a hydrocarbon. The polymer may comprise styrene or nylon (e.g., nylon 11). The polymer may comprise a thermoplast. The organic material may comprise carbon and hydrogen atoms. The organic material may comprise carbon and oxygen atoms. The organic material may comprise carbon and nitrogen atoms. The organic material may comprise carbon and sulfur atoms. In some embodiments, the material may exclude an organic material. The material may comprise a solid or a liquid. In some embodiments, the material may comprise a silicon-based material, for example, silicon based polymer or a resin. The material may comprise an organosilicon-based material. The material may comprise silicon and hydrogen atoms. The material may comprise silicon and carbon atoms. In some embodiments, the material may exclude a silicon-based material. The powder material may be coated by a coating (e.g., organic coating such as the organic material (e.g., plastic coating)). The material may be devoid of organic material. The liquid material may be compartmentalized into reactors, vesicles, or droplets. The compartmentalized material may be compartmentalized in one or more layers. The material may be a composite material comprising a secondary material. The secondary material can be a reinforcing material (e.g., a material that forms a fiber). The reinforcing material may comprise a carbon fiber, Kevlar®, Twaron®, ultra-high-molecular-weight polyethylene, or glass fiber. The material can comprise powder (e.g., granular material) and/or wires. The bound material can comprise chemical bonding. Transforming can comprise chemical bonding. Chemical bonding can comprise covalent bonding. The pre-transformed material may be pulverous. The printed 3D object can be made of a single material (e.g., single material type) or multiple materials (e.g., multiple material types). Sometimes one portion of the 3D object and/or of the material bed may comprise one material, and another portion may comprise a second material different from the first material. The material may be a single material type (e.g., a single alloy or a single elemental metal). The material may comprise one or more material types. For example, the material may comprise two alloys, an alloy and an elemental metal, an alloy and a ceramic, or an alloy and an elemental carbon. The material may comprise an alloy and alloying elements (e.g., for inoculation). The material may comprise blends of material types. The material may comprise blends with elemental metal or with metal alloy. The material may comprise blends excluding (e.g., without) elemental metal or including (e.g., with) metal alloy. The material may comprise a stainless steel. The material may comprise a titanium alloy, aluminum alloy, and/or nickel alloy.

The 3D printing process may comprise printing one or more layers of hardened material in a building cycle, e.g., in a printing cycle. A building cycle (e.g., printing cycle, or print cycle), as understood herein, comprises printing the (e.g., hardened, or solid) material layers of a print job (e.g., all, or substantially all, the layers of a printing job), which may comprise printing one or more 3D objects above a platform (e.g., in a single material bed). The one or more 3D object(s) may or may not be physically anchored to the platform (e.g., a build platform) above which it/they are printed.

In some cases, a layer within the 3D object comprises a single type of material. In some examples, a layer of the 3D object may comprise a single elemental metal type, or a single alloy type. In some examples, a layer within the 3D object may comprise several types of material (e.g., an elemental metal and an alloy, an alloy and a ceramic, an alloy, and an elemental carbon). In certain embodiments, each type of material comprises only a single member of that type. For example: a single member of elemental metal (e.g., iron), a single member of metal alloy (e.g., stainless steel), a single member of ceramic material (e.g., silicon carbide or tungsten carbide), or a single member of elemental carbon (e.g., graphite). In some cases, a layer of the 3D object comprises more than one type of material. In some cases, a layer of the 3D object comprises more than member of a type of material.

In some examples the material bed, platform, or both material bed and platform comprise a material type which constituents (e.g., atoms) readily lose their outer shell electrons, resulting in a free-flowing cloud of electrons within their otherwise solid arrangement. In some examples the powder, the base, or both the powder and the base comprise a material characterized in having high electrical conductivity, low electrical resistivity, high thermal conductivity, or high density. The high electrical conductivity can be at least about $1*10^5$ Siemens per meter (S/m), $5*10^5$ S/m, $1*10^6$ S/m, $5*10^6$ S/m, $1*10^7$ S/m, $5*10^7$ S/m, or $1*10^8$ S/m. The symbol "*" designates the mathematical operation "times." The high electrical conductivity can be between any of the afore-mentioned electrical conductivity values (e.g., from about $1*10^5$ S/m to about $1*10^8$ S/m). The thermal conductivity, electrical resistivity, electrical conductivity, and/or density can be measured at ambient temperature (e.g., at R.T., or 20° C.). The low electrical resistivity may be at most about $1*10^{-5}$ ohm times meter ($\Omega*m$), $5*10^{-6}$ $\Omega*m$, $1*10^{-6}$ $\Omega*m$, $5*10^{-7}$ $\Omega*m$, $1*10^{-7}$ $\Omega*m$, $5*10^{-8}$ or $1*10^8$ $\Omega*m$. The low electrical resistivity can be between any of the afore-mentioned values (e.g., from about $1\times10^{-5}$ $\Omega*m$ to about $1\times10^{-8}$ $\Omega*m$). The high thermal conductivity may be at least about 10 Watts per meter times Kelvin (W/mK), 15 W/mK, 20 W/mK, 35 W/mK, 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The high thermal conductivity can be between any of the afore-mentioned thermal conductivity values (e.g., from about 20 W/mK to about 1000 W/mK). The high density may be at least about 1.5 grams per cubic centimeter ($g/cm^3$), 1.7 $g/cm^3$, 2 $g/cm^3$, 2.5 $g/cm^3$, 2.7 $g/cm^3$, 3 $g/cm^3$, 4 $g/cm^3$, 5 $g/cm^3$, 6 $g/cm^3$, 7 $g/cm^3$, 8 $g/cm^3$, 9 $g/cm^3$, 10 $g/cm^3$, 11 $g/cm^3$, 12 $g/cm^3$, 13 $g/cm^3$, 14 $g/cm^3$, 15 $g/cm^3$, 16 $g/cm^3$, 17 $g/cm^3$, 18 $g/cm^3$, 19 $g/cm^3$, 20 $g/cm^3$, or 25 $g/cm^3$. The high density can be any value between the afore mentioned values (e.g., from about 1 $g/cm^3$ to about 25 $g/cm^3$).

In some embodiments, the elemental metal comprises an alkali metal, an alkaline earth metal, a transition metal, a rare-earth element metal, or another metal. The alkali metal can be Lithium, Sodium, Potassium, Rubidium, Cesium, or Francium. The alkali earth metal can be Beryllium, Magnesium, Calcium, Strontium, Barium, or Radium. The transition metal can be Scandium, Titanium, Vanadium, Chromium, Manganese, Iron, Cobalt, Nickel, Copper, Zinc, Yttrium, Zirconium, Platinum, Gold, Rutherfordium, Dubnium, Seaborgium, Bohrium, Hassium, Meitnerium, Ununbium, Niobium, Iridium, Molybdenum, Technetium, Ruthenium, Rhodium, Palladium, Silver, Cadmium, Hafnium, Tantalum, Tungsten, Rhenium or Osmium. The transition metal can be mercury. The rare earth metal can be a lanthanide or an actinide. The antinode metal can be Lanthanum, Cerium, Praseodymium, Neodymium, Promethium, Samarium, Europium, Gadolinium, Terbium, Dysprosium, Holmium, Erbium, Thulium, Ytterbium, or Lutetium. The actinide metal can be Actinium, Thorium, Protactinium, Uranium, Neptunium, Plutonium, Americium, Curium, Berkelium, Californium, Einsteinium, Fermium, Mendelevium, Nobelium, or Lawrencium. The other metal can be Aluminum, Gallium, Indium, Tin, Thallium, Lead, or Bismuth. The material may comprise a precious metal. The precious metal may comprise gold, silver, palladium, ruthenium, rhodium, osmium, iridium, or platinum. The material may comprise at least about 40%, 50%, 60%, 70%, 80%, 90%, 95%, 97%, 98%, 99%, 99.5% or more precious metal. The material may comprise at most about 40%, 50%, 60%, 70%, 80%, 90%, 95%, 97%, 98%, 99%, 99.5% or less precious metal. The material may comprise precious metal with any value in between the afore-mentioned values. The material may comprise at least a minimal percentage of precious metal according to the laws in the particular jurisdiction.

In some embodiments, the metal alloy comprises iron based alloy, nickel based alloy, cobalt based alloy, chrome based alloy, cobalt chrome based alloy, titanium based alloy, magnesium based alloy, scandium alloy or copper based alloy. The alloy may comprise an oxidation or corrosion resistant alloy. The alloy may comprise a super alloy (e.g., Inconel). The super alloy may comprise Inconel 600, 617, 625, 690, 718 or X-750. The alloy may comprise an alloy used for aerospace applications, automotive application, surgical application, or implant applications. The metal may include a metal used for aerospace applications, automotive application, surgical application, or implant applications. The super alloy may comprise IN 738 LC, IN 939, Rene 80, IN 6203 (e.g., IN 6203 DS), PWA 1483 (e.g., PWA 1483 SX), or Alloy 247.

In some embodiments, the metal alloys comprise Refractory Alloys. The refractory metals and alloys may be used for heat coils, heat exchangers, furnace components, or welding electrodes. The Refractory Alloys may comprise a high melting point, low coefficient of expansion, mechanically strong, low vapor pressure at elevated temperatures, high thermal conductivity, or high electrical conductivity.

At times, the material (e.g., alloy or elemental) comprises a material used for applications in industries comprising aerospace (e.g., aerospace super alloys), jet engine, missile, automotive, marine, locomotive, satellite, defense, oil & gas, energy generation, semiconductor, fashion, construction, agriculture, printing, or medical. The material may comprise an alloy used for products comprising, devices, medical devices (human & veterinary), machinery, cell phones, semiconductor equipment, generators, engines, pistons, electronics (e.g., circuits), electronic equipment, agriculture equipment, motor, gear, transmission, communication equipment, computing equipment (e.g., laptop, cell phone, tablet, i-pad), air conditioning, generators, furniture, musical equipment, art, jewelry, cooking equipment, or sport gear. The material may comprise an alloy used for products for human or veterinary applications comprising implants, or prosthetics. The metal alloy may comprise an alloy used for applications in the fields comprising human or veterinary surgery, implants (e.g., dental), or prosthetics.

At times, the alloy includes a high-performance alloy. The alloy may include an alloy exhibiting at least one of excellent mechanical strength, resistance to thermal creep deformation, good surface stability, resistance to corrosion, and resistance to oxidation. The alloy may include a face-centered cubic austenitic crystal structure. The alloy may comprise Hastelloy, Inconel, Waspaloy, Rene alloy (e.g., Rene-80, Rene-77, Rene-220, or Rene-41), Haynes alloy, Incoloy, MP98T, TMS alloy, MTEK (e.g., MTEK grade MAR-M-247, MAR-M-509, MAR-M-R41, or MAR-M-X-45), or CMSX (e.g., CMSX-3, or CMSX-4). The alloy can be a single crystal alloy.

In some instances, the iron-based alloy comprises Elinvar, Fernico, Ferroalloys, Invar, Iron hydride, Kovar, Spiegeleisen, Staballoy (stainless steel), or Steel. In some instances, the metal alloy is steel. The Ferroalloy may comprise Ferroboron, Ferrocerium, Ferrochrome, Ferromagnesium, Ferromanganese, Ferromolybdenum, Ferronickel, Ferrophosphorus, Ferrosilicon, Ferrotitanium, Ferrouranium, or Ferrovanadium. The iron-based alloy may include cast iron or pig iron. The steel may include Bulat steel, Chromoly, Crucible steel, Damascus steel, Hadfield steel, High speed steel, HSLA steel, Maraging steel, Maraging steel (M300), Reynolds 531, Silicon steel, Spring steel, Stainless steel, Tool steel, Weathering steel, or Wootz steel. The high-speed steel may include Mushet steel. The stainless steel may include AL-6XN, Alloy 20, celestrium, marine grade stainless, Martensitic stainless steel, surgical stainless steel, or Zeron 100. The tool steel may include Silver steel. The steel may comprise stainless steel, Nickel steel, Nickel-chromium steel, Molybdenum steel, Chromium steel, Chromium-vanadium steel, Tungsten steel, Nickel-chromium-molybdenum steel, or Silicon-manganese steel. The steel may be comprised of any Society of Automotive Engineers (SAE) grade such as 440F, 410, 312, 430, 440A, 440B, 440C, 304, 305, 304L, 304L, 301, 304LN, 301LN, 2304, 316, 316L, 316LN, 317L, 2205, 409, 904L, 321, 254SMO, 316Ti, 321H, 17-4, 15-5, 420 or 304H. The steel may comprise stainless steel of at least one crystalline structure selected from the group consisting of austenitic, superaustenitic, ferritic, martensitic, duplex and precipitation-hardening martensitic. Duplex stainless steel may be lean duplex, standard duplex, super duplex or hyper duplex. The stainless steel may comprise surgical grade stainless steel (e.g., austenitic 316, martensitic 420 or martensitic 440). The austenitic 316 stainless steel may include 316L or 316LVM. The steel may include 17-4 Precipitation Hardening steel (also known as type 630 is a chromium-copper precipitation hardening stainless steel; 17-4PH steel). The stainless steel may comprise 360L stainless steel.

At times, the titanium-based alloys include alpha alloys, near alpha alloys, alpha and beta alloys, or beta alloys. The titanium alloy may comprise grade 1, 2, 2H, 3, 4, 5, 6, 7, 7H, 8, 9, 10, 11, 12, 13, 14, 15, 16, 16H, 17, 18, 19, 20, 21, 2, 23, 24, 25, 26, 26H, 27, 28, 29, 30, 31, 32, 33, 34, 35, 36, 37, 38 or higher. In some instances, the titanium base alloy includes $TiAl_6V_4$ or $TiAl_6Nb_2$.

At times, the Nickel based alloy include Alnico, Alumel, Chromel, Cupronickel, Ferronickel, German silver, Hastelloy, Inconel, Monel metal, Nichrome, Nickel-carbon, Nicrosil, Nisil, Nitinol, Hastelloy X, Cobalt-Chromium or Magnetically "soft" alloys. The magnetically "soft" alloys may comprise Mu-metal, Permalloy, Supermalloy, or Brass. The Brass may include nickel hydride, stainless or coin silver. The cobalt alloy may include Megallium, Stellite (e.g. Talonite), Ultimet, or Vitallium. The chromium alloy may include chromium hydroxide, or Nichrome.

At times, the aluminum-based alloy comprises AA-8000, Al—Li (aluminum-lithium), Alnico, Duralumin, Hiduminium, Kryron Magnalium, Nambe, Scandium-aluminum, or Y alloy. The magnesium alloy may be Elektron, Magnox or T-Mg—Al—Zn (Bergman phase) alloy. At times, the material excludes at least one aluminum-based alloy (e.g., $AlSi_{10}Mg$).

At times, the copper-based alloy comprises Arsenical copper, Beryllium copper, Billon, Brass, Bronze, Constantan, Copper hydride, Copper-tungsten, Corinthian bronze, Cunife, Cupronickel, Cymbal alloys, Devarda's alloy, Electrum, Hepatizon, Heusler alloy, Manganin, Molybdochalkos, Nickel silver, Nordic gold, Shakudo or Tumbaga. The Brass may include Calamine brass, Chinese silver, Dutch metal, Gilding metal, Muntz metal, Pinchbeck, Prince's metal, or Tombac. The Bronze may include Aluminum bronze, Arsenical bronze, Bell metal, Florentine bronze, Guanin, Gunmetal, Glucydur, Phosphor bronze, Ormolu or Speculum metal. The copper alloy may be a high-temperature copper alloy (e.g., GRCop-84). The elemental carbon may comprise graphite, Graphene, diamond, amorphous carbon, carbon fiber, carbon nanotube, or fullerene.

In some embodiments, the pre-transformed material (e.g., particulate material, such as powder material, (also referred to herein as a "pulverous material") comprises a solid. The particulate material may comprise fine particles. The pre-transformed material may be a granular material. The pre-transformed material (e.g., powder) can be composed of individual particles. At least some of the particles can be spherical, oval, prismatic, cubic, or irregularly shaped. At least some of the particles can have a fundamental length scale (e.g., diameter, spherical equivalent diameter, length, width, or diameter of a bounding sphere). The fundamental length scale (abbreviated herein as "FLS") of at least some of the particles can be from about 1 nanometers (n) to about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, or 5 nm. At least some of the particles can have a FLS of at least about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, 5 nanometers (nm) or more. At least some of the particles can have a FLS of at most about 1000 micrometers (microns), 500 microns, 400 microns, 300 microns, 200 microns, 100 microns, 50 microns, 40 microns, 30 microns, 20 microns, 10 microns, 1 micron, 500 nm, 400 nm, 300 nm, 200 nm, 100 nm, 50 nm, 40 nm, 30 nm, 20 nm, 10 nm, 5 nm or less. In some cases, at least some of the pre-transformed material particles may have a FLS in between any of the afore-mentioned FLSs.

In some embodiments, the pre-transformed (e.g., particulate) material is composed of a homogenously shaped particle mixture such that all of the particles have substantially the same shape and FLS magnitude within at most about 1%, 5%, 8%, 10%, 15%, 20%, 25%, 30%, 35%, 40%, 50%, 60%, 70%, or less distribution of FLS. In some cases, the powder can be a heterogeneous mixture such that the particles have variable shape and/or FLS magnitude. In some examples, at least about 30%, 40%, 50%, 60%, or 70% (by weight) of the particles within the powder material have a largest FLS that is smaller than the median largest FLS of the powder material. In some examples, at least about 30%, 40%, 50%, 60%, or 70% (by weight) of the particles within the powder material have a largest FLS that is smaller than the mean largest FLS of the powder material.

In some examples, the size of the largest FLS of the transformed material (e.g., height) is greater than the (e.g., average) largest FLS of the powder material by at least about 1.1 times, 1.2 times, 1.4 times, 1.6 times, 1.8 times, 2 times, 4 times, 6 times, 8 times, or 10 times. In some examples, the size of the largest FLS of the transformed material is greater than the (e.g., median) largest FLS of the powder material by at most about 1.1 times, 1.2 times, 1.4 times, 1.6 times, 1.8 times, 2 times, 4 times, 6 times, 8 times, or 10 times. The powder material can have a (e.g., median) largest FLS that is at least about 1 µm, 5 µm, 10 µm, 20 µm, 30 µm, 40 µm, 50 µm, 100 µm, or 200 µm. The powder material can have a (e.g., median) largest FLS that is at most about 1 µm, 5 µm, 10 µm, 20 µm, 30 µm, 40 µm, 50 µm, 100 µm, or 200 µm. In some cases, the powder particles may have a FLS in between any of the FLS listed above (e.g., from about 1 µm to about 200 µm, from about 1 µm to about 50 µm, or from about 5 µm to about 40 µm).

In another aspect provided herein is a system for generating a 3D object comprising: an enclosure for accommodating at least one layer of pre-transformed material (e.g., powder); an energy (e.g., energy beam) capable of transforming the pre-transformed material to form a transformed material; and a controller that directs the energy to at least a portion of the layer of pre-transformed material according to a path (e.g., as described herein). The transformed material may be capable of hardening to form at least a portion of a 3D object. The system may comprise an energy source, an optical system, a temperature control system, a material delivery mechanism (e.g., a recoater), a pressure control system, an atmosphere control system, an atmosphere, a pump, a nozzle, a valve, a sensor, a central processing unit, a display, a chamber, or an instruction (e.g., algorithm). The chamber may comprise a building platform. The system for generating a 3D object and its components may be any 3D printing system. Examples of 3D printing systems, their components, and associated methods, software, systems, devices, and apparatuses, can be found in International Patent Application serial number PCT/US15/36802 filed on Jun. 19, 2015, titled "APPARATUSES, SYSTEMS AND METHODS FOR THREE-DIMENSIONAL PRINTING" or in U.S. patent application Ser. No. 15/374,535 filed on Dec. 9, 2016, titled "SKILLFUL THREE-DIMENSIONAL PRINTING," each of which is entirely incorporated herein by reference.

Figure 2:
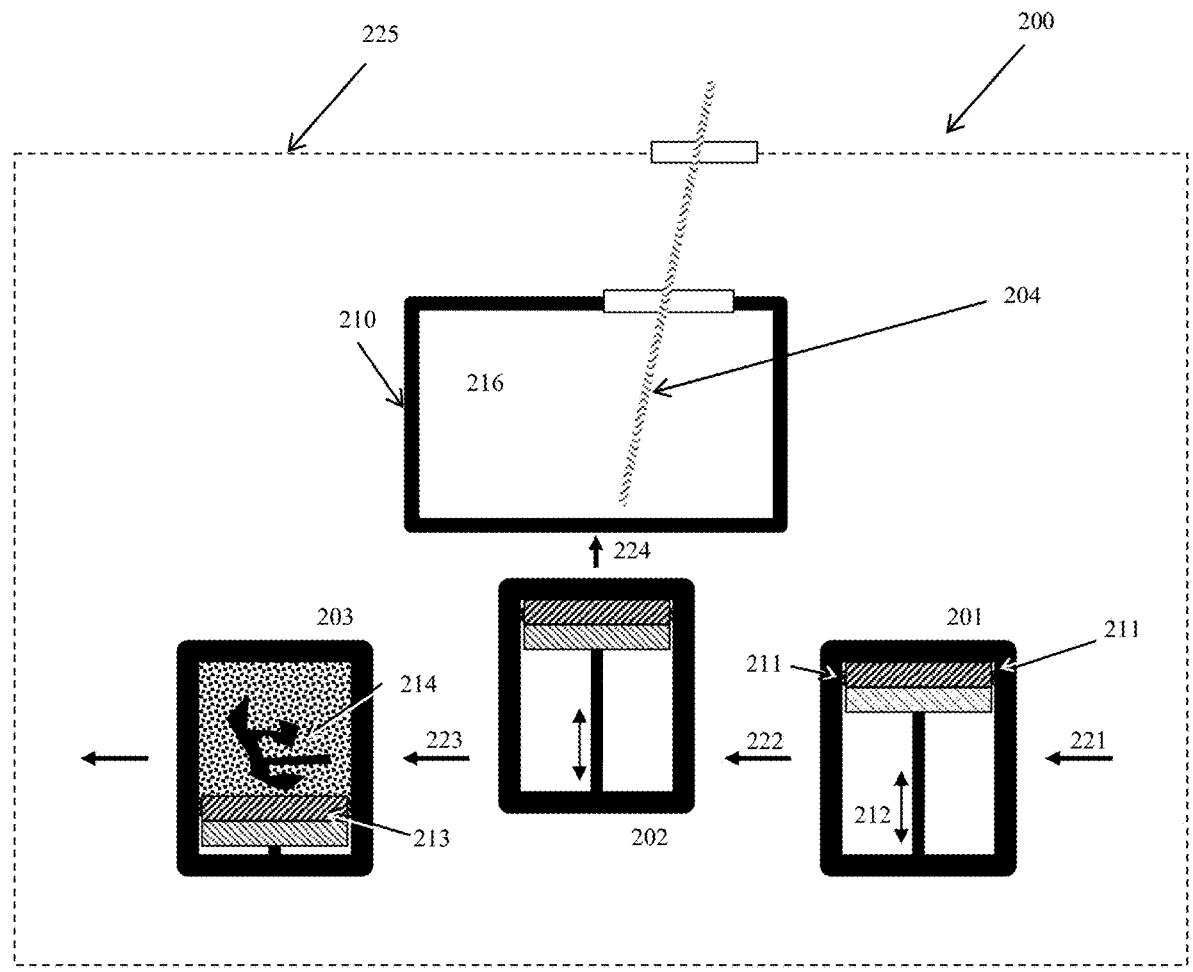
FIG. 2 schematically illustrates a side view of a 3D printing system and its components.

In some embodiments, the 3D printing system (e.g., FIG. 1, 100) comprises a chamber (e.g., FIG. 1, 126; FIG. 2, 216). The chamber may be referred herein as the "processing chamber." The processing chamber can include chamber walls (e.g., FIG. 1, 107). The processing chamber may comprise an energy beam (e.g., FIG. 1, 101; FIG. 2, 204). The energy beam can be generated by an energy source (e.g., FIG. 1, 121). The energy beam may be at least partially controlled by (e.g., pass through) an optical system (e.g., FIG. 1, 120, or FIG. 4). The optical system may include optical components comprising a mirror, a lens (e.g., concave or convex), a fiber, a beam guide, a rotating polygon, a prism, or any suitable combination thereof. The energy beam can travel through a window (e.g., FIG. 1, 115) of the processing chamber. The energy beam may be directed towards a platform (e.g., FIG. 1, comprising 109 and/or 102). The energy beam may be directed towards an exposed surface of a material bed (e.g., FIG. 1, 119). The energy beam can transform at least a portion of a pre-transformed material to a transformed material (e.g., 106). The transformed material may be directed (e.g., streamed) towards the platform. The pre-transformed material may form a material bed (e.g., above the platform). The energy beam can transform at least a portion (e.g., a layer) of the material bed (e.g., of pre-transformed material (e.g., powder)) to a transformed material (e.g., 106) (e.g., a layer of transformed material). The 3D printing system may comprise one or more modules (e.g., FIG. 2, 201, 202, and 203). The one or more modules may be referred herein as the "build modules." At times, at least one build module (e.g., FIG. 1, 130) may be situated in the enclosure comprising the processing chamber (e.g., FIG. 1, 126). At times, at least one build module may engage with the processing chamber (e.g., FIG. 1). At times, at least one build module may not engage with the processing chamber (e.g., FIG. 2). At times, a plurality of build modules (e.g., FIG. 2, 201, 202, and 203) may be situated in an enclosure (e.g., FIG. 2, 200) comprising the processing chamber (e.g., FIG. 2, 210). At times, the build module may be connected to, or may comprise an autonomous guided vehicle (AGV). The AGV may have at least one of the following: a movement mechanism (e.g., wheels), positional (e.g., optical) sensor, and controller. The controller may enable self-docking (e.g., to a docking station) and/or self-driving of the AGV. The self-docketing and/or self-driving may be to and from the processing chamber. The build module may reversibly engage with (e.g., couple to) the processing chamber. The engagement of the build module with the processing chamber may be controlled (e.g., by a controller). The control may be automatic and/or manual. The engagement of the build module with the processing chamber may be reversible. In some embodiments, the engagement of the build module with the processing chamber may be permanent.

In some embodiments, at least one of the build modules has at least one controller. The controller may be its own controller. The controller may be different than the controller controlling the 3D printing process and/or the processing chamber. The translation facilitator (e.g., build module delivery system) may comprise a controller (e.g., its own controller). The controller of the translation facilitator may be different than the controller controlling the 3D printing process and/or the processing chamber. The controller of the translation facilitator may be different than the controller of the build module. The build module controller and/or the translation facilitator controller may be a microcontroller. At times, the controller of the 3D printing process and/or the processing chamber may not interact with the controller of the build module and/or translation facilitator. At times, the controller of the build module and/or translation facilitator may not interact with the controller of the 3D printing process and/or the processing chamber. For example, the controller of the build module may not interact with the controller of the processing chamber. For example, the controller of the translation facilitator may not interact with the controller of the processing chamber. The controller of the 3D printing process and/or the processing chamber may be able to interpret one or more signals emitted from (e.g., by) the build module and/or translation facilitator. The controller of the build module and/or translation facilitator may be able to interpret one or more signals emitted from (e.g., by) the processing chamber. The one or more signals may be electromagnetic, electronic, magnetic, pressure, or sound signals. The electromagnetic signals may comprise visible light, infrared, ultraviolet, or radio frequency signals. The electromagnetic signals may comprise a radio frequency identification signal (RFID). The RFID may be specific for a build module, user, entity, 3D object model, processor, material type, printing instruction, 3D print job, or any combination thereof.

In some embodiments, the build module controller controls the translation of the build module, sealing status of the build module, atmosphere of the build module, engagement of the build module with the processing chamber, exit of the build module from the enclosure, entry of the build module into the enclosure, or any combination thereof. Controlling the sealing status of the build module may comprise opening or closing of the build module shutter. The build module controller may be able to interpret signals from the 3D printing controller and/or processing chamber controller. The processing chamber controller may be the 3D printing controller. For example, the build module controller may be able to interpret and/or respond to a signal regarding the atmospheric conditions in the load lock. For example, the build module controller may be able to interpret and/or respond to a signal regarding the completion of a 3D printing process (e.g., when the printing of a 3D object is complete). The build module may be connected to an actuator. The actuator may be translating or stationary. The controller of the build module may direct the translation facilitator (e.g., comprising an actuator) to translate the build module from one position to another (e.g., arrows 221-224 in FIG. 2), when translation is possible. The translation facilitator may be a build module delivery system. The translation facilitator may be autonomous. The translation facilitator may operate independently of the 3D printer (e.g., mechanisms directed by the 3D printing controller). The translation facilitator (e.g., build module delivery system) may comprise a controller and/or a motor. The translation facilitator may comprise a machine or a human. The translation is possible, for example, when the destination position of the build module is empty. The controller of the 3D printing and/or the processing chamber may be able to sense signals emitted from the controller of the build module. For example, the controller of the 3D printing and/or the processing chamber may be able to sense a signal from the build module that is emitted when the build module is docked into engagement position with the processing chamber. The signal from the build module may comprise reaching a certain position in space, reaching a certain atmospheric characteristic threshold, opening, or shutting the build platform closing, or engaging or disengaging (e.g., docking or undocking) from the processing chamber. The build module may comprise one or more sensors. For example, the build module may comprise a proximity, movement, light, sounds, or touch sensor.

In some embodiments, the build module is included as part of the 3D printing system. In some embodiments, the build module is separate from the 3D printing system. The build module may be independent (e.g., operate independently) from the 3D printing system. For example, build module may comprise their own controller, motor, elevator, build platform, valve, channel, or shutter. In some embodiments, one or more conditions differ between the build module and the processing chamber, and/or among the different build modules. The difference may comprise different pre-transformed materials, atmospheres, platforms, temperatures, pressures, humidity levels, oxygen levels, gas (e.g., inert), traveling speed, traveling method, acceleration speed, or post processing treatment. For example, the relative velocity of the various build modules with respect to the processing chamber may be different, similar, or substantially similar. The build platform may undergo different, similar, or substantially similar post processing treatment (e.g., further processing of the 3D object and/or material bed after the generation of the 3D object in the material bed is complete).

In some examples, a build module translates relative to the processing chamber. The translation may be parallel or substantially parallel to the bottom surface of the build module (e.g., build chamber). The bottom surface of the build module is the one closest to the gravitational center. The translation may be at an angle (e.g., planar or compound) relative to the bottom surface of the build module. The translation may use any device that facilitates translation (e.g., an actuator). For example, the translation facilitator may comprise a robotic arm, conveyor (e.g., conveyor belt), rotating screw, or a moving surface (e.g., platform). The translation facilitator may comprise a chain, rail, or an actuator (e.g., motor). The translation facilitator may comprise a component that can move another. The movement may be controlled (e.g., using a controller). The movement may comprise using a control signal and source of energy (e.g., electricity). The translation facilitator may use electricity, pneumatic pressure, hydraulic pressure, or human power.

In some embodiments, the 3D printing system comprises at least 1, 2, 3, 4, 5, 6, 7, 8, 9, or 10 build modules. FIG. 2 shows an example of three build modules (e.g., 201, 202, and 203) and one processing chamber 210. At least one build module may engage with the processing chamber to expand the interior volume of the processing chamber. During at least a portion of the 3D printing process, the atmospheres of the chamber and enclosure may merge. At times, during at least a portion of the 3D printing process, the atmospheres of the chamber and enclosure may remain separate. During at least a portion of the 3D printing process, the atmospheres of the build module and processing chamber may be separate. The build module may be mobile or stationary. The build module may comprise an elevator. The elevator may be operatively coupled with (e.g., connected to) a platform (e.g., building platform). The elevator may be reversibly connected to at least a portion of the platform (e.g., to the base). The elevator may be irreversibly connected to at least a portion of the platform (e.g., to the substrate). The platform may be separated from one or more walls (e.g., side walls) of the build module by a seal (e.g., FIG. 2, 211; FIG. 1, 103). The seal may be impermeable or substantially impermeable to gas. The seal may be permeable to gas. The seal may be flexible. The seal may be elastic. The seal may be bendable. The seal may be compressible. The seal may comprise rubber (e.g., latex), Teflon, plastic, or silicon. The seal may comprise a mesh, membrane, sieve, paper (e.g., filter paper), cloth (e.g., felt), or brush. The mesh, membrane, paper and/or cloth may comprise randomly and/or non-randomly arranged fibers. The paper may comprise a HEPA filter. The seal may be permeable to at least one gas, and impermeable to the pre-transformed (e.g., and to the transformed) material. The seal may not allow a pre-transformed (e.g., and to the transformed) material to pass through.

Figure 3A:
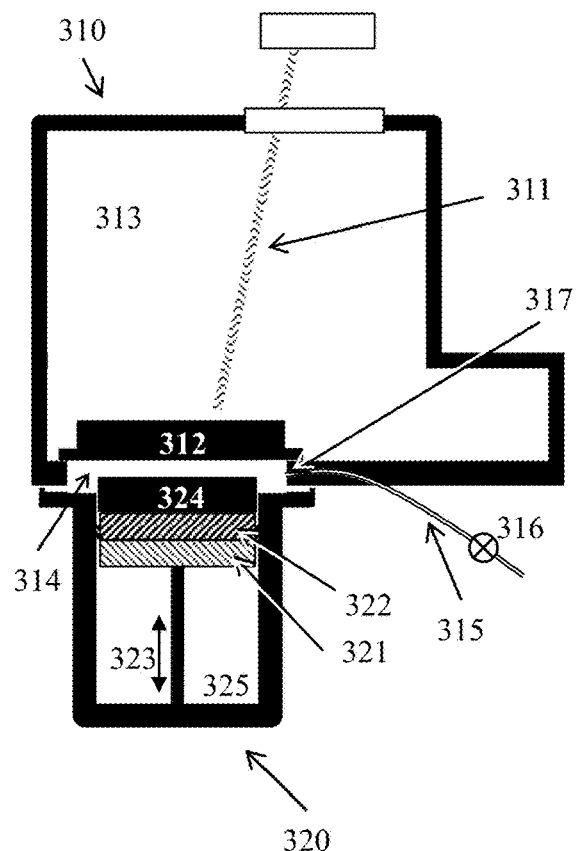
FIGS. 3A and 3B schematically illustrate side views of a 3D printing systems and their components.
Figure 3B:
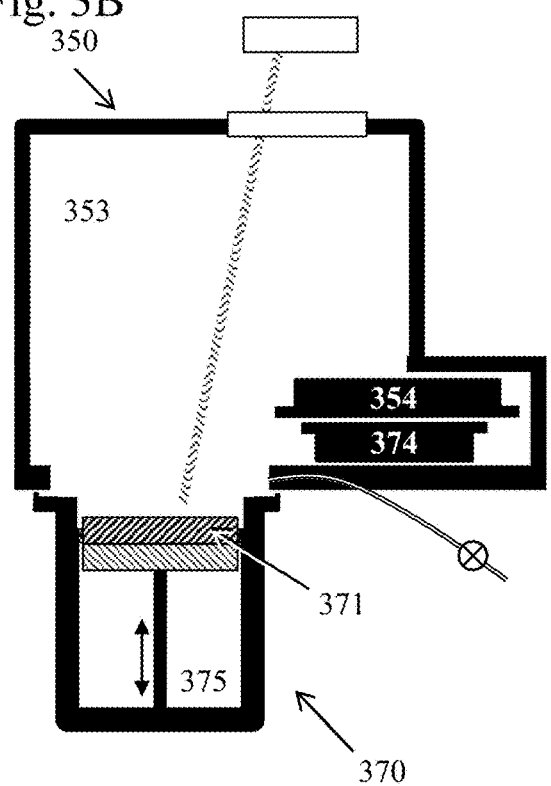

In some examples, the build module and/or processing chamber comprises an openable shutter. For example, the build module and processing chamber may each comprise a separate openable shutter. The shutter may be a seal, door, blockade, stopple, stopper, plug, piston, cover, roof, hood, block, stopple, obstruction, lid, closure, or a cap. The shutter may be opened upon engagement of the build module with the processing chamber. FIG. 3A shows an example of a processing chamber (e.g., FIG. 3A, 310) and a build module (e.g., FIG. 3A, 320). The processing chamber comprises the energy beam (e.g., FIG. 3A, 311). The build module comprises a build platform comprising a substrate (e.g., FIG. 3A, 321), a base (e.g., FIG. 3A, 322), and an elevator shaft (e.g., FIG. 3A, 323) that allows the platform to move vertically up and down. The build module (e.g., FIG. 3A, 320) may comprise a shutter (e.g., FIG. 3A, 324). The processing chamber (e.g., FIG. 3A, 310) may comprise a shutter (e.g., FIG. 3A, 312). The shutter may be openable. The shutter may be removable. The removal of the shutter may comprise manual or automatic removal. The build module shutter may be opened while being connected to the build module. The processing chamber shutter may be opened while being connected to the processing chamber (e.g., through connector). The shutter connector may comprise a hinge, chain, or a rail. In an example, the shutter may be opened in a manner similar to opening a door or a window. The shutter may be opened by swiveling (e.g., similar to opening a door or a window held on a hinge). The shutter may be opened by its removal from the opening which it blocks. The removal may be guided (e.g., by a rail, arm, pulley, crane, or conveyor). The guiding may be using a robot. The guiding may be using at least one motor and/or gear. The shutter may be opened while being disconnected from the build module. For example, the shutter may be opened similar to opening a lid. The shutter may be opened by shifting or sliding (e.g., to a side). FIG. 3B shows an example where the shutter (FIG. 3B, 374) of the build module (FIG. 3B, 370) is open in a way that is disconnected from the build module. FIG. 3B shows an example where the shutter (FIG. 3B, 354) of the processing chamber (FIG. 3B, 350) is open in a way that is disconnected from the processing chamber.

In some embodiments, the build module, processing chamber, and/or enclosure comprises one or more seals. The seal may be a sliding seal or a top seal. For example, the build module and/or processing chamber may comprise a sliding seal that meets with the exterior of the build module upon engagement of the build module with the processing chamber. For example, the processing chamber may comprise a top seal that faces the build module and is pushed upon engagement of the processing chamber with the build module. For example, the build module may comprise a top seal that faces the processing chamber and is pushed upon engagement of the processing chamber with the build module. The seal may be a face seal, or compression seal. The seal may comprise an O-ring.

In some examples, the build module, processing chamber, and/or enclosure are sealed, sealable, or open. The atmosphere of the build module, processing chamber, and/or enclosure may be regulated. The build module may be sealed, sealable, or open. The processing chamber may be sealed, sealable, or open. The enclosure may be sealed, sealable, or open. The build module, processing chamber, and/or enclosure may comprise a valve and/or a gas opening port. The valve and/or a gas opening port may be below, or above the building platform. The valve and/or a gas opening port may be disposed at the horizontal plane of the build platform. The valve and/or a gas opening port may be disposed at the adjacent to the build platform. The valve and/or a gas opening port may be disposed between the processing chamber and the build module. FIG. 3A shows an example of a channel 315 that allows a gas to pass through, which channel has an opening port 317 disposed between the processing chamber 310 and the build module 320. FIG. 3A shows an example of a valve 316 that is disposed along the channel 315. The valve may allow at least one gas to travel through. The gas may enter or exit through the valve. For example, the gas may enter or exit the build module, processing chamber, and/or enclosure through the valve. In some embodiments, the atmosphere of the build module, processing chamber, and/or enclosure may be individually controlled. In some embodiments, the atmosphere of at least two of the build modules, processing chamber, and enclosure may be separately controlled. In some embodiments, the atmosphere of at least two of the build modules, processing chamber, and enclosure may be controlled in concert (e.g., simultaneously). In some embodiments, the atmosphere of at least one of the build modules, processing chamber, or enclosure may be controlled by controlling the atmosphere of at least one of the build module, processing chamber, or enclosure in any combination or permutation. In some examples, the atmosphere in the build module is not controllable by controlling the atmosphere in the processing chamber.

In some examples, the 3D printing system comprises a load lock. The load lock may be disposed between the processing chamber and the build module. The load lock may be formed by engaging the build module with the processing chamber. The load lock may be sealable. For example, the load lock may be sealed by engaging the build module with the processing chamber (e.g., directly, or indirectly). FIG. 3A shows an example of a load lock 314 that is formed when the build module 320 is engaged with the processing chamber 310. An exchange of atmosphere may take place in the load lock by evacuating gas from the load lock (e.g., through channel 315) and/or by inserting gas (e.g., through channel 315). In some embodiments, the load lock may comprise one or more gas opening ports. At times, the load lock may comprise one or more gas transport channels. At times, the load lock may comprise one or more valves. A gas transport channel may comprise a valve. The opening and/or closing of a first valve of the 3D printing system may or may not be coordinated with the opening and/or closing of a second valve of the 3D printing system. The valve may be controlled automatically (e.g., by a controller) and/or manually. The load lock may comprise a gas entry opening port and a gas exit opening port. In some embodiments, a pressure below ambient pressure (e.g., of 1 atmosphere) is formed in the load lock. In some embodiments, a pressure exceeding ambient pressure (e.g., of 1 atmosphere) is formed in the load lock. At times, during the exchange of load lock atmosphere, a pressure below and/or above ambient pressure if formed in the load lock. At times, a pressure equal or substantially equal to ambient pressure is maintained (e.g., automatically, and/or manually) in the load lock. The load lock, building module, processing chamber, and/or enclosure may comprise a valve. The valve may comprise a pressure relief, pressure release, pressure safety, safety relief, pilot-operated relief, low pressure safety, vacuum pressure safety, low and vacuum pressure safety, pressure vacuum release, snap acting, or modulating valve. The valve may comply with the legal industry standards presiding the jurisdiction. The volume of the load lock may be smaller than the volume within the build module and/or processing chamber. The total volume within the load lock may be at most about 0.1%, 0.5%, 1%, 5%, 10%, 20%, 50%, or 80% of the total volume encompassed by the build module and/or processing chamber. The total volume within the load lock may be between any of the afore-mentioned percentage values (e.g., from about 0.1% to about 80%, from about 0.1% to about 5%, from about 5% to about 20%, from about 20% to about 50%, or from about 50% to about 80%). The percentage may be volume per volume percentage.

In some embodiments, the atmosphere of the build module and/or the processing chamber is fluidly connected to the atmosphere of the load lock. At times, conditioning the atmosphere of the load lock will condition the atmosphere of the build module and/or the processing chamber that is fluidly connected to the load lock. The fluid connection may comprise gas flow. The fluid connection may be through a gas permeable seal and/or through a channel (e.g., a pipe). The channel may be a sealable channel (e.g., using a valve).

In some embodiments, the shutter of the build module engages with the shutter of the processing chamber. The engagement may be spatially controlled. For example, when the shutter of the build module is within a certain gap distance from the processing chamber shutter, the build module shutter engages with the processing chamber shutter. The gap distance may trigger an engagement mechanism. The gap trigger may be sufficient to allow sensing of at least one of the shutters. The engagement mechanism may comprise magnetic, electrostatic, electric, hydraulic, pneumatic, or physical force. The physical force may comprise manual force. In some embodiments, a build module shutter may be attracted upwards toward the processing chamber shutter and a processing chamber shutter may be attracted upwards toward the build module shutter. A single unit may be formed from the processing chamber shutter and the build module shutter, that is transferred away from the energy beam. In the single unit, the processing chamber shutter and the build module shutter may be held together by an engagement mechanism. Subsequent to the engagement, the single unit may transfer (e.g., relocate, or move) away from the energy beam. For example, the engagement may trigger the transferring (e.g., relocating) of the build module shutter and the processing chamber shutter as a single unit.

In some examples, removal of the shutter (e.g., of the build module and/or processing chamber) depends on an atmospheric characteristic (e.g., within the build module or the processing chamber). At times, removal of the shutter (e.g., of the build module and/or processing chamber) may depend on reaching a certain (e.g., predetermined) level of an atmospheric characteristics comprising a gas content (e.g., relative gas content), gas pressure, oxygen level, humidity, argon level, or nitrogen level. For example, the certain level may be an equilibrium between an atmospheric characteristic in the build module and that atmospheric characteristics in the processing chamber.

In some embodiments, the 3D printing process initiates after merging of the build module with the processing chamber. At the beginning of the 3D printing process, the build platform may be at an elevated position (e.g., FIG. 3B, 371). At the end of the 3D printing process, the build platform may be at a vertically reduced position (e.g., FIG. 2, 213). The building module may translate between three positions during a 3D printing run. The build module may enter to the enclosure from a position away from the engagement position with the processing chamber (e.g., FIG. 2, 201). The build module may then advance toward the processing chamber (e.g., FIG. 2, 202), and engage with the processing chamber (e.g., as described herein, for example, in FIG. 3B). The layer dispensing mechanism and energy beam can translate and form the 3D object adjacent to the platform, while the platform gradually lowers its vertical position to facilitate layer-wise formation of the 3D object. The layer dispensing mechanism and energy beam can translate and form the 3D object within the material bed (e.g., as described herein), while the platform gradually lowers its vertical position to facilitate layer-wise formation of the 3D object. The layer dispensing mechanism (also referred to herein as a material handling device or layer forming device) can be used to form a portion of the material bed. The layer forming device can dispense material, remove material, and/or shape the material bed (e.g., a layer of material of the material bed). The material can comprise a pre-transformed material or a debris. Shaping the material bed may comprise altering a shape of the exposed surface of the material bed, e.g., planarizing the exposed surface of the material bed. The layer forming device can be in a layer forming mode when dispensing the material and/or shaping the material bed. The layer forming device can be in a parked mode when the layer forming device is in a parked position. The layer dispensing mechanism can dispense material at a dispensing rate of at least about at 50 grams/second (g/s), 55 g/s, 60 g/s, 70 g/s, 80 g/s, 84 g/s, 90 g/s, 100 g/s, 120 g/s, 150 g/s, 200 g/s, or 500 g/s. The dispensing rate can be between any of the afore-mentioned dispensing rates (e.g., from about 50 g/s to about 100 g/s, from about 80 g/s to about 120 g/s, from about 84 g/s to about 500 g/s, from about 55 g/s to about 500 g/s or from about 60 g/s to about 200 g/s). The layer dispenser mechanism can dispense a layer of a height of at least about 100 microns (μm), 150 μm, 200 μm, 250 μm, 300 μm, 350 μm, 400 μm, 450 μm, 500 μm, 550 μm, 600 μm, 650 μm, 700 μm, 750 μm, 800 μm, 850 μm, 900 μm or 950 μm. The height of material dispensed in a layer of material can be between any of the afore-mentioned amounts (e.g., from about 100 μm to about 650 μm, from about 200 μm to about 950 μm, from about 350 μm to about 800 μm, from about 100 μm to about 950 μm). The time taken to dispense a layer of material can be at least about 0.1 seconds (sec), 0.2 sec, 0.3 sec, 0.5 sec, 1 sec, 2 sec, 3 sec, 4 sec, 5 sec, 8 sec, 9 sec, 10 sec, 15 sec or 20 sec. The time taken to dispense a layer of material can be between any of the afore-mentioned times (e.g., from about 0.1 seconds to about 20 seconds, from about 0.2 seconds to about 1 second, from about 3 seconds to about 5 seconds, from about 0.5 seconds to about 20 seconds).

In some embodiments, once and/or after the 3D object printing is complete (e.g., FIG. 2, 214), the build module disengages from the processing chamber and translate away from the processing chamber engagement position (e.g., FIG. 2, 203). Disengagement of the build module from the processing chamber may include closing the processing chamber with its shutter, closing the build module with its shutter, or both closing the processing chamber shutter and closing the build module shutter. Disengagement of the build module from the processing chamber may include maintaining the processing chamber atmosphere to be separate from the enclosure atmosphere, maintaining the build module atmosphere to be separate from the enclosure atmosphere, or maintaining both the processing chamber atmosphere and the build atmosphere separate from the enclosure atmosphere. Disengagement of the build module from the processing chamber may include maintaining the processing chamber atmosphere to be separate from the ambient atmosphere, maintaining the build module atmosphere to be separate from the ambient atmosphere, or maintaining both the processing chamber atmosphere and the build atmosphere separate from the ambient atmosphere. The building platform that is disposed within the build module before engagement with the processing chamber, may be at its topmost position, bottom most position, or anywhere between its top most position and bottom most position within the build module.

At times, the usage of sealable build modules, processing chamber, and/or unpacking chamber allows a small degree of operator intervention, low degree of operator exposure to the pre-transformed material, and/or low down (e.g., shut down) time of the 3D printer. The 3D printing system may operate most of the time without an intermission. The 3D printing system may be utilized for 3D printing most of the time. Most of the time may be at least about 50%, 70%, 80%, 90%, 95%, 96%, 97%, 98%, or 99% of the time. Most of the time may be between any of the afore-mentioned values (e.g., from about 50% to about 99%, from about 80% to about 99%, from about 90% to about 99%, or from about 95% to about 99% of the time. The entire time includes the time during which the 3D printing system prints a 3D object, and time during which it does not print a 3D object. Most of the time may include operation during seven days a week and/or 24 hours during a day.

In some embodiments, the 3D printing requires assistance by one or more operators. At times, the 3D printing system requires operation of maximum a single standard daily work shift. The 3D printing system may require operation by a human operator working at most of about 8 hours (h), 7h, 6h, 5h, 4h, 3h, 2h, 1 h, or 0.5h a day. The 3D printing system may require operation by a human operator working between any of the afore-mentioned time frames (e.g., from about 8h to about 0.5h, from about 8h to about 4h, from about 6h to about 3h, from about 3h to about 0.5h, or from about 2h to about 0.5h a day). The 3D printing system may require operation of maximum a single standard work week shift. The 3D printing system may require operation by a human operator working at most of about 50h, 40 h, 30h, 20h, 10h, 5h, or 1 h a week. The 3D printing system may require operation by a human operator working between any of the afore-mentioned time frames (e.g., from about 40h to about 1h, from about 40h to about 20h, from about 30h to about 10h, from about 20h to about 1h, or from about 10h to about 1h a week). A single operator may support during his daily and/or weekly shift at least 1, 2, 3, 4, 5, 6, 7, 8, 9, or 10 3D printers (i.e., 3D printing systems).

In some embodiments, the enclosure and/or processing chamber of the 3D printing system is opened to the ambient environment sparingly (e.g., during, before, and/or after the 3D printing). In some embodiments, the enclosure and/or processing chamber of the 3D printing system may be opened by an operator (e.g., human) sparingly. Sparing opening may be at most once in at most every 1, 2, 3, 4, or 5 weeks. The weeks may comprise weeks of standard operation of the 3D printer.

In some embodiments, the 3D printer has a capacity of 1, 2, 3, 4, or 5 full prints in terms of pre-transformed material (e.g., powder) reservoir capacity. The 3D printer may have the capacity to print a plurality of 3D objects in parallel. For example, the 3D printer may be able to print at least 2, 3, 4, 5, 6, 7, 8, 9, or 10 3D objects in parallel.

In some embodiments, the printed 3D object is retrieved soon after terminating the last transformation operation of at least a portion of the material bed. Soon after terminating may be at most about 1 day, 12 hours, 6 hours, 3 hours, 2 hours, 1 hour, 30 minutes, 15 minutes, 5 minutes, 240 seconds (sec), 220 sec, 200 sec, 180 sec, 160 sec, 140 sec, 120 sec, 100 sec, 80 sec, 60 sec, 40 sec, 20 sec, 10 sec, 9 sec, 8 sec, 7 sec, 6 sec, 5 sec, 4 sec, 3 sec, 2 sec, or 1 sec. Soon after terminating may be between any of the afore-mentioned time values (e.g., from about is to about 1 day, from about is to about 1 hour, from about 30 minutes to about 1 day, or from about 20 s to about 240 s).

In some embodiments, the 3D printer has a capacity of 1, 2, 3, 4, or 5 full prints before requiring human intervention. Human intervention may be required for refilling the pre-transformed (e.g., powder) material, unloading the build modules, unpacking the 3D object, or any combination thereof. The 3D printer operator may condition the 3D printer at any time during operation of the 3D printing system (e.g., during the 3D printing process). Conditioning of the 3D printer may comprise refilling the pre-transformed material that is used by the 3D printer, replacing gas source, or replacing filters. The conditioning may be with or without interrupting the 3D printing system. For example, refilling and unloading from the 3D printer can be done at any time during the 3D printing process without interrupting the 3D printing process. Conditioning may comprise refreshing the 3D printer.

In some embodiments, the 3D printer comprises at least one filter. The filter may be a ventilation filter. The ventilation filter may capture fine powder from the 3D printing system. The filter may comprise a paper filter such as a high-efficiency particulate arrestance (HEPA) filter (a.k.a., high-efficiency particulate arresting or high-efficiency particulate air filter). The ventilation filter may capture spatter. The spatter may result from the 3D printing process. The ventilator may direct the spatter in a requested direction (e.g., by using positive or negative gas pressure). For example, the ventilator may use vacuum. For example, the ventilator may use gas blow.

In some embodiments, the time lapse between the end of printing in a first material bed, and the beginning of printing in a second material bed is at most about 60 minutes (min), 40 min, 30 min, 20 min, 15 min, 10 min, or 5 min. The time lapse between the end of printing in a first material bed, and the beginning of printing in a second material bed may be between any of the afore-mentioned times (e.g., from about 60 min to abo 5 min, from about 60 min to about 30 min, from about 30 min to about 5 min, from about 20 min to about 5 min, from about 20 min to about 10 min, or from about 15 min to about 5 min). The speed during which the 3D printing process proceeds is disclosed in Patent Application serial number PCT/US15/36802 that is incorporated herein in its entirety.

In some embodiments, the 3D object is removed from the material bed after the completion of the 3D printing process. For example, the 3D object may be removed from the material bed when the transformed material that formed the 3D object hardens. For example, the 3D object may be removed from the material bed when the transformed material that formed the 3D object is no longer susceptible to deformation under standard handling operation (e.g., human and/or machine handling).

At times, the generated 3D object requires very little or no further processing after its retrieval.

Further processing may be post printing processing. Further processing may comprise trimming, as disclosed herein. Further processing may comprise polishing (e.g., sanding). In some cases, the generated 3D object can be retrieved and finalized without removal of transformed material and/or auxiliary support features.

In some examples, the generated 3D object adheres (e.g., substantially) to a requested model of the 3D object. The 3D object (e.g., solidified material) that is generated can have an average deviation value from the intended dimensions (e.g., of a requested 3D object) of at most about 0.5 microns (m), 1 μm, 3 μm, 10 μm, 30 μm, 100 μm, 300 μm or less from a requested model of the 3D object. The deviation can be any value between the afore-mentioned values. The average deviation can be from about 0.5 µm to about 300 µm, from about 10 µm to about 50 µm, from about 15 µm to about 85 µm, from about 5 µm to about 45 µm, or from about 15 µm to about 35 µm. The 3D object can have a deviation from the intended dimensions in a specific direction, according to the formula $Dv+L/K_{dv}$, wherein Dv is a deviation value, L is the length of the 3D object in a specific direction, and $K_{dv}$ is a constant. Dv can have a value of at most about 300 µm, 200 µm, 100 µm, 50 µm, 40 µm, 30 µm, 20 µm, 10 µm, 5 µm, 1 µm, or 0.5 µm. Dv can have a value of at least about 0.5 µm, 1 µm, 3 µm, 5 µm, 10 µm, 20 µm, 30 µm, 50 µm, 70 µm, 100 µm, 300 µm or less. Dv can have any value between the afore-mentioned values. For example, Dv can have a value that is from about 0.5 µm to about 300 µm, from about 10 µm to about 50 µm, from about 15 µm to about 85 µm, from about 5 µm to about 45 µm, or from about 15 µm to about 35 µm. $K_{dv}$ can have a value of at most about 3000, 2500, 2000, 1500, 1000, or 500. $K_{dv}$ can have a value of at least about 500, 1000, 1500, 2000, 2500, or 3000. $K_{dv}$ can have any value between the afore-mentioned values. For example, $K_{dv}$ can have a value that is from about 3000 to about 500, from about 1000 to about 2500, from about 500 to about 2000, from about 1000 to about 3000, or from about 1000 to about 2500.

At times, the generated 3D object (i.e., the printed 3D object) does not require further processing following its generation by a method described herein. The printed 3D object may require reduced amount of processing after its generation by a method described herein. For example, the printed 3D object may not require removal of auxiliary support (e.g., since the printed 3D object was generated as a 3D object devoid of auxiliary support). The printed 3D object may not require smoothing, flattening, polishing, or leveling. The printed 3D object may not require further machining. In some examples, the printed 3D object may require one or more treatment operations following its generation (e.g., post generation treatment, or post printing treatment). The further treatment step(s) may comprise surface scraping, machining, polishing, grinding, blasting (e.g., sand blasting, bead blasting, shot blasting, or dry ice blasting), annealing, or chemical treatment. The further treatment may comprise physical or chemical treatment. The further treatment step(s) may comprise electrochemical treatment, ablating, polishing (e.g., electro polishing), pickling, grinding, honing, or lapping. In some examples, the printed 3D object may require a single operation (e.g., of sand blasting) following its formation. The printed 3D object may require an operation of sand blasting following its formation. Polishing may comprise electro polishing (e.g., electrochemical polishing or electrolytic polishing). The further treatment may comprise the use of abrasive(s). The blasting may comprise sand blasting or soda blasting. The chemical treatment may comprise use or an agent. The agent may comprise an acid, a base, or an organic compound. The further treatment step(s) may comprise adding at least one added layer (e.g., cover layer). The added layer may comprise lamination. The added layer may be of an organic or inorganic material. The added layer may comprise elemental metal, metal alloy, ceramic, or elemental carbon. The added layer may comprise at least one material that composes the printed 3D object. When the printed 3D object undergoes further treatment, the bottom most surface layer of the treated object may be different than the original bottom most surface layer that was formed by the 3D printing (e.g., the bottom skin layer).

At times, the methods described herein are performed in the enclosure (e.g., container, processing chamber, and/or build module). One or more 3D objects can be formed (e.g., generated, and/or printed) in the enclosure (e.g., simultaneously, and/or sequentially). The enclosure may have a predetermined and/or controlled pressure. The enclosure may have a predetermined and/or controlled atmosphere. The control may be manual or via a control system. The atmosphere may comprise at least one gas.

In some examples, the enclosure comprises ambient pressure (e.g., 1 atmosphere), negative pressure (i.e., vacuum) or positive pressure. Different portions of the enclosure may have different atmospheres. The different atmospheres may comprise different gas compositions. The different atmospheres may comprise different atmosphere temperatures. The different atmospheres may comprise ambient pressure (e.g., 1 atmosphere), negative pressure (i.e., vacuum) or positive pressure. The different portions of the enclosure may comprise the processing chamber, build module, or enclosure volume excluding the processing chamber and/or build module. The vacuum may comprise pressure below 1 bar, or below 1 atmosphere. The positively pressurized environment may comprise pressure above 1 bar or above 1 atmosphere. The pressure in the enclosure can be at least about $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, 1000 bar, or 1100 bar. The pressure in the enclosure can be at least about 100 Torr, 200 Torr, 300 Torr, 400 Torr, 500 Torr, 600 Torr, 700 Torr, 720 Torr, 740 Torr, 750 Torr, 760 Torr, 900 Torr, 1000 Torr, 1100 Torr, or 1200 Torr. The pressure in the enclosure can be between any of the afore-mentioned enclosure pressure values (e.g., from about $10^{-7}$ Torr to about 1200 Torr, from about $10^{-7}$ Torr to about 1 Torr, from about 1 Torr to about 1200 Torr, or from about $10^{-2}$ Torr to about 10 Torr). The chamber can be pressurized to a pressure of at least $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. The chamber can be pressurized to a pressure of at most $10^{-7}$ Torr, $10^{-6}$ Torr, $10^{-5}$ Torr, $10^{-4}$ Torr, $10^{-3}$ Torr, $10^{-2}$ Torr, $10^{-1}$ Torr, 1 Torr, 10 Torr, 100 Torr, 1 bar, 2 bar, 3 bar, 4 bar, 5 bar, 10 bar, 20 bar, 30 bar, 40 bar, 50 bar, 100 bar, 200 bar, 300 bar, 400 bar, 500 bar, or 1000 bar. The pressure in the chamber can be at a range between any of the afore-mentioned pressure values (e.g., from about $10^{-7}$ Torr to about 1000 bar, from about $10^{-7}$ Torr to about 1 Torr, from about 1 Torr to about 100 Barr, from about 1 bar to about 10 bar, from about 1 bar to about 100 bar, or from about 100 bar to about 1000 bar). In some cases, the chamber pressure can be standard atmospheric pressure. The pressure may be measured at an ambient temperature (e.g., room temperature, 20° C., or 25° C.).

In some embodiments, the enclosure includes an atmosphere. The enclosure may comprise a (e.g., substantially) inert atmosphere. The atmosphere in the enclosure may be (e.g., substantially) depleted by one or more gases present in the ambient atmosphere. The atmosphere in the enclosure may include a reduced level of one or more gases relative to the ambient atmosphere. For example, the atmosphere may be substantially depleted, or have reduced levels of water (i.e., humidity), oxygen, nitrogen, carbon dioxide, hydrogen sulfide, or any combination thereof. The level of the depleted or reduced level gas may be at most about 1 ppm, 10 ppm, 50 ppm, 100 ppm, 500 ppm, 1000 ppm, 5000 ppm, 10000 ppm, 25000 ppm, 50000 ppm, or 70000 ppm volume by volume (v/v). The level of the depleted or reduced level gas may be at least about 1 ppm, 10 ppm, 50 ppm, 100 ppm, 500 ppm, 1000 ppm, 5000 ppm, 10000 ppm, 25000 ppm, 50000 ppm, or 70000 ppm (v/v). The level of the oxygen gas may be at most about 1 ppm, 10 ppm, 50 ppm, 100 ppm, 500 ppm, 1000 ppm, 5000 ppm, 10000 ppm, 25000 ppm, 50000 ppm, or 70000 ppm (v/v). The level of the water vapor may be at most about 1 ppm, 10 ppm, 50 ppm, 100 ppm, 500 ppm, 1000 ppm, 5000 ppm, 10000 ppm, 25000 ppm, 50000 ppm, or 70000 ppm (v/v). The level of the gas (e.g., depleted or reduced level gas, oxygen, or water) may be between any of the afore-mentioned levels of gas. The atmosphere may comprise air. The atmosphere may be inert. The atmosphere may be non-reactive. The atmosphere may be non-reactive with the material (e.g., the pre-transformed material deposited in the layer of material (e.g., powder), or the material comprising the 3D object). The atmosphere may prevent oxidation of the generated 3D object. The atmosphere may prevent oxidation of the pre-transformed material within the layer of pre-transformed material before its transformation, during its transformation, after its transformation, before its hardening, after its hardening, or any combination thereof. The atmosphere may comprise argon or nitrogen gas. The atmosphere may comprise a Nobel gas. The atmosphere can comprise a gas selected from the group consisting of argon, nitrogen, helium, neon, krypton, xenon, hydrogen, carbon monoxide, and carbon dioxide. The atmosphere may comprise hydrogen gas. The atmosphere may comprise a safe amount of hydrogen gas. The atmosphere may comprise a v/v percent of hydrogen gas of at least about 0.05%, 0.1%, 0.2%, 0.3%, 0.4%, 0.5%, 0.6%, 0.7%, 0.8%, 0.9%, 1%, 2%, 3%, 4%, or 5%, at ambient pressure (e.g., and ambient temperature). The atmosphere may comprise a v/v percent of hydrogen gas of at most about 0.05%, 0.1%, 0.2%, 0.3%, 0.4%, 0.5%, 0.6%, 0.7%, 0.8%, 0.9%, 1%, 2%, 3%, 4%, or 5%, at ambient pressure (e.g., and ambient temperature). The atmosphere may comprise any percent of hydrogen between the afore-mentioned percentages of hydrogen gas. The atmosphere may comprise a v/v hydrogen gas percent that is at least able to react with the material (e.g., at ambient temperature and/or at ambient pressure), and at most adhere to the prevalent work-safety standards in the jurisdiction (e.g., hydrogen codes and standards). The material may be the material within the layer of pre-transformed material (e.g., powder), the transformed material, the hardened material, or the material within the 3D object. Ambient refers to a condition to which people are generally accustomed. For example, ambient pressure may be 1 atmosphere. Ambient temperature may be a typical temperature to which humans are generally accustomed. For example, from about 15° C. to about 30° C., from about −30° C. to about 60° C., from about −20° C. to about 50° C., from 16° C. to about 26° C., from about 20° C. to about 25° C. "Room temperature" may be measured in a confined or in a non-confined space. For example, "room temperature" can be measured in a room, an office, a factory, a vehicle, a container, or outdoors. The vehicle may be a car, a truck, a bus, an airplane, a space shuttle, a spaceship, a ship, a boat, or any other vehicle. Room temperature may represent the small range of temperatures at which the atmosphere feels neither hot nor cold, for example, approximately 24° C., 20° C., 25° C., or any value from about 20° C. to about 25° C.

At times, the pre-transformed material is deposited in an enclosure (e.g., a container). FIG. 1 shows an example of a container 123. The container can contain the pre-transformed material (e.g., without spillage; FIG. 1, 104). The material may be placed in, or inserted to the container. The material may be deposited in, pushed to, sucked into, or lifted to the container. The material may be layered (e.g., spread) in the container. The container may comprise a substrate (e.g., FIG. 1, 109). The substrate may be situated adjacent to the bottom of the container (e.g., FIG. 1, 111). Bottom may be relative to the gravitational field, or relative to the position of the footprint of the energy beam (e.g., FIG. 1, 101) on the layer of pre-transformed material as part of a material bed. The footprint of the energy beam may follow a Gaussian bell shape. In some embodiments, the footprint of the energy beam does not follow a Gaussian bell shape. The container may comprise a platform comprising a base (e.g., FIG. 1, 102). The platform may comprise a substrate (e.g., FIG. 1, 109). The base may reside adjacent to the substrate. The pre-transformed material may be layered adjacent to a side of the container (e.g., on the bottom of the container). The pre-transformed material may be layered adjacent to the substrate and/or adjacent to the base. Adjacent to may be above. Adjacent to may be directly above, or directly on. The substrate may have one or more seals (e.g., FIG. 1, 103) that enclose the material in a selected area within the container. The one or more seals may be flexible or non-flexible. The one or more seals may comprise a polymer or a resin. The one or more seals may comprise a round edge or a flat edge. The one or more seals may be bendable or non-bendable. The seals may be stiff. The container may comprise the base. The base may be situated within the container. The container may comprise the platform, which may be situated within the container. The enclosure, container, processing chamber, and/or building module may comprise an optical window. An example of an optical window can be seen in FIG. 1, 115, FIG. 11, 1182, FIG. 12, 1215. The optical window may allow the energy beam (e.g., FIG. 1, 101; FIG. 12, 1201) to pass through without (e.g., substantial) energetic loss. A ventilator may prevent spatter from accumulating on the surface optical window that is disposed within the enclosure (e.g., within the processing chamber) during the 3D printing. An opening of the ventilator may be situated within the enclosure (e.g., FIG. 1, 126).

At times, the pre-transformed material is deposited in the enclosure by a material dispensing mechanism (e.g., FIGS. 1, 116, 117 and 118) to form a layer of pre-transformed material within the enclosure. The deposited material may be leveled by a leveling operation. The leveling operation may comprise using a material (e.g., powder) removal mechanism that does not contact the exposed surface of the material bed (e.g., FIG. 1, 118). The leveling operation may comprise using a leveling mechanism that contacts the exposed surface of the material bed (e.g., FIG. 1, 117). The material (e.g., powder) dispensing mechanism may comprise one or more dispensers (e.g., FIG. 1, 116). The material dispensing system may comprise at least one material (e.g., bulk) reservoir. The material may be deposited by a layer dispensing mechanism (e.g., a layer dispenser) (e.g., recoater). The layer dispensing mechanism (e.g., a leveler and/or material remover of the layer dispensing mechanism) may level the dispensed material without contacting the material bed (e.g., the top surface of the powder bed). The layer dispensing mechanism may include any layer dispensing mechanism and/or a material (e.g., powder) dispenser used in 3D printing. Examples of layer dispensing mechanisms, their components, and associated methods, software, systems, devices, and apparatuses, can be found in PCT/US15/36802 or in U.S. Ser. No. 15/374,535, each of which is entirely incorporated herein by reference.

Figure 31:
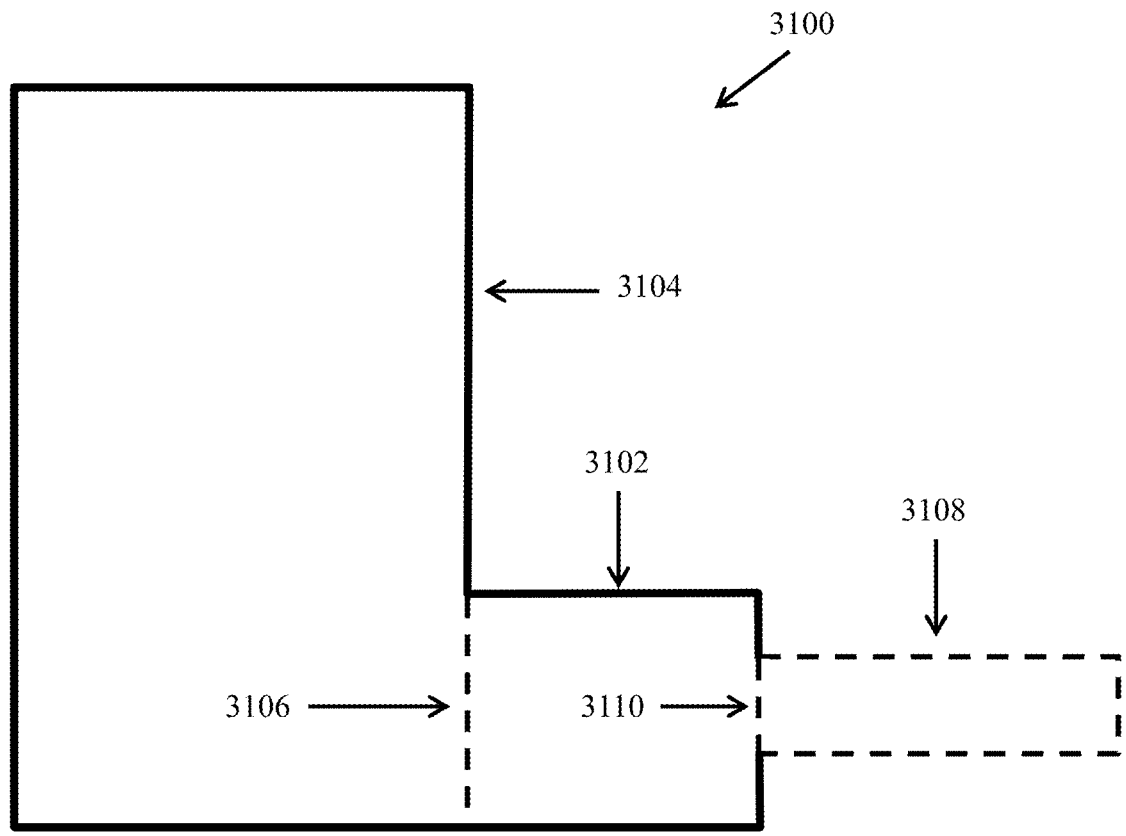
FIG. 31 schematically illustrates a side view of a 3D printing system.

FIG. 31 schematically illustrates a cross-section (or side) view of a 3D printing system 3100, in accordance with some embodiments. In some cases, the 3D printing system includes a first chamber side (e.g., comprising an ancillary chamber, e.g., 3102) and a second chamber side (e.g., comprising a processing chamber, e.g., 3104). One or more components in the first chamber side can be reversibly coupled or (e.g., substantially) irreversibly coupled (e.g., integrally coupled) with one or more components of the second chamber side. For example, the ancillary chamber in the first chamber side can be reversibly coupled or (e.g., substantially) irreversibly coupled (e.g., integrally coupled) to the processing chamber. In some embodiments, an interior volume of the second chamber side is larger than an interior volume of first chamber side. For example, the processing chamber may be larger than the ancillary chamber. The second chamber side can be configured to house a material (e.g., pre-transformed material (e.g., powder)) and/or one or more 3D objects (e.g., during one or more printing operations for forming the one or more 3D objects). The first chamber side can be configured to house one or more apparatuses (also referred to as device(s)) used in the one or more printing operations. In some embodiments, the one or more apparatuses includes a layer forming device. The layer forming device can be used to dispense (e.g., project, or stream) pre-transformed material towards a platform. The layer forming device can be used to form one or more layers of material (e.g., of pre-transformed material). In some embodiments, the one or more layers of material are part of a material bed formed within the second chamber side. The 3D printing system can optionally include a partition (also referred to as a first partition) (e.g., 3106). In some embodiments, the first partition separates a first atmosphere in the first chamber side from a second atmosphere in the second chamber side. In some embodiments, the first atmosphere is different than the second atmosphere. In some embodiments, the first atmosphere is the same as the second atmosphere. The first partition can include one or more openings (also referred to as window(s), door(s), hole(s), aperture(s)) that are configured to allow the one or more apparatuses to transit between the first and second chamber sides, e.g., through the one or more openings. For example, the one or more apparatuses can be positioned within the second chamber side during the one or more processes (e.g., layer forming processes), and transition to the first chamber side after the one or more processes are complete. For example, the one or more apparatuses can be positioned within the second chamber side when the energy beam(s) is idle (e.g., shut), and transition to the first chamber side when the energy beam(s) is operational. At times, a plurality of energy beams may facilitate formation of one or more 3D objects. The one or more apparatuses can remain within the first chamber side during another one or more processes (e.g., transformation operations (e.g., energy beam operations)). In some embodiments, the one or more openings of the first partition allow a first atmosphere within the first chamber side to mix with a second atmosphere in the second chamber side (e.g., the one or more openings is not sealed). In some embodiments, the one or more openings of the first partition are sealed (e.g., using one or more seals). The seal(s) may isolate the first atmosphere from (i) the second atmosphere, (ii) pre-transformed material, and/or (iii) products of a 3D printing process, during one or more printing operations. The products of a 3D printing process may comprise debris, or plasma. The debris may comprise pre-transformed material, transforming material, or transformed material. In some embodiments, the one or more openings of the first partition can be sealed during some operations, and unsealed during other operations. The operations may be associated with the printing. The first chamber side can optionally be reversibly coupled or (e.g., substantially) irreversibly coupled (e.g., integrally coupled) with a shaft system (e.g., 3108). The shaft system can include one or more shafts and/or one or more channels, e.g., as described herein. In some embodiments, the one or more shafts and/or channels can facilitate movement (e.g., translation) of the one or more apparatuses and/or provide vacuum and/or gas pressure to the one or apparatuses, e.g., as described herein. An optional partition (also referred to as a second partition or shaft partition) (e.g., 3110) can separate the first chamber side from the shaft system. In some embodiments, the second partition separates the first atmosphere in the first chamber side from a third atmosphere in the shaft system. In some embodiments, the first atmosphere is different than the third atmosphere. In some embodiments, the first atmosphere is the same as the third atmosphere. In some embodiments, the third atmosphere is an ambient atmosphere. The second partition can include one or more openings (also referred to as window(s), door(s), hole(s), aperture(s)) that are configured to allow the one or more shafts and/or channels to pass therethrough. In some embodiments, the shaft system can be configured to house one or more control devices (e.g., actuators and/or motors) that control operation of the one or more shafts and/or channels. The one or more control devices (e.g., actuator) can be disposed external or internal to the enclosure. The one or more control devices (e.g., actuator) can be disposed external to the first and/or second chamber side portion. The one or more control devices (e.g., actuator) can be disposed in the first and/or second chamber side portion. The one or more control devices (e.g., actuator) can be disposed external to the processing chamber (e.g., enclosure that encloses a 3D object during printing). In some embodiments, the one or more control devices (e.g., actuators or motors) control movement (e.g., translation) of the one or more apparatuses in the processing chamber. The one or more control devices (e.g., actuator) can be disposed external to the ancillary chamber (e.g., enclosure that encloses a 3D object during printing). In some embodiments, the one or more control devices (e.g., actuators or motors) control movement (e.g., translation) of the one or more apparatuses in the ancillary chamber. In some embodiments, the one or more actuators are used to control movement of the one or more apparatuses (e.g., layer forming device) housed within the first chamber side. In some embodiments, the second partition includes one or more openings (also referred to as partition holes, shaft holes, or channel holes). In some embodiments, the one or more openings within the second partition are sealed (e.g., to reduce an amount of (e.g., prevent) material (e.g., pre-transformed material) from reaching the one or more control devices (e.g., actuators or motors) within the shaft system. In some embodiments, the first chamber side portion engages with the second chamber side portion to form the enclosure. For example, the processing chamber can engage with the ancillary chamber to form the enclosure. In some embodiments, the first chamber side portion disengages with the second chamber side portion. For example, the processing chamber can disengage from the ancillary chamber to form the enclosure. The first and/or second opening my close prior to a disengagement of the first chamber side portion from the first chamber side portion. Closure of the first and/or second openings may facilitate maintaining an inert atmosphere in the first chamber side portion and/or second chamber side portion, e.g., upon disengagement. Closure of the first and/or second openings may facilitate continuation of a printing operation one chamber side portion while the second side portion is being removed. The removal may be for replacement (e.g., by another chamber side portion), maintenance, repair, replenishment, or any combination thereof. For example, the processing chamber opening can close prior to disengagement from the ancillary chamber (e.g., to maintain its atmosphere and/or continue the printing process). For example, the ancillary chamber opening can close prior to disengagement from the processing chamber (e.g., to maintain its atmosphere). For example, the ancillary chamber can disengage in order to be replaced by another ancillary chamber, to maintain one of its components, or to replace one of its components. Maintain comprises fix, upgrade, adjust, or any combination thereof. Closure of at least the processing chamber opening, may facilitate performing one or more operations relating to the ancillary chamber, e.g., during the printing and/or without disturbing the printing.

Figure 18A:
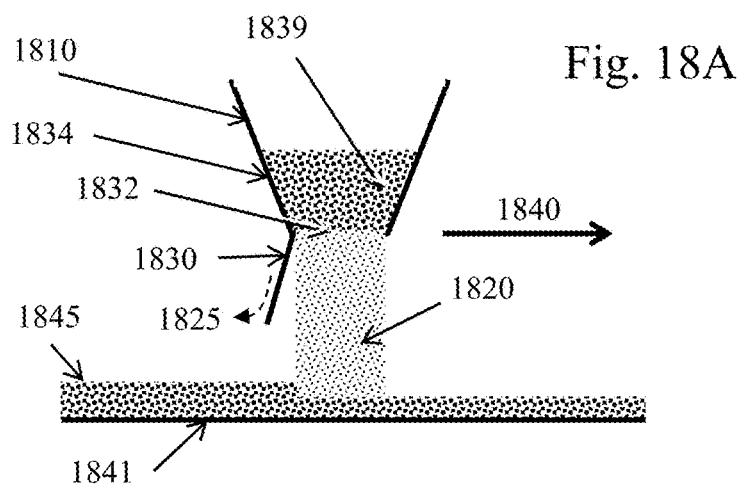
FIGS. 18A-18C schematically illustrate various side views of a component of a 3D printing system.
Figure 18B:
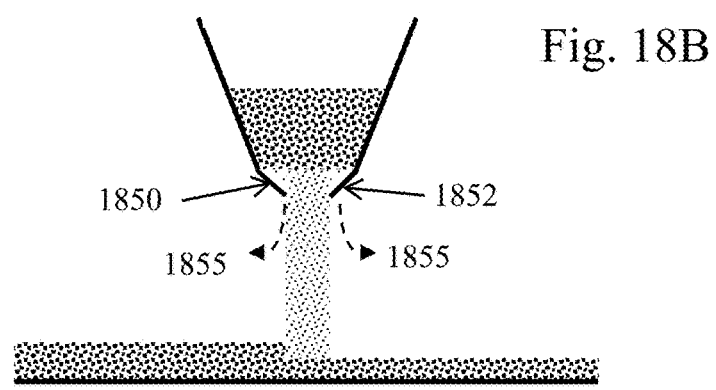
Figure 18C:
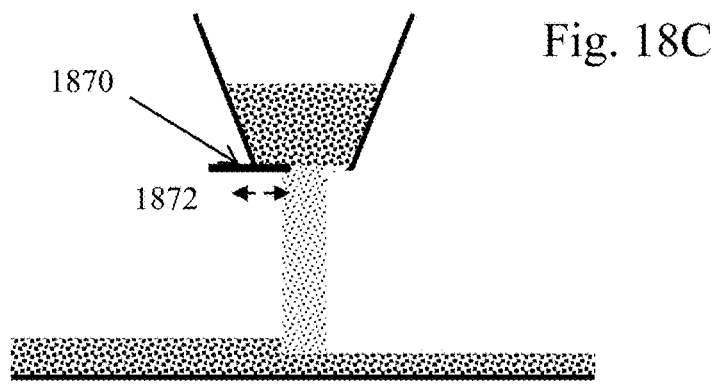

In some embodiments, the layer dispensing mechanism includes components comprising a material dispensing mechanism, material leveling mechanism, material removal mechanism, or any combination or permutation thereof. In some configurations, the material dispensing mechanism may comprise a material dispenser. The material dispenser may be operatively coupled to a mechanism that causes at least a portion of the pre-transformed material within the material dispenser to vibrate (also referred to herein as a "vibration mechanism"). Vibrate may comprise pulsate, throb, resonate, shiver, tremble, flutter or shake. For example, the vibration mechanism may cause one or more sides of the internal reservoir of the material dispenser to vibrate. For example, the vibration mechanism may cause at least a portion of the exit opening of the material dispenser to vibrate. For example, the vibration mechanism may cause one or more components of the material dispenser to vibrate. For example, the vibration mechanism may cause the material dispenser to vibrate. The vibration mechanism may be any vibration mechanism described herein. The material dispenser may comprise a container (e.g., an internal reservoir of pre-transformed material). The pre-transformed material may reside within the container. The container may have a uniform or a non-uniform shape. The container may comprise at least one portion of a wall that is slanted towards an exit opening port. The slanted portion may facilitate flow of material through the exit opening port (e.g., during the dispensing the pre-transformed material). The container may comprise an internal cavity. The internal cavity may facilitate directional flow of the material. The container may comprise an exit opening. The exit opening may be on a bottom surface, and/or at a wall surface of the container. The wall may be a side wall. The exit opening may facilitate (e.g., allow) dispensing of pre-transformed material towards the platform and/or gravitational center. At least one wall of the container may be translatable (e.g., adjustable). The at least one wall of the container may be controlled to adjust the exit opening of the container (e.g., adjust the gap of the exit opening). For example, the lateral distance between a first wall and a second wall opposing the first wall, may be adjusted to facilitate a requested exit opening (e.g., narrow, or wide). The lateral distance between the walls of the container that form the exit opening may be at most about 0.1 millimeter (mm), 0.2 mm, 0.5 mm, 1 mm, 2 mm, 3 mm, 4 mm, 5 mm, 6 mm, 7 mm, 8 mm, 9 mm, or 10 mm. The lateral distance may be a range of distance between any of the afore-mentioned values (e.g., from about 0.1 mm to about 10 mm, from about 0.1 mm to about 1 mm, from about 1 mm to about 4 mm, from about 4 mm to about 7 mm, or from about 7 mm to about 10 mm). The container may be operatively coupled to at least one controller. The at least one controller may facilitate adjustment of the distance between a first wall and a second wall of the container. The adjustment may be done before, after or during at least a portion of the 3D printing (e.g., the entire 3D printing). For example, the adjustment may be before, after, and/or during dispensing a layer of pre-transformed material. The control may be manual and/or automatic (e.g., using a controller). The one or more walls of the container may comprise a smooth internal surface (e.g., that comes into direct contact with at least a portion of the pre-transformed material within the material dispenser). Smooth surface may be of an Ra value of at most about 3 µm, 4 µm, 5 µm, 6 µm, 7 µm, 8 µm, 9 µm, 10 µm, 30 µm, 40 µm, 50 µm, 75 µm, or 100 µm. Smooth surface may be of an Ra value that is between any of the afore-mentioned values (e.g., from about 3 µm to about 100 µm, from about 3 µm to about 40 µm, or from about 3 µm to about 10 µm). The smooth internal surface may exhibit a small, negligible, and/or insubstantial amount of friction with the pre-transformed material (e.g., relative to the intended purpose of dispensing the pre-transformed material from the exit opening port of the material dispenser). The small, negligible, and/or insubstantial amount of friction may facilitate (e.g., easy, uninterrupted, and/or continuous) dispensing of the pre-transformed material in a requested manner. The one or more smooth walls of the container may be formed by a polishing process (e.g., soda-blasting, vapor polishing, flame polishing, paste polishing, or chemical-mechanical polishing). The one or more smooth walls of the container may be formed by coating a wall with a coating (e.g., a polished material). Examples of polished material include mirror, or polished stainless steel. The coating may alter the surface properties. For example, the coating may alter the adhesion, attraction and/or repulsion of the pre-transformed material to the internal surface. For example, the coating may reduce the adhesion and/or attraction of the pre-transformed material to the internal surface. For example, the coating may cause the pre-transformed material to repel from the internal surface. The surface structure of the internal surface may comprise a low attachment surface (e.g., a Lilly pad, or shark skin type surfaces). The container may comprise an entry opening port. The entry opening may be located on a top surface of the container. Top may be in a direction opposite to the platform and/or gravitational center. The material may reside in the container until the exit opening may be opened to allow dispensing of the material. In some embodiments, the entry opening may have an area (e.g., or FLS) that is different than that of the exit opening. For example, the entry opening may have a wider opening than the exit opening. At times, the entry opening may be of (e.g., substantially) the same area (e.g., or FLS) as the exit opening. The exit opening may be operatively coupled to an opening-obstruction. Examples of an opening-obstruction include one or more sectional doors, a sliding door (e.g., FIG. 18C, 1870), a folding door, a swing-out (e.g., FIG. 18A, 1830) or a roll-up door. The opening-obstruction may be physically and/or operatively coupled at a position adjacent to the exit opening. Physically coupled may comprise a hinge and/or a motor. The position adjacent to the exit opening may comprise a position at the external surface of the material dispenser. Adjacent may be on a (e.g., external) bottom surface of the container. Adjacent may be below the exit opening. The opening obstruction may be physically and/or operatively coupled via a mechanical connector, a controlled sensor, a magnetic connector, an electro-magnetic connector, or an electrical connector. The opening obstruction may be operatively coupled to at least one controller. The controller may actuate the opening of the opening obstruction (e.g., at a requested and/or predetermined time). The controller may receive feedback from at least one sensor. The opening and/or closing of the opening obstruction may be controlled based on the feedback from the sensor. For example, a height (e.g., optical) sensor may detect the height of a dispensed layer. The controller may receive a detected height input. The controller may adjust the amount of pre-transformed material to be dispensed based on the detected height. To adjust the amount of material to be dispensed, the controller may adjust the lateral distance of the exit opening and/or the position of the opening obstruction. The detected height may be at least about 200 microns (m), 250 μm, 300 μm, 350 μm, 400 μm, 450 μm, 500 μm, 550 μm, 600 μm, 650 μm, 700 μm, 750 μm, 800 μm, 850 μm, 900 μm or 950 μm. The detected height can be between any of the afore-mentioned amounts (e.g., from about 200 μm to about 950 μm, from about 200 μm to about 500 μm, from about 500 μm to about 700 μm, or from about 700 μm to about 950 μm). At times, the material within the container may actuate (e.g., push) the opening-obstruction (e.g., to open the exit opening port and allow pre-transformed material to exit the material dispenser). An actuator may facilitate sliding, swinging-out, or rolling the opening-obstruction to facilitate dispensing of the material from the exit opening of the material dispenser. A controller may control the actuator (e.g., in real-time during at least a portion of the 3D printing). The opening-obstruction may at least partially (e.g., fully) open when dispensing the material from the exit opening (e.g., before, after, and/or during the 3D printing). The degree to which the opening-obstruction obstructs the exit opening port may be controlled (e.g., in real time during the dispensing). The degree to which the opening-obstruction obstructs the exit opening port may regulate (e.g., in real time during the dispensing) the amount of pre-transformed material that exits the material dispenser. The opening obstruction may be closed once a sufficient amount of pre-transformed material has been dispensed at a position. For example, the opening obstruction may be closed at times during a portion of a deposition cycle of a pre-transformed material layer. For example, the opening obstruction may be closed once a layer of material has been dispensed. At times, the opening obstruction may be closed when the material leveling mechanism and/or the material removal mechanism are in operation. FIGS. 18A-18C show examples of a side view of a material dispensing mechanism that comprise various opening obstructions. FIG. 18A shows an example of a material dispensing mechanism that dispenses material (e.g., 1820) to form a layer of material (e.g., 1845) on a platform (e.g., 1841). The material may comprise a pre-transformed material. The material dispensing mechanism translates in a lateral direction (e.g., 1840). The material dispensing mechanism may not be in contact with the target surface (e.g., exposed surface of a material bed). The target surface can include any suitable surface used for one or more transformation operations. In some embodiments, the target surface includes a surface at which an energy beam (e.g., laser beam, electron beam, and/or ion beam) is directed. For example, the target surface can correspond to an exposed surface of a material bed used in a selective sintering operation. In some embodiments, the target surface includes surfaces of a pre-transformed material that is not in a material bed. The layer dispensing mechanism (e.g., comprising the material dispensing mechanism) may translate in a parallel manner (e.g., in a direction that is (e.g., substantially) parallel) with respect to the platform (e.g., a surface (e.g., top surface) of the platform (e.g., base)), e.g., as it translates laterally. The layer dispensing mechanism may translate in a manner that deviates from being parallel with respect to the platform. For example, the layer dispensing mechanism may approach the platform, e.g., as it travels laterally. For example, the layer dispensing mechanism may sag towards the platform, e.g., as it translates laterally. The dispensed layer of material may form a material bed above the platform (e.g., base). The material dispensing mechanism comprises a container (e.g., having a side wall 1810) that contains the pre-transformed material (e.g., 1839). The material dispensing mechanism may further comprise an opening-obstruction (e.g., 1830). The opening-obstruction may swing-out (e.g., 1825) to allow material dispensing from the container through the exit opening (e.g., 1832). The swinging-out may be about a rotational axis (e.g., using a hinge). The opening-obstruction may swivel. The opening obstruction may be physically coupled to an edge of a wall of the container (e.g., 1834) and the exit opening. FIG. 18B shows an example of a material dispensing mechanism that comprises multiple opening obstructions (e.g., 1850, and 1852). At least one of the plurality of opening obstructions may swing out (e.g., 1855) to allow dispensing of material from the exit opening. At least two of the plurality of opening obstructions may be synchronized. At least two of the plurality of opening obstructions may not be synchronized. Synchronized may be according to the timing and/or magnitude of their respective opening. At least two of the opening-obstructions may be operatively coupled to the same controller. At least two of the opening-obstructions may be operatively coupled to different controllers. The opening obstructions may be independently controlled. For example, a first opening obstruction (e.g., 1850) may swing out to dispense material while the second opening obstruction (e.g., 1852) may be closed. FIG. 18C shows an example of a material dispensing mechanism that comprises a sliding opening obstruction (e.g., 1872). The opening obstruction may slide in a lateral direction (e.g., along the X-axis, 1872). The opening-obstruction may be controlled. Controlling may include sliding the opening obstruction at least in part, such that at least a portion of the exit opening allows dispensing of the pre-transformed material (e.g., while a portion of the exit opening remains closed). The amount of pre-transformed material dispensed may be controlled by controlling the opening (e.g., sliding) of the opening obstruction. Examples of layer dispensing mechanisms (e.g., layer forming device), their components, and associated methods, software, systems, devices, and apparatuses, can be found in PCT/US15/36802 or in U.S. Ser. No. 15/374, 535, each of which is entirely incorporated herein by reference.

In some embodiments, the 3D printer comprises at least one ancillary chamber. The ancillary chamber may be an integral part of the processing chamber. At times, the ancillary chamber may be separate (e.g., separable) from the processing chamber. The ancillary chamber may be mounted to the processing chamber (e.g., before, after, or during the 3D printing). The mounting may be reversible mounting. The mounting may be controlled (e.g., manually or by a controller). The atmosphere of the ancillary and processing chamber may be (e.g., substantially) the same atmosphere (e.g., during a printing operation). At times, the atmosphere of the ancillary chamber and the processing chamber may differ (e.g., during a printing operation). The atmosphere of the ancillary chamber may be an inert atmosphere (e.g., during a printing operation). The atmosphere in the ancillary chamber may be deficient by one or more reactive species (e.g., water and/or oxygen) (e.g., during a printing operation). The ancillary chamber may be a garage. The garage may be used to house (e.g., park) one or more components of the 3D printer. The component may be a layer dispensing mechanism. The layer forming device may be in a parked mode when the layer dispensing mechanism (or a portion thereof) is within the ancillary chamber and is not forming (e.g., dispensing, removing and/or shaping) a layer of material (e.g., pre-transformed material). The layer forming device may be in a parked mode when it is (e.g., substantially) stationary (e.g., not translating and/or vibrating). The layer forming device may be in a layer forming mode when the layer forming device is and is forming (e.g., dispensing, removing and/or shaping) a layer of material (e.g., pre-transformed material) (e.g., in the processing chamber). One or more controllers can be configured a mode of the layer forming device (e.g., layer forming and/or parked mode). The ancillary chamber (e.g., FIG. 11, 1105) may be coupled to one of the side walls of the processing chamber (e.g., FIG. 11, 1180). In some embodiments, the ancillary chamber may be incorporated in the processing chamber. The processing chamber may be similar to the one described herein (e.g., FIG. 1, 126, FIG. 2, 216). At times, the ancillary chamber may be a part of the processing chamber (e.g., FIG. 2, 216). At times, the ancillary chamber may be coupled to the processing chamber. At times, the ancillary chamber may be coupled to one of the side walls of the processing chamber. The ancillary chamber may be mounted to the processing chamber. The mounting may be reversible mounting. The mounting may be controlled (e.g., manually or by a controller). The atmosphere of the ancillary chamber and processing chamber may be (e.g., substantially) the same atmosphere. At times, the atmosphere of the ancillary chamber and the processing chamber may differ.

Figure 11:
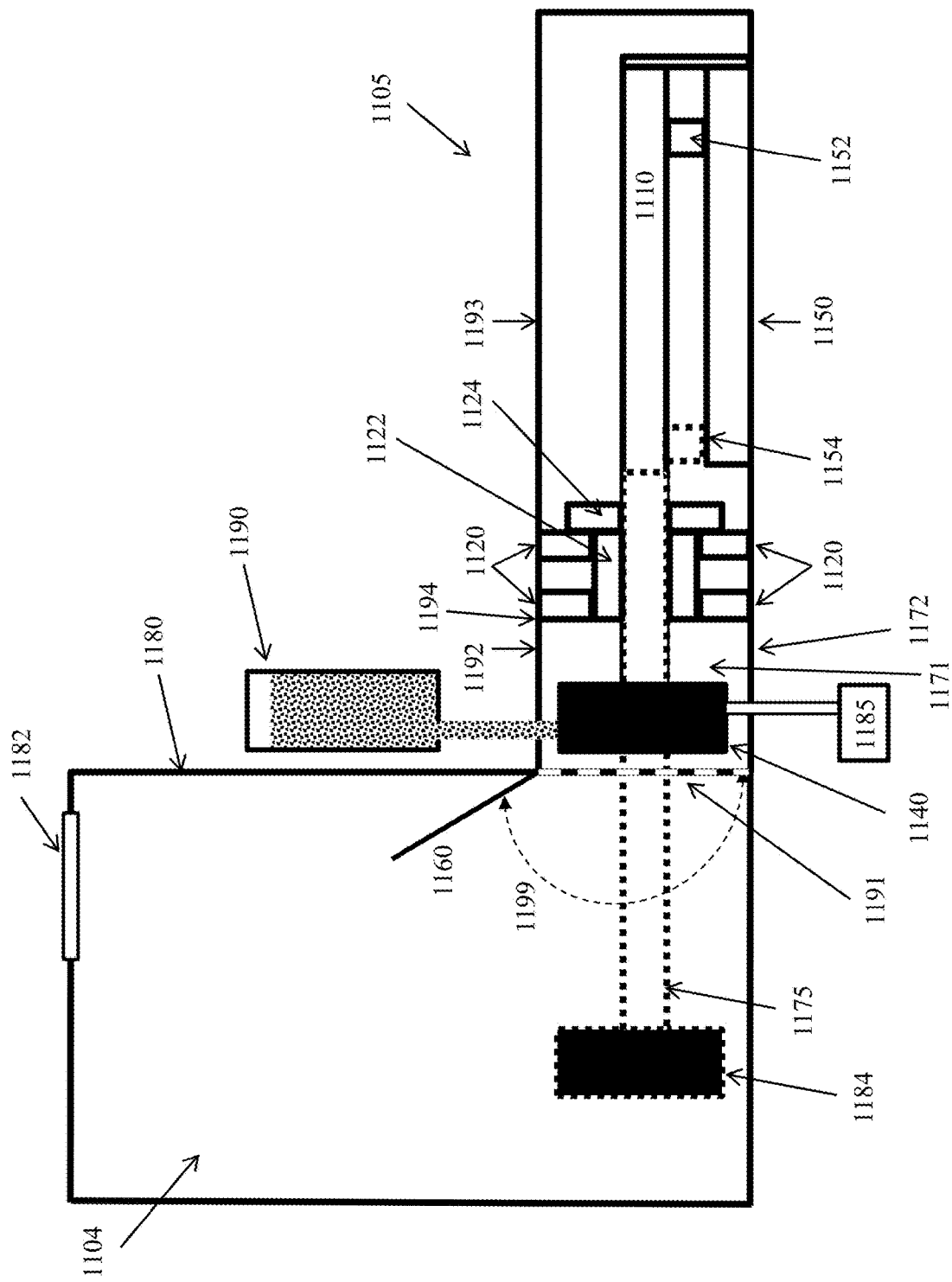
FIG. 11 schematically illustrates a side view of a 3D printing system and its components.
Figure 12:
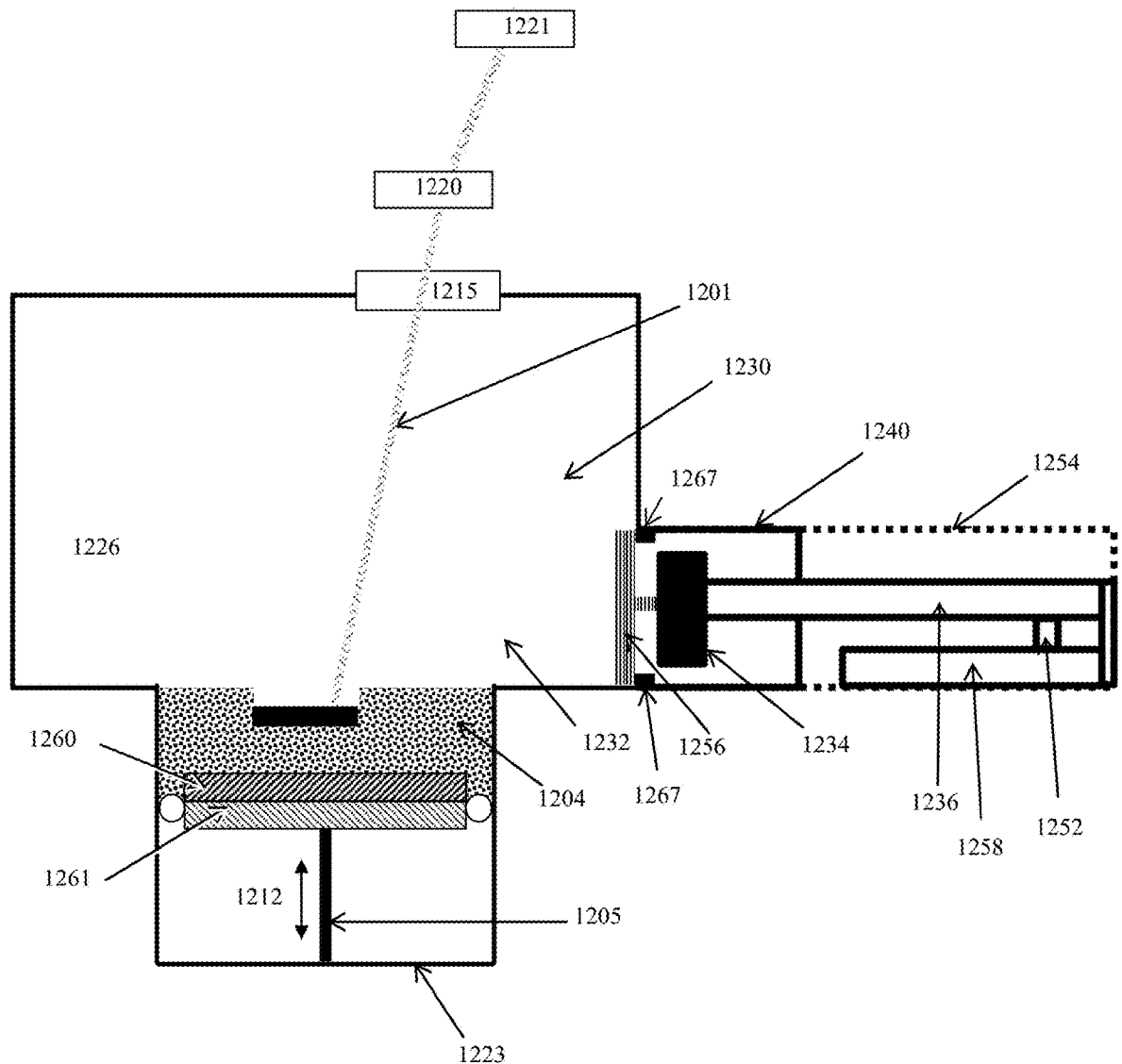
FIG. 12 schematically illustrates a side view of a 3D printing system and its components.
Figure 13:
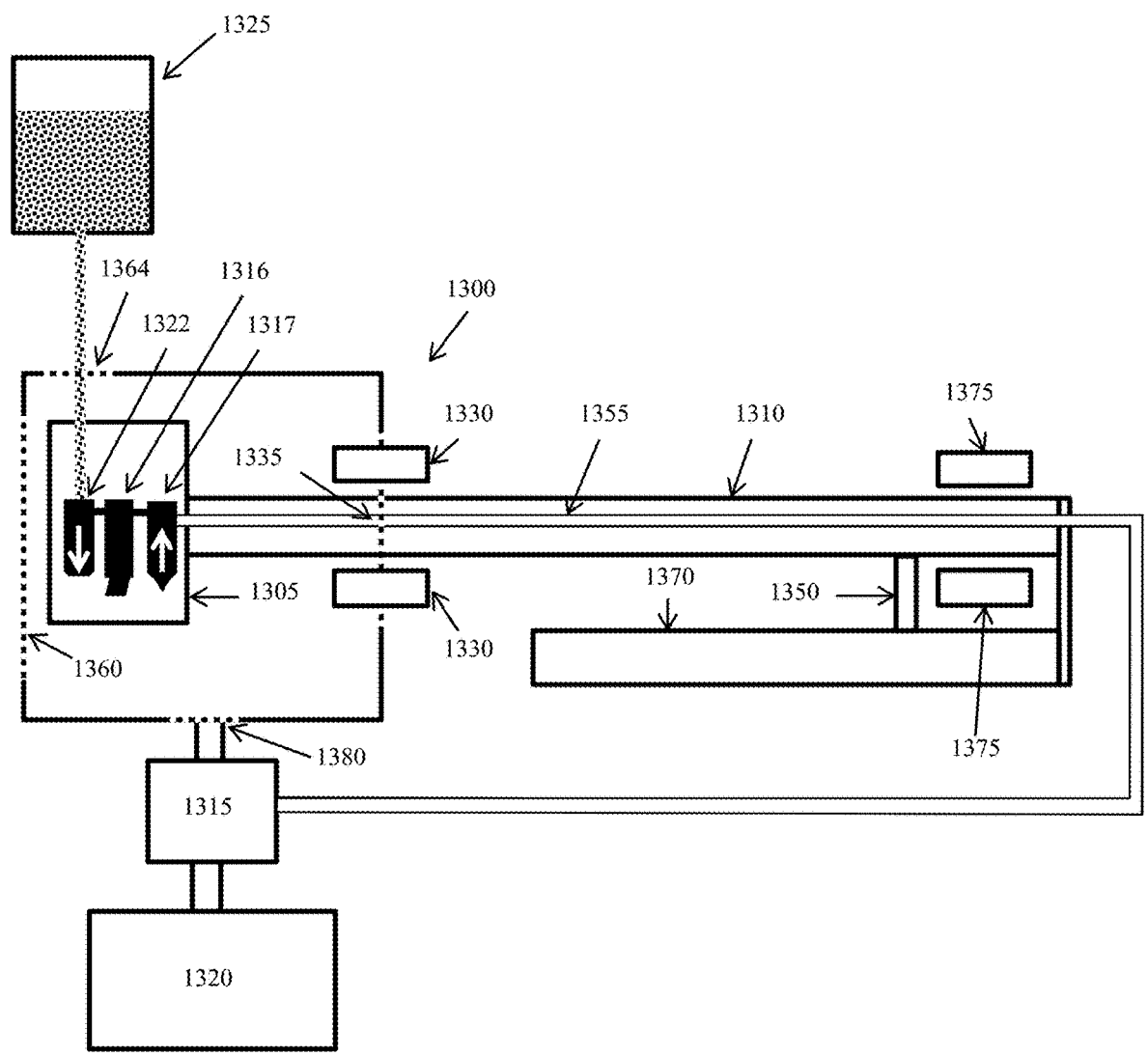
FIG. 13 schematically illustrates a side view of components in a 3D printing system.

In some embodiments, the layer dispensing mechanism is coupled to one or more shafts (e.g., a rod, a pole, a bar, a cylinder, one or more spherical bearings coupled at a predetermined distance) (e.g., FIG. 11, 1110, FIG. 13, 1310, FIG. 12, 1236). The shaft may comprise a vertical (e.g., small) cross section of a circle, triangle, square, pentagon, hexagon, octagon, or any other polygon. The vertical cross section may be of an amorphous shape. The one or more shafts may be movable. For example, the shaft may be movable to and from the ancillary chamber (e.g., before, during, and/or after the 3D printing). For example, the shaft may be movable from the ancillary chamber to the processing chamber (e.g., for deposition of a layer of material). For example, the shaft may be movable from the processing chamber to the ancillary chamber (e.g., in preparation for transforming at least a portion of the material bed). FIG. 13 shows an example of a shaft, 1310. At times, at least a portion of the shaft may reside within the ancillary chamber (e.g., FIG. 11, 1110). At times, at least a portion of the shaft may reside out of the ancillary chamber (e.g., FIG. 11, 1175). The atmosphere of the portion of the shaft residing within the ancillary chamber may be (e.g., substantially) the same atmosphere as the atmosphere of the ancillary chamber. The atmosphere of the ancillary chamber may be an inert atmosphere. The atmosphere in the ancillary chamber may be deficient by one or more reactive species (e.g., water and/or oxygen). The atmosphere of the portion of the shaft residing out of the ancillary chamber may differ from the atmosphere of the ancillary chamber. The atmosphere of the portion of the shaft residing out of the ancillary chamber may not be an inert atmosphere. The atmosphere of the portion of the shaft residing out of the ancillary chamber may be open to one or more reactive species (e.g., water and/or oxygen). The ancillary chamber may accommodate at least a portion of the shaft. FIG. 11 shows an example where the ancillary chamber 1105 accommodates the entire shaft 1110. FIG. 12 shows an example where the ancillary chamber (e.g., FIG. 12, 1240) accommodates a portion of the shaft (e.g., 1236). FIG. 13 shows an example of components of an ancillary chamber (e.g., 1300) including one or more shafts (e.g., 1310). The one or more shafts may comprise a conveying system. The one or more shafts may comprise a retracting system. The shaft may be (e.g., operatively) coupled to the layer dispensing mechanism (layer forming device) (e.g., FIG. 13, 1305). Coupled may be physically attached to one of the components of the layer dispensing mechanism (also referred to herein as "material handling device", "layer forming device" "layer dispensing system"). The attachment may be physical, magnetic, electrical, or any combination thereof. Coupled may comprise positional (e.g., optical) sensors to one or more components of the layer dispensing mechanism. The shaft may assist in moving the layer dispensing mechanism from the ancillary chamber to a position adjacent to the material bed. The position adjacent to the material bed may be within the processing chamber. The position adjacent to the material bed may be within the build module. The shaft may comprise an internal cavity. The internal cavity may be a channel. For example, the shaft may comprise one or more channels (e.g., FIG. 13, 1355). In some embodiments, at least one of the one or more channels is operationally coupled to one or more components of the layer forming device (e.g., FIG. 13, 1305) and/or the recycling system (e.g., FIG. 13, 1315). For example, at least one of the one or more channels can be configured to transit material (e.g., excess pre-transformed material) from the layer forming device to the recycling system. A portion of the one or more channels (e.g., 1355) may be enclosed within the shaft (e.g., 1310). A portion of the one or more channels may be external to the shaft (e.g., 1310). The external portion of the shaft may be coupled to a reduced pressure (e.g. vacuum) system (e.g., FIG. 13, 1320). The reduce pressure system may comprise a pump (e.g., as disclosed herein). The one or more channels may comprise a transit system. The vacuum system may insert positive pressure through the channel to transit pre-transformed material. The vacuum system may insert negative pressure through the channel to remove pre-transformed material from the ancillary chamber. The vacuum system may insert negative pressure through the channel to remove pre-transformed material from the layer dispensing mechanism. The vacuum system may insert negative pressure through the channel to remove pre-transformed material from the shaft. The vacuum system may transit the collected pre-transformed material to a recycling system (e.g., FIG. 13, 1315, FIG. 11, 1185). The recycling system may recycle a collected pre-transformed material back to the layer dispensing mechanism (e.g., the pre-transformed material may be transferred manually to the bulk reservoir 1325). At times, the transfer of pre-transformed material (e.g., conveying) back to the layer dispensing mechanism may be automated and/or controlled. Controlling may be performed before, after, and/or during the 3D printing. The recycling system may comprise a sieve. The recycling system may comprise a material re-conditioning system. The material re-conditioning system may recondition (e.g., remove any reactive species such as oxygen, water, etc.) the collected pre-transformed material. The reconditioned material may be recycled and used in the 3D printing. Recycling may comprise transporting the material to the layer dispensing mechanism. The recycling may be continuous during the 3D printing. For example, the recycling may be continuous during the time at which the layer dispensing mechanism is parked in the garage.

The number and configuration of shafts and channels can vary. For example, the system (e.g., printing system) can include at least one shaft. At least one channel can be within (e.g., on) the at least one shaft. In some embodiments, a first channel is in a first shaft, and a second channel is in a second shaft. The first channel can configure to guide the material to the layer forming device (e.g., at least one component thereof). The second channel can be configured to guide the material from the layer forming device. The first and/or second channels can be configured to guide the material to the layer forming device (e.g., at least one component thereof). The first and/or second channels are configured to guide the material from the layer forming device (e.g., at least one component thereof). The apparatus can include at least two channels within (e.g., on) a shaft (e.g., a single shaft). A first channel can be configured to guide the material to the layer forming device (e.g., at least one component thereof). A second channel can be configured to guide the material from the layer forming device (e.g., at least one component thereof).

In some examples, the shaft is (e.g., operatively) coupled to an actuator (e.g., FIG. 13, 1350, FIG. 11, 1152, FIG. 12, 1252). The actuator may move the shaft. The actuator may comprise a linear actuator. The shaft may be (e.g., operatively) coupled to a (e.g., linear) encoder. The actuator may be coupled to a mechanism (e.g., layer forming device) through at least one shaft. The at least one shaft can include at least one channel configured to transport a (e.g., pre-transformed) material therethrough. The actuator can translate the mechanism by translating the at least one shaft. The at least one shaft can be operatively coupled to (e.g., can include) at least one bellow. The at least one shaft can be operatively coupled to an opening in a wall of the enclosure (e.g., processing chamber). The opening can include a seal. The actuator may move the shaft to convey the coupled layer dispensing mechanism adjacent to the build module. The actuator may move the shaft to retract the coupled layer dispensing mechanism (layer forming device) into the ancillary chamber. The layer forming device (or a portion thereof) can be removably housed within the ancillary chamber. For example, the layer forming device (or a portion thereof) can be housed within the ancillary chamber when the layer forming device is not being used to form a layer of material (e.g., within the processing chamber). Examples of an actuator include a linear motor, pneumatic motors, electric motors, solar motors, hydraulic motors, thermal motors, magnetic motors, or mechanical motors. The actuator may reside on a stage (e.g., FIG. 13, 1370, FIG. 11, 1150, FIG. 12, 1258). The stage may be stationary. The stage may be movable (e.g., before, after, and/or during the 3D printing). The stage may comprise a rail system. The stage may allow smooth movement of the shaft. The shaft may be coupled to one or more bearings. The bearing may be a machine element that constrains relative motion to a requested motion. The bearing may be a machine element that reduces friction between moving components. For example, the bearing may allow a smooth movement of the shaft. The bearing may comprise elements that physically contact the shaft. For example, the bearing (e.g., ball bearing) may comprise balls that contact the shaft in one or more points. The bearing may not contact the shaft (e.g., gas bearing, or magnetic bearing).

In some embodiments, the ancillary chamber is separable from the processing chamber. For example, the ancillary chamber (e.g., FIG. 13, 1300) can includes one or more doors (e.g., 1360, 1380, 1335, or 1364) (also referred to as port(s), opening(s), or aperture(s)) that may be sealable (e.g., include one or more seals). On closure, the one or more sealable doors can isolate an atmosphere within the ancillary chamber (e.g., load lock). When open, the one or more sealable doors can provide access to chambers, channels, or systems. For example, one or more sealable doors (e.g., 1360) can provide access to a processing chamber. The one or more sealable doors may allow a layer dispensing device (e.g., 1305) to travel therethrough, e.g., between the ancillary chamber and adjacent processing chamber. The one or more sealable doors (e.g., 1380) can provide access to a recycling system (e.g., 1315) (e.g., via one or more connectors (e.g., tubes)). The one or more sealable doors (e.g., 1380) to the recycling system can be part of a funnel portion, e.g., as described herein. The one or more sealable doors (e.g., 1364) can provide access to a bulk reservoir (e.g., 1325) (e.g., which can supply (e.g., pre-transformed) material to the layer forming device). The one or more sealable doors can include any suitable sealing mechanisms (e.g., valve(s) (e.g., gate valve(s)), seals, or O-rings). In some embodiments, one or more coupling members can be used to couple the ancillary chamber to the processing chamber.

The processing chamber may include a sealable door for isolating an atmosphere therein (e.g., and a load lock). In some embodiments, both the processing chamber and the ancillary chamber include sealable doors (e.g., comprising and/or forming a load lock). In some embodiments, one or more coupling members can be used to removably couple the ancillary chamber to the processing chamber. In some embodiments, the coupling members include the one or more seals. Any suitable coupling members and/or seals can be used (e.g., plate(s), fastener(s), clamp(s), bolt(s), latch (es)). In some embodiments, the ancillary chamber includes a door (e.g., 1380) (also referred to as port(s), opening(s), or aperture(s)) that provide access to the recycling system (e.g., 1315).

Figure 17:
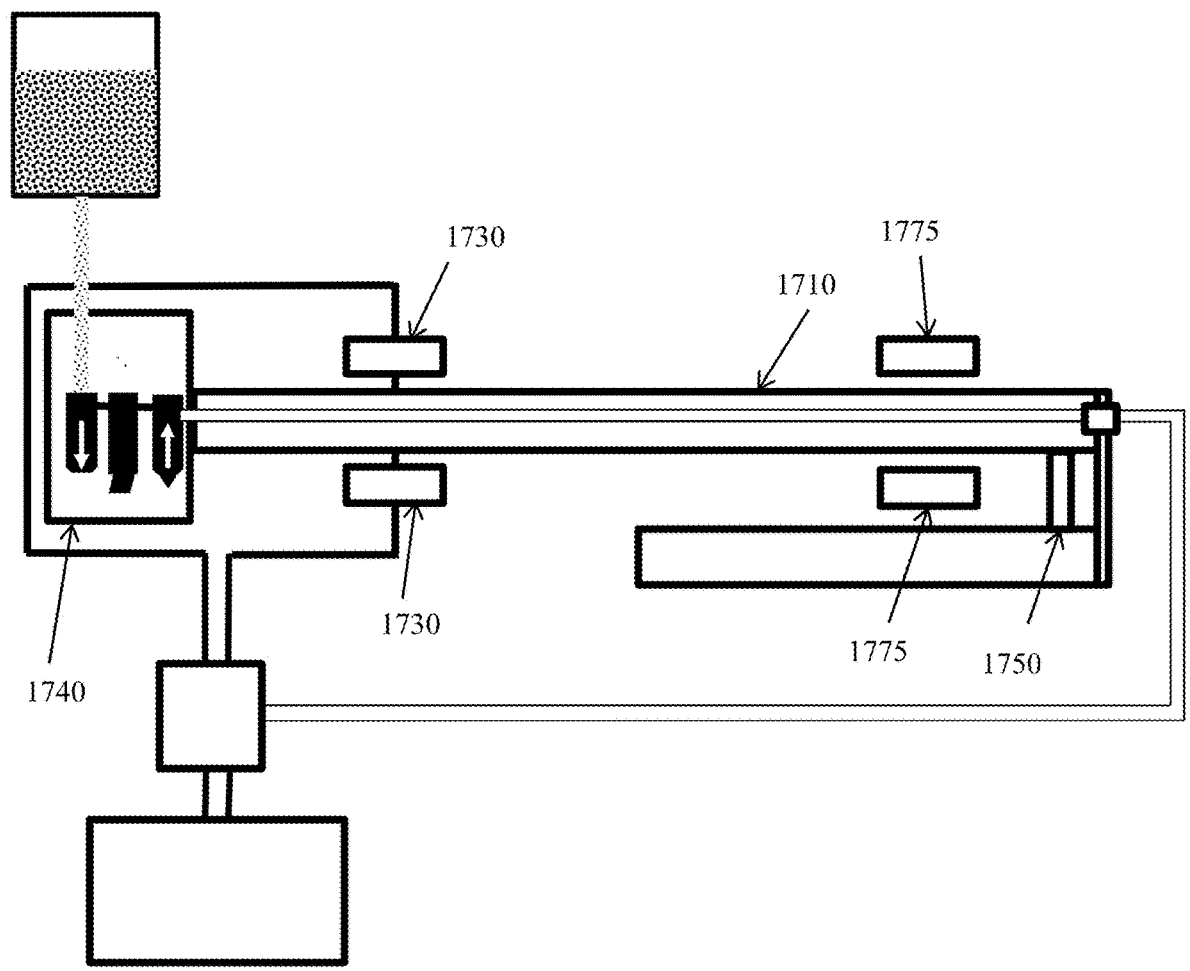
FIG. 17 schematically illustrates a side view of various components of a 3D printing system.

FIG. 11 shows an example of a (front) bearing 1122. The (front) bearings may be coupled to a (e.g., side) of a wall of the enclosure (e.g., ancillary chamber) via one or more supports 1120. FIG. 13 shows an example of front bearings 1330 and rear bearings 1375. FIG. 17 shows an example of front bearings 1730 and rear bearings 1775. The bearings may be stationary (e.g., FIG. 13, 1330, 1375, FIG. 11, 1122). The bearings may be movable (e.g., FIG. 17, 1775). The movable bearing may be coupled to the movement of the shaft (e.g., 1710). The bearings may be disposed adjacent to the actuator (e.g., 1750). Adjacent may be between the actuator and the layer dispensing mechanism (e.g., as shown in the example of FIG. 17, bearings 1775). Adjacent may be a position after the actuator (e.g., as shown in the example of FIG. 13, bearings 1375), such that the actuator is disposed between the bearing and the layer dispensing mechanism (e.g., as shown in the example of FIG. 13, bearings 1330). The bearings may facilitate a directional path for the shaft. The movable rear bearings may facilitate (e.g., a directional) movement of the shaft.

In some embodiments, the stage (e.g., 1370) optionally comprises a stopper. The stopper may be a bearing, a valve, a plug, a pop-up stopper, a trip lever, or a plunger style stopper. The stopper may control the movable distance of the shaft (e.g., maximum, and/or minimum movement span).

In some embodiments, the ancillary chamber comprises a vibration mechanism. The vibration mechanism may include a motor. The motor may be any motor described herein. The motor may be a motor that exhibits linear motion. The motor exhibiting the linear motion may comprise a linear motor, a rotary motor (e.g., coupled to a conveyor or an escalator), an absolute encoder with motor, an incremental encoder with motor, or a stepper motor. The motor may comprise an electric motor, or a pneumatic motor. The motor may comprise an electro-mechanical motor. The vibration mechanism may include a mechanism that exhibits linear motion (e.g., a drive mechanism). The vibration mechanism may comprise a shaft coupled to (i) a lead screw (e.g., with a nut coupled to the shaft), a (ii) timing belt (e.g., coupled to one or more electric motors), a (iii) a rack and pinion, or (iv) any combination thereof. The lead screw may comprise a nut. The nut may be coupled to a shaft or guide rod. The interior of the shaft may be hollow. The interior of the shaft may comprise one or more cavities. The interior of the shaft may allow a pre-transformed material and/or a gas to flow through the one or more shaft cavities. The shaft may comprise a guiding rod. A turning of the lead screws and/or nut may allow the shaft (or guiding rod) to travel (e.g., in a lateral direction). The lead screw can be coupled to at least one actuator (e.g., a motor). The timing belt may be a toothed belt (i.e., a drive belt with teeth on the inside surface). The timing belt may be coupled to one or more motors (e.g., electrical motors), on the inside surface. The one or more motors may rotate the timing belt. A component may be operatively coupled to the timing belt. The rotation of the timing belt may allow the component to travel in a lateral direction. At times, the component may be coupled to a gear (e.g., a pinion) of a rack and pinion. The rack may comprise a linear bar with teeth on its surface. The gear may be coupled to an actuator (e.g., an electrical motor). The gear may engage with the teeth on the rack, and a rotational motion may be performed. The rotational motion may allow the gear and a component coupled to the gear to travel (e.g., in a lateral direction). At times, optionally, a vibration mechanism may be coupled to at least one component (e.g., material dispenser and/or material leveling mechanism) of the layer dispensing mechanism. For example, a vibration mechanism (e.g., a rotary encoder) may be connected to a (e.g., side of a) material dispensing mechanism. A vibration mechanism may be connected to a (e.g., side of a) material levelling mechanism. At times, at least two components (e.g., the material dispensing mechanism and the material levelling mechanism) of the layer dispensing mechanism may be connected to the same vibration mechanism. At times, at least two components of the layer dispensing mechanism may be connected to a different vibration mechanism. At times, at least two components of the layer dispensing mechanism may be vibrated simultaneously. At times, at least two components of the layer dispensing mechanism may be vibrated independent of each other. At times, the operation of at least two components of the layer dispensing mechanism may be affected by the same vibration mechanism. At times, the operation of at least two components of the layer dispensing mechanism may be affected by different vibration mechanism (e.g., respectively). The vibration mechanism may affect a single component of the layer dispensing mechanism (e.g., during its operation). For example, the material levelling mechanism and the material removal mechanism may be paused and/or shut off, when the material dispensing mechanism is operational and/or vibrating. The vibration mechanism may affect the operation of at least two components of the layer dispensing mechanism. For example, the material removal mechanism may be paused and/or shut off, when the material dispensing mechanism and the material levelling mechanism are operational and/or vibrating.

In some embodiments, the one or more components of the layer dispensing mechanism are arranged in a specific configuration. The configuration may include coupling the one or more components to at least one shaft. The configuration may include translating the one or more components (e.g., by translating the shaft). The translation may be to the processing chamber from the ancillary chamber, or from the processing chamber to the ancillary chamber. The shaft (e.g., and the one or more components of the layer dispensing mechanism) may translate (e.g., laterally) on a trajectory. The trajectory may run parallel to the target surface and/or platform. The trajectory may run from one side of the platform to the opposite side of the platform and/or exposed surface of the material bed. The trajectory may run from one side of the material bed to an opposite side of the material bed. The shaft may translate in a direction towards the processing chamber. The shaft may translate in a direction towards the ancillary chamber.

Figure 19A:
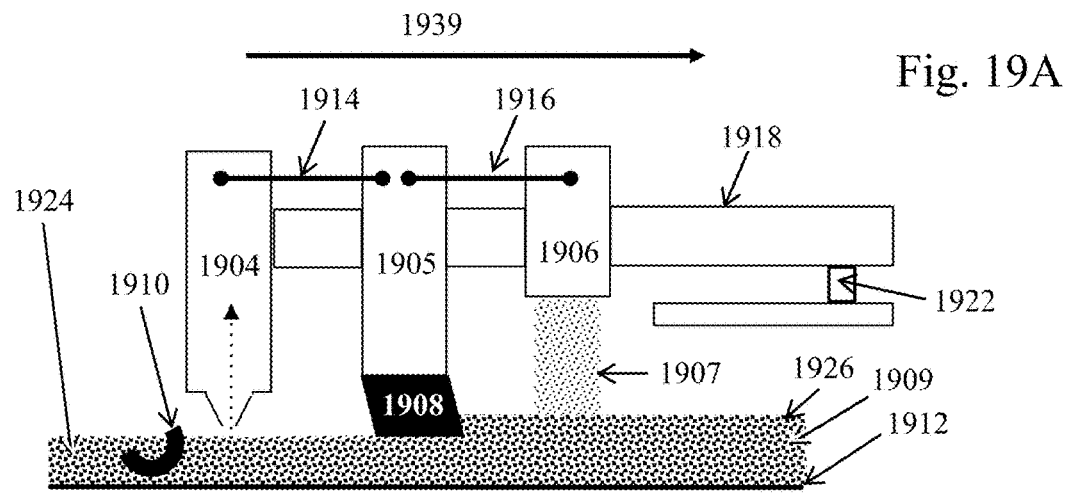
FIGS. 19A-19C schematically illustrates a side view of a component in various configurations, of a 3D printing system.
Figure 19B:
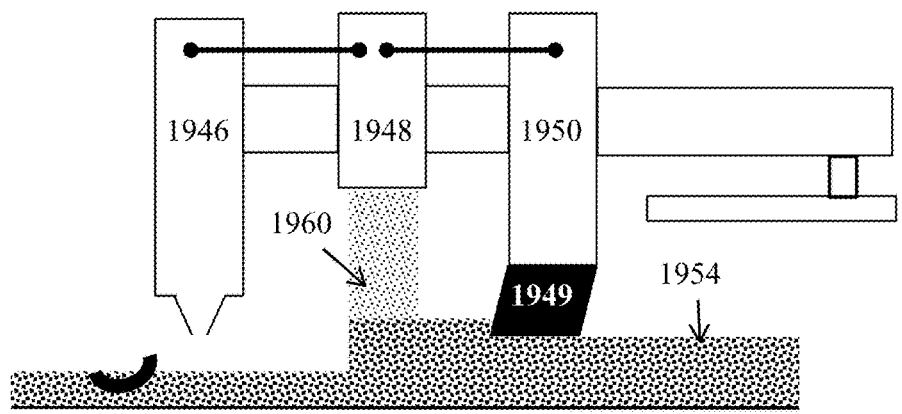
Figure 19C:
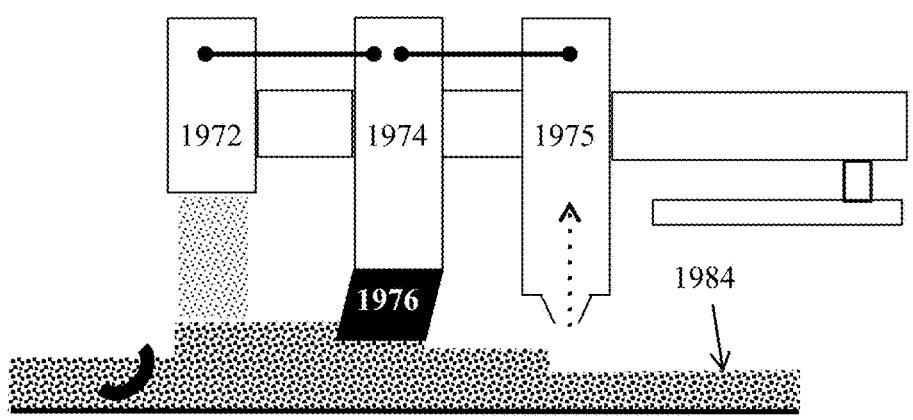

One or more components of the layer dispensing mechanism may be (e.g., selectively, and/or controllably) operational during translation. The configuration may comprise (i) a material dispensing mechanism, (ii) a material levelling mechanism, or (iii) a material removal mechanism, at any combination or permutation thereof. For example, the configuration may comprise placing (i) a material dispensing mechanism at a first position on the shaft, coupled to (e.g., followed by) (ii) a material levelling mechanism, coupled to (e.g., followed by) (iii) a material removal mechanism. At times, the configuration may include placing a material dispensing mechanism between the material removal mechanism and the material levelling mechanism. At times, the configuration may comprise placing (i) a material removal mechanism at the first position on the shaft, coupled to (e.g., followed by) (ii) a material levelling mechanism that may be further coupled to (e.g., followed by) (iii) a material dispensing mechanism. FIGS. 19A-19C show examples of various configurations of arranging the components within a layer dispensing mechanism. FIG. 19A shows an example of a configuration wherein the material leveling mechanism (e.g., leveler) (e.g., comprising 1905 and 1908) is at a position between a material removal mechanism (material remover) (e.g., 1904) and the material dispensing mechanism (e.g., layer dispenser) (e.g., 1906). In the example, FIG. 19A, the material dispensing mechanism precedes the material leveling mechanism relative to the direction of movement (e.g., 1939) of the layer dispensing mechanism. The material dispensing mechanism may be connected (e.g., 1916, physically, operatively) to the material leveling mechanism. The material leveling mechanism may be coupled (e.g., 1914, physically, and/or operatively) to the material removal mechanism. In some configurations, at least one component of the layer dispensing mechanism may be connected to at least one shaft (e.g., 1918). For example, all the components of the layer dispensing mechanism may be connected to the at least one shaft. The shaft may be operatively coupled (e.g., connected) to an actuator. The actuator may facilitate linear motion of the shaft (e.g., to and from the processing chamber). The linear motion may be in a direction that is (e.g., substantially) parallel (e.g., 1939) to a surface of a platform (e.g., 1912), e.g., that supports the material bed. The linear motion may be in a direction that is not (e.g., substantially) parallel to the surface of the platform. The linear motion may comprise a component (e.g., be in a) direction that is (e.g., substantially) perpendicular to a direction of movement (e.g., FIG. 1, 112) of the platform (e.g., in accordance with an elevator (e.g., FIG. 1, 105) a build module (e.g., FIG. 1, 130)). The linear motion may be in a direction that is not (e.g., substantially) perpendicular to a direction of movement of the platform. The shaft may be operatively coupled (e.g., connected) to a translating component (e.g., 1922). The translating component may comprise the actuator. The actuator may be a motor. For example, the translating component may be a motor that facilitates linear motion (e.g., of the shaft and/or of at least one component of the layer dispensing mechanism). The motor may be any motor described herein. FIG. 19A shows an example of a platform (e.g., 1912) above which a layer of material may be dispensed (e.g., 1907) to form a material bed (e.g., 1909). The 3D object (e.g., 1910) may be formed in the material bed. At least two of the material dispensing, material leveling, and material removal may be performed synchronously (e.g., in the same translation cycle). Synchronously may be within a single translation cycle. A translation cycle may include translating the layer dispensing mechanism laterally from a first end of the material bed (e.g., 1924) to a second end of the material bed (e.g., 1926). An end of a material bed may be a position on the periphery of the material bed. At times, a (e.g., planar) layer of pre-transformed material may be dispensed during the translation cycle. The material bed may be formed by dispensing a plurality of (e.g., planar) layers of pre-transformed material. At times, the amount of pre-transformed material dispensed to form at least two (e.g., planar) layers of the plurality of layers, may be constant. At times, the amount of pre-transformed material dispensed to form at least two (e.g., planar) layers of the plurality of layers, may be different. For example, a first amount of pre-transformed material that is dispensed to form a first layer; and a second amount of pre-transformed material is dispensed to form a second layer. Occasionally, the first amount may be different from the second amount. Occasionally, the first amount may be (e.g., substantially) equal to the second amount. At times, the average height of at least two (e.g., planar) layers of pre-transformed material within the plurality of layers may be constant. At times, the average height of at least two (e.g., planar) layers of pre-transformed material within the plurality of layers may be different. For example, a first (e.g., planar) layer of pre-transformed material may have an average first height, and a second (e.g., planar) layer of pre-transformed material may have an average second height. At times, the second height may be different than the first height. At times, the second height may be (e.g., substantially) the same as the first height. In some instances, the amount of material dispensed to form a layer may vary across the layer. In some instances, the height of the layer may vary across the layer. In some instances, the amount of material dispensed to form a layer be (e.g., substantially) constant across the layer. In some instances, the height of the layer may be (e.g., substantially) constant across the layer. At times, a layer of material may be dispensed, leveled (e.g., planarized) by the leveler (e.g., blade), and a portion thereof may be removed (e.g., by the material remover) during the translation cycle of the layer dispensing mechanism. At times, a single layer of material may be dispensed, and leveled (e.g., planarized) during the translation cycle. The translation cycle may comprise moving from one side of the material bed to the opposing side. The translation cycle may comprise moving from one side of the material bed to the opposing side, and back to the one side. FIG. 19B shows an example of a configuration wherein the material dispensing mechanism (e.g., 1948) may be at a position between the material removal mechanism (e.g., 1946) and the material leveling mechanism (e.g., comprising 1949 and 1950). In the example, FIG. 19B, the material dispensing mechanism precedes the material leveling mechanism relative to the direction of movement (e.g., 1940) of the layer dispensing mechanism. A layer of material may be dispensed (e.g., 1960) and leveled (e.g., 1954) within a first portion of the translation cycle (e.g., in the direction 1940). The material removal may be performed within a second portion of the translation cycle. The second portion of the translation cycle may be in a reverse direction relative to the first translation cycle. At times, the material dispensing, material leveling, and material removal may be performed asynchronously. Asynchronously may be within more than one translation cycle portion. FIG. 19C shows an example of a configuration wherein the material leveling mechanism (e.g., comprising 1974 and 1976) may be at a position between the material dispensing mechanism (e.g., 1972) and the material removal mechanism (e.g., 1975). In the example, FIG. 19C, the material dispensing mechanism precedes the material leveling mechanism, and the material removal mechanism, relative to the direction of movement (e.g., 1970) of the layer dispensing mechanism. In the example configuration of FIG. 19C, the material dispensing, material leveling, and the material removal may be performed in a single translation cycle. A (e.g., substantially) planar layer (e.g., 1984) may be formed during the single translation cycle.

In some embodiments, the vibration mechanism is operatively coupled to a first controller. In some embodiments, the layer dispensing mechanism may be operatively coupled to a second controller. At times, a component of the layer dispensing mechanism may be operatively coupled to a third controller. At times, the first controller, second controller and the third controller may be the same controller. At times, the first controller, second controller and the third controller may be different controllers. At times, at least two of the (i) vibration mechanism, (ii) shaft, and (iii) at least one component of the layer dispensing mechanism, may be controlled by the same controller. At times, at least two of the (i) vibration mechanism, (ii) shaft, and (iii) at least one component of the layer dispensing mechanism, may be controlled by a different controller. The controller may control the operation of one or more components of the layer dispensing mechanism. For example, the controller may turn on a component of the layer dispensing mechanism (e.g., the material dispensing mechanism), for example, when the ancillary chamber is open. The controller may control the operation of the vibration mechanism. For example, the vibration mechanism may be turned on when the material dispensing system may be in operation, or when the material levelling system may be in operation. In some embodiments, the vibration mechanism is turned off when the material removal system may be in operation.

In some embodiments, the vibration mechanism has various operational characteristic. In some embodiments, the vibration mechanism is operatively coupled to at least one actuator that facilitates the movement of the one or more shafts (e.g., between the ancillary chamber and the processing chamber). In some embodiments, the vibration mechanism is operatively coupled to at least one actuator that facilitates the movement of the layer dispensing mechanism (e.g., between the ancillary chamber and the processing chamber). The vibration mechanism may be separate from the to at least one actuator that facilitates the movement of the one or more shafts and/or layer dispensing mechanism (or any of its components). The vibration mechanism may be integrated with the at least one actuator that facilitates the movement of the one or more shafts and/or layer dispensing mechanism (or any of its components). For example, the vibration mechanism and the at least one actuator that facilitates the movement of the one or more shafts and/or layer dispensing mechanism (or any of its components) may be the same (e.g., the same actuator, e.g., the same motor). The operational characteristic may comprise (i) a frequency of vibration, (ii) an overall forward and/or backwards velocity of the shaft and/or layer dispensing mechanism, (iii) a travel distance of the shaft and/or layer dispensing mechanism (e.g., when vibration mechanism is in operation), (iv) a dispensed amount of pre-transformed material, or (iv) a removed amount of pre-transformed material. Any of the operational characteristics may pertain to an operating vibration mechanism. Forward velocity pertains to the shaft and/or layer dispensing mechanism moving away from the ancillary chamber and into the processing chamber. Backward velocity pertains to the shaft and/or layer dispensing mechanism moving away from the processing chamber and into the ancillary chamber. In some embodiments, the forward and backwards velocity may be (e.g., substantially) similar. In some embodiments, the forward and backwards velocity may be different. The frequency of vibration may be at least about 20 Hertz (Hz), 25 Hz, 30 Hz, 35 Hz, 40 Hz, 45 Hz, 50 Hz, 55 Hz, 60 Hz, 65 Hz, 70 Hz, 75 Hz, 80 Hz, 85 Hz, 90 Hz, 95 Hz, 100 Hz, $10^5$ Hz, 110 Hz, 115 Hz, 120 Hz, 125 Hz, 130 Hz, 135 Hz, 140 Hz, 145 Hz, or 150 Hz. The frequency of vibration may be at most about 25 Hz, 30 Hz, 35 Hz, 40 Hz, 45 Hz, 50 Hz, 55 Hz, 60 Hz, 65 Hz, 70 Hz, 75 Hz, 80 Hz, 85 Hz, 90 Hz, 95 Hz, 100 Hz, $10^5$ Hz, 110 Hz, 115 Hz, 120 Hz, 125 Hz, 130 Hz, 135 Hz, 140 Hz, 145 Hz, or 150 Hz. The frequency of vibration may be a range of frequency between any of the afore-mentioned frequency values (e.g., from about 20 Hz to about 150 Hz, or from about 20 Hz to about 40 Hz, from about 40 Hz to about 100 Hz, or from about 100 Hz to about 150 Hz). The translation velocity of at least one component of the layer dispensing mechanism, may be at most 10 millimeter/second (mm/sec), 20 mm/sec, 30 mm/sec, 40 mm/sec, 50 mm/sec, 60 mm/sec, 70 mm/sec, 80 mm/sec, 90 mm/sec, 100 mm/sec, 110 mm/sec, 120 mm/sec, 125 mm/sec, 130 mm/sec, 140 mm/sec, 150 mm/sec, 160 mm/sec, 170 mm/sec, 180 mm/sec, 190 mm/sec, 200 mm/sec, 250 mm/sec, 300 mm/sec, 400 mm/sec, or 500 mm/sec. The translation velocity of at least one component of the layer dispensing mechanism may be at least 10 millimeter/second (mm/sec), 20 mm/sec, 30 mm/sec, 40 mm/sec, 50 mm/sec, 60 mm/sec, 70 mm/sec, 80 mm/sec, 90 mm/sec, 100 mm/sec, 110 mm/sec, 120 mm/sec, 130 mm/sec, 140 mm/sec, 150 mm/sec, 160 mm/sec, 170 mm/sec, 180 mm/sec, 190 mm/sec, 200 mm/sec, 250 mm/sec, 300 mm/sec, 400 mm/sec, or 500 mm/sec. The translation velocity of at least one component of the layer dispensing mechanism may be a range of velocity between any of the afore-mentioned velocity values (e.g., from about 10 mm/sec to about 500 mm/sec, from about 10 mm/sec to about 125 mm/sec, from about 130 mm/sec to about 300 mm/sec, or, from about 300 mm/sec to about 500 mm/sec). The travel distance of the layer dispensing mechanism within the processing chamber may be at least about 10 millimeter (mm), 20 mm, 30 mm, 40 mm, 50 mm, 60 mm, 70 mm, 75 mm, 80 mm, 90 mm, 100 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 420 mm, 440 mm, 460 mm, 480 mm, 500 mm, 520 mm, 540 mm, 560 mm, 575 mm, 580 mm, 590 mm, 600 mm, 620 mm, 650 mm, 670 mm, 690 mm or 700 mm. The travel distance of the layer dispensing mechanism within the processing chamber may be at most about 20 mm, 30 mm, 40 mm, 50 mm, 60 mm, 70 mm, 75 mm, 80 mm, 90 mm, 100 mm, 110 mm, 120 mm, 130 mm, 140 mm, 150 mm, 160 mm, 170 mm, 180 mm, 190 mm, 200 mm, 220 mm, 240 mm, 260 mm, 280 mm, 300 mm, 320 mm, 340 mm, 360 mm, 380 mm, 400 mm, 420 mm, 440 mm, 460 mm, 480 mm, 500 mm, 520 mm, 540 mm, 560 mm, 575 mm, 580 mm, 590 mm, 600 mm, 620 mm, 650 mm, 670 mm, 690 mm or 700 mm. The travel distance of the layer dispensing mechanism may be a range of distance between any of the afore-mentioned distance values (e.g., from about 10 mm to about 700 mm, from about 10 mm to about 300 mm, from about 10 mm to about 75 mm, from about 75 mm to about 575 mm, from about 100 mm to about 400 mm or from about 400 mm to about 700 mm).

Figure 20A:
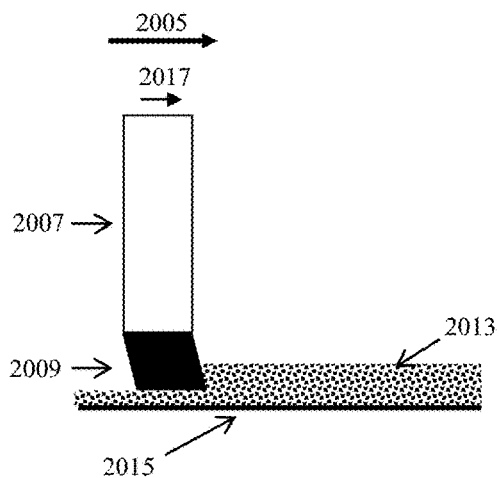
FIGS. 20A-20C schematically illustrate a movement of a component of a 3D printing system, and FIGS. 20D-20E schematically illustrates various graphs associated with a movement of a component of a 3D printing system.
Figure 20B:
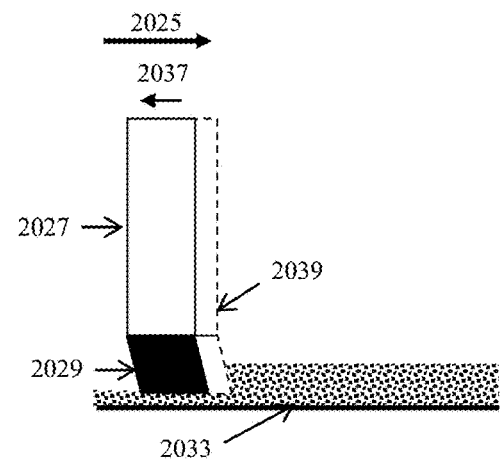
Figure 20C:
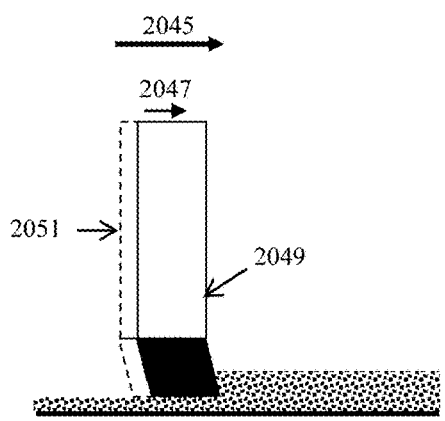
Figure 20D:
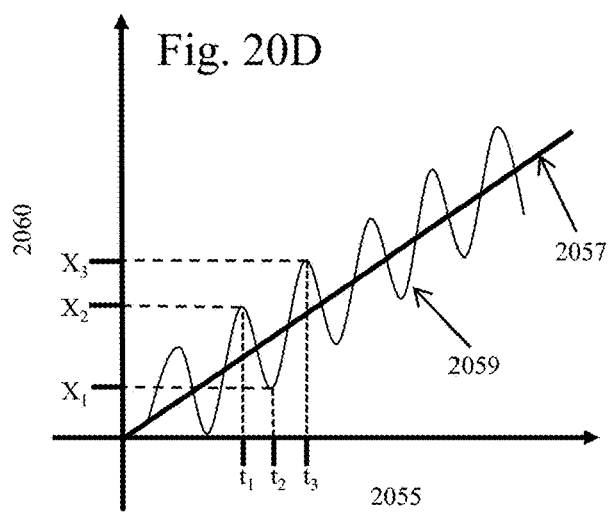
Figure 21A:
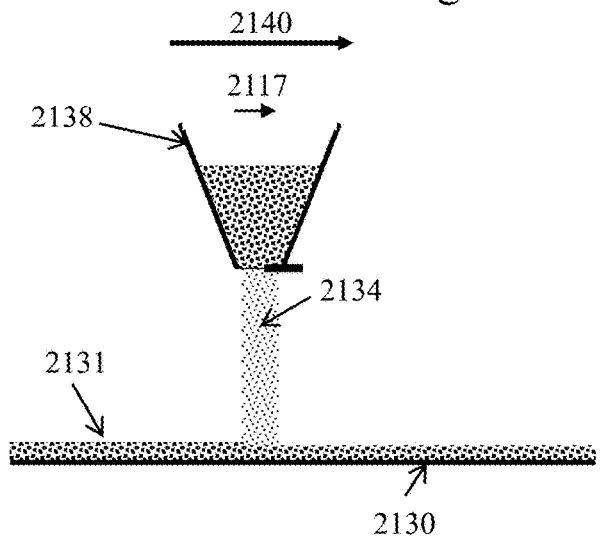
FIGS. 21A-21C schematically illustrate a movement of a component of a 3D printing system.
Figure 21B:
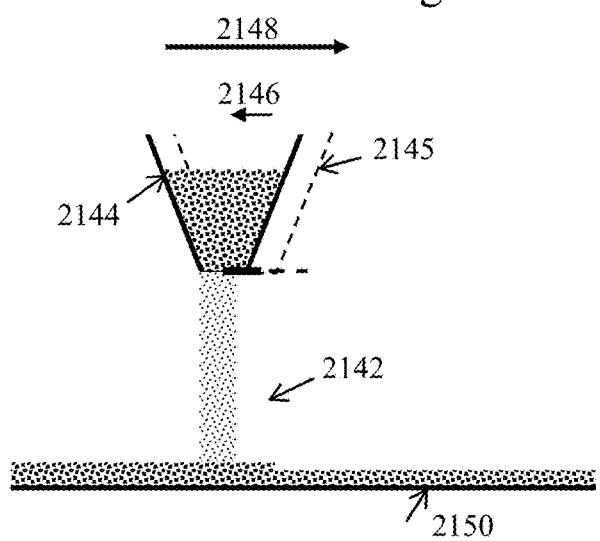
Figure 21C:
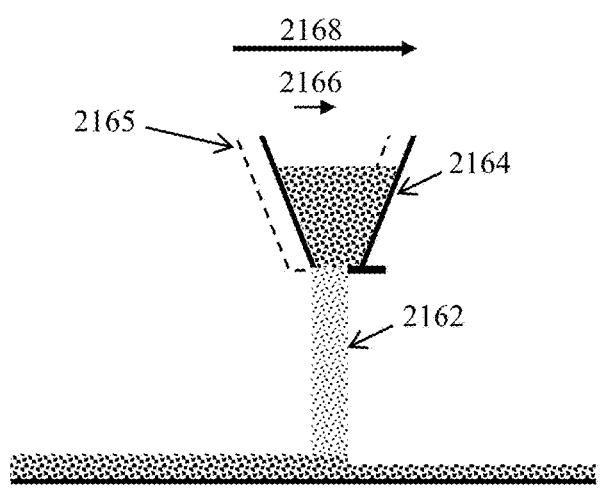

In some embodiments, the vibration mechanism facilitates a vibrating motion of a portion of the layer dispensing mechanism. At times, the actuator that moves the shaft and/or layer dispensing mechanism may additionally facilitate a vibrating motion (e.g., of the shaft). Vibrating motion may include moving the shaft and/or layer dispensing mechanism in a back-and-forth manner. The vibrating motion may include a dithering movement. The dithering movement may comprise a (e.g., small) back and forth movement along the trajectory of the overall forward movement of the shaft and/or layer dispensing mechanism. A dithering movement may be a movement in an overall forward direction. A dithering movement may include a movement in a direction reverse from the direction of a previous (e.g., forward) movement. The dithering movement may be small (e.g., shorter in length and time) as compared to an overall movement of the shaft and/or the layer dispensing mechanism. The dithering movement may have a length of at most about 0.1 mm, 0.2 mm, 0.3 mm, 0.4 mm, 0.5 mm, 0.6 mm, 0.7 mm, 0.8 mm, 0.9 mm, 1.0 mm, 1.1 mm, 1.2 mm, 1.3 mm, 1.4 mm, 1.5 mm, 1.6 mm, 1.7 mm, 1.8 mm, 1.9 mm, 2.0 mm, 2.2 mm, 2.4 mm, 2.6 mm, 2.7 mm, 2.8 mm, 3.0 mm, 4.0 mm, 5.0 mm, 6.0 mm, 7.0 mm, 8.0 mm, 9.0 mm, or 9.9 mm. The dithering movement may have a length that may be a range between any of the afore-mentioned values (e.g., from about 0.1 mm to about 9.9 mm, from about 0.1 mm to about 1.0 mm, from about 1.0 mm to about 5.0 mm, or from about 5.0 mm to about 9.9 mm). Vibrating may include moving the shaft in an overall forward direction. At times, the dithering movement may overlap (e.g., superimpose) with the overall forward movement of the shaft. FIGS. 20A-20C show examples of a vibrating motion of a component of the layer dispensing mechanism (e.g., leveling mechanism). FIGS. 21A-21C show examples of a (e.g., successive steps in a) vibrating motion of a component of the layer dispensing mechanism (e.g., material dispensing mechanism). FIG. 20A illustrates an example of moving a component of the layer dispensing mechanism (e.g., 2007, 2009, a leveling mechanism) in a forward direction (e.g., 2017) relative to a platform (e.g., FIG. 20A, 2015) or an exposed surface (e.g., 2013) of a material bed. FIG. 20B illustrates an example of moving the component (e.g., comprising 2027 and 2029) in a backward direction (e.g., 2037) relative to the platform (e.g., FIG. 20B, 2033), relative to a previous position (e.g., 2039) of the component, and/or relative to an exposed surface of the material bed. FIG. 20C and illustrate an example of moving the component (e.g., 2049) in the forward direction (e.g., 2047), relative to the platform, to a previous position (e.g., 2051), and/or relative to the exposed surface of the material bed. When performing the vibration motion of the leveling mechanism (e.g., by translating a shaft in a linear manner), the operation illustrated in FIG. 20A is executed, followed by the operation illustrated in FIG. 20B, which is subsequently followed by the operation in FIG. 20C. For example, the operations in FIG. 20A-20C are performed successively. FIG. 21A illustrates an example of moving a component of the layer dispensing mechanism (e.g., 2138, a material dispenser) in a forward direction (e.g., 2117) relative to a platform (e.g., 2130) and/or relative to the exposed surface (e.g., 2131) of the material bed, to a position $X_2$ at time $t_1$. FIG. 21B illustrates an example of moving the component (e.g., 2144) in a backward direction (e.g., 2146) relative to the platform (e.g., 2150), relative to a previous position (e.g., 2145) of the component, and/or relative to the exposed surface of the material bed, to a position $X_1$ at time $t_2$. FIG. 21C illustrates an example of moving the component (e.g., 2164) in the forward direction (e.g., 2166), on the target surface, relative to a previous position (e.g., 2165), to a position $X_3$ at a time $t_3$. Positions $X_1$, $X_2$ and $X_3$ are along the trajectory of the shaft and/or layer dispensing mechanism. In some examples, the distance $X_1$-$X_3$ is greater than the distance $X_1$-$X_2$. In some examples, the distance $X_1$-$X_3$ is greater than the distance $X_2$-$X_3$. Time $t_1$ is before time $t_2$ that is before time $t_3$. Positions $X_1$-$X_3$ and times $t_1$-$t_3$ may correspond to those in FIG. 20D. When performing the vibration motion of the material dispensing mechanism (e.g., by translating a shaft in a linear manner), the operation illustrated in FIG. 21A is executed, followed by the operation illustrated in FIG. 21B, which is subsequently followed by the operation in FIG. 21C. In some configurations, the example operations shown in FIGS. 20A-20C and/or FIGS. 21A-21C may be performed by the same vibration mechanism. At times, the example operations shown in FIGS. 20A-20C and/or FIGS. 21A-21C may be performed simultaneously. In some examples, the example operations shown in FIGS. 20A-20C and/or FIGS. 21A-21C may be the same operation respectively. The trajectory of the third operation may partially overlap the trajectory of the second operation, which may partially overlap the trajectory of the first operation. The partial overlapped operations may form an overall propagation (e.g., FIG. 20A, 2005, followed by 2025 followed by 2045; or FIG. 21A, 2140, followed by 2148, followed by 2168) of the component of the layer dispensing mechanism from the first operation by the third operation.

Figure 20E:
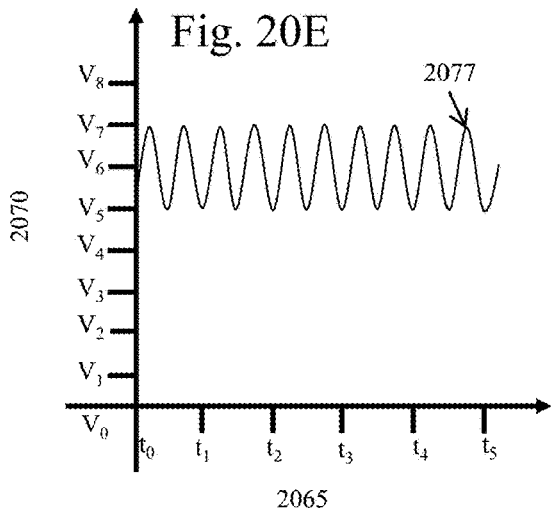

Vibrating one or more components of the layer dispensing mechanism may include one or more moving operations selected from (i) moving in a forward direction to form a first forward path, (ii) moving in an opposite direction from the first forward path to at least partially overlap the first forward path to form a backwards path, and (iii) moving in a forward direction from the backwards path to an overall forward position from the first operation. Operations (i) to (iii) can be conducted sequentially. In some embodiments, the backwards path overlaps the first forward path in part. In some embodiments, the second forward path overlaps the backwards path in part. Moving the component of the layer dispensing mechanism and/or shaft may include overall moving in the forward direction (e.g., two steps forward and one step backward). For example, when the non-overlapping second forward path exceeds the first forward path in the direction of forward movement. FIG. 20D illustrates an example of a graphical representation of the movement of a component of the layer dispensing mechanism, wherein the graphical representation illustrates the position of the component in the X-axis direction (e.g., 2060) as time (e.g., 2055) progresses. The component moves in an overall forward lateral position (e.g., 2057, e.g., in the X-axis direction) during a period of time. The overall forward lateral movement may be superimposed by a dithering movement (e.g., 2059, a vibration movement). At times, the displacement of the component in a forward movement may be greater than the displacement of the component in the backward movement (e.g., accounting for an overall forward movement). At times, the displacement of the component in a backward movement may be greater than the displacement of the component in the forward movement (e.g., accounting for an overall backward movement). At times, the displacement of the component in the forward movement may be (e.g., substantially) the same as the displacement of the component in the backward movement. FIG. 20E illustrates an example of a graphical representation of the acceleration of movement of a component of the layer dispensing mechanism, wherein the graphical representation illustrates the change in velocity (e.g., 2070) of movement of the component and/or shaft as time (e.g., 2065) progresses. In the example shown, the velocity varies between $V_5$ to $V_7$ (e.g., 2077). The velocity may accelerate from $V_5$ to $V_7$ and drop back to $V_5$ at a time interval between $t_0$ to $t_1$. The component and/or shaft may move in a forward direction in this time period. In a second time period between $t_0$ to $t_1$, the component may move in a reverse direction from the previous forward motion. The variation in velocity, in the backward (e.g., reverse) direction may be same as the variation in velocity in the forward direction (e.g., a change of velocity from $V_5$ to $V_7$ and a drop back to $V_5$ during the second portion of time between $t_0$ to $t_1$). In the example of FIG. 20E, the acceleration of the component in the forward direction and the acceleration of the component in the reverse direction is the same between each time frame. At times, the acceleration rate and/or frequency may be uniform (e.g., constant) throughout the (e.g., vibration and/or overall forward) motion of the component and/or shaft. At times, the acceleration rate and/or frequency may be non-uniform (e.g., rate of change of velocity and/or the magnitude of velocity may be higher in the forward direction motion than the rate of change of velocity and/or the magnitude of velocity in the backward direction motion). The motion may be across the material bed and/or platform (e.g., from one side to the other).

Figure 25A:
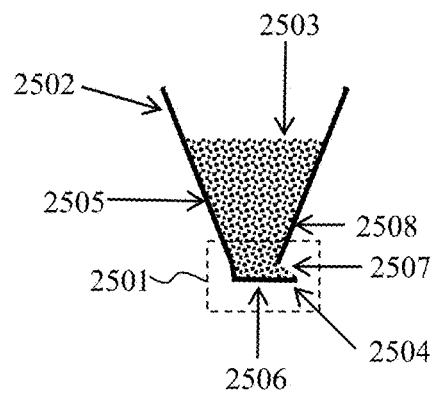
FIGS. 25A-25C schematically illustrate a movement of a component of a 3D printing system.
Figure 25B:
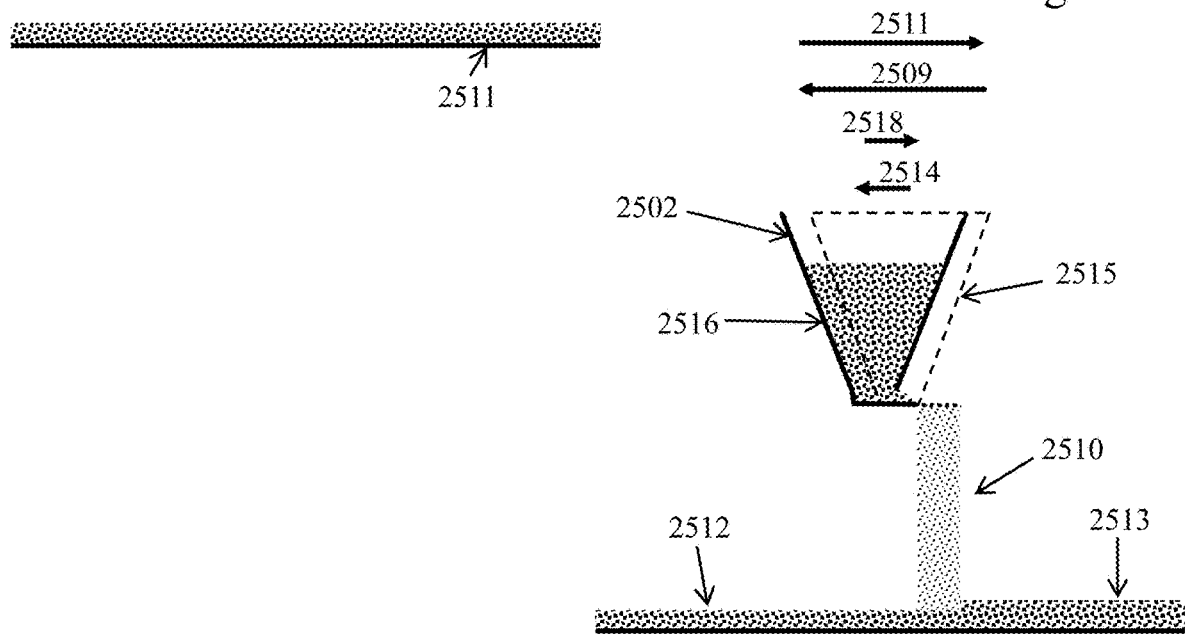
Figure 25C:
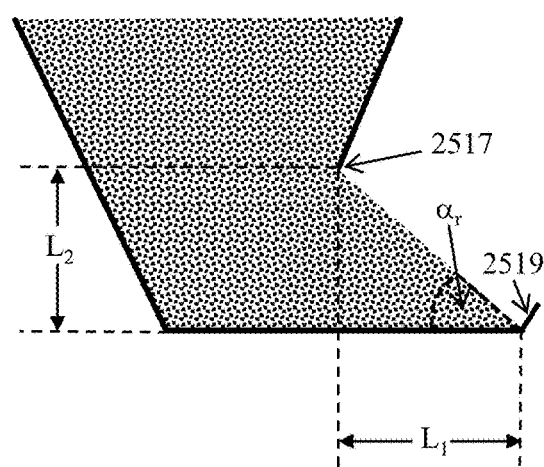

At times, at least one component of the layer dispenser (e.g., the component may be a material dispenser) comprises features that allow for the dispensing of (e.g., a pre-transformed) material without the use of a moving mechanism (e.g., hinge, flap, gate, lid, shutter, or joint) contacting the material. For example, a particulate material (e.g., particles of a powdered material) may become lodged in the moving mechanisms such that the dispensing mechanism (or portions thereof) may require replacement and/or maintenance (e.g., cleaning). In some embodiments, the at least one component of the layer dispenser (e.g., the material dispenser) may not include (e.g., be devoid of) the moving mechanism. Absence of the moving mechanism may improve a functional reliability of the component and/or reduce the amount of maintenance and/or replacement of the component. FIGS. 25A-25C illustrate an example of a layer dispenser 2502 in accordance with some embodiments. FIGS. 25A and 25B illustrate movement stages of the layer dispenser, and FIG. 25C illustrates an inset view 2501 showing a close-up of a portion of the layer dispenser 2502. The layer dispenser can include a bottom portion (e.g., 2506) that can (e.g., temporarily) retain at least a portion of the material (e.g., 2503) within the layer dispenser. The material (e.g., pre-transformed material) can temporarily accumulate at the bottom portion, supported by the walls of the bottom portion and the force of gravity. The layer dispenser may have at least one slanted (e.g., side) wall (e.g., 2505, or 2508), e.g., that converge towards the bottom portion, thus forming a converging reservoir for the material to be dispensed (e.g., the pre-transformed material). In some cases, the layer dispenser has a funnel shape (e.g., comprising side wall 2505) that converges at the bottom portion. The bottom portion can include a lip (e.g., 2504) (also referred to as a ledge) that extends from the bottom portion. The lip can correspond to a projecting edge that ends at an exit opening (e.g., 2507) where the material can exit the layer dispenser. The lip may extend beyond a horizontal cross section of the converging reservoir bottom. The extend of extension may consider (e.g., correlate to) an angle of repose of the material to be dispensed. The exit opening can be at least partially defined by the lip (e.g., 2519) and a back edge (e.g., 2517) of the bottom portion. The exit opening can be positioned in a back portion (e.g., 2508) of the layer dispenser. The lip and back edge can facilitate temporary retention of the material within the bottom portion, e.g., in accordance with an angle of repose (e.g., $\alpha_r$) of the material. In some cases, the material can be retained within the bottom portion when the layer dispenser (e.g., in a stationary state, a temporary stationary state, or a moving state) when conditions of the following equation 1 are met:

$$\tan \alpha_r = \frac{L2}{L1};$$

where $L_1$ is a lateral (e.g., horizontal) length from the back edge to the end of the lip; $L_2$ is a height (e.g., longitudinal length) of the lip as measured from the back edge; and $\alpha_r$ is the angle of repose of the material. The angle of repose $\alpha_r$ can vary depending on factors such as the type of material (e.g., composition of the material) and the particles size of the material. In some embodiments, L2/L1 ranges from about 0.2 and about 1, from about 0.2 to about 0.5, from about 0.5 to about 1, from about 0.5 to about 0.8, from about 0.3 to about 0.6, or from about 0.8 to about 1.

In some embodiments, the lip includes a retaining member (e.g., 2519). The retaining member may be an obstruction to the material fall. In some embodiments, the retaining member extends (e.g., upward) from an end of the lip at angle. The retaining member can facilitate retention of the material within the bottom portion. Motion in a first direction (e.g., 2509) and/or a second direction (e.g., 2511) of the layer dispenser can cause the material within the layer dispenser (e.g., temporarily retained within bottom portion 2506) to exit the exit opening and drop (e.g., 2510) onto the platform (e.g., 2511) and/or a previously dispensed material (e.g., 2512) to form a layer of material (e.g., 2513). The first and second directions can be referred to as reverse and forward directions, respectively. In some instances, the layer dispenser is operationally coupled with one or more actuators (e.g., that is/are operationally coupled with one or more controllers) that provides the (e.g., forward and/or backward) motion. In some cases, the motion includes a stuttering motion. For instance, the stuttering motion can include: multiple stops, a change in velocity, a change in acceleration, or a change in trajectory. The change and/or stops may be repetitive (e.g., repeat at least once during the motion). For example, the layer dispenser can move (e.g., 2514) from a first position (e.g., 2515) to a second position (e.g., 2516), which may define a repetition cycle. For example, the position may be a stopped position. In some embodiments, the respective cycle involves the layer dispenser respectively moving in opposing direction (e.g., 2518) (e.g., with corresponding first and second positions (e.g., stopped positions)). In some cases, the stuttering motion includes a vibrating motion. In some embodiments, the vibrating motion includes vibrations at a frequency, e.g., an ultrasonic frequency. The repetitive (e.g., stuttering) motion (e.g., stopping and starting motion) can occur stepwise in the overall forward motion of the layer dispenser. The repetitive motion can occur over any suitable time period(s) and have any suitable repetition frequency. The repetition frequency may facilitate a fallout of the material from the material dispenser at a rate. The rate may facilitate a (e.g., substantially) planar deposition of the material. The rate may facilitate a (e.g., substantially) homogenous deposition of the material, e.g., across the deposition area. The deposition area may be at least a portion of a platform or an exposed surface of a material bed. In some cases, the repetitive (e.g., stuttering) motion is accomplished by altering the forward motion (e.g., 2509) of the one or more actuators used to move the layer dispenser. For example, the one or more actuators that control the forward motion can be tuned to articulate a rough motion of the at least one component of the layer dispenser (e.g., the material dispenser) such that a repetitive (e.g., and stuttering) motion is associated with an overall forward motion.

Figure 30A:
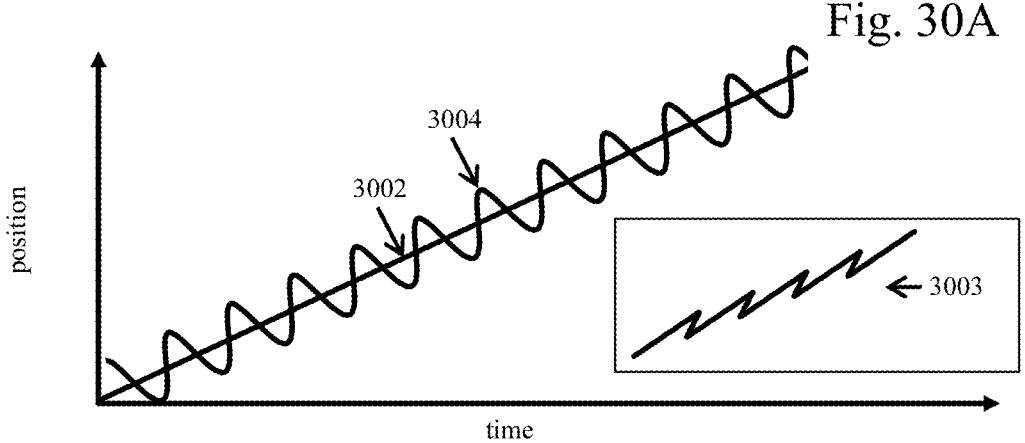
FIGS. 30A-30C are schematic graphs relating to motions of a component of a 3D printing system.
Figure 30B:
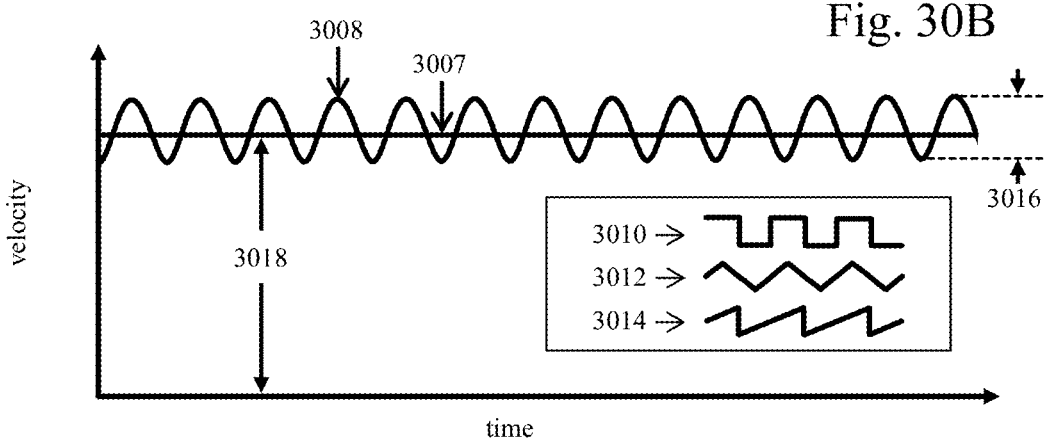
Figure 30C:
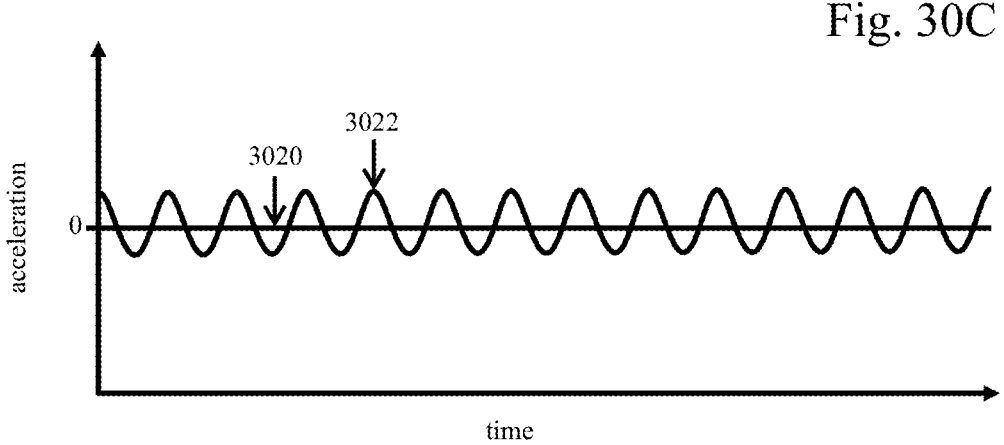

FIGS. 30A-30C show examples of schematic graphs illustrating example motion for at least one component of a layer dispenser, in accordance with some embodiments. The at least one component of the layer dispenser can move in a direction (e.g., forward). The direction may be in accordance with an exposed surface of the material bed and/or platform. The graph of FIG. 30A illustrates a position of the at least one component of the layer dispenser as a function of time. The movement of the at least one component of the layer dispenser across the surface of the material bed (e.g., forward motion) may include a modulated motion. The modulated motion can include vibrating, stuttering, oscillating, jittering, fluctuating, pulsating, and/or fluttering motion. The modulated motion can facilitate dispensing of a (e.g., pre-transformed) material from the material dispenser. For example, the modulated motion can agitate the material within the cavity (e.g., reservoir) of the material dispenser such that at least a portion of the material exits the exit opening (e.g., at a bottom portion) of the material dispenser. The modulated motion can be caused by adjusting a forward (and/or backward) motion of the layer dispenser. For example, the one or more actuators that facilitate (e.g., cause) the forward and/or backward movement can be tuned (e.g., roughened) to emphasize the modulated motion. In some cases, one or more actuators dedicated to facilitating (e.g., providing) the modulated motion is/are used. For example, the actuators may comprise vibrators. FIG. 30A indicates a position of the layer dispenser can include an average motion 3002 in (e.g., substantially) one direction (e.g., forward or backward), and a modulated motion 3004. The modulated motion can be periodic (e.g., repetitive, oscillatory (e.g., harmonic)). The modulated motion may average out to the average motion. The periodic motion can be regular or irregular. The modulated motion can cause the material to dispense the material periodically or constantly, e.g., along at least a portion of its movement trajectory. In some embodiments, the modulated motion is associated with forward and/or backward motion (e.g., 3003) of the at least one component of the layer dispenser (e.g., the material dispenser). In some cases, the directional (e.g., forward or backward) motion and/or the modulated motion continues until the material dispenser reaches the end of the movement path (e.g., at an edge of the material bed). The movement path may be a trajectory.

FIG. 30B indicates a velocity of a at least one component of the layer dispenser (e.g., material dispenser) as a function of time, in accordance with some embodiments. An average velocity (e.g., 3007) of the at least one component of the layer dispenser can be (e.g., substantially) constant. The modulated motion may cause smaller velocity changes (e.g., 3008). In some embodiments, an average velocity of the at least one component of the layer dispenser is (e.g., substantially) constant (e.g., 3007). In some embodiments, an average velocity of the at least one component of the layer dispenser is non-constant (e.g., accelerates and/or decelerates). In some embodiments, a modulated velocity of the at least one component of the layer dispenser is non-constant (e.g., comprises acceleration and/or deceleration, e.g., 3008). In some embodiments, the modulated motion is in accordance with a wave motion (e.g., curve (e.g., sine wave) (e.g., 3008), square wave (e.g., 3010), triangle wave (e.g., 3012), sawtooth wave (e.g., 3014)). In some embodiments, a velocity amplitude (e.g., 3116) of the modulated motion is at most a pre-determined percentage of an average velocity (e.g., 3118), e.g., achieving a consistent dispense rate (e.g., along the movement trajectory). The pre-determined percentage can depend on factors such as material properties of the material being dispensed (e.g., comprising particle size, particle shape, coefficient of friction, or mass). In some embodiments, the modulated motion has a pre-determined amplitude that is at most about 40%, 30%, 20%, 10%, 8%, 5%, 3%, 2%, or 1% of the average velocity. The pre-determined amplitude can be between any of the afore-mentioned values. For example, the pre-determined amplitude can range from about 1% to about 40%, about 1% to about 10%, or from about 10% to about 40% of the average velocity. In some embodiments, the at least one component of the layer dispenser is a material dispenser, a leveler, or a material remover. The vibrating material dispenser may dispense material with a uniformity of at most about 5%, 10%, 15%, 20%, or 25%. The uniformity percentage may be calculated by dividing a deviation of a volume of pre-transformed material per unit area that is being dispensed, over an average volume per unit area that is dispensed. The vibrating material dispenser may dispense material with a uniformity between any of the afore-mentioned percentages (e.g., from about 5% to about 25%, from about 5% to about 15%, or from about 10% to about 25%). The uniformity may be calculated per dispensing cycle. The dispensing cycle may comprise a deposition of a layer of pre-transformed material (e.g., to form a material bed). The frequency of vibration may be at least about 10 Hertz (Hz), 20 Hz, 25 Hz, 30 Hz, 35 Hz, 40 Hz, 45 Hz, 50 Hz, 55 Hz, 60 Hz, 65 Hz, 70 Hz, 75 Hz, 80 Hz, 85 Hz, 90 Hz, 95 Hz, 100 Hz, 105 Hz, 110 Hz, 115 Hz, 120 Hz, 125 Hz, 130 Hz, 135 Hz, 140 Hz, 145 Hz, 150 Hz, 10 KHz, or 20 KHz. The frequency of vibration may be a range of frequency between any of the afore-mentioned frequency values (e.g., from about 20 Hz to about 20 KHz, or from about 10 Hz to about 40 Hz, from about 40 Hz to about 100 Hz, or from about 100 Hz to about 20K Hz). The vibration may be at an ultrasonic frequency. The standard deviation of the thickness of a planar and/or dispensed layer, along the trajectory of the at least one component of the layer dispensing mechanism may be at most about 400 micrometers (μm), 300 μm, 250 μm, 150 μm, 100 μm, 75 μm, 50 μm, 30 μm, 25 μm, 20 μm, or 10 μm. The standard deviation of the thickness (e.g. height) of a planar and/or dispensed layer, along the trajectory of the at least one component of the layer dispensing mechanism may be of any value between the afore-mentioned values (e.g., from about 400 μm to about 10 μm, from about 250 μm to about 50 μm, from about 300 μm to about 25 μm, or from about 100 μm to about 10 μm). The planar layer may be one that has been planarized with a vibrating leveler and/or material remover. The dispensed layer may be one that has been formed using a material dispenser. The planar layer may be one that has been formed by the material dispenser. Vibrating the at least one component facilitates a planar exposed surface that deviates from average planarity by at most about 400 micrometers (μm), 300 μm, 250 μm, 150 μm, 100 μm, 75 μm, 50 μm, 30 μm, 25 μm, 20 μm, or 10 μm. Vibrating the at least one component facilitates a planar exposed surface that deviates from average planarity by any value between the afore-mentioned values (e.g., from about 400 μm to about 10 μm, from about 250 μm to about 50 μm, from about 300 μm to about 25 μm, or from about 100 μm to about 10 μm).

FIG. 30C indicates an acceleration of a material dispenser as a function of time, in accordance with some embodiments. An average acceleration (e.g., 3120) of the material dispenser can be (e.g., substantially) zero, with the modulated motion causing (e.g., small) acceleration changes (e.g., 3122). In some cases, a (e.g., substantially) zero average acceleration can be associated with a consistent dispense rate, e.g., along the movement trajectory. In some embodiments, an average acceleration of the material dispenser is non-zero (e.g., positive and/or negative).

Figure 23A:
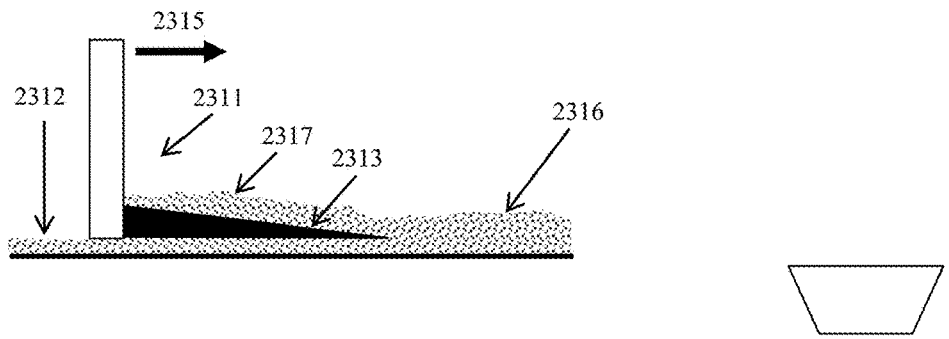
FIGS. 23A-23D schematically illustrate various components of a 3D printing system.
Figure 23B:
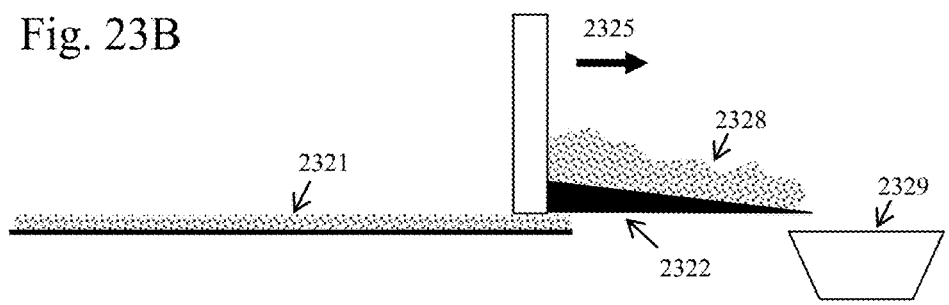
Figure 23C:
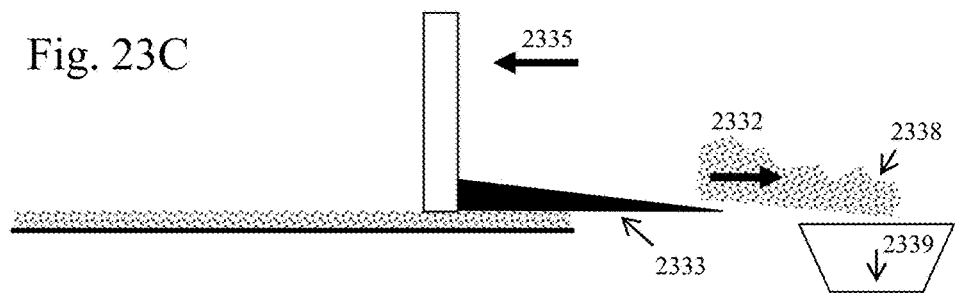
Figure 23D:
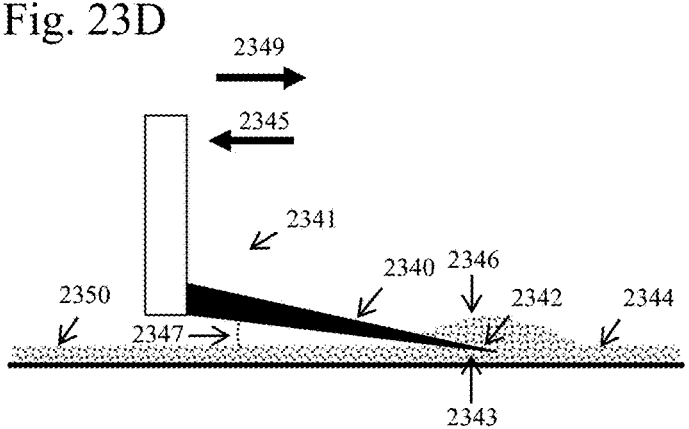

In some embodiments, a portion of the material leveling mechanism (e.g., a blade portion) collects the excess pre-transformed material, as it levels the dispensed material. FIGS. 23A-23D show examples of planarizing an exposed surface of a material bed. FIG. 23A shows a leveling mechanism (e.g., leveler, 2311) comprising a blade 2313 that translate in a direction 2315, and shears the material bed having an exposed surface 2316, to form a planar exposed surface 2312. In the example shown in FIG. 23A, pre-transformed material from the material bed accumulates 2317 on the blade 2313 as it translates 2315. In some embodiments, as the leveling mechanism reaches the end of the material bed, the leveling mechanism stops abruptly or reverses its direction of movement abruptly, resulting in a continued motion (e.g., inertial movement) of the accumulated excess material forward. In some embodiments, as the leveling mechanism reaches the end of the material bed, the leveling mechanism accelerates and stops abruptly or reverses its direction of movement abruptly, resulting in a continued motion (e.g., inertial movement) of the accumulated excess material forward. The forward moving excess pre-transformed material may be accumulated and/or sucked into a container (e.g., of the recycling system). FIG. 23B shows an example where the blade 2322 of the leveling mechanism that accumulates material and moves and/or accelerates in a direction (e.g., forward) 2325, which movement moves the accumulated material 2328 toward a collection system (e.g., collector) 2329 to form a planar exposed surface 2321. FIG. 23C shows an example where the blade of the leveling mechanism 2333 reverses its direction to 2335 (e.g., abruptly) to move away from the collection system, resulting in a (e.g., continuous) movement of the excess accumulate pre-transformed material 2338 in a direction 2332 via its momentum (in accordance with the direction 2325 of the leveling mechanism in FIG. 23B), and toward the collection system 2339 (e.g., collector, or collection reservoir). The pre-transformed material can deposit into the collection system. At the end of a translation cycle (e.g., of the material leveling mechanism), the excess pre-transformed material (e.g., within the collection system) may be transferred and/or collected into an overflow mechanism and/or a recycling mechanism. FIG. 23C show an example of excess pre-transformed material 2338 on its way to a collection system 2339. The overflow mechanism may be a container that collects excess pre-transformed material. The pre-transformed material from the overflow mechanism may be transferred to a recycling mechanism and/or a material dispensing mechanism. At times, the processing chamber and/or enclosure may have an opening to facilitate the transfer of the excess pre-transformed material. The opening may be adjacent to the material bed (e.g., at a boundary of the material bed). At times, the vibration mechanism may facilitate the transfer of the excess pre-transformed material. The vibration mechanism may be controlled (e.g., automatically, and/or manually) to perform a dithering movement (e.g., a back-and-forth movement) at a high acceleration rate. At times, a single dithering movement may be performed (e.g., at the end of the planarization cycle of the leveling mechanism). At times, a plurality of dithering movements may be performed (e.g., while using the leveling mechanism to planarize the material bed and/or while dispensing the pre-transformed material). At times, the plurality of dithering movements may be performed at the same location (e.g., at the edge of a material bed). At times, the dithering movement may be performed at the end of and/or during a material leveling cycle. At times, the dithering movement may be performed at the end of and/or during a material deposition cycle. In some embodiments, the material leveling mechanism is configured to reduce disruption of the leveled (e.g., (e.g., substantially) planar) exposed surface of material bed. For example, at least a tip of the blade (e.g., the blade) can be angled (e.g., slanted) with respect to the exposed surface of the material bed. FIG. 23D show an example material leveling mechanism 2341 having a blade 2340 that has a first (e.g., top) edge 2342 and second (e.g., bottom) edge 2343. The first and second edges can be part of a tip of the blade. The first (e.g., top) edge can guide the pre-transformed material 2346 of the material bed 2344 onto the top surface of the blade when moving in a direction 2349, e.g., toward a collection system. If the material leveling mechanism is configured to move a reverse direction 2345, the second (e.g., bottom) edge 2343 can be at an angle 2347 with respect to the leveled ((e.g., substantially) planar) exposed surface 2350 of the material bed. For example, at least the tip of the blade (comprising the second surface 2343) can be tilted with respect to the leveled exposed surface of the material bed. The at least the tip of the blade may comprise the blade. The angle 2347 may be an acute angle. The angle 2347 can be any suitable acute angle. In some embodiments, the angle is at most about 90 degrees (°), 85°, 70°, 60°, 50°, 40°, 30°, 25°, 20°, 15°, 10°, 5°, 3°, 2°, 1°, or zero °. About zero ° corresponds to the second edge being (e.g., substantially) parallel to the leveled surface. In some embodiments, the angle is greater than zero ° (non-parallel to the leveled surface). The angle can be between any of the afore-mentioned degrees (e.g., from about 1° to about 90°, from about 30° to about 90°, or from about 1° to about 30°).

At times, the vibration mechanism is controlled. The vibration motion may be performed continuously (e.g., during the deposition of a planar layer of pre-transformed material, or a portion thereof). The vibration motion may be performed during (e.g., as part of) printing of the 3D object. The vibrating movement of the shaft may be controlled statically (e.g., before, after, deposition of a planar layer of material). The vibrating movement of the shaft may be controlled dynamically (e.g., during deposition of at least a portion of a planar layer of material).

In some embodiments, the actuator is coupled to at least one controller (herein collectively "controller"). The controller may be coupled to a sensor (e.g., positional, optical, weight). The controller may control the starting of the actuator. The controller may control the stopping of the actuator. The controller may detect a position of the layer dispensing mechanism. The controller may dynamically (e.g., in real-time during the 3D printing) control the actuator to adjust the position of the layer dispensing mechanism. The controller may control the amount of movable distance of the shaft (e.g., by controlling the actuator). The controller may detect the need to perform dispensing and/or planarization of a pre-transformed material. The controller may activate the actuator to move the shaft and the coupled layer dispensing mechanism to a position adjacent to the platform. The controller may detect the completion of dispensing a layer adjacent to the platform (e.g., comprising a base FIG. 1, 102 and a substrate FIG. 1, 109). The controller may activate the actuator to move the shaft to retract the layer dispensing mechanism into the ancillary chamber.

Figure 14A:
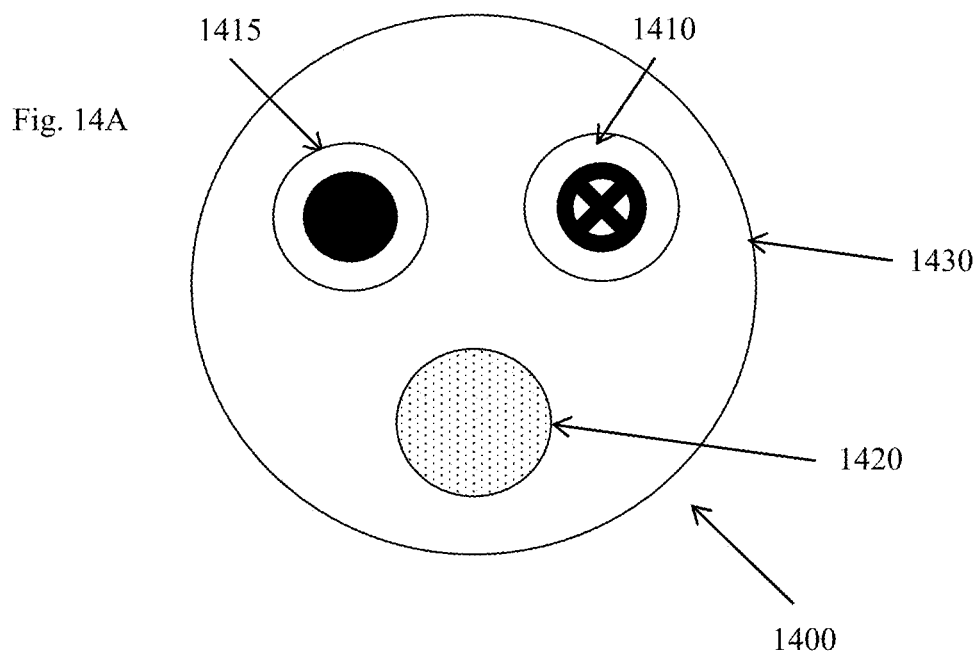
FIGS. 14A and 14B schematically illustrate various views of components of a 3D printing system.
Figure 14B:
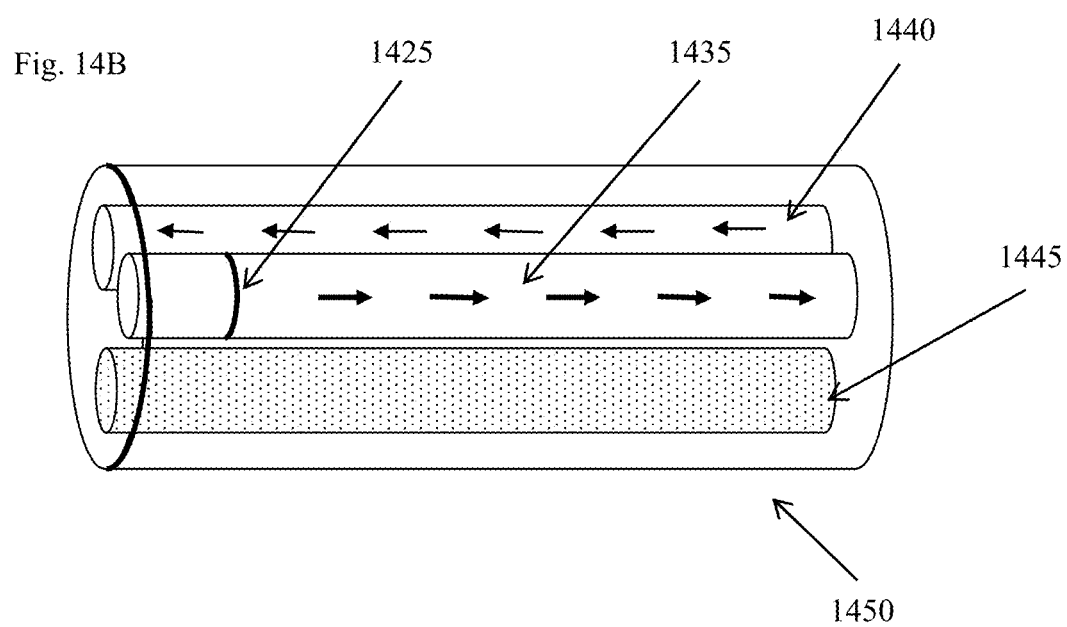
Figure 15:
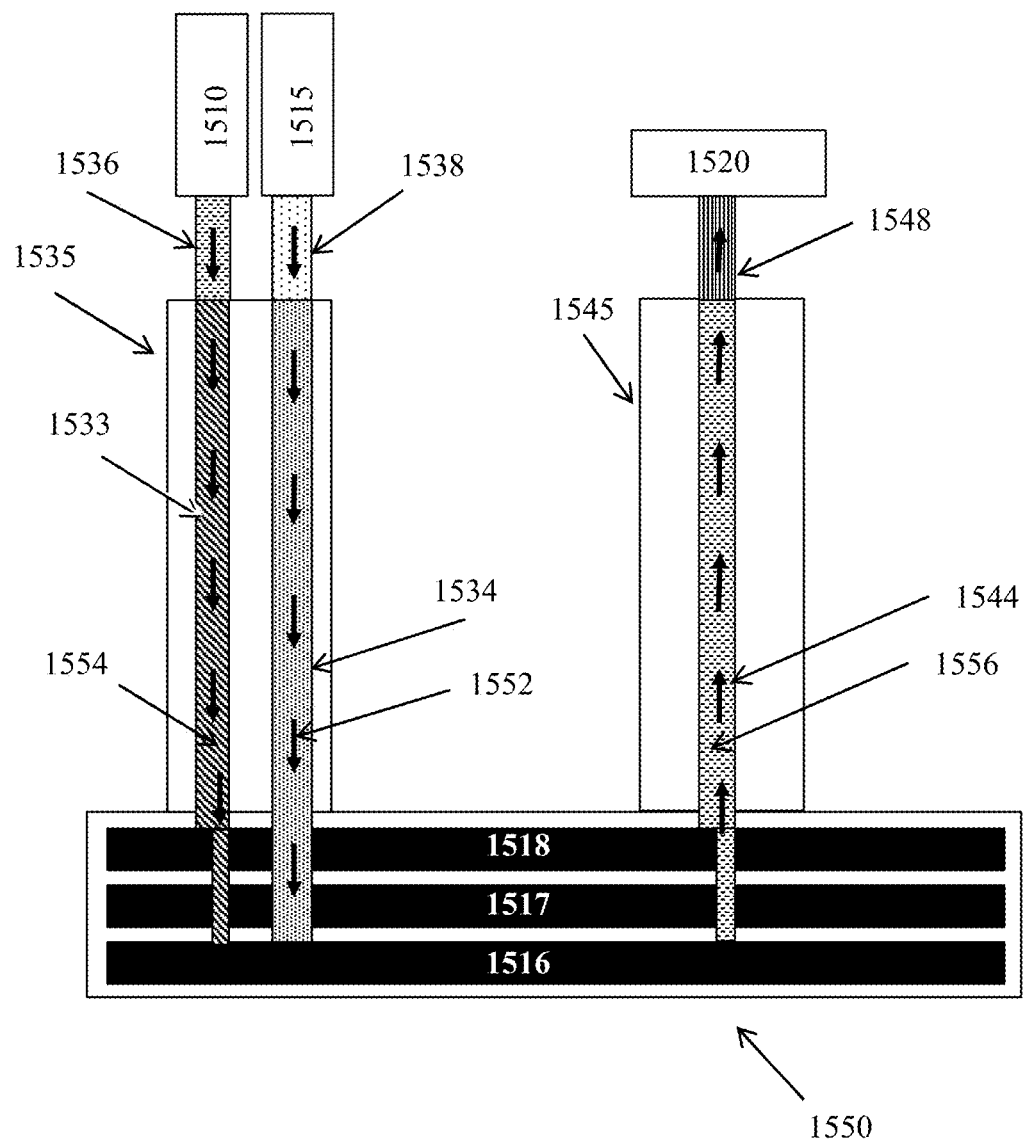
FIG. 15 schematically illustrates a top view of components of a 3D printing system.

In some embodiments, the material dispensing mechanism is operatively coupled to one or more shafts. FIG. 15 shows an example of two shafts (e.g., 1535, 1545) coupled to the layer dispensing mechanism (e.g., 1550). Each shaft may be coupled to an actuator. In some examples, at least two of the shafts have a common actuator. In some examples, at least two of the shafts each have their own (different) actuator. The actuator may reside on a stage. The shaft may be hollow (e.g., comprise one or more cavities). The shaft may facilitate suction of debris and/or pre-transformed material from the layer dispensing mechanism. The layer dispensing mechanism may include a material dispensing mechanism 1516, a levelling mechanism 1517 and a material removal mechanism 1518. FIG. 14A shows an example of a vertical cross section of a shaft (e.g., 1430). The shaft may comprise one or more channels (e.g., FIG. 14B, 1435, 1440, 1445). FIG. 14B shows an example of a side view of the shaft. The channel may include a valve. The valve may be located outside or inside the shaft. FIG. 14B shows an example of a valve 1425 located in the shaft 1450. The valve may control (e.g., regulate and/or direct) the flow of content included within the channel. The valve may be a pneumatic, manual, solenoid, motor, hydraulic, a two-port, a three-port, or a four-port valve. The content of the channel may comprise debris, pre-transformed material, or gas. FIG. 14A shows an example of a vertical cross section of a shaft 1400 comprising three channels 1410 (that transport a material, such as gas, inwards), 1415 (that transport a material, such as gas, outwards), and 1420 (that transport pre-transformed material).

In some embodiments, a shaft comprises at least one transit system (e.g., a channel within the shaft). A portion of the channel (e.g., FIG. 15, 1533, 1534, or 1544) may reside within the shaft. A portion of the channel (e.g., 1536, 1538, or 1548) may be external to the shaft. The channel may transport pre-transformed material (e.g., 1552) into the layer dispensing mechanism (layer forming device). The channel may transport (e.g., compressed) gas (e.g., 1554) into the layer dispensing mechanism (e.g., layer dispenser) and/or material removal mechanism (e.g., material remover). The channel may assist in removing pre-transformed material (e.g., 1556) from the layer dispensing mechanism and/or material removal mechanism. Positive and/or negative pressure may be used to facilitate transport in the channel. The channel (e.g., an external end thereof) may be (e.g., fluidly) connected to recycling system (e.g., 1520), a reconditioning system, a bulk reservoir of pre-transformed material (e.g., 1515), a pressure pump (e.g., 1510), (e.g., a vacuum or gas pump). The channel that transports pre-transformed material may be (e.g., fluidly) connected to the material dispensing mechanism (e.g., 1516) of the layer dispensing mechanism (e.g., 1550). The channel that transports gas or air may be connected to the material levelling mechanism (e.g., leveler) (e.g., 1517) or the material removal mechanism (e.g., 1518) of the layer dispensing mechanism. The channel that transports negative pressure (e.g., gas or air) may be connected to the material removal mechanism (e.g., 1518) of the layer dispensing mechanism. Fluid connection as understood herein is a connection that allows material to be flowingly transferred. The material that is transferred can comprise solid, liquid or gas.

In some embodiments, the 3D printer comprises an ancillary chamber. FIG. 12 shows an example of an ancillary chamber 1240 coupled to the processing chamber 1226. In some embodiments, the layer dispensing mechanism (e.g., 1234) is parked within the ancillary chamber, when the layer dispensing mechanism does not perform dispensing adjacent to a platform, which platform comprises a substrate 1261 and a base 1260. The layer dispensing mechanism may be conveyed to the processing chamber (e.g., FIG. 12, 1226). When conveyed, the layer dispensing mechanism may move from a first position (e.g., a position within the ancillary chamber (e.g., FIG. 11, 1140) to a position adjacent to the build module (e.g., 1184)). When conveyed, the one or more shafts may move from a first position (e.g., a position within the ancillary chamber (e.g., 1172)) to a position adjacent to the processing chamber (e.g., 1175). When conveyed, the actuator (e.g., 1152) may move from a first position (e.g., a position within the ancillary chamber 1105) to a position adjacent to the build module (e.g., 1154). When conveyed, the layer dispensing mechanism may dispense a layer of pre-transformed material adjacent to the platform (e.g., FIG. 12, 1204). The layer dispensing mechanism may park within the ancillary chamber. For example, the layer dispensing mechanism may part in the ancillary chamber when the layer dispensing mechanism is not performing a dispersion of a layer of pre-transformed material. For example, the layer dispensing mechanism may part in the ancillary chamber when the material dispenser does not dispense pre-transformed material. For example, the layer dispensing mechanism may part in the ancillary chamber when the leveling mechanism does not level (e.g., planarize) the material bed. For example, the layer dispensing mechanism may part in the ancillary chamber when the material removal mechanism does planarize the material bed. For example, the layer dispensing mechanism may part in the ancillary chamber when the material bed is exposed to an energy beam (e.g., FIG. 12, 1201).

In some embodiments, the ancillary chamber (e.g., also referred to herein as "ancillary enclosure," e.g., 1254) is dimensioned to accommodate the layer dispensing mechanism (e.g., FIG. 12, 1240, FIG. 13, 1305). The layer forming device (layer dispenser) can include a material dispenser (e.g., 1322), leveler (e.g., 1316) and a material remover (e.g., 1317). The ancillary chamber may be dimensioned to enclose the layer dispensing mechanism (layer forming device), one or more bearings, one or more bellow portions, at least a portion of the one or more shafts (e.g., FIG. 11, 1110, or FIG. 12, 1236), or any combination thereof. In some cases, one section (e.g., first section) of the ancillary chamber is configured to house the layer forming device (e.g., when the layer forming device is in a parked mode) and another section (e.g., second section) of the ancillary chamber is configured to house the one or more actuators. FIG. 11 shows an example of an ancillary chamber 1172 having section 1192 enclosing a layer forming device (e.g., in a parked mode) and another section 1193 enclosing one or more actuators (e.g., 1152). The one or more actuators can control movement (e.g., translation and/or vibration) of the layer forming device. The first and second sections can be separated by a partition (e.g., 1194) (also referred to as a wall, barrier, or separator) that can include one or more partition holes for the one or more shafts (e.g., 1110) to pass therethrough. In some embodiments, the first section is configured to have a different atmosphere (e.g., pressure, temperature, and/or chemical (e.g., gas, particles, plasma) composition) than the second section. In some embodiments, the first section is configured to have the same atmosphere (e.g., pressure, temperature, and/or gas composition) than the second section. In some embodiments, one or more seals (e.g., including bellows, bearings, gas flow mechanism, diaphragm, cloth, or mesh) are situated in or adjacent to the one or more partition holes. The one or more seals can separate atmospheres within the first and second sections. For example, the one or more seals can prevent particles (e.g., powder (e.g., pre-transformed material powder) and/or debris) from transiting between the first or second section. This may be beneficial, for example, in order to reduce an amount (e.g., prevent) particles from reaching components and/or devices housed within the first or second sections. In some embodiments, the partition and one or more seals are used to reduce an amount (e.g., prevent) particles from reaching the one or more actuators (e.g., 1152) in the second section. In some embodiments, the second section is open to an ambient atmosphere. In some embodiments, the first section is separated from the ambient atmosphere.

The layer dispensing mechanism may comprise at least one of a material dispensing mechanism (e.g., FIG. 1, 116), leveling mechanism (e.g., FIG. 1, 117), and a material removal mechanism (e.g., FIG. 1, 118). FIG. 11 schematically shows an example of a layer dispensing mechanism 1140. The ancillary chamber may be separated from the processing chamber through a closable opening that comprises a closure (e.g., a shield, door, or window). The opening (e.g., the partition between the ancillary chamber and the processing chamber) may comprise a closure (e.g., FIG. 11, 1160, or FIG. 12, 1256). The closure may relocate to allow the layer dispensing mechanism (also referred to herein as "layer dispenser," or "layer forming device") to travel from the ancillary chamber to a position adjacent to (e.g., above) the material bed. The closure may be coupled with (e.g., connect to) the layer forming device. The closure may be coupled with (e.g., connect to) at least one shaft that is coupled with (e.g., connect to) the layer forming device. The closure may close to separate the processing chamber from the ancillary chamber within the same atmosphere (e.g., the processing chamber and ancillary chamber remain within the same atmosphere). The closure may close to isolate an atmosphere of the processing chamber from an atmosphere of the ancillary chamber. The closure may permit gaseous exchange between the processing chamber and the ancillary chamber. The closure may close to isolate the 3D printing taking place in the processing chamber from components housed in the ancillary chamber (e.g., the layer dispenser). The closure may or may not closed the opening when the layer forming device is forming (e.g., dispensing, leveling, removing material from) a layer (e.g., is operative in the processing chamber). The closure may or may not close the opening when the energy beam is operative in the processing chamber. The closure may or may not close the opening when the pre-transformed material is being transformed to the transformed material. The closure may or may not close the opening when the layer forming device is positioned within the ancillary chamber (e.g., when in the parked mode). The closure may open, e.g., to allow the atmosphere of the ancillary chamber and the processing chamber to merge. The closure may open, e.g., to allow debris from the processing chamber to enter the ancillary chamber. The closure may be (e.g., operatively) coupled to the layer dispensing mechanism. Operatively coupled may comprise physically coupled. The closure may be coupled via a mechanical connector, a controlled sensor, a magnetic connector, an electro-magnetic connector, or an electrical connector. The layer dispensing mechanism may cause the closure to open when conveyed adjacent to the material bed (e.g., by pushing the closure). The closure may slide, tilt, flap, roll, or be pushed to allow the layer dispensing mechanism to travel to and from the ancillary chamber. The closure may relocate to a position adjacent to the opening. Adjacent may be below, above, to the side, or distant from the opening. Distant from the opening may comprise in a position more distant from the ancillary chamber. The closure may at least partially (e.g., fully) open the opening (e.g., before, after, and/or during the 3D printing).

In some examples, the 3D printer comprises a layer dispensing mechanism. FIG. 12 shows an example of a layer dispensing mechanism (e.g., FIG. 12, 1234) that can travel from a position in the ancillary chamber (e.g., FIG. 12, 1240) to a position adjacent to the material bed (e.g., FIG. 12, 1232). The separator (e.g., closure) may change its position to allow the movement of the layer dispensing mechanism to and/or from the ancillary chamber. The change of position may be by sliding, flapping, pushing, magnetic opening or rolling. For example, the separator may be a sliding, flapping, or rolling door. The separator may be operatively coupled to an actuator. The actuator may cause the separator to alter its position (e.g., as described herein). The actuator may cause the separator to slide, flap, or roll (e.g., in a direction). The direction may be up/down or sideways with respect to a prior position of the separator. The actuator may be controlled (e.g., by a controller and/or manually). Altering the position may be laterally, horizontally, or at an angle with respect to an exposed surface of the material bed and/or build platform. For example, the actuator may be controlled via at least one sensor (e.g., as disclosed herein). The sensor may comprise a position or motion sensor. The sensor may comprise an optical sensor. For example, the separator may be coupled to the layer dispensing mechanism. Coupling may be using mechanical, electrical, electro-magnetic, electrical, or magnetic connectors. The separator may slide, open or roll when pushed by the layer dispensing mechanism. The separator may slide, close or roll in place when the layer dispensing mechanism retracts into the ancillary chamber.

At times, the layer dispensing mechanism causes (e.g., directly, or indirectly) the closure to open and/or close the opening. Indirectly can be via at least one controller (e.g., comprising a sensor and/or actuator). Directly may comprise directly attached to the layer dispensing mechanism. FIG. 11 shows an example of an opening 1191 comprising a flapping closure 1160 that opens up (according to arrow 1199) to allow the layer dispensing mechanism (layer forming device) 1184 to exit an ancillary enclosure 1105 and enter the processing chamber 1104; and/or allow the layer dispensing mechanism 1184 to enter the ancillary enclosure 1105 and exit the processing chamber 1104. The opening can be within a partition (also referred to as a wall, divider, separator, or barrier) between the ancillary enclosure and the processing chamber. The flapping closure may close according to an arrow 1199 having a reversed direction, and thus separate the ancillary enclosure (e.g., chamber) 1105 from the processing chamber 1104. FIG. 12 shows an example of an opening bordered by stoppers 1267, which opening is closed by a shield type closure 1156 that is connected to the layer dispensing mechanism 1234. In the example of FIG. 12, the layer dispensing opening causes the shield type closure to open the opening as the layer dispensing mechanism travels away from the ancillary chamber 1240 toward a position adjacent to the platform (e.g., comprising the base 1260). In the example of FIG. 12, the layer dispensing opening causes the shield type closure to close the opening as the layer dispensing mechanism travels into the ancillary chamber 1240 (e.g., to park).

At times, a physical property (e.g., comprising velocity, speed, direction of movement, or acceleration) of one or more components of the layer dispensing mechanism is controlled. Controlling may include using at least one controller. Controlling may include modulation of the physical property (e.g., within a predetermined time frame). Controlling may include modulation of the physical property within a translation cycle of the layer dispensing mechanism. At times, one or more components (e.g., the material dispensing mechanism, the material leveling mechanism, and/or the material removal mechanism) of the layer dispensing mechanism may be controlled to operate at a (e.g., substantially) constant velocity (e.g., throughout the translation cycle, throughout a material dispensing cycle, throughout a material leveling cycle and/or throughout a material removal cycle). At times, one or more components may be controlled to operate at a variable velocity. At times, one or more components may be controlled to operate at variable velocity within a portion of time of the translation cycle. At times, the velocity of one or more components of the layer dispensing mechanism, within a first time portion of the translation cycle and a second time portion of the translation cycle may be same. At times, the velocity of one or more components of the layer dispensing mechanism, within a first time portion of the translation cycle and a second time portion of the translation cycle may be different. At times, within the translation cycle, the velocity of one or more components of the layer dispensing mechanism at a first position may be different than the velocity of the one or more components at a second position. At times, within the translation cycle, the velocity of one or more components of the layer dispensing mechanism at a first position may be the same as the velocity of the one or more components at a second position. At times, a component of the layer dispensing mechanism may be individually controlled. At times, at least two or more components of the layer dispensing mechanism may be collectively controlled. At times, at least two components of the layer dispensing mechanism may be controlled by the same controller. At times, at least two components of the layer dispensing mechanism may be controlled by a different controller.

In some configurations, the 3D printer comprises a bulk reservoir (e.g., FIG. 13, 1325, FIG. 11, 1190) (e.g., a tank, a pool, a tub, or a basin). The bulk reservoir may comprise pre-transformed material. The bulk reservoir may comprise a mechanism configured to deliver the pre-transformed material from the bulk reservoir to at least one component (e.g., material dispenser) of the layer dispensing mechanism (layer forming device). The bulk reservoir can be connected or disconnected from the layer dispensing mechanism (e.g., from the material dispenser). FIG. 13 shows an example of a bulk reservoir 1325, which is disconnected from the layer dispensing mechanism 1340. The disconnected pre-transformed material dispenser can be located above, below or to the side of the material bed. The disconnected pre-transformed material dispenser can be located above the material bed, for example above the material entrance opening to the material dispenser within the layer dispensing mechanism. Above may be in a position away from the gravitational center.

The bulk reservoir may be connected to the material dispensing mechanism (e.g., layer dispenser) (e.g., FIG. 13, 1325) that can be a component of (or be coupled to) the layer dispensing mechanism. The bulk reservoir may be located above, below or to the side of the layer dispensing mechanism. The layer dispensing mechanism and/or the bulk reservoir have at least one opening port (e.g., for the pre-transformed material to move to and/or from). Pre-transformed material can be stored in the bulk reservoir. The bulk reservoir may hold at least an amount of material sufficient for one layer, or sufficient to build the entire 3D object. The bulk reservoir may hold at least about 200 grams (gr), 400 gr, 500 gr, 600 gr, 800 gr, 1 Kilogram (Kg), or 1.5 Kg of pre-transformed material. The bulk reservoir may hold at most 200 gr, 400 gr, 500 gr, 600 gr, 800 gr, 1 Kg, or 1.5 Kg of pre-transformed material. The bulk reservoir may hold an amount of material between any of the afore-mentioned amounts of bulk reservoir material (e.g., from about 200 gr to about 1.5 Kg, from about 200 gr to about 800 gr, or from about 700 gr to about 1.5 kg). Material from the bulk reservoir can travel to the layer dispensing mechanism via a force. The force can be natural (e.g., gravity), or artificial (e.g., using an actuator such as, for example, a pump). The force may comprise friction. Examples of bulk reservoir, its components, and associated methods, software, systems, devices, and apparatuses, can be found in PCT/US15/36802, which is entirely incorporated herein by reference.

In some embodiments, the pre-transformed material dispenser reservoir resides within the material dispensing mechanism (e.g., FIG. 13, 1322). The pre-transformed material dispenser may hold at least an amount of powder material sufficient for at least one, two, three, four or five layers. The pre-transformed material dispenser reservoir (e.g., internal reservoir) may hold at least an amount of powder material sufficient for at most one, two, three, four or five layers. The pre-transformed material dispenser reservoir may hold an amount of material between any of the afore-mentioned amounts of material (e.g., sufficient to a number of layers from about one layer to about five layers). The pre-transformed material dispenser reservoir may hold at least about 20 grams (gr), 40 gr, 50 gr, 60 gr, 80 gr, 100 gr, 200 gr, 400 gr, 500 gr, or 600 gr of pre-transformed material. The pre-transformed material reservoir may hold at most about 20 gr, 40 gr, 50 gr, 60 gr, 80 gr, 100 gr, 200 gr, 400 gr, 500 gr, or 600 gr of pre-transformed material. The pre-transformed material dispenser reservoir may hold an amount of material between any of the afore-mentioned amounts of pre-transformed material dispenser reservoir material (e.g., from about 20 gr to about 600 gr, from about 20 gr to about 300 gr, or from about 200 gr to about 600 gr.). Pre-transformed material may be transferred from the bulk reservoir to the material dispenser by any analogous method described herein for exiting of pre-transformed material from the material dispenser. At times, the exit opening ports (e.g., holes) in the bulk reservoir exit opening may have a larger FLS relative to those of the pre-transformed material dispenser exit opening port. For example, the bulk reservoir may comprise an exit opening comprising a mesh or a surface comprising at least one hole. The mesh (or a surface comprising at least one hole) may comprise a hole with a fundamental length scale of at least about 0.25 mm, 0.5 mm. 1 mm, 2 mm, 3 mm, 4 mm, 5 mm, 6 mm, 7 mm, 8 mm, 9 mm or 1 centimeter. The mesh (or a surface comprising at least one hole) may comprise a hole with a fundamental length scale of at most about 0.25 mm, 0.5 mm. 1 mm, 2 mm, 3 mm, 4 mm, 5 mm, 6 mm, 7 mm, 8 mm, 9 mm or 1 centimeter. The mesh (or a surface comprising at least one hole) may comprise a hole with a fundamental length scale of any value between the afore-mentioned values (e.g., from about 0.25 mm to about 1 cm, from about 0.25 mm to about 5 mm, or from about 5 mm to about 1 cm). The bulk reservoir may comprise a plane that may have at least one edge that is translatable into or out of the bulk reservoir. The bulk reservoir may comprise a plane that may pivot into or out of the bulk reservoir (e.g., a flap door). Such translation may create an opening, which may allow pre-transformed material in the reservoir to flow out of the reservoir (e.g., using gravity).

At times, a controller is operatively coupled to the bulk reservoir. The controller may control the time (e.g., time period, duration, and/or an indication/signal received from a sensor) for filling the bulk reservoir. The controller may control the amount of pre-transformed material released from the bulk reservoir by controlling, for example, the amount of time the conditions for allowing pre-transformed material to exit the bulk reservoir are in effect. In some examples, the pre-transformed material dispenser dispenses an excess amount of powder that is retained within the pre-transformed material dispenser reservoir, prior to the loading of pre-transformed material from the bulk reservoir to the pre-transformed material dispenser reservoir. In some examples, the pre-transformed material dispenser does not dispense of any excess amount of pre-transformed material that is retained within the pre-transformed material dispenser reservoir, prior to loading of pre-transformed material from the bulk reservoir to the pre-transformed material dispenser reservoir. Pre-transformed material may be transferred from the bulk reservoir to the pre-transformed material dispenser using a scooping mechanism that scoops pre-transformed material from the bulk reservoir and transfers it to the pre-transformed material dispenser. The scooping mechanism may scoop a fixed or predetermined amount of material. The scooped amount may be adjustable. The scooping mechanism may pivot (e.g., rotate) in the direction perpendicular to the scooping direction. The bulk reservoir may be exchangeable, removable, non-removable, or non-exchangeable. The bulk reservoir may comprise exchangeable components. The layer dispensing mechanism and/or any of its components may be exchangeable, removable, non-removable, or non-exchangeable. The powder dispensing mechanism may comprise exchangeable components.

At times, the pre-transformed material in the bulk reservoir or in the material dispensing mechanism is preheated, cooled, is at an ambient temperature or maintained at a predetermined temperature. A leveling mechanism (e.g., FIG. 13, 1316, comprising a rake, roll, brush, spatula, or blade) can be synchronized with the material dispensing mechanism to deliver and planarize the pre-transformed material to form the material bed. The leveling mechanism can planarize (e.g., level), distribute and/or spread the pre-transformed material on the platform (as the pre-transformed material is dispensed by the material dispensing mechanism.

The leveling mechanism may push an excess of pre-transformed material and/or other debris to the ancillary chamber. The pre-transformed material and/or other debris that resides in the ancillary chamber may be evacuated via a closable opening port 1380. The evacuation may be active (e.g., using an actuator activating a pump, scooper, blade, squeegee, brush, or broom). The evacuation may be passive (e.g., using gravitational force). For example, the floor of the ancillary chamber may be tilted towards the opening. The tilted floor may allow any pre-transformed material and/or other debris to slide towards the opening with or without any additional energy (e.g., a suction device, or any other energy activated device).

At times, the bulk reservoir is stationary. The bulk reservoir may be located at least partially within the ancillary chamber. The bulk reservoir may be located at least partially outside of the ancillary chamber. The bulk reservoir may be located at a position adjacent to (e.g., above) the layer dispensing mechanism, when the layer dispensing mechanism resides (e.g., parks) within the ancillary chamber. The bulk reservoir may be located at least partially within the processing chamber. The bulk reservoir may be located at least partially outside of the processing chamber. The bulk reservoir may comprise a top surface and a bottom surface. Bottom may be in a direction towards the gravitational center and/or the platform. Tom may be in a direction opposite to the gravitational center and/or the platform. The top surface may have an entrance opening. The entrance opening may include a closure. The closure may be coupled to the top surface. The bulk reservoir may have a volume that is greater than the volume of the material dispensing mechanism within the layer dispensing mechanism. The bulk reservoir may be filled with pre-transformed material from the entrance opening. The bulk reservoir may be filled during, after or before 3D printing. At times, the bulk reservoir may be refilled during, after, or before a layer deposition cycle (e.g., after a plurality of translation cycles). At times, the entrance opening may be on a side surface of the reservoir. At times, the bulk reservoir may be operatively coupled to at least one sensor. The sensor may indicate the amount of material within the bulk reservoir. The sensor may be a positional sensor. The sensor may sense a position of the material dispenser (e.g., in the ancillary chamber). The sensor may sense an engagement of the material dispenser with the bulk reservoir. The bottom surface of the bulk reservoir may be coupled (e.g., operatively, and/or physically) to a channel. Coupled may comprise flowably connected. The bottom surface may be coupled to a plate (e.g., a flat surface). At times, the bottom surface may be coupled to more than one plates. The plate may facilitate a flow of (e.g., pre-transformed) material from the bulk reservoir to the material dispensing mechanism. The plate(s) may be translatable. The plate(s) may translate in a lateral direction (e.g., along the X-axis). The plate(s) may be located at a position between a bottom surface of the bulk reservoir and a top surface of the material dispensing mechanism. The plurality of plates may translate simultaneously. The movement of the plurality of plates may be synchronized. The plurality of plates may translate independently. The movement of the one or more plates may be controlled (e.g., manually and/or by a controller). At times, the plate may facilitate the closure of the bottom surface of the bulk reservoir. At times, the plate may facilitate the closure of the top surface of the material dispensing mechanism. At times, the plate may simultaneously facilitate the closure of the top surface of the material dispensing mechanism and the bottom surface of the bulk reservoir.

Figure 22A:
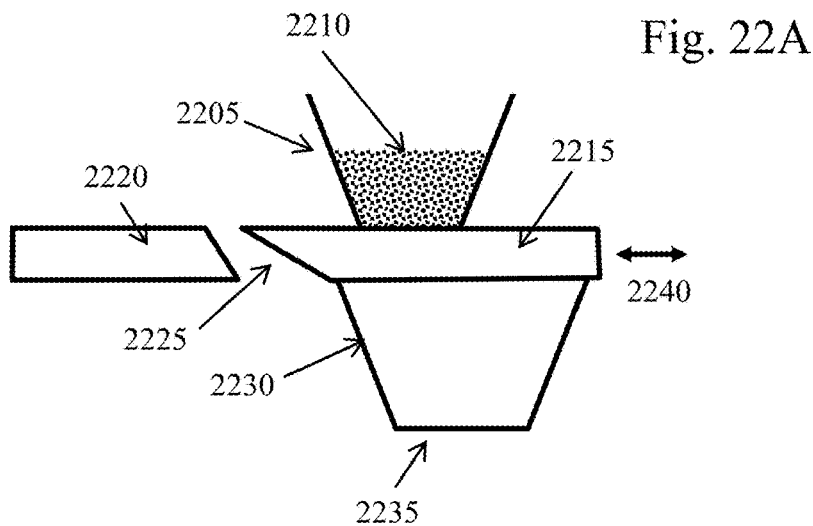
FIGS. 22A-22C schematically illustrate a component of a 3D printing system.
Figure 22B:
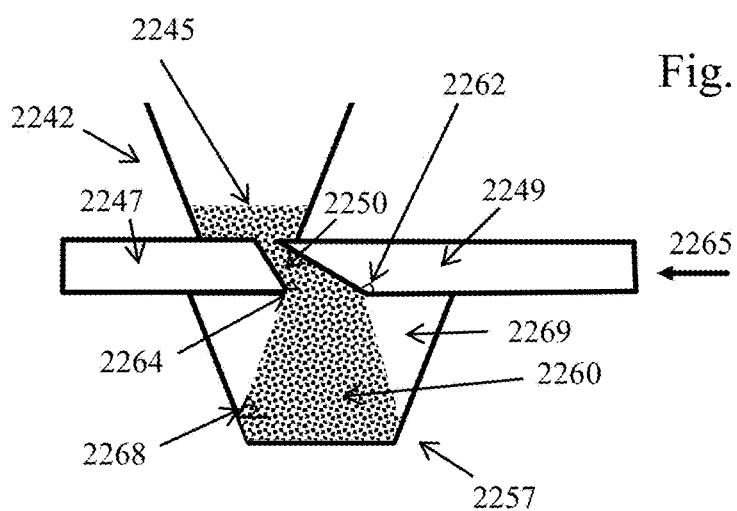
Figure 22C:
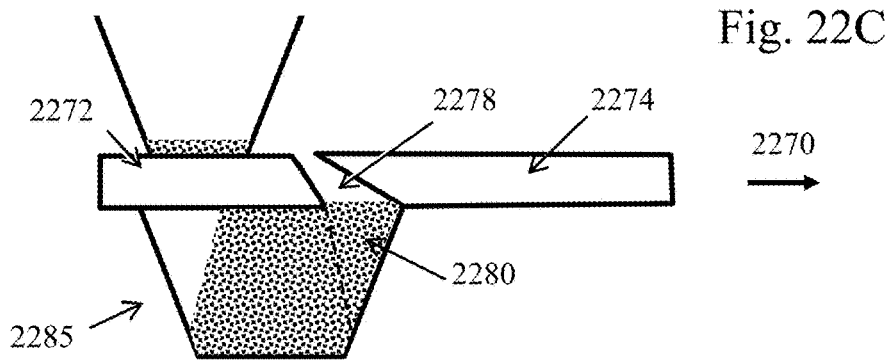

In some embodiments, the plate comprises a perforation. The perforation may be a lateral (e.g., horizontal) gap (also referred to as an opening) between two or more plates. The perforation may be an aperture within a single plate. The perforation may be formed by a gap between a plurality of (e.g., two) plates. The perforation may comprise a uniform or a non-uniform shape. For example, the perforation may have a geometric 3D shape (e.g., a box, e.g., a cube). The perforation may form a channel between the bulk reservoir and the material dispensing mechanism. The plate may be translated, such that the perforation may be aligned between at least a portion of the exit opening of the bulk reservoir and at least a portion of an entrance opening of the material dispensing mechanism. At times, the material dispensing mechanism may be translated to align with the perforated plate and/or the exit opening of the bulk reservoir. The channel may be cylindrical. The channel may be a tube. The channel may resemble an inversed funnel. At least one wall of the channel may be slanted. The channel may comprise divergent (e.g., non-parallel) surfaces. The channel may be aligned on one side at a first angle (e.g., FIG. 22B, 2262) with the material dispenser and on a second side at a second angle (e.g., FIG. 22B, 2264) with the material dispenser. The first angle may be different than the second angle. At times, the first angle may be the same as the second angle. The cross section of the channel entrance (e.g., the area between the exit opening of the bulk reservoir and the top surface of the aligned perforation) may be different (e.g., narrower) than the cross section of the channel exit (e.g., the area between the entrance opening of the material dispensing mechanism and the bottom surface of the aligned perforation). Without wishing to be bound to theory, the different cross-sections may lead to an increase in channel volume towards the channel exit as compared to the volume at the channel entrance. The different cross-sections of the channel entrance and channel opening may facilitate (e.g., easier) flow of the (e.g., pre-transformed) material (e.g., by reducing clogging and/or clumping of the (e.g., pre-transformed) material). At times, a wall of the channel may include a material (e.g., a polished material, e.g., as described herein) that may lower the friction and/or adhesion between the channel surface and the (e.g., pre-transformed) material. At times, a wall of the channel may include a coating (e.g., as described herein) that may lower the friction and/or adhesion between the channel surface and the (e.g., pre-transformed) material. The channel may facilitate directing the flow of (e.g., pre-transformed) material from the bulk reservoir to the material dispenser (e.g., when the exit opening of the bulk reservoir, the plate perforation and the entrance opening of the material dispensing mechanism are at least partially aligned with each other). The volume of the channel may be smaller than the volume of the bulk reservoir and/or the volume of the material dispensing mechanism. The flow of material through the channel may form a mound of material within the material dispensing mechanism. At times, a void may be formed adjacent to (e.g., on a side of) the mound of material (e.g., according to the angle of repose, e.g., 2268). The cessation of flow of the (e.g., pre-transformed) material may be self-controlled as the mound of material reaches the top surface of the material dispensing mechanism. The amount of (e.g., pre-transformed) material flow may be self-limited by the channel. For example, the (e.g., pre-transformed) material may stop flowing to the material dispensing mechanism, when the mound of material reaches the top surface of the material dispensing mechanism, and the channel may be filled with the (e.g., pre-transformed) material (e.g., FIG. 22B). The perforated plate (e.g., or the plurality of plates comprising a gap) may be moved in a lateral direction to close the channel. The channel may be closed when a pre-determined amount of material is dispensed into the material dispensing mechanism. The channel may be closed when the channel is filled (e.g., entirely) with (e.g., pre-transformed) material and may not be able to hold additional material. At times, material may be trapped within the channel (e.g., when the perforated plate moves to form a closure of the channel). The closure of the channel may be caused by the engagement of the entrance opening of the channel with the closed bottom portion of the bulk reservoir. The perforated plate may be moved to align the channel with a portion of the material dispensing mechanism that is devoid of (e.g., pre-transformed material) (e.g., due to the angle of repose). The trapped material may be dispensed within this void. The volume of the channel may facilitate (e.g., complete) evacuation of the trapped (e.g., pre-transformed) material into the material dispenser volume. At times, the perforated plate (or plurality of plates comprising a lateral gap) may be moved at a slow speed. Slow may be a speed that allows dispensing of material into the void (e.g., without spillage outside of the material dispenser). At times, the perforated plate may be aligned with the void portion for a predetermined time-period. The trapped material within the channel may be dispensed into the void. For example, the trapped material may be dispensed within the void when the perforated plate (or plurality of plates comprising the lateral gap) moves, and/or when the perforated plate may be aligned with the void. At times, the amount of trapped material may be (e.g., substantially) equal to the volume of the void. FIGS. 22A-22C illustrate examples of various positions of a perforated plate or a pair of plates that are separated by a (e.g., lateral) (e.g., horizontal) gap, shown as a vertical cross section. FIG. 22A shows an example of two plate portions (e.g., 2220, 2215) that form a perforation and/or a channel (e.g., 2225); or an example of two plates (e.g., 2220, 2215) that are separated by a lateral gap that form the channel (e.g., 2225). The plate(s) may be translated in a lateral direction (e.g., 2240) to facilitate a closure of the bottom surface of the bulk reservoir (e.g., 2205). The plate(s) may facilitate a closure of the entrance opening of the material dispensing mechanism (e.g., 2235). The bulk reservoir may be filled with (e.g., pre-transformed) material (e.g., 2210) when the channel is misaligned with an exit opening of the bulk reservoir. FIG. 22B shows an example of aligning the channel (e.g., 2250) with the exit opening of the bulk reservoir (e.g., 2242) and an entrance opening of the material dispensing mechanism (e.g., 2257). The one or more plates (e.g., 2247, 2249) may be translated in a lateral direction (e.g., 2265) to form the alignment. Once at least partially aligned (e.g., to allow flow of the (e.g., pre-transformed) material from the bulk reservoir to the material dispenser), the channel may be in the aligned position for a (e.g., predetermined) amount of time to allow the (e.g., pre-transformed) material to fill the channel to its congestion (e.g., 2250). At times, the channel may remain in the aligned position until no more (e.g., pre-transformed) material can flow out of the channel (e.g., due to its congestion). Once aligned, the (e.g., pre-transformed) material (e.g., 2245) from the bulk reservoir may flow into the material dispensing mechanism via the channel. The dispensed (e.g., pre-transformed) material may form a mound of material (e.g., 2260) within the material dispensing mechanism. Additionally, a void may be formed (e.g., due to the angle of repose (e.g., 2268) of the mound of material). FIG. 22C shows an example of the plate(s) in an ancillary fill position. An ancillary fill position may be a position wherein the channel (e.g., 2278) may be aligned with the void (e.g., FIG. 22B, 2269) within the material dispensing mechanism (e.g., 2285). The plate(s) (e.g., comprising 2272 and 2274) may be translated in a lateral direction (e.g., 2270) to align the channel with the void area. The movement of the plate(s) may facilitate closure of the bulk reservoir when reaching the ancillary position. The alignment may facilitate flow of (e.g., pre-transformed) material (e.g., trapped material, or excess material) from the channel into the void area of the material dispensing mechanism, to at least partially fill it up (e.g., 2280), and empty the channel (e.g., 2278).

Figure 32A:
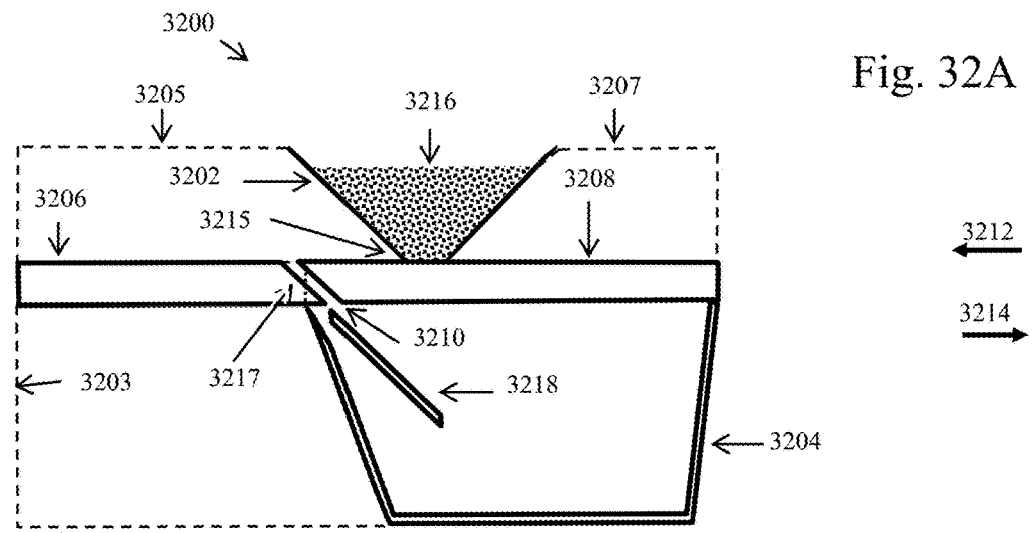
FIGS. 32A-32C schematically illustrate components of a 3D printing system.
Figure 32B:
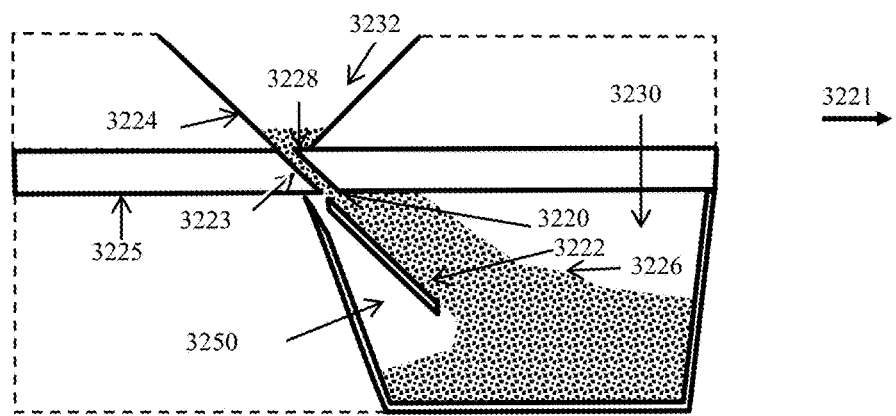
Figure 32C:
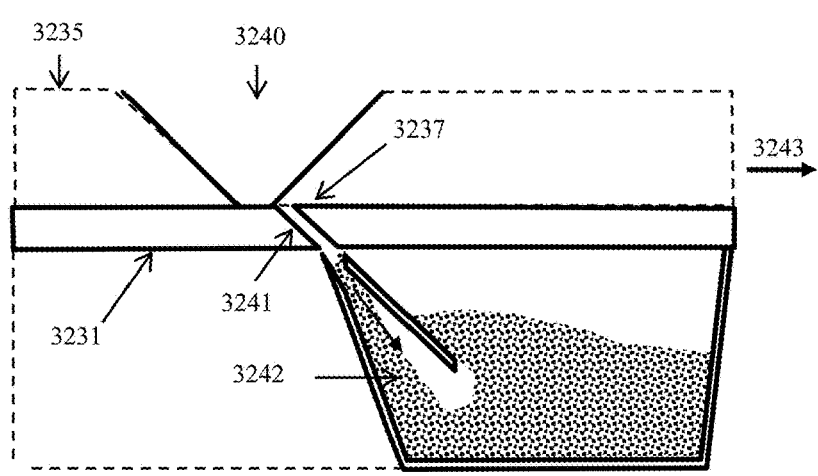

In some embodiments, the plate(s) allow for channeling of (e.g., pre-transformed) material through a (e.g., side) opening of the material dispenser. FIGS. 32A-32C illustrate examples of cross-section views of an example apparatuses (e.g., 3200) for channeling material, e.g., from a bulk reservoir (e.g., 3202) to a material dispenser (e.g., 3204), in accordance with some embodiments. The plate can be a single (e.g., perforated) plate or include multiple (e.g., at least two) plates. The plate(s) can include a first portion (or a first plate) (e.g., 3206) and a second portion (or a second plate) (e.g., 3208) that are separated by a (e.g., lateral) (e.g., horizontal) channel (e.g., 3210) (also referred to as an opening or gap). The first portion and the second portion can be two separate plates. The cross section of the gap may be adjustable before, during, and/or after channeling the material. In some embodiments, the plate is a non-perforated single plate that is configured to approach and/or recede from the material dispenser, e.g., to form and/or disrupt the channel. FIG. 32A shows the plate(s) in a first position that facilitates closure of the bulk reservoir comprising material 3216, where a channel between the bulk reservoir and the material dispenser is not being engaged with the bulk reservoir exit opening 3215. In some cases, a support member (e.g., 2303) supports at least a portion of the first portion (first plate). The support member can be (e.g., directly) adjacent the material dispenser. In some cases, the bulk reservoir and/or material dispenser is (e.g., directly) adjacent one or more axillary member(s) (e.g., 3205 and/or 3207). In some embodiments, the plate(s) may be configured to translate in at least one (e.g., lateral) direction. For example, the plate(s) may be translatable in a first direction (e.g., 3212) and a second direction (e.g., 3214). The first direction can be opposite the second direction. In some embodiments, the plate(s) is configured to translate (e.g., substantially) only in one direction (e.g., 3212 or 3124). In some embodiments, at least one plate is operatively coupled to the material dispenser, e.g., in a way that facilitates co-translation of the plate(s) and material dispenser (e.g., with respect to the bulk reservoir and/or platform). For example, the plate may be (e.g., removably) fixed to the material dispenser. For example, the plate may be an integral part of the material dispenser. In some embodiments, the material reservoir comprises a top portion that is different than a plate. In some embodiments, the plate(s) is operatively coupled to the bulk reservoir (e.g., the plate and bulk reservoir translate together with respect to the material dispenser. Movement of the plate(s) can at least partially align the plate opening, plate side, and/or plate edge (e.g., 3217), with (i) an exit opening of the bulk reservoir (e.g., 3215) and/or (ii) an entrance opening of the material dispenser. The (e.g., at least partial) alignment can form a channel that facilitates a flow of (e.g., pre-transformed) material (e.g., 3216) from the bulk reservoir to the material dispenser. FIG. 32B shows an example of aligning the channel with the exit opening (e.g., 3218) of the bulk reservoir and an entrance opening (e.g., 3320) of the material dispenser. The entrance opening of the material dispenser can be located along a side of the material dispenser. The side of the material dispenser can correspond to one or more walls of the material dispenser that are non-parallel to the platform and/or plate (e.g., not the top or bottom of the material dispenser). The side of the material dispenser can be configured not to (i) face the platform, and/or the exposed surface of the material bed, and/or (ii) face away from the exposed surface of the material bed and/or from the platform. The side can be normal to an exposed surface of the material bed, e.g., during operation of the material dispenser. The side can be configured to be slanted with respect to an exposed surface of the material bed, e.g., during operation of the material dispenser. The shape of the channel, exit opening and entrance opening can be the same or different. In some embodiments, at least one of the channels, exit opening and entrance opening has an elongated (e.g., slot) shape. In some embodiments, the bulk reservoir has a wall(s) that is slanted and/or converge toward the exit opening (e.g., 3228) (e.g., funnel-shaped) of the bulk reservoir. The alignment can be achieved by translating the plate(s) with respect to the bulk reservoir and/or the material dispenser (e.g., in direction 3221). In some embodiments, the plate opening, plate edge, and/or side is at least partially aligned with the exit opening of the bulk reservoir and the entrance openings to the material dispenser (e.g., internal walls at least partially defining the channel, bulk reservoir and/or material dispenser are not fully aligned with one another). In some cases, at least a portion of the internal surface of a wall of the channel (e.g., walls of one or more of: the bulk reservoir, plate opening, plate side, plate edge, and material dispenser) is polished or coated with a polished material. In some cases, the internal surface of the channel wall has an Ra value below a pre-determined value. For example, the Ra value may be below about 50 micrometers ($\mu m$), 10 $\mu m$, 5 $\mu m$, or 1 $\mu m$. In some embodiments, at least one internal wall of each of the channel, bulk reservoir and/or material dispenser are parallel with respect to each other during alignment. In some embodiments, at least one internal wall of each of the plate opening, bulk reservoir and/or material dispenser is oriented at a non-parallel angle with respect to each other, a surface (e.g., 3225) of the plate(s) and/or platform. The at least partial alignment can form a channel that facilitates movement (e.g., by the force of gravity and/or an applied pressure (e.g., gas pressure)) from one side of the channel to its opposing side, e.g., from a cavity (e.g., 3232) of the bulk reservoir to a cavity (e.g., 3230) of the material dispenser. The cavity may be an internal compartment. The flow of material can be facilitated by movement (e.g., during engagement or disengagement) of the material dispenser, the bulk reservoir and/or the plate(s), e.g., as described herein with reference to FIGS. 22A-22C. The channel can have a uniform (e.g., have a symmetric cross-section) shape or a non-uniform (e.g., have a non-symmetric cross-section) shape. The channel can have no rotational symmetry axis (e.g., that comprises its entry and exit). The channel can at least partially be defined by at least two diverging and/or parallel (e.g., internal) surfaces. The channel can at least partially be defined by at least two diverging and/or parallel (e.g., internal) sides of its vertical cross section. The channel can facilitate the flow of the material from a first end of the plate opening to a second opposite end of the plate opening.

In some embodiments, the internal compartment of the material dispenser comprises one or more baffles. The one or more baffles may facilitate flow (e.g., from an opening of the material dispenser) into the internal compartment of the material dispenser. The one or more baffles may facilitate creation of a void in the internal compartment, which void is devoid of the pre-transformed material, e.g., during the entry of the pre-transformed material into the internal compartment. The baffle (e.g., one or more baffles) may be slated. The baffle may be parallel to a channel directing the pre-transformed material into the internal compartment. The baffle may comprise a curvature. The baffle may be linear. The baffle may facilitate reduced friction flow of the pre-transformed material into the compartment. The baffle may preserve a void free of pre-transformed material in the compartment, e.g., during introduction of the pre-transformed material into the compartment. The baffle may be replaceable. The baffle may be an integral part of the material dispenser. FIG. 32A shows an example of a material dispenser 3204 comprising a baffle 3218 disposed adjacent to a channel formed by an edge 3217 of a plate 3206. FIG. 32B shown an example of a material dispenser comprising a baffle 3222 disposed adjacent to a channel 3220, and a pre-transformed material that enters from the cavity 3232 of the bulk reservoir through the channel 3223 and into 3226 the internal compartment of the material dispenser, which internal compartment comprises a void 3250 that is formed by the assistance of the baffle 3222, and a void 3230 formed according to the angle of repose of the pre-transformed material. The pre-transformed material may enter the material dispenser until the channel (e.g., 3223) will clog, e.g., as long as sufficient pre-transformed material resides in the bulk reservoir. The system comprising the bulk reservoir, channel, and material dispenser may be a self-limiting material conveyance system. Once the channel gets clogged by the pre-transformed material (e.g., sensed by a sensor coupled to the channel, material dispenser and/or bulk reservoir), the material dispenser, channel, and/or bulk reservoir may translate (e.g., 3243) to facilitate aligning the channel with the void (e.g., 3250), e.g., formed using the baffle(s). FIG. 32C shows an example of a channel 3241 that has been emptied into area 3242 in the internal compartment of the bulk reservoir. The baffle(s) may facilitate reducing spillage of pre-transformed material during and/or after filling upon the internal compartment of the material dispenser. The baffle(s) may facilitate continuous flow of the pre-transformed material into the internal compartment of the material dispenser. The internal surface(s) of the channel may be polished and/or having low Ra value, e.g., as disclosed herein. The internal surface(s) of the material dispenser opening may be polished and/or having low Ra value, e.g., as disclosed herein. The internal surface(s) of the material dispenser opening may be continuation of the channel, e.g., upon flow of the pre-transformed material into the internal compartment.

In some embodiments, the channel can be formed by engagement of a plate with a material dispenser, e.g., a side of the material dispenser and/or an opening (e.g., entrance opening) of the material dispenser. In some embodiments, a first end of the plate opening (e.g., 3223) and at least part of an entrance opening (e.g., 3320) of the material dispenser can form at least part of the channel. In some embodiments, a first end of the plate opening and at least part of an exit opening of the bulk reservoir can form at least part of the channel. The second end of the plate opening and/or at least part of the entrance opening of the material dispenser can form at least part of the channel. A first cross-section of the first end of the plate opening can be different than a respective second cross-section of the second end of the plate opening. A first cross-section of the first end of the plate opening can be different than a respective second cross-section of the entrance opening of the material dispenser. The first cross section can be smaller than the second cross section. The first cross section and/or the second cross section can be a vertical cross section. The channel may be in the at least partially aligned position for a (e.g., predetermined) amount of time to allow a requested (e.g., predetermined) amount of material to fill the interior of the material dispenser. Filling the interior of the material dispenser may comprise at least partially filling of the channel (e.g., to its congestion). At times, the channel may remain in the at least partially aligned position until no more material can flow out of the channel (e.g., due to its congestion). The dispensed material may form a mound of material (e.g., 3226). FIG. 32C shows an example of the plate(s) translated (e.g., further in direction 3243) such that the channel becomes congested (e.g., closed). In some cases, movement of the plate(s) may facilitate flow of material trapped material within the channel. In some embodiments, the plate(s) can be configured to translate between a first close position (e.g., FIG. 32A) and second closed position (e.g., FIG. 32C). In the first closed position, the material dispenser (e.g., top thereof, e.g., comprising second plate or second portion 3208) can close (e.g., block) the entrance opening (e.g., 3320) of the material dispenser, e.g., utilizing at least one of the auxiliary members (e.g., 3205). In the second closed position, the first plate 3231 can close (e.g., block) the entrance opening of the bulk reservoir (e.g., 3240). FIG. 32A shows an example in which plate 3280 blocks the exit opening of the bulk reservoir comprising material 3216, and the channel 3210 leading to the material dispenser 3204 interior, becomes open. FIG. 32B shows an example in which the channel moves in a direction 3221 until the bulk reservoir opening 3238 is fluidly connected to the material dispenser opening 3320 by the channel, to facilitate material flow from the bulk reservoir into the interior of the material dispenser. FIG. 32C shows an example in which the plate 3240 moves in a direction 3243 to a position in which the bulk reservoir 3240 is closed by plate 3210, and an end 3237 of the channel leading to the material dispenser interior, becomes open.

Figure 33:
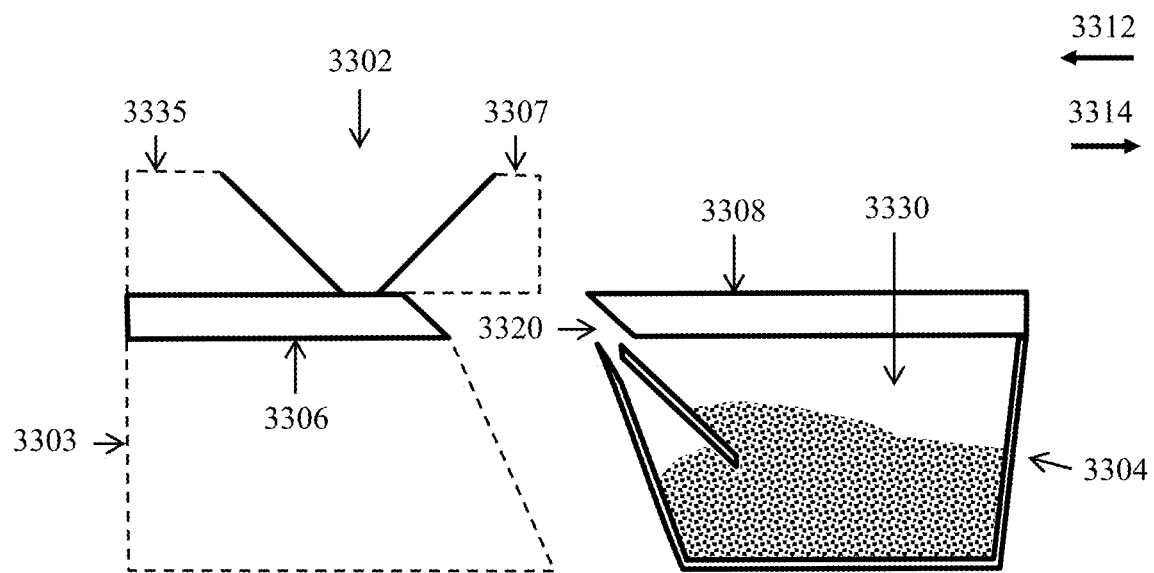
FIG. 33 schematically illustrates components of a 3D printing system.

In some embodiments, the channel may be disrupted, e.g., by movement of the plate(s), material dispenser, and/or material reservoir. Disrupting the channel can include disrupting a position, a cross sectional shape, a cross sectional area, a volume, and/or an existence of the channel. When the channel is disrupted, the plate opening may not be at least partially aligned with the exit opening of the bulk reservoir and the entrance opening of the material dispenser. In some embodiments, the material dispenser is separable from the bulk reservoir. In some embodiments, the channel is disrupted when the material dispenser separates from the bulk reservoir. FIG. 33 shows the material dispenser 3304 separated from the bulk reservoir 3302. In some embodiments, the material dispenser (e.g., and the second portion of the plate (or the second plate) (e.g., 3308)) are separable from the bulk reservoir. In some embodiments, the material dispenser (e.g., and the second portion of the plate (or a second plate)) are separable from the first portion of the plate (or the first plate) (e.g., 3306). In some embodiments, the material dispenser is (e.g., fixedly) coupled to, or is an integral part of, the second portion of the plate (or the second plate). In some embodiments, disengagement of the material dispenser can cause material (e.g., trapped material) within the entrance opening (e.g., 3320) of the material dispenser to move (e.g., slide) into the cavity (e.g., 3330) of the material dispenser. The material dispenser may disengage from its coupling to the bulk reservoir to facilitate its operation (e.g., dispensing material towards a platform), e.g., by translating in a direction 3314. The disengagement of the material dispenser from the bulk reservoir may cause a disruption of the channel. The disruption of the channel may comprise breaking, eliminating, or terminate the existence of, the channel. The disruption of the channel may cease return of the material dispenser towards the bulk reservoir, e.g., in a direction 3312. The disruption of the channel may cease on engagement of the material dispenser with the bulk reservoir and/or plate(s) (e.g., first plate). The formation the channel may be on engagement of the material dispenser with the bulk reservoir and/or plate(s) (e.g., first plate), e.g., after completion of a material dissension cycle. In some embodiments, the channel may be formed or terminated depending on the position of the material dispenser and/or plate(s). At times, the layer dispensing mechanism is parked in the ancillary chamber. The layer dispensing mechanism may comprise a material removal mechanism that may include pre-transformed material (e.g., powder) and/or other debris (e.g., soot, or other debris), collectively termed herein as "debris." The debris may be dispersed on the floor of the ancillary chamber when the layer dispensing mechanism may be parked in the ancillary chamber. The floor of the ancillary chamber may be coupled to a recycling system (e.g., FIG. 13, 1315). The floor of the ancillary chamber may be optionally coupled to the recycling system via a vacuum (e.g., FIG. 13, 1320). The floor of the ancillary chamber may be optionally coupled to a reconditioning system. The recycling and/or reconditioning system may comprise a sieve. The recycling system may comprise a reservoir that holds the recycled material. The recycled material may be reconditioned (e.g., having reduced reactive species such as oxygen, or water). The recycled material may be sieved through the sieving system. In some examples, material may not be reconditioned. The material may be sucked by a vacuum (e.g., from the floor of the ancillary chamber). The floor of the ancillary chamber may be tilted. The floor of the ancillary chamber may be sloped at an angle. The floor of the ancillary chamber may be built to assist removal of the material by way of gravity. The debris on the floor of the ancillary chamber may be transported away from the ancillary chamber (e.g., into the recycling system). Transportation may be via the opening port (e.g., 1380). Transportation may be via a pipe, hole, channel, or a conveyor system.

In some embodiments, the floor of the ancillary chamber includes one or more features to facilitate movement of material (e.g., excess material (e.g., pre-transformed material and/or transformed material) and/or debris) through an opening port (e.g., FIG. 13, 1380) to the recycling system (e.g., FIG. 11, 1185 or FIG. 13, 1315). FIGS. 26A-26C and 27A-27C show examples perspective views of opening port regions 2600 and 2700 of ancillary chambers (e.g., FIG. 11, 1105, FIG. 12, 1240 or FIG. 13, 1300) in accordance with some embodiments. The floor of the ancillary chamber can include a funnel portion (e.g., 2604 or 2704) that has at least one wall that converge toward the port opening (e.g., 2606 or 2706), conducive to guiding material (e.g., 2608) away from the opening port. The funnel portion can be integrally formed with the ancillary chamber (e.g., the funnel portion and ancillary chamber form a unitary piece), or be a piece that is separate (e.g., separable piece) from the ancillary chamber. In some embodiments, a pressure (e.g., gas pressure) is applied to the material (e.g., at expose surface 2625) within the funnel portion to facilitate the flow of the material through the funnel portion. The opening port region can include a port flushing component (e.g., 2610 or 2710) that is configured to provide a flow (e.g., 2612 or 2712) of gas that flushes material through (e.g., into and out of) the opening port region (e.g., 2600 or 2700). For example, the flow of gas can flush port opening (e.g., 2606 or 2706) between the ancillary chamber and the recycling system. The port flushing component can include an inlet (e.g., 2603 and 2703) that is operationally couples with a gas source and pressure source (e.g., one or more pumps (e.g., cyclone pump)) (e.g., FIG. 13, 1320), which can at least partially provide the pressure for the flow of gas through the opening port region. The port flushing component can include an outlet (e.g., 2605 and 2705) that is configured to direct the flow of gas, including entrained material (e.g., 2608) from the ancillary chamber, out of the port flushing component. In some cases, the outlet is operationally coupled to a recycling system (e.g., FIG. 13, 1315). The flow of gas through the opening port region can carry the material toward at least one filter (e.g., sieve) of the recycling system that can remove, e.g., debris or a particulate matter having a larger FLS, from the pre-transformed material. Larger particles can be larger than the average and/or mean FLS particulate material used as a pre-transformed material. The port flushing component can be coupled (e.g., connected) to the gas source and/or the recycling system via one or more coupling members (e.g., one or more tubes, hoses, pipes, ducts, chutes). The port flushing component can have walls (e.g., 2615 and 2715) that at least partially define a channel (e.g., 2611 or 2711) for directing the flow of gas. An inner cross-section (e.g., 2619 and 2719) of the port flushing component can be any suitable size (e.g., diameter, width). In some embodiments, the inner cross-section size (e.g., diameter, width) of the port flushing component is at least about 0.1" (inches), 0.5", 1.0", 1.5", 1.75", 2.0", 2.5", 3.0", 4.0", 5.0", 10", 15", or 20". In some embodiments, the port flushing component has an inner cross-section size (e.g., diameter, width) between any of the afore-mentioned values (e.g., from about 0.1" to about 20", from about 0.1" to about 5.0", from about 5.0" to about 20"). In some embodiments, a cross-section (e.g., FLS thereof) of the port opening (e.g., 2606 or 2706) is smaller than an inner cross-section size (e.g., FLS thereof) of the port flushing component. The cross-section of the channel can have any suitable shape (e.g., circular, rectangular, square, triangular, oval) or suitable combination of shapes. In some cases, the cross-section (e.g., diameter, width) of the channel varies. In some cases, the port flushing component is configured to direct the flow of gas to flush the port opening in a direction that is (e.g., substantially) non-parallel (e.g., at an angle that is not zero degrees or 180 degrees) relative to a direction of flow (e.g., 2601 or 2701) (e.g., at least partially provided by gravity) of material from the ancillary chamber (e.g., floor of ancillary chamber (e.g., funnel portion)) toward the port flushing component through the port opening. The flow (e.g., 2612 or 2712) of gas directed to flush the port opening, can be at an angular direction with respect to a flow direction (e.g., 2601 or 2701) of the material from the ancillary chamber (e.g., floor of ancillary chamber (e.g., funnel portion)) toward the port flushing component and through the port opening. For example, the flow (e.g., 2612 or 2712) of gas flushing the port opening can be in an (e.g., substantially) orthogonal (e.g., perpendicular or normal) direction with respect to a flow direction (e.g., 2601 or 2701) of the material from the ancillary chamber (e.g., floor of ancillary chamber (e.g., funnel portion)) toward the port flushing component and through the port opening. The flow of gas flowing past the port opening can be at an angular direction (e.g., in an (e.g., substantially) orthogonal direction) with respect to a flow direction (e.g., 2601 or 2701) of the material through the port opening. The flow (e.g., 2612 or 2712) of gas flushing the port opening can be at an angular direction (e.g., in an (e.g., substantially) orthogonal direction) with respect to a cross section of the port opening. The flow (e.g., 2612 or 2712) of gas can be in an (e.g., substantially) orthogonal (e.g., perpendicular or normal) direction with respect to a flow direction (e.g., 2601 or 2701) of the material from the ancillary chamber (e.g., floor of ancillary chamber (e.g., funnel portion)) toward the port flushing component (e.g., provided by gravity). Substantially orthogonal directions can be directions that are about 90 degrees (°) with respect to each other (e.g., about 90°, about 100°, about 95°, about 80°, about 85°). The port flushing component can be integrally formed with the funnel portion (e.g., the port flushing component and funnel portion form a unitary piece), or be a piece that is separate (e.g., separable piece) from the funnel portion.

Figure 26A:
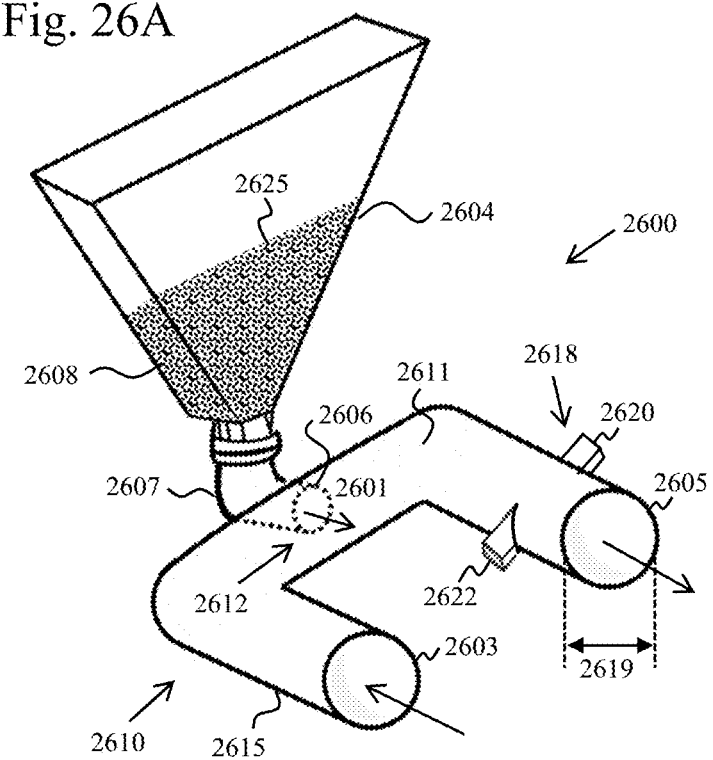
FIGS. 26A-26C schematically illustrate various components of a 3D printing system.
Figure 26B:
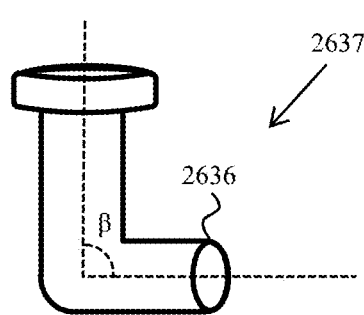
Figure 26C:
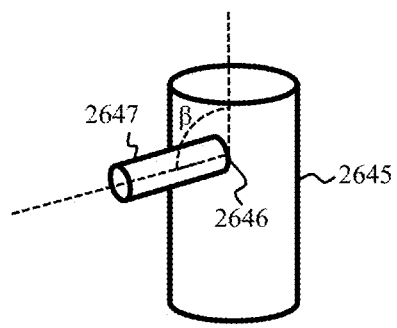

In some embodiments, the port flushing component is coupled to the funnel portion via a connector. FIG. 26B shows an example connector 2637 having an opening port 2636. FIG. 26C shows an example connector 2647 having an opening port 2646 coupled to a portion of a port flushing component (e.g., FIG. 26A, 2615). In some embodiments, the connector can have a bent portion (e.g., FIG. 26B, 2637) that is bent an angle (e.g., β). The angle beta (β) can be an obtuse angle, or a right angle. The angle beta may be different from an acute angle. In some embodiments, the connector has a curved, continuously bent and/or gradually bent shape. In some embodiments, the connector has a (e.g., substantially) straight shape (e.g., beta may be 180 degrees). The connector may couple with the port flushing component at an angle (e.g., FIG. 26C, β). These features (bent portion of the connector or the relative angle of the connector to the port flushing component) can cause the flow of material exiting the port opening (e.g., 2606) to be at a corresponding angle (e.g., β) relative to the flow of gas within the port flushing component. In some cases, the angle (e.g., β) is (e.g., substantially) not a straight angle (not 0° or 180°). The angle beta can be any angle beta disclosed herein. In some cases, the connector is removable with respect to the funnel portion and/or the flushing component. Removable may be before, after, and/or during the 3D printing. The removal may be controlled (e.g., manually and/or automatically, e.g., using a controller). For example, the connector may be coupled with the funnel portion and/or the flushing component using one or more fastening mechanisms (e.g., using threaded fasteners, bolts, seals, flanges). In some embodiments, the connector is integrally formed (e.g., not (e.g., sustainably) removable) with respect to the funnel portion and/or the flushing component. In some embodiments, at least one of the funnel portion, connector, and port flushing component includes a closeable valve that controls the flow of material therethrough.

Figure 27A:
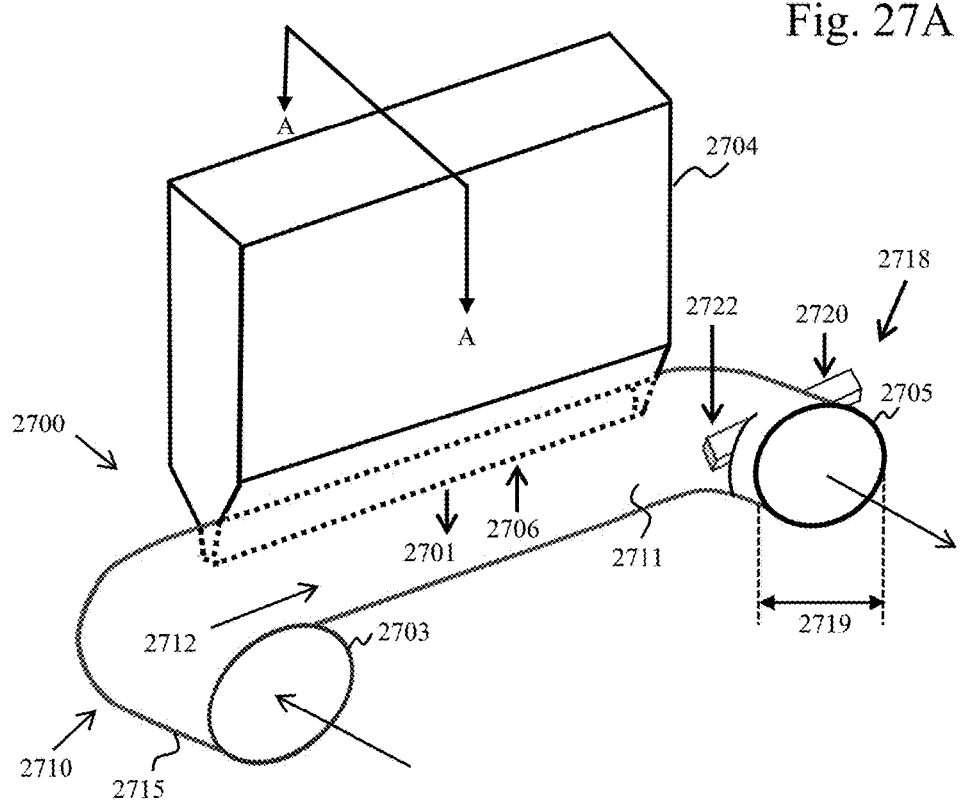
FIGS. 27A-27C schematically illustrate various components of a 3D printing system.
Figure 27B:
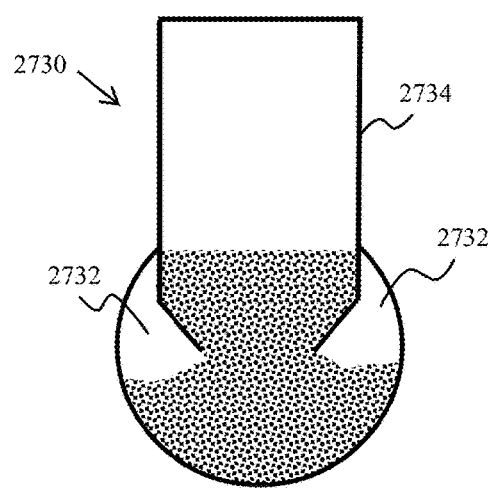
Figure 27C:
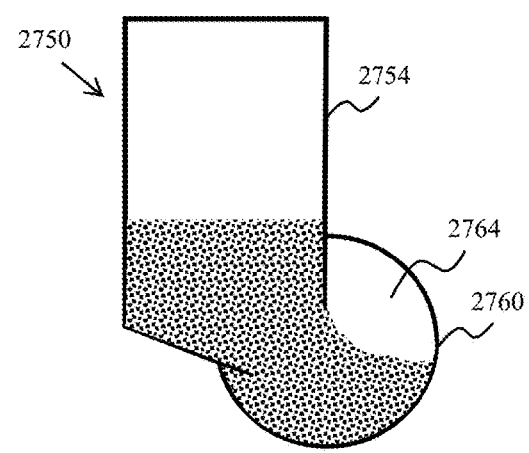

In some embodiments, the funnel portion is directly coupled to the port flushing component (e.g., FIG. 27A, 2710). FIG. 27A shows an example of a perspective view of an opening port region 2700, in accordance with some embodiments. FIG. 27B shows an example of a cross section view A-A of the opening port region 2700 of FIG. 27A. FIG. 27C shows an example of a cross section view of an opening port region 2750, in accordance with some embodiments. In some cases, the funnel portion (e.g., 2704 or 2754) partially occludes a cross-section portion of the port flushing component (e.g., 2710, 2730, or 2760) at the port opening. The cross-section portion of the channel at the port opening can have any suitable shape (e.g., circular, rectangular, square, triangular, oval). In some embodiments, the funnel portion is integrated into a tube-shaped port flushing component. In some embodiments, the funnel portion is removable from the port flushing component. In some embodiments, the funnel portion and/or the port flushing component includes a closeable valve that controls the flow of material therebetween. In some embodiments, a size of the channel (e.g., at least partially defined by the cross-section of the port flushing component at the port opening) is large enough to provide space (e.g., 2732 or 2764) (also referred to as head space) for the gas flow to travel in the channel. In some cases, a cross-sectional area of the head space is at least about 50, 40, 30, 20, 10, 5, or 1 percent of the cross-section of the channel (e.g., at the port opening), wherein the percentage is calculated as volume per volume percentage. The head space can be any percentage between the aforementioned values. For example, the head space can have a cross-sectional area from about 1% to about 50%, from about 1% to about 20%, or from about 20% to about 50% of the cross-section of the channel (e.g., at the port opening). In some embodiments, the flow (e.g., controlled by flow velocity) is configured to sweep the material through the channel within a pre-determined time (e.g., within at most about 10 minutes (min), 5 min, 2 min, 1 min, 45 seconds (sec), 30 sec, 20 sec, 10 sec, 5 sec, or 1 sec). The pre-determined time can range between any of the afore-mentioned values. For example, the pre-determined time can range from about 1 sec to about 10 min, from about 1 sec to about 30 sec, or from about 30 sec to about 10 min.

In some embodiments, the system (e.g., printing system) includes one or more features for detecting the material (e.g., excess material (e.g., pre-transformed material and/or transformed material)) transported between the ancillary chamber and the one or more recycling systems. For example, the system can include one or more detector devices (e.g., 2618 or 2718). The one or more detector devices can be disposed in any suitable location between the funnel portion and the recycling system. For instance, the one or more detector devices can be part of (or within or around) the funnel portion (e.g., 2604 or 2704), the flush opening port (e.g., 2606 or 2706), the one or more connectors (e.g., 2607 (e.g., 2637 or 2647)), and/or a one or more connector channels (e.g., tubes, hoses, pipes, ducts, chutes). In some cases, the detector device can determine the presence of the material traveling from the ancillary chamber to the recycling system. In some cases, an amount and/or flow of material that passes between the ancillary chamber and the recycling system(s) can be detected. The one or more detector devices can include one or more emitters (e.g., 2620 or 2720) (also referred to as energy sources) that can be configured to emit a signal, e.g., an electromagnetic radiation (e.g., light beam, electron beam, x-ray beam) and/or acoustic signal. The one or more detector devices can include one or more detector devices (e.g., 2622 or 2722) (also referred to as sensors) that can be configured to detect (sense) a signal (e.g., electromagnetic radiation), emitted from the one or more emitters. In some cases, the one or more detector devices includes a particle counter, a spectrometer, or both. A spectrometer can be configured to analyze the material using light (e.g., ultraviolet, visible or x-ray) or acoustics signals (e.g., vibration, sound, ultrasound, infrasound). In some embodiments, the emitter is arranged to direct radiation toward an internal volume of the funnel portion, the flush opening port (e.g., the channel (e.g., 2611 or 2711), the connector channel and/or the one or more coupling members, depending on the detector device(s) location(s). The radiation can be directed toward a flow of material that is entrained with the flow (e.g., 2612 or 2712) of gas. That portion of radiation that reaches the detector(s) (e.g., is not reflected/deflected by the material) can be at least partially detected by detector(s). The detector(s) can be configured to detect an amount of material, size of particles of the material, the velocity of the flow of material, and/or a chemical nature of the material (e.g., type of pre-transformed material, whether a pre-transformed material or a transformed material or a foreign material). In some embodiments, the one or more detectors include a photodetector, an optical density (OD) detector, or a combination thereof. In some embodiments, the emitter(s) and/or detector(s) are within the internal volume of the funnel portion, the flush opening port, the connector channel and/or the one or more coupling members. In some embodiments, the emitter(s) and/or detector(s) are outside of the internal volume of the funnel portion, the flush opening port, the connector channel and/or the one or more coupling members. In some cases, the detector(s) is operationally coupled to one or more receivers that can generate electrical output. An intensity of the electrical output can correspond (or inversely correspond) to an amount of material that passes by the detector(s). In some cases, the electrical output is monitored over a predetermined period, or continuously monitored. The monitoring can be used to determine the amount of material that passes by the detector(s) during a layer dispensing operation (e.g., when the layer dispenser dispenses material onto the platform), during periods of time between layer dispensing operations (e.g., when the pump(s) are able to clear (or partially clear) the internal volume. This information can be used to determine, for example, an amount of material that is transported to the recycling system. The information can be used to determine an amount (e.g., volume of material) that is transported to one or more filters (e.g., to determine when a filter cleaning/changing should occur). The information can be used to determine (e.g., calculate) an efficiency of the one or more filters. For example, the information can be used to determine when it is time to change or replace the one or more filters. The information can be used to determine an amount of material that is recycled, for example, as a result of each dispensing operation. In some cases, the information can be used to determine the amount of material (e.g., pre-transformed material) transferred to and/or available in the recycling system for use. These and other metrics can be used to determine efficiency and performance of the printing system and/or the printing process(es).

At times, the layer dispensing mechanism is disposed within the ancillary chamber (e.g., when it does not perform an operation adjacent to the build platform and/or that affects the build module). The layer dispensing mechanism may slide in and out of the side chamber through a position which the separator previously occupied. The separator may be actuated by at least one sensor and/or controller.

In some embodiments, when there is a need to perform dispensing and/or leveling adjacent to the build platform (e.g., material dispensing to the material bed, and/or leveling of the material bed), the layer dispensing mechanism slides out of the side chamber (e.g., FIG. 11, 1175) via a sliding mechanism (e.g., FIG. 11, 1110, and 1150). The sliding mechanism may include at least one (e.g., mechanical linear) bearing. The sliding mechanism may comprise truck and rail system or a sliding rack system. The sliding mechanism may comprise a base rail. The sliding mechanism may comprise a stage (e.g., 1150). The layer dispensing mechanism may be coupled to a shaft (e.g., FIG. 11, 1110). The shaft can be a rod, slab, stick, staff, strip, piece, plate, wedge, or board. The shaft may be movable. The sliding mechanism may be a transport, transit, and/or translation mechanism. The shaft may be (e.g., further) coupled to the sliding mechanism via at least one actuator. The at least one sliding-mechanism-actuator may comprise a motor or piston. The at least one sliding-mechanism-actuator may be operatively coupled to one or more wheels, escalator, conveyor (e.g., conveyor belt). The motor may comprise a linear motor. The motor may comprise a servo, stepper, digital, rotary, or a piezo-electric motor. The motor may be a linear hydraulic motor. The motor may be any motor disclosed herein. The sliding mechanism actuator (e.g., FIG. 11, 1152) may be coupled to the sliding mechanism and to the shaft (e.g., 1110). The shaft may alter a position of the layer dispensing mechanism. For example, the shaft may convey the layer dispensing mechanism adjacent to the platform (e.g., material bed). The shaft may retract the layer dispensing mechanism from a position adjacent to the platform into the ancillary chamber (e.g., once it finishes dispensing the layer of material). The conveying may be performed using the actuator and/or the sliding mechanism. The sliding mechanism may be activated by at least one sensor. The sliding mechanism may be coupled to at least one controller. The controller may indicate the need to perform dispensing a layer of material.

The systems and/or apparatuses disclosed herein may comprise one or more motors. The motors may comprise servomotors. The servomotors may comprise actuated linear lead screw drive motors. The motors may comprise belt drive motors. The motors may comprise rotary encoders. The encoder may comprise an absolute encoder. The encoder may comprise an incremental encoder. The apparatuses and/or systems may comprise switches. The switches may comprise homing or limit switches. The motors may comprise actuators. The motors may comprise linear actuators. The motors may comprise belt driven actuators. The motors may comprise lead screw driven actuators. The actuators may comprise linear actuators.

Figure 16:
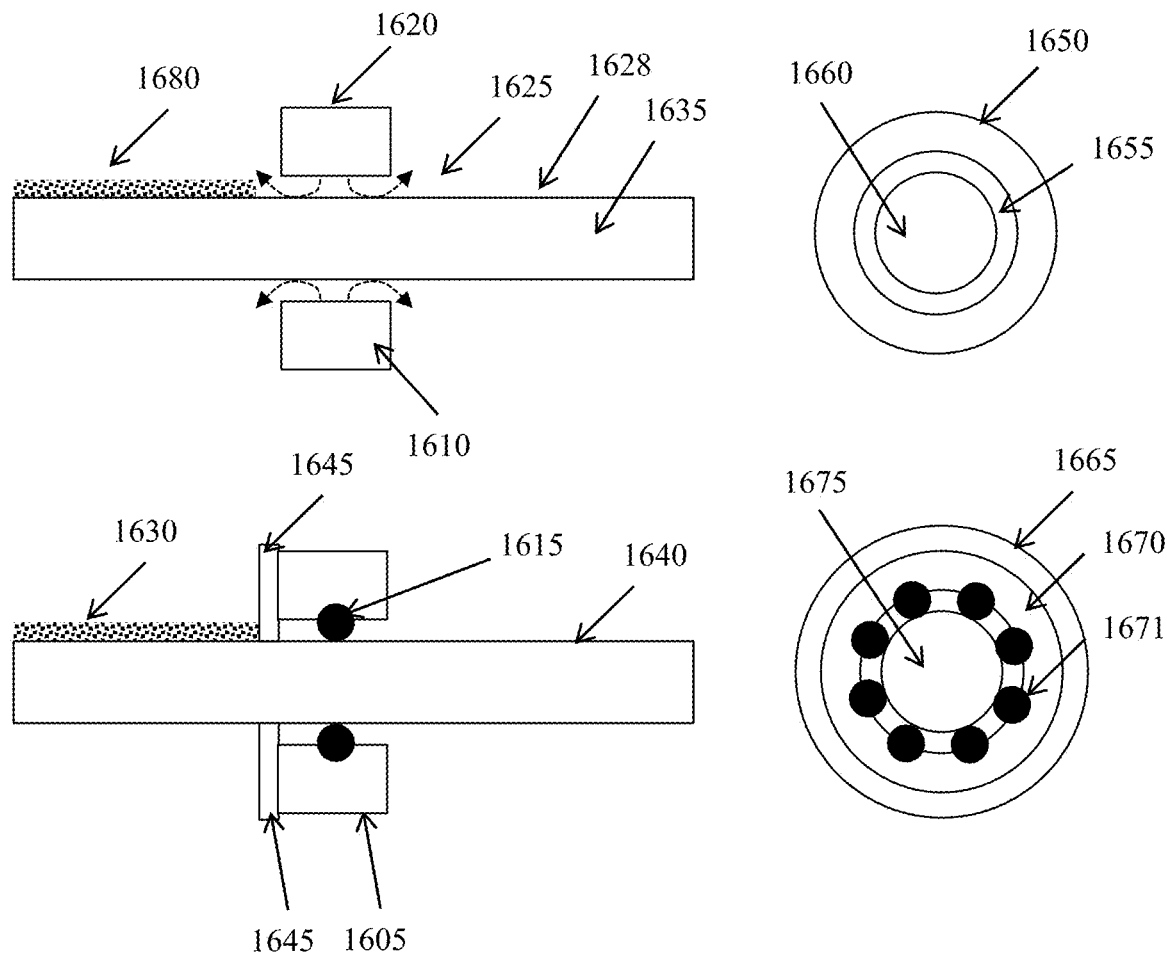
FIG. 16 schematically illustrates various views of components in a 3D printing system.

At times, the ancillary chamber comprises one or more bearings. The bearings (e.g., FIG. 13, 1330, 1375) may allow smooth movement of the shaft. FIG. 16 shows an example of a side view (e.g., 1610, 1620) of a gas bearings coupled to a shaft 1635, depicting gas flow 1625. FIG. 16 shows an example of a front view of a gas bearing 1650 coupled to a shaft 1660. FIG. 16 shows an example of a side view of a mechanical bearing (e.g., 1615, 1605) coupled to a shaft 1640. FIG. 16 shows an example of a front view of a mechanical bearing 1670 coupled to a shaft 1675 by balls (e.g., 1671). The bearings may be disposed adjacent to the shaft. Adjacent may be surrounding at least a portion of the shaft (e.g., a portion of the shaft circumference). The bearing may have a ring shape (e.g., disposed around the shaft). The bearings may support the shaft when the layer dispensing mechanism is conveyed adjacent to the material bed. The shaft may comprise debris (e.g., FIG. 16, 1630, 1680). The bearings may comprise a cleaning mechanism. The cleaning mechanism may comprise a brush, sponge, cloth, or fiber). The cloth may comprise felt or microfiber cloth. The cleaning mechanism may be (i) an integral part of or (ii) separate from the bearing. The cleaning mechanism may be passive or active. The active cleaning mechanism may be controlled (e.g., before, after, or during the 3D printing). The control may be manual and/or automatic (e.g., using a controller). For example, the cleaning mechanism may comprise a flexible material (e.g., plastic, rubber, or Teflon). The cleaning mechanism may snugly fit around the circumference of the bearing. For example, the cleaning mechanism may comprise an O-ring. The cleaning mechanism may prevent any debris from entering the bearing. The cleaning mechanism may be integrated in the bearing. For example, the bearings may comprise gas bearings (e.g., air bearing). For example, the bearings may blow gas (e.g., FIG. 16, 1625) towards the shaft. The gas may clean the shaft. The blown gas may prevent any debris (e.g., 1680) from advancing past the bearing. Past the bearing may be in a position further away from the processing chamber (e.g., 1628). In some examples, the bearing is not in contact with the shaft (e.g., 1655). The cleaning mechanism (e.g., 1645) may prevent any debris (e.g., 1630) from advancing past the bearing (e.g., 1605). The ancillary chamber may include at least one sensor (e.g., a material sensor, a debris sensor, a weight sensor). The controller may activate the cleaning mechanism. For example, the controller may activate the cleaning mechanism on detection of debris by the sensor. A seal may be disposed adjacent to the bearing (e.g., FIG. 11, 1124). The seal may maintain the atmosphere in the ancillary chamber that is formed on engagement of the seal (e.g., 1171). The seal can engage with a gas bearing to seal the space between the gas bearing and the shaft (e.g., 1655). The gas bearing may comprise continuous flow of gas (e.g., during the 3D printing). The flow of gas may comprise various pressures. For example, when the shaft is traveling (e.g., and debris is accumulated on it) the gas pressure is higher than when the shaft is stationary (e.g., when the layer dispensing mechanism is parked and/or the opening is closed). The gas pressure may be controlled (e.g., manually and/or by a controller). The gas may comprise an inert gas. The gas may be any gas disclosed herein. The atmosphere within the ancillary chamber may comprise a gas. The atmosphere within the ancillary chamber may be inert. The bearings may be charged with gas. The bearings may not allow a debris to propagate past the bearing in a direction away from the processing chamber (e.g., out of the ancillary chamber that is bordered by the bearing). The bearings when charged with gas may expel any debris adjacent to the bearing (e.g., 1625). The bearings charged with gas may clean the shaft by not allowing adherence of debris to the shaft (e.g., at a position adjacent to the engagement of the bearing with the shaft).

Figure 24:
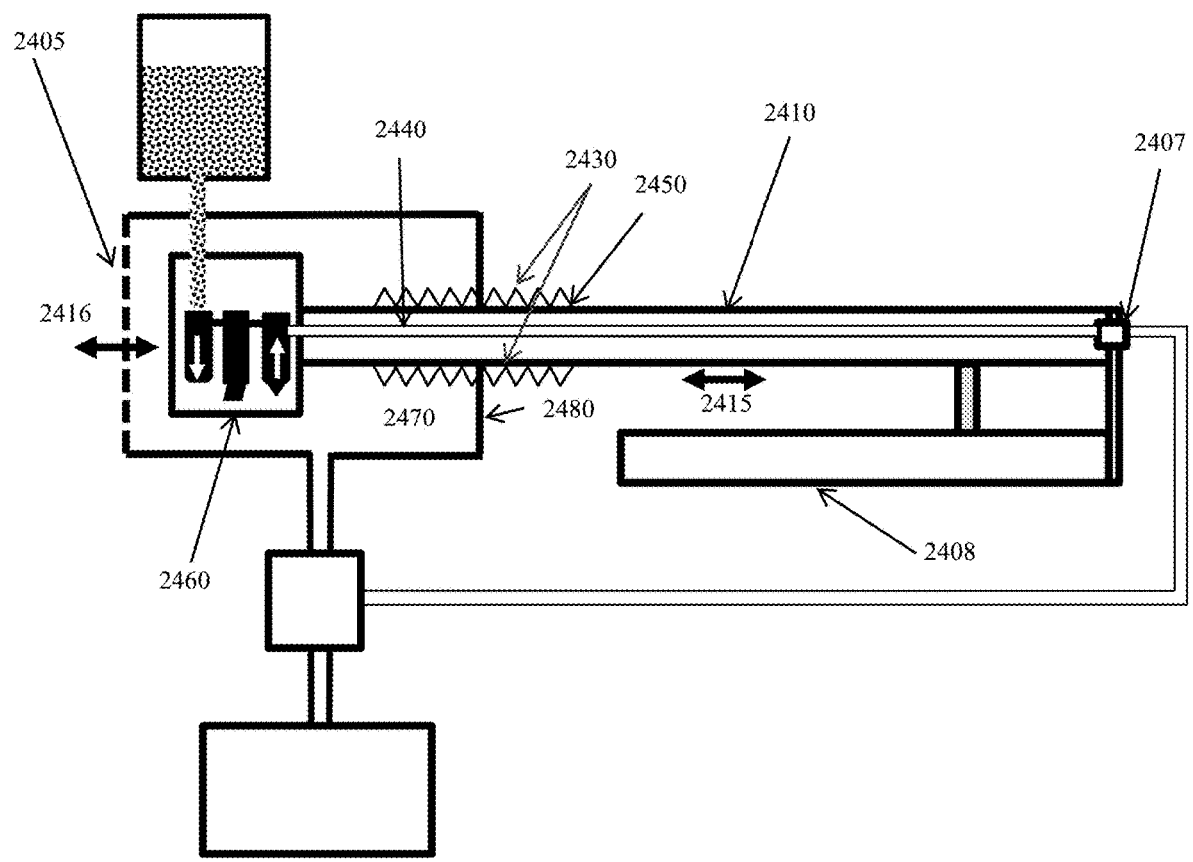
FIG. 24 schematically illustrates a side view of components in a 3D printing system.

In some examples, a portion of the shaft (e.g., FIG. 24, 2410) is engulfed by a seal (e.g., FIG. 24, 2430). In some examples, the seal may engulf the circumference of a vertical cross section of the shaft (e.g., cylindric section of a cylindrical shaft). The seal may comprise at least one elastic vessel. The seal can be compressed (e.g., when pressure is applied), or extended (e.g., under vacuum). The seal can be a metal (e.g., comprising elemental metal or metal alloy) seal. The seal may comprise a bellow, bearing, gas flow, diaphragm, cloth, or mesh. The seal may extend and/or contract as a consequence of the operation of the actuator, and/or movement of the shaft. For example, the seal may comprise a plurality of bellows. The seal may be situated at or adjacent to a partition hole. The shaft may travel through the hole. The shaft may be disposed in the hole. In some examples, a first bellow may be disposed in front of the hole (e.g., in the ancillary chamber 2470 (e.g., in a partition of the ancillary chamber)), and a second bellow may be disposed behind the hole (e.g., 2480). In some examples, the bellow may extend through the hole. In some examples, the bellow may reside in one side of the hole (e.g., in the ancillary chamber, e.g., 2470; or outside of the ancillary chamber, e.g., 2480). The seal may comprise a bellow. The bellow may comprise formed (e.g., cold formed, or hydroformed), welded (e.g., edge-welded, or diaphragm) or electroformed bellow. The bellow may be a mechanical bellow. The material of the bellow may comprise a metal, rubber, polymeric, plastic, latex, silicon, composite material, or fiberglass. The material of the bellow may be any material mentioned herein (e.g., comprising stainless steel, titanium, nickel, or copper). The material may have high plastic elongation characteristics, high-strength, and/or be resistant to corrosion. The seal may comprise a flexible element (e.g., a spring, wire, tube, or diaphragm). The seal may be (e.g., controllably) expandable and/or contractible. The control may be before, during, and/or after operation of the shaft and/or layer dispensing mechanism. The control may be manual and/or automatic (e.g., using at least one controller). The seal may be elastic. The seal may be extendable and/or compressible (e.g., on pressure, or as a result of the elevator operation). The seal may comprise pneumatic, electric, and/or magnetic elements. The seal may comprise gas that can be compressed and/or expanded. The seal may be extensible. The seal may return to its original shape and/or size when released (e.g., from positive pressure, or vacuum). The seal may compress and/or expand relative (e.g., proportionally) to the amount of translation of the layer dispensing mechanism (e.g., translation via the shaft). The seal may compress and/or expand relative to the amount of pressure applied (e.g., within the build module). The seal may reduce (e.g., prevent) permeation of particulate material from one end of the seal (e.g., 2440) to its opposite end (e.g., 2450). The seal may protect the actuator(s) and/or guides (e.g., railings), by reducing (e.g., blocking) permeation of the particulate material. FIG. 24 shows an example of a vertical cross section of a layer dispensing mechanism 2460 that is operatively coupled to a shaft 2410, which shaft can move back and/or forth 2415, which material dispensing mechanism is able to move back and/or forth 2416 and enter and/or exit the ancillary chamber 2470 through (e.g., one or more) a closable opening 2405. In the example shown in FIG. 24, a shaft 2410 is engulfed by at least one bellow (shown as a vertical cross section, comprising 2430). The seal (e.g., 2430) may reduce (e.g., prevent) migration of a pre-transformed (or transformed) material and/or debris through a partition (e.g., wall) that separates the ancillary chamber (e.g., 2470) from the actuator (e.g., motor) of the shaft and/or layer dispensing mechanism (e.g., 2407) and/or its railing (e.g., 2408). The seal (e.g., 2430) may reduce (e.g., hinder) migration of a pre-transformed (or transformed) material and/or debris from the ancillary chamber (e.g., 2470) towards the actuator (e.g., motor) of the shaft and/or layer dispensing mechanism (e.g., 2407) and/or its railing (e.g., 2408). The seal (e.g., 2430) may facilitate confinement of pre-transformed (or transformed) material and/or debris in the ancillary chamber (e.g., 2470). The seal (e.g., 2430) may facilitate separation between the pre-transformed (or transformed) material and/or debris and the actuator and/or railing that facilitates movement of the layer dispensing mechanism (layer forming device). The seal (e.g., 2430) may facilitate proper operation of the actuator and/or railing, by reducing the amount of (e.g., preventing) pre-transformed (or transformed) material and/or debris from reaching (e.g., and clogging) them. The seal (e.g., 2430) may reduce an amount of (e.g., prevent) pre-transformed (or transformed) material and/or debris from crossing the partition (e.g., wall) of the ancillary chamber (e.g., 2470) to the side (e.g., 2280) that faces the railing and/or shaft actuator. The seal may facilitate cleaning the shaft from pre-transformed material and/or debris.

In some embodiments, the seal may permit a gas leak therethrough. The gas leak may have leak rate of at most about 0.1 l/min, 0.05 liters per minute (l/min), 0.03 l/min, 0.02 l/min, 0.01 l/min, 0.005 l/min, 0.0025 l/min, or 0.0001 l/min. The leak rate may have any value between the afore-mentioned values (e.g., from about 0.1 l/min to about 0.0001 l/min, from about 0.1 l/min to about 0.002 l/min, or from about 0.05 l/min to about 0.005 l/min). In some embodiments, the seal comprises a bellow. In some embodiments, the bellow is operative for at least 0.2 million cycles (Mcyc), 0.5 Mcyc, 0.7 Mcyc, 1.0 Mcyc, 1.5 Mcyc, or 2 Mcyc. The bellow may be operative for any number of cycles between the afore-mentioned number of cycles (e.g., from about 0.2 Mcyc to about 2 Mcyc, from about 0.5 Mcyc to about 1.5 Mcyc, or from about 0.7 Mcyc to about 2 Mcyc). In some embodiments, the bellow is operative the fore mentioned number of cycles while keeping the afore mentioned gas leak rate. The bellow may be operative at a positive, negative, or ambient pressure, e.g., as disclosed herein. For example, the bellow may be operative at any pressure of the enclosure disclosed herein. In some embodiments, the bellow is operative at a pressure of at least about 0.1 pounds per square inch (PSI), 0.2 PSI, 0.3 PSI, 0.5 PSI, 0.7 PSI, or 1.0 PSI above atmospheric pressure (e.g., at room temperature, ambient temperature, and/or at a temperature of at least about 20° C. or 25° C.), which may be the pressure in the enclosure. The bellow may be operative at a pressure between any of the afore-mentioned pressure values (e.g., from about 0.1 PSI to about 1.0 PSI, from about 0.1 PSI to about 0.7 PSI, or from about 0.3 PSI to about 1.0 PSI above ambient pressure). The bellow may comprise a metal bellow. The metal may be any metal disclosed herein, e.g., an elemental metal or a metal alloy. The bellow may comprise a composite material.

At times, the layer dispensing mechanism is supported by the bearings when conveyed adjacent to the material bed. The shaft may comprise a weak or stiff material. When the shaft is distant from the bearing, the layer dispensing mechanism may sag due to the material properties of the shaft. The sagging may be detected by at least one sensor (e.g., positional, optical, contact sensor). The sagging may be corrected and/or adjusted (e.g., via at least one controller and/or software). The sagging may be corrected and/or adjusted by way of altering at least one property of the layer dispensing mechanism. The at least one property may comprise altering the path of dispensing, altering the amount of material dispensed, altering the amount of material removed, altering a position of the layer dispensing mechanism (or any of its components). The position may be horizontal, vertical, or angular. Altering may comprise altering the amount of pre-transformed material dispensed. Altering may comprise altering the amount of pre-transformed material removed. Altering may comprise altering the velocity of the layer dispensing mechanism. Altering may be in real time (e.g., during the 3D printing, such as during the operation of the layer dispensing mechanism or any of its components). The weak material may comprise stainless steel. The stiff material may comprise silicon carbide, glass, ceramics or titanium. The stiff material may be a composite material. The composite may comprise carbon fibers. The composite may comprise aluminum oxide and silicon carbide. The composite may comprise silicon carbide (e.g., nanoparticles) and magnesium. The layer dispensing mechanism may be isolated from the elevated temperatures in the processing chamber (e.g., during the transformation of at least a portion of the material bed) while it is disposed in the ancillary chamber.

At times, the platform (also herein, "printing platform" or "building platform") is disposed in the enclosure (e.g., in the build module and/or processing chamber). The platform may comprise a substrate or a base. The substrate and/or the base may be removable or non-removable. The building platform may be (e.g., substantially) horizontal, (e.g., substantially) planar, or non-planar. The platform may have a surface that points towards the deposited pre-transformed material (e.g., powder material), which at times may point towards the top of the enclosure (e.g., away from the center of gravity). The platform may have a surface that points away from the deposited pre-transformed material (e.g., towards the center of gravity), which at times may point towards the bottom of the container. The platform may have a surface that is (e.g., substantially) flat and/or planar. The platform may have a surface that is not flat and/or not planar. The platform may have a surface that comprises protrusions or indentations. The platform may have a surface that comprises embossing. The platform may have a surface that comprises supporting features (e.g., auxiliary support). The platform may have a surface that comprises a mold. The platform may have a surface that comprises a wave formation. The surface may point towards the layer of pre-transformed material within the material bed. The wave may have an amplitude (e.g., vertical amplitude or at an angle). The platform (e.g., base) may comprise a mesh through which the pre-transformed material (e.g., the remainder) is able to flow through. The platform may comprise a motor. The platform (e.g., substrate and/or base) may be fastened to the container. The platform (or any of its components) may be transportable. The transportation of the platform may be controlled and/or regulated by a controller (e.g., control system). The platform may be transportable horizontally, vertically, or at an angle (e.g., planar or compound).

At times, the platform is vertically transferable, for example using an actuator. The actuator may cause a vertical translation (e.g., an elevator). An actuator causing a vertical translation (e.g., an elevation mechanism (also referred to as an elevator)) is shown as an example in FIG. 1, 105. The up and down arrow 112 next to the elevation mechanism 105 signifies a possible direction of movement of the elevation mechanism, or a possible direction of movement effectuated by the elevation mechanism.

In some cases, auxiliary support(s) adheres to the upper surface of the platform. In some examples, the auxiliary supports of the printed 3D object may touch the platform (e.g., the bottom of the enclosure, the substrate, or the base). Sometimes, the auxiliary support may adhere to the platform. In some embodiments, the auxiliary supports are an integral part of the platform. At times, auxiliary support(s) of the printed 3D object, do not touch the platform. In any of the methods described herein, the printed 3D object may be supported only by the pre-transformed material within the material bed (e.g., powder bed, FIG. 1, 104). Any auxiliary support(s) of the printed 3D object, if present, may be suspended adjacent to the platform. Occasionally, the platform may have a pre-hardened (e.g., pre-solidified) amount of material. Such pre-solidified material may provide support to the printed 3D object. At times, the platform may provide adherence to the material. At times, the platform does not provide adherence to the material. The platform may comprise elemental metal, metal alloy, elemental carbon, or ceramic. The platform may comprise a composite material (e.g., as disclosed herein). The platform may comprise glass, stone, zeolite, or a polymeric material. The polymeric material may include a hydrocarbon or fluorocarbon. The platform (e.g., base) may include Teflon. The platform may include compartments for printing small objects. Small may be relative to the size of the enclosure. The compartments may form a smaller compartment within the enclosure, which may accommodate a layer of pre-transformed material.

At times, the energy beam projects energy to the material bed. The apparatuses, systems, and/or methods described herein can comprise at least one energy beam. In some cases, the apparatuses, systems, and/or methods described can comprise two, three, four, five, or more energy beams. The energy beam may include radiation comprising electromagnetic, electron, positron, proton, plasma, or ionic radiation (or any suitable combination thereof). The electromagnetic beam may comprise microwave, infrared, ultraviolet or visible radiation. The ion beam may include a cation or an anion. The electromagnetic beam may comprise a laser beam. The energy beam may derive from a laser source. The energy source may be a laser source. The laser may comprise a fiber laser, a solid-state laser, or a diode laser. The laser source may comprise a Nd:YAG, Neodymium (e.g., neodymium-glass), or an Ytterbium laser. The laser beam may comprise a corona laser beam, e.g., a laser beam having a footprint similar to a doughnut shape. The laser may comprise a carbon dioxide laser ($CO_2$ laser). The laser may be a fiber laser. The laser may be a solid-state laser. The laser can be a diode laser. The energy source may comprise a diode array. The energy source may comprise a diode array laser. The laser may be a laser used for micro laser sintering. Examples of energy beam (e.g., laser), associated methods of use, software, systems, devices, and apparatuses, can be found in PCT/US15/36802, or in U.S. Ser. No. 15/374,535, each of which is entirely incorporated herein by reference.

In some embodiments, the 3D printer includes a plurality of energy beam (e.g., lasers). The 3D printer may comprise at least 2, 4, 6, 8, 10, 12, 16, 20, 24, 32, 36, 64 or more energy beams. Each of the energy beam may be coupled with its own optical window. At times, at least two energy beams may shine through the same optical window. At times, at least two energy beams may shine through different optical windows.

In some embodiments, the beam profile of the energy beam is altered, e.g., during printing. Any of the 3D printing methodologies disclosed herein can include altering the beam profile. Alteration of the beam profile can be using a physical component and/or a computational scheme (e.g., algorithm). Alteration of the beam profile can comprise manual and/or automatic methods. The automatic methods may comprise usage of at least one controller directing the beam profile alteration. The beam profile may be altered during the 3D printing, e.g., during printing of a layer of transformed material that forms at least a portion of the 3D object. Alteration of the beam profile can comprise alteration of a type of an energy profile utilized. The type of the beam profile comprises: a gaussian beam profile, a top hat beam profile, or a doughnut (e.g., corona) beam profile. For example, the energy beam may print a first portion of the 3D object using a gaussian beam profile, and then print a second portion of the 3D object using a doughnut shaped beam profile.

At times, the energy beam (e.g., transforming energy beam) comprises a Gaussian energy beam. The energy beam may have any cross-sectional shape comprising an ellipse (e.g., circle), or a polygon (e.g., as disclosed herein). The energy beam may have a cross section with a FLS (e.g., diameter) of at least about 50 micrometers ($\mu m$), 100 $\mu m$, 150 $\mu m$, 200 $\mu m$, or 250 $\mu m$. The energy beam may have a cross section with a FLS of at most about 60 micrometers ($\mu m$), 100 $\mu m$, 150 $\mu m$, 200 $\mu m$, or 250 $\mu m$. The energy beam may have a cross section with a FLS of any value between the afore-mentioned values (e.g., from about 50 $\mu m$ to about 250 $\mu m$, from about 50 $\mu m$ to about 150 $\mu m$, or from about 150 $\mu m$ to about 250 $\mu m$). The power per unit area of the energy beam may be at least about 100 Watt per millimeter square ($W/mm^2$), 200 $W/mm^2$, 300 $W/mm^2$, 400 $W/mm^2$, 500 $W/mm^2$, 600 $W/mm^2$, 700 $W/mm^2$, 800 $W/mm^2$, 900 $W/mm^2$, 1000 $W/mm^2$, 2000 $W/mm^2$, 3000 $W/mm^2$, 5000 $W/mm^2$, 7000 $W/mm^2$, or 10000 $W/mm^2$. The power per unit area of the tiling energy flux may be at most about 110 $W/mm^2$, 200 $W/mm^2$, 300 $W/mm^2$, 400 $W/mm^2$, 500 $W/mm^2$, 600 $W/mm^2$, 700 $W/mm^2$, 800 $W/mm^2$, 900 $W/mm^2$, 1000 $W/mm^2$, 2000 $W/mm^2$, 3000 $W/mm^2$, 5000 $W/mm^2$, 7000 $W/mm^2$, or 10000 $W/mm^2$. The power per unit area of the energy beam may be any value between the afore-mentioned values (e.g., from about 100 $W/mm^2$ to about 3000 $W/mm^2$, from about 100 $W/mm^2$ to about 5000 $W/mm^2$, from about 100 $W/mm^2$ to about 10000 $W/mm^2$, from about 100 $W/mm^2$ to about 500 $W/mm^2$, from about 1000 $W/mm^2$ to about 3000 $W/mm^2$, from about 1000 $W/mm^2$ to about 3000 $W/mm^2$, or from about 500 $W/mm^2$ to about 1000 $W/mm^2$). The scanning speed of the energy beam may be at least about 50 millimeters per second (mm/sec), 100 mm/sec, 500 mm/sec, 1000 mm/sec, 2000 mm/sec, 3000 mm/sec, 4000 mm/sec, or 50000 mm/sec. The scanning speed of the energy beam may be at most about 50 mm/sec, 100 mm/sec, 500 mm/sec, 1000 mm/sec, 2000 mm/sec, 3000 mm/sec, 4000 mm/sec, or 50000 mm/sec. The scanning speed of the energy beam may any value between the afore-mentioned values (e.g., from about 50 mm/sec to about 50000 mm/sec, from about 50 mm/sec to about 3000 mm/sec, or from about 2000 mm/sec to about 50000 mm/sec). The energy beam may be continuous or non-continuous (e.g., pulsing). The energy beam may be modulated before and/or during the formation of a transformed material as part of the 3D object. The energy beam may be modulated before and/or during the 3D printing process.

In some embodiments, the energy beam (e.g., laser) has a power of at least about 10 Watt (W), 30 W, 50 W, 80 W, 100 W, 120 W, 150 W, 200 W, 250 W, 300 W, 350 W, 400 W, 500 W, 750 W, 800 W, 900 W, 1000 W, 1500 W, 2000 W, 3000 W, or 4000 W. The energy beam may have a power of at most about 10 W, 30 W, 50 W, 80 W, 100 W, 120 W, 150 W, 200 W, 250 W, 300 W, 350 W, 400 W, 500 W, 750 W, 800 W, 900 W, 1000 W, 1500, 2000 W, 3000 W, or 4000 W. The energy beam may have a power between any of the afore-mentioned energy beam power values (e.g., from about 10 W to about 100 W, from about 100 W to about 1000 W, or from about 1000 W to about 4000 W). The energy beam may derive from an electron gun. The energy beam may include a pulsed energy beam, a continuous wave energy beam, or a quasi-continuous wave energy beam. The pulse energy beam may have a repetition frequency of at least about 1 Kilo Hertz (KHz), 2 KHz, 3 KHz, 4 KHz, 5 KHz, 6 KHz, 7 KHz, 8 KHz, 9 KHz, 10 KHz, 20 KHz, 30 KHz, 40 KHz, 50 KHz, 60 KHz, 70 KHz, 80 KHz, 90 KHz, 100 KHz, 150 KHz, 200 KHz, 250 KHz, 300 KHz, 350 KHz, 400 KHz, 450 KHz, 500 KHz, 550 KHz, 600 KHz, 700 KHz, 800 KHz, 900 KHz, 1 Mega Hertz (MHz), 2 MHz, 3 MHz, 4 MHz, or 5 MHz. The pulse energy beam may have a repetition frequency of at most about 1 Kilo Hertz (KHz), 2 KHz, 3 KHz, 4 KHz, 5 KHz, 6 KHz, 7 KHz, 8 KHz, 9 KHz, 10 KHz, 20 KHz, 30 KHz, 40 KHz, 50 KHz, 60 KHz, 70 KHz, 80 KHz, 90 KHz, 100 KHz, 150 KHz, 200 KHz, 250 KHz, 300 KHz, 350 KHz, 400 KHz, 450 KHz, 500 KHz, 550 KHz, 600 KHz, 700 KHz, 800 KHz, 900 KHz, 1 Mega Hertz (MHz), 2 MHz, 3 MHz, 4 MHz, or 5 MHz. The pulse energy beam may have a repetition frequency between any of the afore-mentioned repetition frequencies (e.g., from about 1 KHz to about 5 MHz, from about 1 KHz to about 1 MHz, or from about 1 MHz to about 5 MHz).

In some embodiments, the methods, apparatuses and/or systems disclosed herein comprise Q-switching, mode coupling or mode locking to effectuate the pulsing energy beam. The apparatus or systems disclosed herein may comprise an on/off switch, a modulator, or a chopper to effectuate the pulsing energy beam. The on/off switch can be manually or automatically controlled. The switch may be controlled by the control system. The switch may alter the "pumping power" of the energy beam. The energy beam may be at times focused, non-focused, or defocused. In some instances, the defocus is substantially zero (e.g., the beam is non-focused).

In some embodiments, the energy source(s) projects energy using a DLP modulator, a one-dimensional scanner, a two-dimensional scanner, or any combination thereof. The energy source(s) can be stationary or translatable. The energy source(s) can translate vertically, horizontally, or in an angle (e.g., planar or compound angle). The energy source(s) can be modulated. The energy beam(s) emitted by the energy source(s) can be modulated. The modulator can include an amplitude modulator, phase modulator, or polarization modulator. The modulation may alter the intensity of the energy beam. The modulation may alter the current supplied to the energy source (e.g., direct modulation). The modulation may affect the energy beam (e.g., external modulation such as external light modulator). The modulation may include direct modulation (e.g., by a modulator). The modulation may include an external modulator. The modulator can include an acousto-optic modulator or an electro-optic modulator. The modulator can comprise an absorptive modulator or a refractive modulator. The modulation may alter the absorption coefficient the material that is used to modulate the energy beam. The modulator may alter the refractive index of the material that is used to modulate the energy beam.

In some embodiments, the energy beam(s), energy source (s), and/or the platform of the energy beam array are moved via a galvanometer scanner, a polygon, a mechanical stage (e.g., X-Y stage), a piezoelectric device, gimbal, or any combination of thereof. The galvanometer may comprise a mirror. The galvanometer scanner may comprise a two-axis galvanometer scanner. The scanner may comprise a modulator (e.g., as described herein). The scanner may comprise a polygonal mirror. The scanner can be the same scanner for two or more energy sources and/or beams. At least two (e.g., each) energy source and/or beam may have a separate scanner. The energy sources can be translated independently of each other. In some cases, at least two energy sources and/or beams can be translated at different rates, and/or along different paths. For example, the movement of a first energy source may be faster as compared to the movement of a second energy source. The systems and/or apparatuses disclosed herein may comprise one or more shutters (e.g., safety shutters), on/off switches, or apertures.

In some embodiments, the energy beam (e.g., laser) has a FLS (e.g., a diameter) of its footprint on the on the exposed surface of the material bed of at least about 1 micrometer (μm), 5 μm, 10 μm, 20 μm, 30 μm, 40 μm, 50 μm, 60 μm, 70 μm, 80 μm, 90 μm, 100 μm, 200 μm, 300 μm, 400 μm, or 500 μm. The energy beam may have a FLS on the layer of its footprint on the exposed surface of the material bed of at most about 1 μm, 5 μm, 10 μm, 20 μm, 30 μm, 40 μm, 50 μm, 60 μm, 70 μm, 80 μm, 90 μm, 100 μm, 200 μm, 300 μm, 400 μm, or 500 μm. The energy beam may have a FLS on the exposed surface of the material bed between any of the afore-mentioned energy beam FLS values (e.g., from about 5 μm to about 500 μm, from about 5 μm to about 50 μm, or from about 50 µm to about 500 µm). The beam may be a focused beam. The beam may be a dispersed beam. The beam may be an aligned beam. The apparatus and/or systems described herein may further comprise a focusing coil, a deflection coil, or an energy beam power supply. The defocused energy beam may have a FLS of at least about 1 mm, 5 mm, 10 mm, 20 mm, 30 mm, 40 mm, 50 mm, or 100 mm. The defocused energy beam may have a FLS of at most about 1 mm, 5 mm, 10 mm, 20 mm, 30 mm, 40 mm, 50 mm, or 100 mm. The energy beam may have a defocused cross-sectional FLS on the layer of pre-transformed material between any of the afore-mentioned energy beam FLS values (e.g., from about 5 mm to about 100 mm, from about 5 mm to about 50 mm, or from about 50 mm to about 100 mm).

The power supply to any of the components described herein can be supplied by a grid, generator, local, or any combination thereof. The power supply can be from renewable or non-renewable sources. The renewable sources may comprise solar, wind, hydroelectric, or biofuel. The powder supply can comprise rechargeable batteries.

In some embodiments, the exposure time of the energy beam is at least 1 microsecond (µs), 5 µs, s, 20 µs, 30 µs, 40 µs, 50 µs, 60 µs, 70 µs, 80 µs, 90 µs, 100 µs, 200 µs, 300 µs, 400 µs, 500 µs, 800 µs, or 1000 s. The exposure time of the energy beam may be most about 1 µs, 5 µs, 10 µs, 20 µs, 30 µs, 40 µs, 50 µs, 60 µs, 70 µs, 80 µs, 90 µs, 100 µs, 200 µs, 300 µs, 400 µs, 500 µs, 800 µs, or 1000 s. The exposure time of the energy beam may be any value between the afore-mentioned exposure time values (e.g., from about 1 µs to about 1000 µs, from about 1 µs to about 200 µs, from about 1 µs to about 500 µs, from about 200 s to about 500 µs, or from about 500 s to about 1000 s).

At times, the controller controls one or more characteristics of the energy beam (e.g., variable characteristics). The control of the energy beam may allow a low degree of material evaporation during the 3D printing process. For example, controlling one or more energy beam characteristics may (e.g., substantially) reduce the amount of spatter generated during the 3D printing process. The low degree of material evaporation may be measured in grams of evaporated material and compared to a Kilogram of hardened material formed as part of the 3D object. The low degree of material evaporation may be evaporation of at most about 0.25 grams (gr.), 0.5 gr, 1 gr, 2 gr, 5 gr, 10 gr, 15 gr, 20 gr, 30 gr, or 50 gr per every Kilogram of hardened material formed as part of the 3D object. The low degree of material evaporation per every Kilogram of hardened material formed as part of the 3D object may be any value between the afore-mentioned values (e.g., from about 0.25 gr to about 50 gr, from about 0.25 gr to about 30 gr, from about 0.25 gr to about 10 gr, from about 0.25 gr to about 5 gr, or from about 0.25 gr to about 2 gr).

In some embodiments, the methods, systems, and/or the apparatus described herein further comprise at least one energy source. In some cases, the system can comprise two, three, four, five, or more energy sources. An energy source can be a source configured to deliver energy to an area (e.g., a confined area). An energy source can deliver energy to the confined area through radiative heat transfer.

In some embodiments, the energy source supplies any of the energies described herein (e.g., energy beams). The energy source may deliver energy to a point or to an area. The energy source may include an electron gun source. The energy source may include a laser source. The energy source may comprise an array of lasers. In an example, a laser can provide light energy at a peak wavelength of at least about 100 nanometer (nm), 500 n, 1000 n, 1010 nm, 1020 nm, 1030 n, 1040 nm, 1050 nm, 1060 n, 1070 nm, 1080 nm, 1090 n, 1100 nm, 1200 nm, 1500 nm, 1600 nm, 1700 nm, 1800 nm, 1900 nm, or 2000 nm. In an example a laser can provide light energy at a peak wavelength of at most about 100 nanometer (nm), 500 nm, 1000 nm, 1010 nm, 1020 nm, 1030 nm, 1040 nm, 1050 nm, 1060 nm, 1070 nm, 1080 n, 1090 nm, 1100 nm, 1200 nm, 1500 nm, 1600 nm, 1700 nm, 1800 nm, 1900 nm, or 2000 nm. In an example a laser can provide light energy at a peak wavelength between the afore-mentioned peak wavelengths (e.g., from 100 nm to 2000 nm, from 100 nm to 1100 nm, or from 1000 nm to 2000 nm). The energy beam can be incident on the top surface of the material bed. The energy beam can be incident on, or be directed to, a specified area of the material bed over a specified time period. The energy beam can be substantially perpendicular to the top (e.g., exposed) surface of the material bed. The material bed can absorb the energy from the energy beam (e.g., incident energy beam) and, as a result, a localized region of the material in the material bed can increase in temperature. The increase in temperature may transform the material within the material bed. The increase in temperature may heat and transform the material within the material bed. In some embodiments, the increase in temperature may heat and not transform the material within the material bed. The increase in temperature may heat the material within the material bed.

In some embodiments, the energy beam and/or source is moveable such that it can translate relative to the material bed. The energy beam and/or source can be moved by a scanner. The movement of the energy beam and/or source can comprise utilization of a scanner.

In some embodiments, at one point in time, and/or (e.g., substantially) during the entire build of the 3D object: At least two of the energy beams and/or sources are translated independently of each other or in concert with each other. At least two of the multiplicity of energy beams can be translated independently of each other or in concert with each other. In some cases, at least two of the energy beams can be translated at different rates such that the movement of the one is faster compared to the movement of at least one other energy beam. In some cases, at least two of the energy sources can be translated at different rates such that the movement of the one energy source is faster compared to the movement of at least another energy source. In some cases, at least two of the energy sources (e.g., all of the energy sources) can be translated at different paths. In some cases, at least two of the energy sources can be translated at substantially identical paths. In some cases, at least two of the energy sources can follow one another in time and/or space. In some cases, at least two of the energy sources translate substantially parallel to each other in time and/or space. The power per unit area of at least two of the energy beams may be (e.g., substantially) identical. The power per unit area of at least one of the energy beams may be varied (e.g., during the formation of the 3D object). The power per unit area of at least one of the energy beams may be different. The power per unit area of at least one of the energy beams may be different. The power per unit area of one energy beam may be greater than the power per unit area of a second energy beam. The energy beams may have the same or different wavelengths. A first energy beam may have a wavelength that is smaller or larger than the wavelength of a second energy beam. The energy beams can derive from the same energy source. At least one of the energy beams can derive from different energy sources. The energy beams can derive from different energy sources. At least two of the energy beams may have the same power (e.g., at one point in time, and/or (e.g., substantially) during the entire build of the 3D object). At least one of the beams may have a different power (e.g., at one point in time, and/or substantially during the entire build of the 3D object). The beams may have different powers (e.g., at one point in time, and/or (e.g., substantially) during the entire build of the 3D object). At least two of the energy beams may travel at (e.g., substantially) the same velocity. At least one of the energy beams may travel at different velocities. The velocity of travel (e.g., speed) of at least two energy beams may be (e.g., substantially) constant. The velocity of travel of at least two energy beams may be varied (e.g., during the formation of the 3D object or a portion thereof). The travel may refer to a travel relative to (e.g., on) the exposed surface of the material bed (e.g., powder material). The travel may refer to a travel close to the exposed surface of the material bed. The travel may be within the material bed. The at least one energy beam and/or source may travel relative to the material bed.

Figure 10:
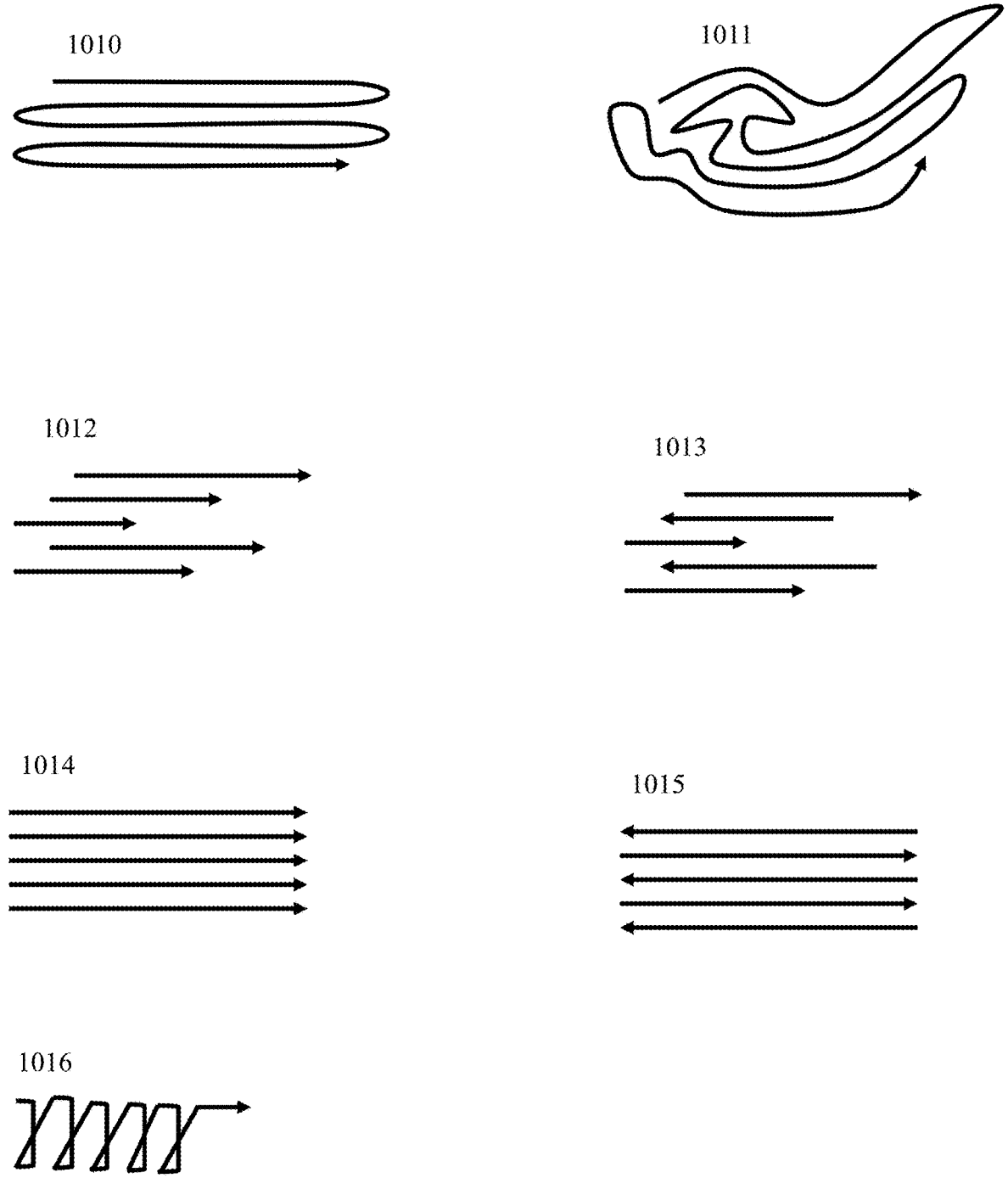
FIG. 10 illustrates various paths.

At times, the energy (e.g., energy beam) travels in a path. The path may comprise a hatch. The path of the energy beam may comprise repeating a path. For example, the first energy may repeat its own path. The second energy may repeat its own path, or the path of the first energy. The repetition may comprise a repetition of 1, 2, 3, 4, 5, 6, 7, 8, 9, 10 times or more. The energy may follow a path comprising parallel lines. For example, FIG. 10, 1015 or 1014 show paths that comprise parallel lines. The lines may be hatch lines. The distance between each of the parallel lines or hatch lines, may be at least about 1 µm, 5 µm, 10 µm, 20 µm, 30 µm, 40 µm, 50 µm, 60 µm, 70 µm, 80 µm, 90 µm, or more. The distance between each of the parallel lines or hatch lines, may be at most about 1 µm, 5 µm, 10 µm, 20 µm, 30 µm, 40 µm, 50 µm, 60 µm, 70 µm, 80 µm, 90 µm, or less. The distance between each of the parallel lines or hatch lines may be any value between any of the afore-mentioned distance values (e.g., from about 1 µm to about 90 µm, from about 1 µm to about 50 µm, or from about 40 µm to about 90 µm). The distance between the parallel or parallel lines or hatch lines may be substantially the same in every layer (e.g., plane) of transformed material. The distance between the parallel lines or hatch lines in one layer (e.g., plane) of transformed material may be different than the distance between the parallel lines or hatch lines respectively in another layer (e.g., plane) of transformed material within the 3D object. The distance between the parallel lines or hatch lines portions within a layer (e.g., plane) of transformed material may be substantially constant. The distance between the parallel lines or hatch lines within a layer (e.g., plane) of transformed material may be varied. The distance between a first pair of parallel lines or hatch lines within a layer (e.g., plane) of transformed material may be different than the distance between a second pair of parallel lines or hatch lines within a layer (e.g., plane) of transformed material respectively. The first energy beam may follow a path comprising two hatch lines or paths that cross in at least one point. The hatch lines or paths may be straight or curved. The hatch lines or paths may be winding. FIG. 10, 1010 or 1011 show examples of winding paths. The first energy beam may follow a hatch line or path comprising a U-shaped turn (e.g., FIG. 10, 1010) and/or looping turn (e.g., FIG. 10, 1016). The first energy beam may follow a hatch line or path devoid of U-shaped turns (e.g., FIG. 1012).

In some embodiments, the formation of the 3D object includes transforming (e.g., fusing, binding, or connecting) the pre-transformed material (e.g., powder material) using an energy beam. The energy beam may be projected on to a particular area of the material bed, thus causing the pre-transformed material to transform. The energy beam may cause at least a portion of the pre-transformed material to transform from its present state of matter to a different state of matter. For example, the pre-transformed material may transform at least in part (e.g., completely) from a solid to a liquid state. The energy beam may cause at least a portion of the pre-transformed material to chemically transform. For example, the energy beam may cause chemical bonds to form or break. The chemical transformation may be an isomeric transformation. The transformation may comprise a magnetic transformation or an electronic transformation. The transformation may comprise coagulation of the material, cohesion of the material, or accumulation of the material.

In some embodiments, the methods described herein further comprises repeating the operations of material deposition and material transformation operations to produce a 3D object (or a portion thereof) by at least one 3D printing (e.g., additive manufacturing) method. For example, the methods described herein may further comprise repeating the operations of depositing a layer of pre-transformed material and transforming at least a portion of the pre-transformed material to connect to the previously formed 3D object portion (e.g., repeating the 3D printing cycle), thus forming at least a portion of a 3D object. The transforming operation may comprise utilizing an energy beam to transform the material. In some instances, the energy beam is utilized to transform at least a portion of the material bed (e.g., utilizing any of the methods described herein).

In some embodiments, the transforming energy is provided by an energy source. The transforming energy may comprise an energy beam. The energy source can produce an energy beam. The energy beam may include a radiation comprising electromagnetic, electron, positron, proton, plasma, or ionic radiation. The electromagnetic beam may comprise microwave, infrared, ultraviolet, or visible radiation. The ion beam may include a charged particle beam. The ion beam may include a cation, or an anion. The electromagnetic beam may comprise a laser beam. The laser may comprise a fiber, or a solid-state laser beam. The energy source may include a laser. The energy source may include an electron gun. The energy depletion may comprise heat depletion. The energy depletion may comprise cooling. The energy may comprise an energy flux (e.g., energy beam. E.g., radiated energy). The energy may comprise an energy beam. The energy may be the transforming energy. The energy may be a warming energy that is not able to transform the deposited pre-transformed material (e.g., in the material bed). The warming energy may be able to raise the temperature of the deposited pre-transformed material. The energy beam may comprise energy provided at a (e.g., substantially) constant or varied energy beam characteristics. The energy beam may comprise energy provided at (e.g., substantially) constant or varied energy beam characteristics, depending on the position of the generated hardened material within the 3D object. The varied energy beam characteristics may comprise energy flux, rate, intensity, wavelength, amplitude, power, cross-section, or time exerted for the energy process (e.g., transforming or heating). The energy beam cross-section may be the average (or mean) FLS of the cross section of the energy beam on the layer of material (e.g., powder). The FLS may be a diameter, a spherical equivalent diameter, a length, a height, a width, or diameter of a bounding circle. The FLS may be the larger of a length, a height, and a width of a 3D form. The FLS may be the larger of a length and a width of a substantially two-dimensional (2D) form (e.g., wire, or 3D surface).

Figure 9:
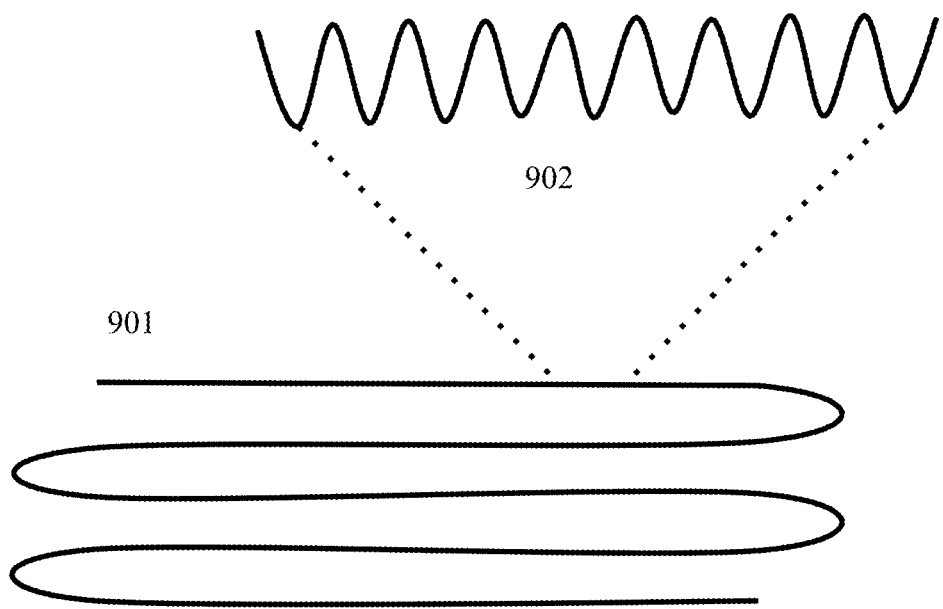
FIG. 9 illustrates a path.

At times, the energy beam follows a path. The path of the energy beam may be a vector. The path of the energy beam may comprise a raster, a vector, or any combination thereof. The path of the energy beam may comprise an oscillating pattern. The path of the energy beam may comprise a zigzag, wave (e.g., curved, triangular, or square), or curve pattern. The curved wave may comprise a sine or cosine wave. The path of the energy beam may comprise a sub-pattern. The path of the energy beam may comprise an oscillating (e.g., zigzag), wave (e.g., curved, triangular, or square), and/or curved sub-pattern. The curved wave may comprise a sine or cosine wave. FIG. 9 shows an example of a path 901 of an energy beam comprising a zigzag sub-pattern (e.g., 902 shown as an expansion (e.g., blow-up) of a portion of the path 901). The sub-path of the energy beam may comprise a wave (e.g., sine or cosine wave) pattern. The sub-path may be a small path that forms the large path. The sub-path may be a component (e.g., a portion) of the large path. The path that the energy beam follows may be a predetermined path. A model may predetermine the path by utilizing a controller or an individual (e.g., human). The controller may comprise a processor. The processor may comprise a computer, computer program, drawing or drawing data, statue or statue data, or any combination thereof.

At times, the path comprises successive lines. The successive lines may touch each other. The successive lines may overlap each other in at least one point. The successive lines may substantially overlap each other. The successive lines may be spaced by a first distance (e.g., hatch spacing). FIG. 10 shows an example of a path 1014 that includes five hatches wherein each two immediately adjacent hatches are separated by a spacing distance. Examples of hatch spacing, and associated methods, software, systems, devices, and apparatuses, can be found in international patent application serial no. PCT/US16/34857 filed on May 27, 2016, titled "THREE-DIMENSIONAL PRINTING AND THREE-DIMENSIONAL OBJECTS FORMED USING THE SAME" that is entirely incorporated herein by reference.

The term "auxiliary support," as used herein, generally refers to at least one feature that is a part of a printed 3D object, but not part of the desired, requested, intended, designed, ordered, and/or final 3D object. Auxiliary support may provide structural support during and/or after the formation of the 3D object. The auxiliary support may be anchored to the enclosure. For example, an auxiliary support may be anchored to the platform (e.g., building platform), to the side walls of the material bed, to a wall of the enclosure, to an object (e.g., stationary, or semi-stationary) within the enclosure, or any combination thereof. The auxiliary support may be the platform (e.g., the base, the substrate, or the bottom of the enclosure). The auxiliary support may enable the removal or energy from the 3D object (e.g., or a portion thereof) that is being formed. The removal of energy (e.g., heat) may be during and/or after the formation of the 3D object. Examples of auxiliary support comprise a fin (e.g., heat fin), anchor, handle, pillar, column, frame, footing, wall, platform, or another stabilization feature. In some instances, the auxiliary support may be mounted, clamped, or situated on the platform. The auxiliary support can be anchored to the building platform, to the sides (e.g., walls) of the building platform, to the enclosure, to an object (stationary or semi-stationary) within the enclosure, or any combination thereof.

Figure 7:
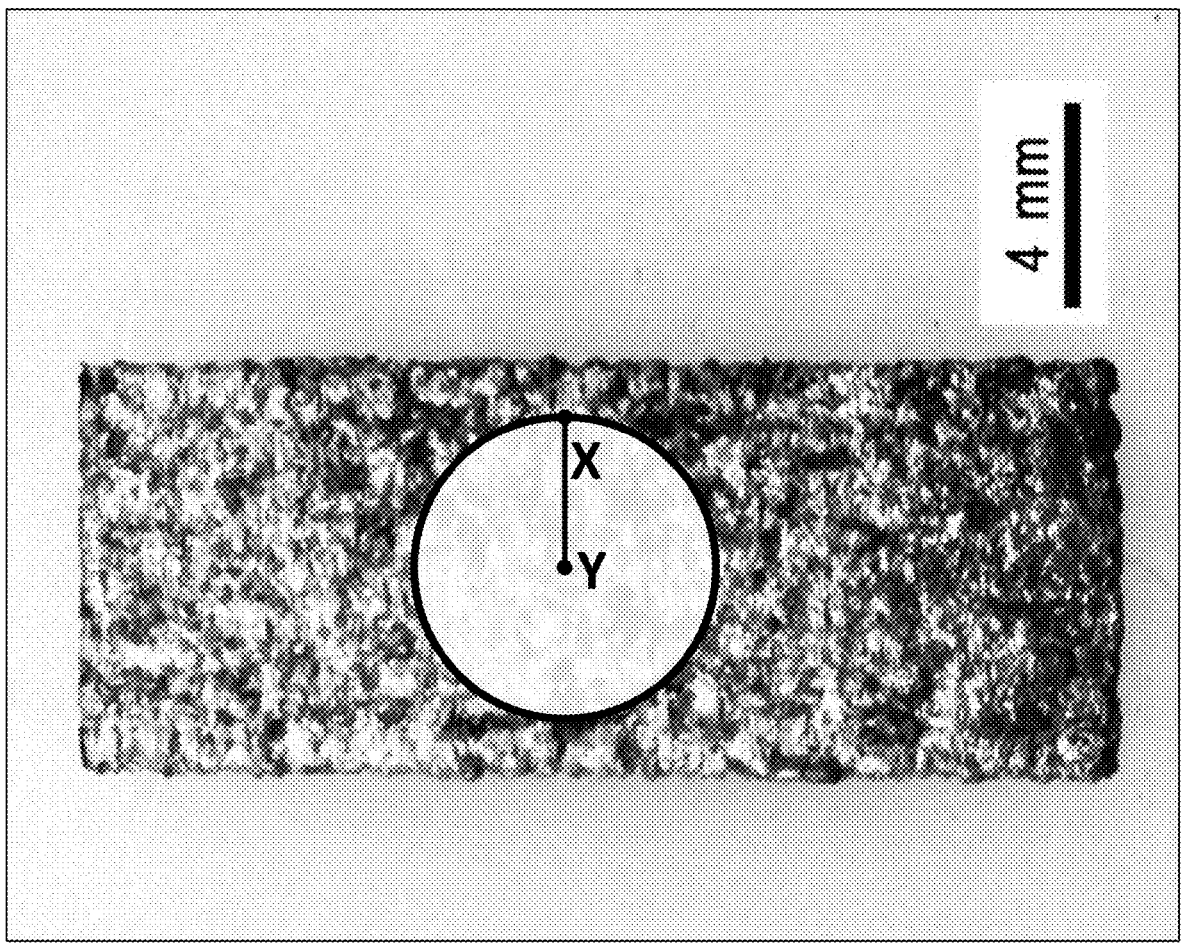
FIG. 7 shows a horizontal view of a 3D object.

In some examples, the generated 3D object is printed without auxiliary support. In some examples, overhanging feature of the generated 3D object can be printed without (e.g., without any) auxiliary support. The generated object can be devoid of auxiliary supports. The generated object may be suspended (e.g., float anchorlessly) in the material bed (e.g., powder bed). The term "anchorlessly," as used herein, generally refers to without or in the absence of an anchor. In some examples, an object is suspended in a powder bed anchorlessly without attachment to a support. For example, the object floats in the powder bed. The generated 3D object may be suspended in the layer of pre-transformed material (e.g., powder material). The pre-transformed material (e.g., powder material) can offer support to the printed 3D object (or the object during its generation). Sometimes, the generated 3D object may comprise one or more auxiliary supports. The auxiliary support may be suspended in the pre-transformed material (e.g., powder material). The auxiliary support may provide weights or stabilizers. The auxiliary support can be suspended in the material bed within the layer of pre-transformed material in which the 3D object (or a portion thereof) has been formed. The auxiliary support (e.g., one or more auxiliary supports) can be suspended in the pre-transformed material within a layer of pre-transformed material other than the one in which the 3D object (or a portion thereof) has been formed (e.g., a previously deposited layer of (e.g., powder) material). The auxiliary support may touch the platform. The auxiliary support may be suspended in the material bed (e.g., powder material) and not touch the platform. The auxiliary support may be anchored to the platform. The distance between any two auxiliary supports can be at least about 1 millimeter, 1.3 millimeters (mm), 1.5 mm, 1.8 mm, 1.9 mm, 2.0 mm, 2.2 mm, 2.4 mm, 2.5 mm, 2.6 mm, 2.7 mm, 3 mm, 4 mm, 5 mm, 10 mm, 11 mm, 15 mm, 20 mm, 30 mm, 40 mm, 41 mm, or 45 mm. The distance between any two auxiliary supports can be at most 1 millimeter, 1.3 mm, 1.5 mm, 1.8 mm, 1.9 mm, 2.0 mm, 2.2 mm, 2.4 mm, 2.5 mm, 2.6 mm, 2.7 mm, 3 mm, 4 mm, 5 mm, 10 mm, 11 mm, 15 mm, 20 mm, 30 mm, 40 mm, 41 mm, or 45 mm. The distance between any two auxiliary supports can be any value in between the afore-mentioned distances (e.g., from about 1 mm to about 45 mm, from about 1 mm to about 11 mm, from about 2.2 mm to about 15 mm, or from about 10 mm to about 45 mm). At times, a sphere intersecting an exposed surface of the 3D object may be devoid of auxiliary support. The sphere may have a radius XY that is equal to the distance between any two auxiliary supports mentioned herein. FIG. 7 shows an example of a top view of a 3D object that has an exposed surface. The exposed surface includes an intersection area of a sphere having a radius XY, which intersection area is devoid of auxiliary support.

In some examples, the diminished number of auxiliary supports or lack of auxiliary support, facilitates a 3D printing process that requires a smaller amount of material, produces a smaller amount of material waste, and/or requires smaller energy as compared to commercially available 3D printing processes. The reduced number of auxiliary supports can be smaller by at least about 1.1, 1.3, 1.5, 2, 3, 4, 5, 6, 7, 8, 9, or 10 as compared to conventional 3D printing. The smaller amount may be smaller by any value between the aforesaid values (e.g., from about 1.1 to about 10, or from about 1.5 to about 5) as compared to conventional 3D printing.

In some embodiments, the generated 3D object has a surface roughness profile. The generated 3D object can have various surface roughness profiles, which may be suitable for various applications. The surface roughness may be the deviations in the direction of the normal vector of a real surface from its ideal form. The generated 3D object can have a Ra value of as disclosed herein.

At times, the generated 3D object (e.g., the hardened cover) is substantially smooth. The generated 3D object may have a deviation from an ideal planar surface (e.g., atomically flat or molecularly flat) of at most about 1.5 nanometers (n), 2 nm, 3 nm, 4 nm, 5 nm, 10 nm, 15 nm, 20 nm, 25 nm, 30 nm, 35 nm, 100 nm, 300 nm, 500 nm, 1 micrometer (m), 1.5 µm, 2 µm, 3 µm, 4 µm, 5 µm, 10 µm, 15 µm, 20 µm, 25 µm, 30 µm, 35 µm, 100 µm, 300 µm, 500 µm, or less. The generated 3D object may have a deviation from an ideal planar surface of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (m), 1.5 µm, 2 µm, 3 µm, 4 µm, 5 µm, 10 µm, 15 µm, 20 µm, 25 µm, 30 µm, 35 µm, 100 µm, 300 µm, 500 µm, or more. The generated 3D object may have a deviation from an ideal planar surface between any of the afore-mentioned deviation values. The generated 3D object may comprise a pore. The generated 3D object may comprise pores. The pores may be of an average FLS (diameter or diameter equivalent in case the pores are not spherical) of at most about 1.5 nanometers (nm), 2 nm, 3 nm, 4 nm, 5 nm, 10 nm, 15 nm, 20 nm, 25 nm, 30 nm 35 nm, 100 nm, 300 nm, 500 nm, 1 micrometer (m), 1.5 µm, 2 µm, 3 µm, 4 µm, 5 µm, 10 µm, 15 µm, 20 µm, 25 µm, 30 µm, 35 µm, 100 µm, 300 µm, or 500 µm. The pores may be of an average FLS of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (m), 1.5 µm, 2 µm, 3 µm, 4 µm, 5 µm, 10 µm, 15 µm, 20 µm, 25 µm, 30 µm, 35 µm, 100 µm, 300 µm, or 500 µm. The pores may be of an average FLS between any of the afore-mentioned FLS values (e.g., from about 1 nm to about 500 µm, or from about 20 µm, to about 300 µm). The 3D object (or at least a layer thereof) may have a porosity of at most about 0.05 percent (%), 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The 3D object (or at least a layer thereof) may have a porosity of at least about 0.05%, 0.1%, 0.2%, 0.3%, 0.4%, 0.5%, 0.6%, 0.7%, 0.8%, 0.9%, 1%, 2%, 3%, 4%, 5%, 6%, 7%, 8%, 9%, 10%, 20%, 30%, 40%, 50%, 60%, 70%, or 80%. The 3D object (or at least a layer thereof) may have porosity between any of the afore-mentioned porosity percentages (e.g., from about 0.05% to about 80%, from about 0.05% to about 40%, from about 10% to about 40%, or from about 40% to about 90%). In some instances, a pore may traverse the generated 3D object. For example, the pore may start at a face of the 3D object and end at the opposing face of the 3D object. The pore may comprise a passageway extending from one face of the 3D object and ending on the opposing face of that 3D object. In some instances, the pore may not traverse the generated 3D object. The pore may form a cavity in the generated 3D object. The pore may form a cavity on a face of the generated 3D object. For example, pore may start on a face of the plane and not extend to the opposing face of that 3D object.

At times, the formed plane comprises a protrusion. The protrusion can be a grain, a bulge, a bump, a ridge, or an elevation. The generated 3D object may comprise protrusions. The protrusions may be of an average FLS of at most about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (m), 1.5 µm, 2 µm, 3 µm, 4 µm, 5 µm, 10 µm, 15 µm, 20 µm, 25 µm, 30 µm, 35 µm, 100 µm, 300 µm, 500 µm, or less. The protrusions may be of an average FLS of at least about 1.5 nanometers (nm), 2 nm, 3 nm, 4 nm, 5 nm, 10 nm, 15 nm, 20 nm, 25 nm, 30 nm, 35 nm, 100 nm, 300 nm, 500 nm, 1 micrometer (m), 1.5 µm, 2 µm, 3 µm, 4 µm, 5 µm, 10 µm, 15 µm, 20 µm, 25 µm, 30 µm, 35 µm, 100 µm, 300 µm, 500 µm, or more. The protrusions may be of an average FLS between any of the afore-mentioned FLS values. The protrusions may constitute at most about 0.05%, 0.1%, 0.2%, 0.3%, 0.4%, 0.5%, 0.6%, 0.7%, 0.8%, 0.9%, 1%, 2%, 3%, 4%, 5%, 10%, 20%, 30%, 40%, or 50% of the area of the generated 3D object. The protrusions may constitute at least about 0.05%, 0.1%, 0.2%, 0.3%, 0.4%, 0.5%, 0.6%, 0.7%, 0.8%, 0.9%, 1%, 2%, 3%, 4%, 5%, 10%, 20%, 30%, 40%, or 50% of the area of the 3D object. The protrusions may constitute a percentage of an area of the 3D object that is between the afore-mentioned percentages of 3D object area. The protrusion may reside on any surface of the 3D object. For example, the protrusions may reside on an external surface of a 3D object. The protrusions may reside on an internal surface (e.g., a cavity) of a 3D object. At times, the average size of the protrusions and/or of the holes may determine the resolution of the printed (e.g., generated) 3D object. The resolution of the printed 3D object may be at least about 1 micrometer, 1.3 micrometers (µm), 1.5 µm, 1.8 µm, 1.9 µm, 2.0 µm, 2.2 µm, 2.4 µm, 2.5 µm, 2.6 µm, 2.7 µm, 3 µm, 4 µm, 5 µm, 10 µm, 20 µm, 30 µm, 40 µm, 50 µm, 60 µm, 70 µm, 80 µm, 90 µm, 100 µm, 200 µm, or more. The resolution of the printed 3D object may be at most about 1 micrometer, 1.3 micrometers (µm), 1.5 µm, 1.8 µm, 1.9 µm, 2.0 µm, 2.2 µm, 2.4 µm, 2.5 µm, 2.6 µm, 2.7 µm, 3 µm, 4 µm, 5 µm, 10 µm, 20 µm, 30 µm, 40 µm, 50 µm, 60 µm, 70 µm, 80 µm, 90 µm, 100 µm, 200 µm, or less. The resolution of the printed 3D object may be any value between the above-mentioned resolution values. At times, the 3D object may have a material density of at least about 99.9%, 99.8%, 99.7%, 99.6%, 99.5%, 99.4%, 99.3%, 99.2%, 99.1%, 99%, 98%, 96%, 95%, 94%, 93%, 92%, 91%, 90%, 8%, or 70%. At times, the 3D object may have a material density of at most about 99.5%, 99%, 98%, 96%, 95%, 94%, 93%, 92%, 91%, 90%, 8%, or 70%. At times, the 3D object may have a material density between the afore-mentioned material densities. The resolution of the 3D object may be at least about 100 dots per inch (dpi), 300 dpi, 600 dpi, 1200 dpi, 2400 dpi, 3600 dpi, or 4800 dpi. The resolution of the 3D object may be at most about 100 dpi, 300 dpi, 600 dpi, 1200 dpi, 2400 dpi, 3600 dpi, or 4800 dip. The resolution of the 3D object may be any value between the afore-mentioned values (e.g., from 100 dpi to 4800 dpi, from 300 dpi to 2400 dpi, or from 600 dpi to 4800 dpi). The height uniformity (e.g., deviation from average surface height) of a planar surface of the 3D object may be at least about 100 µm, 90 µm, 80 µm, 70 µm, 60 µm, 50 µm, 40 µm, 30 µm, 20 µm, 10 µm, or 5 µm. The height uniformity of the planar surface may be at most about 100 µm, 90 µm, 80 µm, 70 µm, 60 µm, 50 µm, 40 µm, 30 µm, 20 µm, 10 µm, or 5 µm. The height uniformity of the planar surface of the 3D object may be any value between the afore-mentioned height deviation values (e.g., from about 100 µm to about 5 µm, from about 50 µm to about 5 µm, from about 30 µm to about 5 µm, or from about 20 µm to about 5 µm). The height uniformity may comprise high precision uniformity.

In some embodiments, a newly formed layer of material (e.g., comprising transformed material) reduces in volume during its hardening (e.g., by cooling). Such reduction in volume (e.g., shrinkage) may cause a deformation in the requested 3D object. The deformation may include cracks, and/or tears in the newly formed layer and/or in other (e.g., adjacent) layers. The deformation may include geometric deformation of the 3D object or at least a portion thereof.

Figure 8:
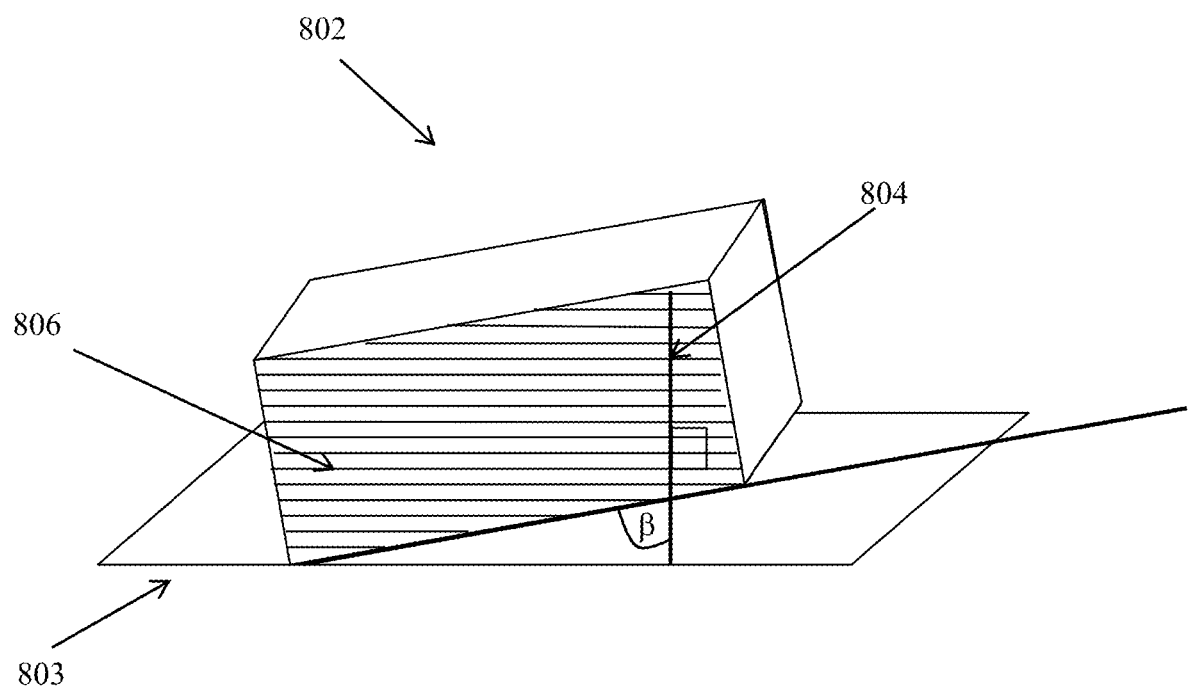
FIG. 8 schematically illustrates a 3D object.

The newly formed layer can be a portion of a 3D object. The one or more layers that form the 3D printed object (e.g., sequentially) may be (e.g., substantially) parallel to the building platform. An angle may be formed between a layer of hardened material of the 3D printed object and the platform. The angle may be measured relative to the average layering plane of the layer of hardened material. The platform (e.g., building platform) may include the base, substrate, or bottom of the enclosure. The building platform may be a carrier plate. FIG. 8 shows an example of a 3D object 802 formed by sequential binding of layers of hardened material adjacent to a platform 803. The average layering plane of the layers of hardened material forms an angle (e.g., beta) with a normal 804 to the layering plane 806.

In an aspect provided herein is a 3D object comprising a layer of hardened material generated by at least one 3D printing method described herein, wherein the layer of material (e.g., hardened) is different from a corresponding cross section of a model of the 3D object. For example, the generated layers differ from the proposed slices. The layer of material within a 3D object can be indicated by the microstructure of the material. Examples of material microstructure, and associated methods, software, systems, devices, and apparatuses, can be found in PCT/US15/36802, which is entirely incorporated herein by reference.

Energy (e.g., heat) can be transferred from the material bed to the cooling member (e.g., heat sink) through any one or combination of heat transfer mechanisms. FIG. 1, 113 shows an example of a cooling member. The heat transfer mechanism may comprise conduction, radiation, or convection. The convection may comprise natural or forced convection. The cooling member can be solid, liquid, gas, or semi-solid. In some examples, the cooling member (e.g., heat sink) is solid. The cooling member may be located above, below, or to the side of the material layer. The cooling member may comprise an energy conductive material. The cooling member may comprise an active energy transfer or a passive energy transfer. The cooling member may comprise a cooling liquid (e.g., aqueous or oil), cooling gas, or cooling solid. The cooling member may be further connected to a cooler and/or a thermostat. The gas, semi-solid, or liquid comprised in the cooling member may be stationary or circulating. The cooling member may comprise a material that conducts heat efficiently. The heat (thermal) conductivity of the cooling member may be at least about 20 Watts per meters times Kelvin (W/mK), 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The heat conductivity of the heat sink may be at most about 20 W/mK, 50 W/mK, 100 W/mK, 150 W/mK, 200 W/mK, 205 W/mK, 300 W/mK, 350 W/mK, 400 W/mK, 450 W/mK, 500 W/mK, 550 W/mK, 600 W/mK, 700 W/mK, 800 W/mK, 900 W/mK, or 1000 W/mK. The heat conductivity of the heat sink may be any value between the afore-mentioned heat conductivity values. The heat (thermal) conductivity of the cooling member may be measured at ambient temperature (e.g., room temperature) and/or pressure. For example, the heat conductivity may be measured at about 20° C. and a pressure of 1 atmosphere. The heat sink can be separated from the powder bed or powder layer by a gap. The gap can be filled with a gas. Examples of cooling member, associated methods, software, systems, devices, and apparatuses, can be found in PCT/US15/36802 or in U.S. Ser. No. 15/374,535, each of which is entirely incorporated herein by reference.

When the energy source is in operation, the material bed can reach a certain (e.g., average) temperature. The average temperature of the material bed can be an ambient temperature or "room temperature." The average temperature of the material bed can have an average temperature during the operation of the energy (e.g., beam). The average temperature of the material bed can be an average temperature during the formation of the transformed material, the formation of the hardened material, or the generation of the 3D object. The average temperature can be below or just below the transforming temperature of the material. Just below can refer to a temperature that is at most about 1° C., 2° C., 3° C., 4° C., 5° C., 6° C., 7° C., 8° C., 9° C., 10° C., 15° C., or 20° C. below the transforming temperature. The average temperature of the material bed (e.g., pre-transformed material) can be at most about 10° C. (degrees Celsius), 20° C., 25° C., 30° C., 40° C., 50° C., 60° C., 70° C., 80° C., 90° C., 100° C., 120° C., 140° C., 150° C., 160° C., 180° C., 200° C., 250° C., 300° C., 400° C., 500° C., 600° C., 700° C., 800° C., 900° C., 1000° C., 1200° C., 1400° C., 1600° C., 1800° C., or 2000° C. The average temperature of the material bed (e.g., pre-transformed material) can be at least about 10° C., 20° C., 25° C., 30° C., 40° C., 50° C., 60° C., 70° C., 80° C., 90° C., 100° C., 120° C., 140° C., 150° C., 160° C., 180° C., 200° C., 250° C., 300° C., 400° C., 500° C., 600° C., 700° C., 800° C., 900° C., 1000° C., 1200° C., 1400° C., 1600° C., 1800° C., or 2000° C. The average temperature of the material bed (e.g., pre-transformed material) can be any temperature between the afore-mentioned material average temperatures. The average temperature of the material bed (e.g., pre-transformed material) may refer to the average temperature during the 3D printing. The pre-transformed material can be the material within the material bed that has not been transformed and generated at least a portion of the 3D object (e.g., the remainder). The material bed can be heated or cooled before, during, or after forming the 3D object (e.g., hardened material). Bulk heaters can heat the material bed. The bulk heaters can be situated adjacent to (e.g., above, below, or to the side of) the material bed, or within a material dispensing system. For example, the material can be heated using radiators (e.g., quartz radiators, or infrared emitters). The material bed temperature can be substantially maintained at a predetermined value. The temperature of the material bed can be monitored. The material temperature can be controlled manually and/or by a control system.

In some embodiments, the pre-transformed material within the material bed is heated by a first energy source such that the heating will transform the pre-transformed material. The remainder of the material that did not transform to generate at least a portion of the 3D object (e.g., the remainder) can be heated by a second energy source. The remainder can be at an average temperature that is less than the liquefying temperature of the material (e.g., during the 3D printing). The maximum temperature of the transformed portion of the material bed and the average temperature of the remainder of the material bed can be different. The solidus temperature of the material can be a temperature wherein the material is in a solid state at a given pressure (e.g., ambient pressure). Ambient may refer to the surrounding. After the portion of the material bed is heated to the temperature that is at least a liquefying temperature of the material by the first energy source, that portion of the material may be cooled to allow the transformed (e.g., liquefied) material portion to harden (e.g., solidify). In some cases, the liquefying temperature can be at least about 100° C., 200° C., 300° C., 400° C., or 500° C., and the solidus temperature can be at most about 500° C., 400° C., 300° C., 200° C., or 100° C. For example, the liquefying temperature is at least about 300° C. and the solidus temperature is less than about 300° C. In another example, the liquefying temperature is at least about 400° C. and the solidus temperature is less than about 400° C. The liquefying temperature may be different from the solidus temperature. In some instances, the temperature of the pre-transformed material is maintained above the solidus temperature of the material and below its liquefying temperature. In some examples, the material from which the pre-transformed material is composed has a super cooling temperature (or super cooling temperature regime). In some examples, as the first energy source heats up the pre-transformed material to cause at least a portion of it to melt, the molten material will remain molten as the material bed is held at or above the material super cooling temperature of the material, but below its melting point. When two or more materials make up the material layer at a specific ratio, the materials may form a eutectic material on transformation of the material. The liquefying temperature of the formed eutectic material may be the temperature at the eutectic point, close to the eutectic point, or far from the eutectic point. Close to the eutectic point may designate a temperature that is different from the eutectic temperature (i.e., temperature at the eutectic point) by at most about 0.1° C., 0.5° C., 1C, 2° C., 4° C., 5° C., 6° C., 8° C., 10° C., or 15° C. A temperature that is farther from the eutectic point than the temperature close to the eutectic point is designated herein as a temperature far from the eutectic Point. The process of liquefying and solidifying a portion of the material can be repeated until the entire object has been formed. At the completion of the generated 3D object, it can be removed from the remainder of material in the container. The remaining material can be separated from the portion at the generated 3D object. The generated 3D object can be hardened and removed from the container (e.g., from the substrate or from the base).

At times, the methods described herein further comprise stabilizing the temperature within the enclosure. For example, stabilizing the temperature of the atmosphere or the pre-transformed material (e.g., within the material bed). Stabilization of the temperature may be to a predetermined temperature value. The methods described herein may further comprise altering the temperature within at least one portion of the container. Alteration of the temperature may be to a predetermined temperature. Alteration of the temperature may comprise heating and/or cooling the material bed. Elevating the temperature (e.g., of the material bed) may be to a temperature below the temperature at which the pre-transformed material fuses (e.g., melts or sinters), connects, or bonds.

Figure 4:
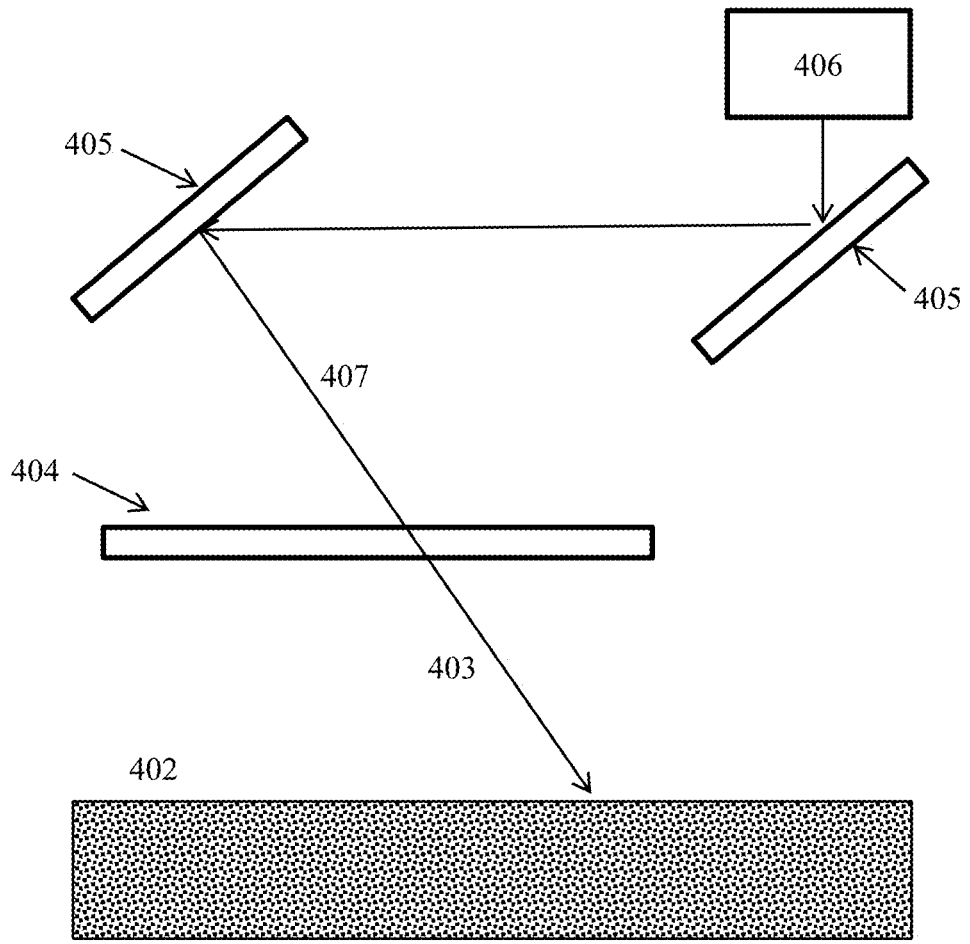
FIG. 4 schematically illustrates a side view of components in a 3D printing system.

In some embodiments, the apparatus and/or systems described herein comprise an optical system. The optical components may be controlled manually and/or via a control system (e.g., a controller). FIG. 4 shows an example of an optical system. The optical system may be configured to direct at least one energy beam (e.g., 407) from the at least one energy source (e.g., 406) to a position on the material bed within the enclosure (e.g., a predetermined position). A scanner can be included in the optical system. The printing system may comprise a processor (e.g., a central processing unit). The processor can be programmed to control a trajectory of the at least one energy beam and/or energy source with the aid of the optical system. The systems and/or the apparatus described herein can further comprise a control system in communication with the at least one energy source and/or energy beam. The control system can regulate a supply of energy from the at least one energy source to the material in the container. The control system may control the various components of the optical system (e.g., FIG. 4). The various components of the optical system may include optical components comprising a mirror(s) (e.g., 405), a lens (e.g., concave or convex), a fiber, a beam guide, a rotating polygon, or a prism. The lens may be a focusing or a dispersing lens. The lens may be a diverging or converging lens. The mirror can be a deflection mirror. The optical components may be tiltable and/or rotatable. The optical components may be tilted and/or rotated. The mirror may be a deflection mirror. The optical components may comprise an aperture. The aperture may be mechanical. The optical system may comprise a variable focusing device. The variable focusing device may be connected to the control system. The variable focusing device may be controlled by the control system and/or manually. The variable focusing device may comprise a modulator. The modulator may comprise an acousto-optical modulator, mechanical modulator, or an electro optical modulator. The focusing device may comprise an aperture (e.g., a diaphragm aperture). The energy beam may be directed through a window (e.g., 404) (e.g., as part of a chamber (e.g., processing chamber) of a printing system) and to a target surface (e.g., 402) (e.g., within the chamber).

In some embodiments, the container described herein comprises at least one sensor. The sensor may be connected and/or controlled by the control system (e.g., computer control system, or controller). The control system may be able to receive signals from the at least one sensor. The control system may act upon at least one signal received from the at least one sensor. The control may rely on feedback and/or feed forward mechanisms that has been pre-programmed. The feedback and/or feed forward mechanisms may rely on input from at least one sensor that is connected to the control unit.

In some embodiments, the sensor detects the amount of material (e.g., pre-transformed material) in the enclosure. The controller may monitor the amount of material in the enclosure (e.g., within the material bed). The systems and/or the apparatus described herein can include a pressure sensor. The pressure sensor may measure the pressure of the chamber (e.g., pressure of the chamber atmosphere). The pressure sensor can be coupled to a control system. The pressure can be electronically and/or manually controlled. The controller may regulate the pressure (e.g., with the aid of one or more vacuum pumps) according to input from at least one pressure sensor. The sensor may comprise light sensor, image sensor, acoustic sensor, vibration sensor, chemical sensor, electrical sensor, magnetic sensor, fluidity sensor, movement sensor, speed sensor, position sensor, pressure sensor, force sensor, density sensor, metrology sensor, sonic sensor (e.g., ultrasonic sensor), or proximity sensor. The metrology sensor may comprise measurement sensor (e.g., height, length, width, angle, and/or volume). The metrology sensor may comprise a magnetic, acceleration, orientation, or optical sensor. The optical sensor may comprise a camera (e.g., IR camera, or CCD camera (e.g., single line CCD camera)). or CCD camera (e.g., single line CCD camera). The sensor may transmit and/or receive sound (e.g., echo), magnetic, electronic, or electromagnetic signal. The electromagnetic signal may comprise a visible, infrared, ultraviolet, ultrasound, radio wave, or microwave signal. The metrology sensor may measure the tile. The metrology sensor may measure the gap. The metrology sensor may measure at least a portion of the layer of material (e.g., pre-transformed, transformed, and/or hardened). The layer of material may be a pre-transformed material (e.g., powder), transformed material, or hardened material. The metrology sensor may measure at least a portion of the 3D object. The sensor may comprise a temperature sensor, weight sensor, powder level sensor, gas sensor, or humidity sensor. The gas sensor may sense any gas enumerated herein. The temperature sensor may comprise Bolometer, Bimetallic strip, Calorimeter, Exhaust gas temperature gauge, Flame detection, Gardon gauge, Golay cell, Heat flux sensor, Infrared thermometer, Microbolometer, Microwave radiometer, Net radiometer, Quartz thermometer, Resistance temperature detector, Resistance thermometer, Silicon band gap temperature sensor, Special sensor microwave/imager, Temperature gauge, Thermistor, Thermocouple, Thermometer, Pyrometer, IR camera, or CCD camera (e.g., single line CCD camera). The temperature sensor may measure the temperature without contacting the material bed (e.g., non-contact measurements). The pyrometer may comprise a point pyrometer, or a multi-point pyrometer. The Infrared (IR) thermometer may comprise an IR camera. The pressure sensor may comprise Barograph, Barometer, Boost gauge, Bourdon gauge, hot filament ionization gauge, Ionization gauge, McLeod gauge, Oscillating U-tube, Permanent Downhole Gauge, Piezometer, Pirani gauge, Pressure sensor, Pressure gauge, tactile sensor, or Time pressure gauge. The position sensor may comprise Auxanometer, Capacitive displacement sensor, Capacitive sensing, Free fall sensor, Gravimeter, Gyroscopic sensor, Impact sensor, Inclinometer, Integrated circuit piezoelectric sensor, Laser rangefinder, Laser surface velocimeter, LIDAR, Linear encoder, Linear variable differential transformer (LVDT), Liquid capacitive inclinometers, Odometer, Photoelectric sensor, Piezoelectric accelerometer, Rate sensor, Rotary encoder, Rotary variable differential transformer, Selsyn, Shock detector, Shock data logger, Tilt sensor, Tachometer, Ultrasonic thickness gauge, Variable reluctance sensor, or Velocity receiver. The optical sensor may comprise a Charge-coupled device, Colorimeter, Contact image sensor, Electro-optical sensor, Infra-red sensor, Kinetic inductance detector, light emitting diode as light sensor, Light-addressable potentiometric sensor, Nichols radiometer, Fiber optic sensors, optical position sensor, photo detector, photodiode, photomultiplier tubes, phototransistor, photoelectric sensor, photoionization detector, photomultiplier, photo resistor, photo switch, phototube, scintillometer, Shack-Hartmann, single-photon avalanche diode, superconducting nanowire single-photon detector, transition edge sensor, visible light photon counter, or wave front sensor. The weight of the enclosure (e.g., container), or any components within the enclosure can be monitored by at least one weight sensor in or adjacent to the material. For example, a weight sensor can be situated at the bottom of the enclosure. The weight sensor can be situated between the bottom of the enclosure and the substrate. The weight sensor can be situated between the substrate and the base. The weight sensor can be situated between the bottom of the container and the base. The weight sensor can be situated between the bottom of the container and the top of the material bed. The weight sensor can comprise a pressure sensor. The weight sensor may comprise a spring scale, a hydraulic scale, a pneumatic scale, or a balance. At least a portion of the pressure sensor can be exposed on a bottom of the container. In some cases, the at least one weight sensor can comprise a button load cell. Alternatively, or additionally a sensor can be configured to monitor the weight of the material by monitoring a weight of a structure that contains the material (e.g., a material bed). One or more position sensors (e.g., height sensors) can measure the height of the material bed relative to the substrate. The position sensors can be optical sensors. The position sensors can determine a distance between one or more energy sources and a surface of the material bed. The surface of the material bed can be the upper surface of the material bed. For example, FIG. 1, 119 shows an example of an upper surface of the material bed 104.

In some embodiments, the methods, systems, and/or the apparatus described herein may comprise at least one valve. The valve may be shut or opened according to an input from the at least one sensor, or manually. The degree of valve opening or shutting may be regulated by the control system, for example, according to at least one input from at least one sensor. The systems and/or the apparatus described herein can include one or more valves, such as throttle valves.

In some embodiments, the methods, systems and/or the apparatus described herein comprise a motor. The motor may be controlled by the control system and/or manually. The apparatuses and/or systems described herein may include a system providing the material (e.g., powder material) to the material bed. The system for providing the material may be controlled by the control system, or manually. The motor may connect to a system providing the material (e.g., powder material) to the material bed. The system and/or apparatus of the present invention may comprise a material reservoir. The material may travel from the reservoir to the system and/or apparatus of the present invention. The material may travel from the reservoir to the system for providing the material to the material bed. The motor may alter (e.g., the position of) the substrate and/or to the base. The motor may alter (e.g., the position of) the elevator. The motor may alter an opening of the enclosure (e.g., its opening or closure). The motor may be a step motor or a servomotor. The methods, systems and/or the apparatus described herein may comprise a piston. The piston may be a trunk, crosshead, slipper, or deflector piston.

In some examples, the systems and/or the apparatus described herein comprise at least one nozzle. The nozzle may be regulated according to at least one input from at least one sensor. The nozzle may be controlled automatically or manually. The controller may control the nozzle. The nozzle may include jet (e.g., gas jet) nozzle, high velocity nozzle, propelling nozzle, magnetic nozzle, spray nozzle, vacuum nozzle, or shaping nozzle (e.g., a die). The nozzle can be a convergent or a divergent nozzle. The spray nozzle may comprise an atomizer nozzle, an air-aspirating nozzle, or a swirl nozzle.

In some examples, the systems and/or the apparatus described herein comprise at least one pump. The pump may be regulated according to at least one input from at least one sensor. The pump may be controlled automatically or manually. The controller may control the pump. The one or more pumps may comprise a positive displacement pump. The positive displacement pump may comprise rotary-type positive displacement pump, reciprocating-type positive displacement pump, or linear-type positive displacement pump. The positive displacement pump may comprise rotary lobe pump, progressive cavity pump, rotary gear pump, piston pump, diaphragm pump, screw pump, gear pump, hydraulic pump, rotary vane pump, regenerative (peripheral) pump, peristaltic pump, rope pump or flexible impeller. Rotary positive displacement pump may comprise gear pump, screw pump, or rotary vane pump. The reciprocating pump comprises plunger pump, diaphragm pump, piston pumps displacement pumps, or radial piston pump. The pump may comprise a valve-less pump, steam pump, gravity pump, eductor-jet pump, mixed-flow pump, bellow pump, axialflow pumps, radial-flow pump, velocity pump, hydraulic ram pump, impulse pump, rope pump, compressed-air-powered double-diaphragm pump, triplex-style plunger pump, plunger pump, peristaltic pump, roots-type pumps, progressing cavity pump, screw pump, or gear pump. In some examples, the systems and/or the apparatus described herein include one or more vacuum pumps selected from mechanical pumps, rotary vain pumps, turbomolecular pumps, ion pumps, cryopumps, and diffusion pumps. The one or more vacuum pumps may comprise Rotary vane pump, diaphragm pump, liquid ring pump, piston pump, scroll pump, screw pump, Wankel pump, external vane pump, roots blower, multistage Roots pump, Toepler pump, or Lobe pump. The one or more vacuum pumps may comprise momentum transfer pump, regenerative pump, entrapment pump, Venturi vacuum pump, or team ejector.

In some embodiments, the systems, apparatuses, and/or components thereof comprise a communication technology. The communication technology may comprise a Bluetooth technology. The systems, apparatuses, and/or components thereof may comprise a communication port. The communication port may be a serial port or a parallel port. The communication port may be a Universal Serial Bus port (i.e., USB). The systems, apparatuses, and/or components thereof may comprise USB ports. The USB can be micro or mini-USB. The USB port may relate to device classes comprising 00h, 01h, 02h, 03h, 05h, 06h, 07h, 08h, 09h, 0Ah, 0Bh, 0Dh, 0Eh, 0Fh, 10h, 11h, DCh, E0h, EFh, FEh, or FFh. The surface identification mechanism may comprise a plug and/or a socket (e.g., electrical, AC power, DC power). The systems, apparatuses, and/or components thereof may comprise an adapter (e.g., AC and/or DC power adapter). The systems, apparatuses, and/or components thereof may comprise a power connector. The power connector can be an electrical power connector. The power connector may comprise a magnetically attached power connector. The power connector can be a dock connector. The connector can be a data and power connector. The connector may comprise pins. The connector may comprise at least 10, 15, 18, 20, 22, 24, 26, 28, 30, 40, 42, 45, 50, 55, 80, or 100 pins.

In some embodiments, the systems, apparatuses, and/or components thereof comprise one or more controllers. The one or more controllers can comprise one or more central processing unit (CPU), input/output (I/O) and/or communications module. The CPU can comprise electronic circuitry that carries out instructions of a computer program by performing basic arithmetic, logical, control and I/O operations specified by the instructions. The controller can comprise a suitable software (e.g., operating system). The control system may optionally include a feedback control loop and/or feed-forward control loop. The controllers may be shared between one or more systems or apparatuses. Each apparatus or system may have its own controller. Two or more systems and/or its components may share a controller. Two or more apparatuses and/or its components may share a controller. The controller may monitor and/or direct (e.g., physical) alteration of the operating conditions of the apparatuses, software, and/or methods described herein. The controller may be a manual or a non-manual controller. The controller may be an automatic controller. The controller may operate upon request. The controller may be a programmable controller. The controller may be programed. The controller may comprise a processing unit (e.g., CPU or GPU). The controller may receive an input (e.g., from a sensor). The controller may deliver an output. The controller may comprise multiple controllers. The controller may receive multiple inputs. The controller may generate multiple outputs. The controller may be a single input single output controller (SISO) or a multiple input multiple output controller (MIMO). The controller may interpret the input signal received. The controller may acquire data from the one or more sensors. Acquire may comprise receive or extract. The data may comprise measurement, estimation, determination, generation, or any combination thereof. The controller may comprise feedback control. The controller may comprise feed-forward control. The control may comprise on-off control, proportional control, proportional-integral (PI) control, or proportional-integral-derivative (PID) control. The control may comprise open loop control, or closed loop control. The controller may comprise closed loop control. The controller may comprise open loop control. The controller may comprise a user interface. The user interface may comprise a keyboard, keypad, mouse, touch screen, microphone, speech recognition package, camera, imaging system, or any combination thereof. The outputs may include a display (e.g., screen), speaker, or printer. The controller may be any controller (e.g., a controller used in 3D printing). Examples of controller(s), associated methods, software, systems, devices, and apparatuses, can be found in PCT/US15/36802; U.S. Ser. No. 15/374,535; U.S. patent application Ser. No. 16/505,520 filed Jul. 8, 2019; in U.S. patent application Ser. No. 16/245,183 filed on Jan. 10, 2019; and in international Patent Application serial number PCT/US16/59781, filed on Oct. 31, 2016; each of which is incorporated herein by reference in its entirety.

At times, the methods, systems, and/or the apparatus described herein further comprise a control system. The control system can be in communication with one or more energy sources and/or energy (e.g., energy beams). The energy sources may be of the same type or of different types. For example, the energy sources can be both lasers, or a laser and an electron beam. For example, the control system may be in communication with the first energy and/or with the second energy. The control system may regulate the one or more energies (e.g., energy beams). The control system may regulate the energy supplied by the one or more energy sources. For example, the control system may regulate the energy supplied by a first energy beam and by a second energy beam, to the pre-transformed material within the material bed. The control system may regulate the position of the one or more energy beams. For example, the control system may regulate the position of the first energy beam and/or the position of the second energy beam.

Figure 5:
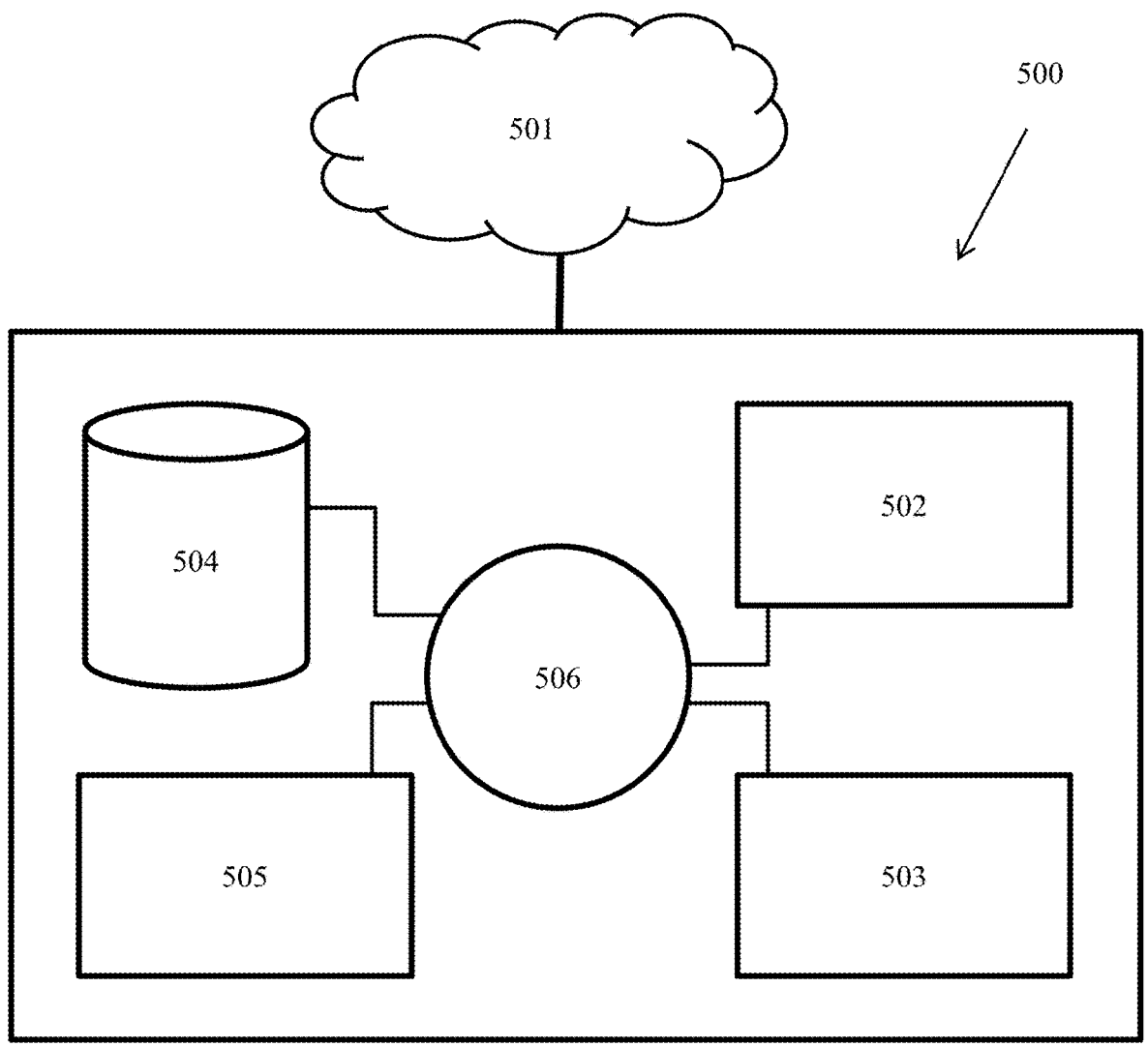
FIG. 5 schematically illustrates a computer control system that is programmed or otherwise configured to facilitate the formation of one or more 3D objects.

In some embodiments, the 3D printing system comprises a processor. The processor may be a processing unit. The controller may comprise a processing unit. The 3D printing system can include one or more controllers. The processing unit may be central. The processing unit may comprise a central processing unit (herein "CPU"). The controllers or control mechanisms (e.g., comprising a computer system) may be programmed to implement methods of the disclosure. The processor (e.g., 3D printer processor) may be programmed to implement methods of the disclosure. The controller may control at least one component of the systems and/or apparatuses disclosed herein. FIG. 5 is a schematic example of a computer system 500 that is programmed or otherwise configured to facilitate the formation of a 3D object according to the methods provided herein. The computer system 500 can control (e.g., direct, monitor, and/or regulate) various features of printing methods, apparatuses and systems of the present disclosure, such as, for example, control force, translation, heating, cooling and/or maintaining the temperature of a powder bed, process parameters (e.g., chamber pressure), scanning rate (e.g., of the energy beam and/or the platform), scanning route of the energy source, position and/or temperature of the cooling member(s), application of the amount of energy emitted to a selected location, or any combination thereof. The computer system 500 can be part of, or be in communication with, a 3D printing system or apparatus. The computer may be coupled to one or more mechanisms disclosed herein, and/or any parts thereof. For example, the computer may be coupled to one or more sensors, valves, switches, motors, pumps, scanners, optical components, or any combination thereof.

The computer system 500 can include a processing unit 506 (also "processor," "computer" and "computer processor" used herein). The computer system may include memory or memory location 502 (e.g., random-access memory, read-only memory, flash memory), electronic storage unit 504 (e.g., hard disk), communication interface 503 (e.g., network adapter) for communicating with one or more other systems, and peripheral devices 505, such as cache, other memory, data storage and/or electronic display adapters. The memory 502, storage unit 504, interface 503, and peripheral devices 505 are in communication with the processing unit 506 through a communication bus (solid lines), such as a motherboard. The storage unit can be a data storage unit (or data repository) for storing data. The computer system can be operatively coupled to a computer network ("network") 501 with the aid of the communication interface. The network can be the Internet, an internet and/or extranet, or an intranet and/or extranet that is in communication with the Internet. In some cases, the network is a telecommunication and/or data network. The network can include one or more computer servers, which can enable distributed computing, such as cloud computing. The network, in some cases with the aid of the computer system, can implement a peer-to-peer network, which may enable devices coupled to the computer system to behave as a client or a server.

In some examples, the processing unit executes a sequence of machine-readable instructions, which can be embodied in a program or software. The instructions may be stored in a memory location, such as the memory 502. The instructions can be directed to the processing unit, which can subsequently program or otherwise configure the processing unit to implement methods of the present disclosure. Examples of operations performed by the processing unit can include fetch, decode, execute, and write back. The processing unit may interpret and/or execute instructions. The processor may include a microprocessor, a data processor, a central processing unit (CPU), a graphical processing unit (GPU), a system-on-chip (SOC), a co-processor, a network processor, an application specific integrated circuit (ASIC), an application specific instruction-set processor (ASIPs), a controller, a programmable logic device (PLD), a chipset, a field programmable gate array (FPGA), or any combination thereof. The processing unit can be part of a circuit, such as an integrated circuit. One or more other components of the system 500 can be included in the circuit.

The 3D system can include any suitable number of controllers, and can be used to control any number of suitable (e.g., different) operations. For example, in some embodiments, one or more controllers is used to control one or more parts of a printing operation and another one or more controllers is used to control another one or more parts of the printing operation. In some embodiments, a number of controllers are used to control one part of a printing operation. In some embodiments, a controller (e.g., a single controller) used to control a number of parts of a printing operation. For example, in some embodiments, one or more controllers is used to control a transformation operation (e.g., control one or more energy beams), and another one or more controllers is used to control movement of one or more devices (e.g., build plate and/or layer forming apparatus).

In some examples, the storage unit 504 can store files, such as drivers, libraries and saved programs. The storage unit can store user data (e.g., user preferences and user programs). In some cases, the computer system can include one or more additional data storage units that are external to the computer system, such as located on a remote server that is in communication with the computer system through an intranet or the Internet.

In some embodiments, the computer system communicates with one or more remote computer systems through a network. For instance, the computer system can communicate with a remote computer system of a user (e.g., operator). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. A user (e.g., client) can access the computer system via the network.

Methods as described herein can be implemented by way of machine (e.g., computer processor) executable code stored on an electronic storage location of the computer system, such as, for example, on the memory 502 or electronic storage unit 504. The machine executable or machine-readable code can be provided in the form of software. During use, the processor 506 can execute the code. In some cases, the code can be retrieved from the storage unit and stored on the memory for ready access by the processor. In some situations, the electronic storage unit can be precluded, and machine-executable instructions are stored on memory.

At times, the code is pre-compiled and configured for use with a machine have a processer adapted to execute the code, or can be compiled during runtime. The code can be supplied in a programming language that can be selected to enable the code to execute in a pre-compiled or as-compiled fashion.

In some embodiments, the processing unit includes one or more cores. The computer system may comprise a single core processor, multi core processor, or a plurality of processors for parallel processing. The processing unit may comprise one or more central processing unit (CPU) and/or a graphic processing unit (GPU). The multiple cores may be disposed in a physical unit (e.g., Central Processing Unit, or Graphic Processing Unit). The processing unit may include one or more processing units. The physical unit may be a single physical unit. The physical unit may be a die. The physical unit may comprise cache coherency circuitry. The multiple cores may be disposed in close proximity. The physical unit may comprise an integrated circuit chip. The integrated circuit chip may comprise one or more transistors. The integrated circuit chip may comprise at least about 0.2 billion transistors (BT), 0.5 BT, 1 BT, 2 BT, 3 BT, 5 BT, 6 BT, 7 BT, 8 BT, 9 BT, 10 BT, 15 BT, 20 BT, 25 BT, 30 BT, 40 BT, or 50 BT. The integrated circuit chip may comprise at most about 7 BT, 8 BT, 9 BT, 10 BT, 15 BT, 20 BT, 25 BT, 30 BT, 40 BT, 50 BT, 70 BT, or 100 BT. The integrated circuit chip may comprise any number of transistors between the afore-mentioned numbers (e.g., from about 0.2 BT to about 100 BT, from about 1 BT to about 8 BT, from about 8 BT to about 40 BT, or from about 40 BT to about 100 BT). The integrated circuit chip may have an area of at least about 50 mm$^2$, 60 mm$^2$, 70 mm$^2$, 80 mm$^2$, 90 mm$^2$, 100 mm$^2$, 200 mm$^2$, 300 mm$^2$, 400 mm$^2$, 500 mm$^2$, 600 mm$^2$, 700 mm², or 800 mm². The integrated circuit chip may have an area of at most about 50 mm², 60 mm², 70 mm², 80 mm², 90 mm², 100 mm², 200 mm², 300 mm², 400 mm², 500 mm², 600 mm², 700 mm², or 800 mm². The integrated circuit chip may have an area of any value between the afore-mentioned values (e.g., from about 50 mm² to about 800 mm², from about 50 mm² to about 500 mm², or from about 500 mm² to about 800 mm²). The close proximity may allow substantial preservation of communication signals that travel between the cores. The close proximity may diminish communication signal degradation. A core as understood herein is a computing component having independent central processing capabilities. The computing system may comprise a multiplicity of cores, which are disposed on a single computing component. The multiplicity of cores may include two or more independent central processing units. The independent central processing units may constitute a unit that read and execute program instructions. The independent central processing units may constitute parallel processing units. The parallel processing units may be cores and/or digital signal processing slices (DSP slices). The multiplicity of cores can be parallel cores. The multiplicity of DSP slices can be parallel DSP slices. The multiplicity of cores and/or DSP slices can function in parallel. The multiplicity of cores may include at least about 2, 10, 40, 100, 400, 1000, 2000, 3000, 4000, 5000, 6000, 7000, 8000, 9000, 10000, 11000, 12000, 13000, 14000 or 15000 cores. The multiplicity of cores may include at most about 1000, 2000, 3000, 4000, 5000, 6000, 7000, 8000, 9000, 10000, 11000, 12000, 13000, 14000, 15000, 20000, 30000, or 40000 cores. The multiplicity of cores may include cores of any number between the afore-mentioned numbers (e.g., from about 2 to about 40000, from about 2 to about 400, from about 400 to about 4000, from about 2000 to about 4000, from about 4000 to about 10000, from about 4000 to about 15000, or from about 15000 to about 40000 cores). In some processors (e.g., FPGA), the cores may be equivalent to multiple digital signal processor (DSP) slices (e.g., slices). The plurality of DSP slices may be equal to any of plurality core values mentioned herein. The processor may comprise low latency in data transfer (e.g., from one core to another). Latency may refer to the time delay between the cause and the effect of a physical change in the processor (e.g., a signal). Latency may refer to the time elapsed from the source (e.g., first core) sending a packet to the destination (e.g., second core) receiving it (also referred as two-point latency). One-point latency may refer to the time elapsed from the source (e.g., first core) sending a packet (e.g., signal) to the destination (e.g., second core) receiving it, and the designation sending a packet back to the source (e.g., the packet making a round trip). The latency may be sufficiently low to allow a high number of floating-point operations per second (FLOPS). The number of FLOPS may be at least about 0.1 Tera FLOPS (T-FLOPS), 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, or 10 T-FLOPS. The number of flops may be at most about 0.2 T-FLOPS, 0.25 T-FLOPS, 0.5 T-FLOPS, 0.75 T-FLOPS, 1 T-FLOPS, 2 T-FLOPS, 3 T-FLOPS, 5 T-FLOPS, 6 T-FLOPS, 7 T-FLOPS, 8 T-FLOPS, 9 T-FLOPS, 10 T-FLOPS, 20 T-FLOPS, 30 T-FLOPS, 50 T-FLOPS, 100 T-FLOPS, 1 P-FLOPS, 2 P-FLOPS, 3 P-FLOPS, 4 P-FLOPS, 5 P-FLOPS, 10 P-FLOPS, 50 P-FLOPS, 100 P-FLOPS, 1 EXA-FLOP, 2 EXA-FLOPS or 10 EXA-FLOPS. The number of FLOPS may be any value between the afore-mentioned values (e.g., from about 0.1 T-FLOP to about 10 EXA-FLOPS, from about 0.1 T-FLOPS to about 1 T-FLOPS, from about 1 T-FLOPS to about 4 T-FLOPS, from about 4 T-FLOPS to about 10 T-FLOPS, from about 1 T-FLOPS to about 10 T-FLOPS, or from about 10 T-FLOPS to about 30 T-FLOPS, from about 50 T-FLOPS to about 1 EXA-FLOP, from about 0.1 T-FLOP to about 10 EXA-FLOPS)). In some processors (e.g., FPGA), the operations per second may be measured as (e.g., Giga) multiply-accumulate operations per second (e.g., MACs or GMACs). The MACs value can be equal to any of the T-FLOPS values mentioned herein measured as Tera-MACs (T-MACs) instead of T-FLOPS respectively. The FLOPS can be measured according to a benchmark. The benchmark may be a HPC Challenge Benchmark. The benchmark may comprise mathematical operations (e.g., equation calculation such as linear equations), graphical operations (e.g., rendering), or encryption/decryption benchmark. The benchmark may comprise a High Performance LINPACK, matrix multiplication (e.g., DGEMM), sustained memory bandwidth to/from memory (e.g., STREAM), array transposing rate measurement (e.g., PTRANS), Random-access, rate of Fast Fourier Transform (e.g., on a large one-dimensional vector using the generalized Cooley-Tukey algorithm), or Communication Bandwidth and Latency (e.g., MPI-centric performance measurements based on the effective bandwidth/latency benchmark). LINPACK may refer to a software library for performing numerical linear algebra on a digital computer. DGEMM may refer to double precision general matrix multiplication. STREAM benchmark may refer to a synthetic benchmark designed to measure sustainable memory bandwidth (in MB/s) and a corresponding computation rate for four simple vector kernels (Copy, Scale, Add and Triad). PTRANS benchmark may refer to a rate measurement at which the system can transpose a large array (global). MPI refers to Message Passing Interface.

In some embodiments, the computer system includes hyper-threading technology. The computer system may include a chip processor with integrated transform, lighting, triangle setup, triangle clipping, rendering engine, or any combination thereof. The rendering engine may be capable of processing at least about 10 million polygons per second. The rendering engines may be capable of processing at least about 10 million calculations per second. As an example, the GPU may include a GPU by NVidia, ATI Technologies, S3 Graphics, Advanced Micro Devices (AMD), or Matrox. The processing unit may be able to process instructions (e.g., algorithms) comprising a matrix or a vector. The core may comprise a complex instruction set computing core (CISC), or reduced instruction set computing (RISC).

In some embodiments, the computer system includes an electronic chip that is reprogrammable (e.g., field programmable gate array (FPGA)). For example, the FPGA may comprise Tabula, Altera, or Xilinx FPGA. The electronic chips may comprise one or more programmable logic blocks (e.g., an array). The logic blocks may compute combinational functions, logic gates, or any combination thereof. The computer system may include custom hardware. The custom hardware may comprise an instruction (e.g., algorithm).

In some embodiments, the computer system includes configurable computing, partially reconfigurable computing, reconfigurable computing, or any combination thereof. The computer system may include a FPGA. The computer system can comprise one or more controllers that are configured to control one or more instructions described herein. The one or more controllers can comprise circuitry configured to interpret and/or execute the instructions. The computer system may include an integrated circuit that performs the instruction (e.g., algorithm). For example, the reconfigurable computing system may comprise FPGA, CPU, GPU, or multi-core microprocessors. The reconfigurable computing system may comprise a High-Performance Reconfigurable Computing architecture (HPRC). The partially reconfigurable computing may include module-based partial reconfiguration, or difference-based partial reconfiguration. The FPGA may comprise configurable FPGA logic, and/or fixed-function hardware comprising multipliers, memories, microprocessor cores, first in-first out (FIFO) and/or error correcting code (ECC) logic, digital signal processing (DSP) blocks, peripheral Component interconnect express (PCI Express) controllers, Ethernet media access control (MAC) blocks, or high-speed serial transceivers. DSP blocks can be DSP slices.

In some embodiments, the computing system includes an integrated circuit that performs the instruction (e.g., algorithm (e.g., control algorithm)). The physical unit (e.g., the cache coherency circuitry within) may have a clock time of at least about 0.1 Gigabits per second (Gbit/s), 0.5 Gbit/s, 1 Gbit/s, 2 Gbit/s, 5 Gbit/s, 6 Gbit/s, 7 Gbit/s, 8 Gbit/s, 9 Gbit/s, 10 Gbit/s, or 50 Gbit/s. The physical unit may have a clock time of any value between the afore-mentioned values (e.g., from about 0.1 Gbit/s to about 50 Gbit/s, or from about 5 Gbit/s to about 10 Gbit/s). The physical unit may produce the instruction (e.g., algorithm) output in at most about 0.1 microsecond (µs), 1 µs, 10 µs, 100 µs, or 1 millisecond (ms). The physical unit may produce the instruction (e.g., algorithm) output in any time between the above-mentioned times (e.g., from about 0.1 µs, to about 1 ms, from about 0.1 µs, to about 100 µs, or from about 0.1 s to about 10 s).

In some instances, the controller uses calculations, real time measurements, or any combination thereof to regulate the energy beam(s). The sensor (e.g., temperature and/or positional sensor) may provide a signal (e.g., input for the controller and/or processor) at a rate of at least about 0.1 KHz, 1 KHz, 10 KHz, 100 KHz, 1000 KHz, or 10000 KHz). The sensor may provide a signal at a rate between any of the above-mentioned rates (e.g., from about 0.1 KHz to about 10000 KHz, from about 0.1 KHz to about 1000 KHz, or from about 1000 KHz to about 10000 KHz). The memory bandwidth of the processing unit may be at least about 1 gigabyte per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may be at most about 1 gigabyte per second (Gbytes/s), 10 Gbytes/s, 100 Gbytes/s, 200 Gbytes/s, 300 Gbytes/s, 400 Gbytes/s, 500 Gbytes/s, 600 Gbytes/s, 700 Gbytes/s, 800 Gbytes/s, 900 Gbytes/s, or 1000 Gbytes/s. The memory bandwidth of the processing unit may have any value between the afore-mentioned values (e.g., from about 1 Gbytes/s to about 1000 Gbytes/s, from about 100 Gbytes/s to about 500 Gbytes/s, from about 500 Gbytes/s to about 1000 Gbytes/s, or from about 200 Gbytes/s to about 400 Gbytes/s). The sensor measurements may be real-time measurements. The real time measurements may be conducted during the 3D printing process. The real-time measurements may be in situ measurements in the 3D printing system and/or apparatus. the real time measurements may be during the formation of the 3D object. In some instances, the processing unit may use the signal obtained from the at least one sensor to provide a processing unit output, which output is provided by the processing system at a speed of at most about 100 min, 50 min, 25 min, 15 min, 10 min, 5 min, 1 min, 0.5 min (i.e., 30 sec), 15 sec, 10 sec, 5 sec, 1 sec, 0.5 sec, 0.25 sec, 0.2 sec, 0.1 sec, 80 milliseconds (msec), 50 msec, 10 msec, 5 msec, 1 msec, 80 microseconds (µsec), 50 µsec, 20 µsec, 10 µsec, 5 µsec, or 1 µsec. In some instances, the processing unit may use the signal obtained from the at least one sensor to provide a processing unit output, which output is provided at a speed of any value between the afore-mentioned values (e.g., from about 100 min to about 1 µsec, from about 100 min to about 10 min, from about 10 min to about 1 min, from about 5 min to about 0.5 min, from about 30 sec to about 0.1 sec, from about 0.1 sec to about 1 msec, from about 80 msec to about 10 µsec, from about 50 µsec to about 1 µsec, from about 20 µsec to about 1 µsec, or from about 10 µsec to about 1 µsec).

At times, the processing unit output comprises an evaluation of the temperature at a location, position at a location (e.g., vertical, and/or horizontal), or a map of locations. The location may be on the target surface. The map may comprise a topological or temperature map. The temperature sensor may comprise a temperature imaging device (e.g., IR imaging device).

At times, the processing unit uses the signal obtained from the at least one sensor in an instruction (e.g., algorithm) that is used in controlling the energy beam. The instruction (e.g., algorithm) may comprise the path of the energy beam. In some instances, the instruction (e.g., algorithm) may be used to alter the path of the energy beam on the target surface. The path may deviate from a cross section of a model corresponding to the requested 3D object. The processing unit may use the output in an instruction (e.g., algorithm) that is used in determining the manner in which a model of the requested 3D object may be sliced. The processing unit may use the signal obtained from the at least one sensor in an instruction (e.g., algorithm) that is used to configure one or more parameters and/or apparatuses relating to the 3D printing process. The parameters may comprise a characteristic of the energy beam. The parameters may comprise movement of the platform and/or material bed. The parameters may comprise relative movement of the energy beam and the material bed. In some instances, the energy beam, the platform (e.g., material bed disposed on the platform), or both may translate. Alternatively, or additionally, the controller may use historical data for the control. Alternatively, or additionally, the processing unit may use historical data in its one or more instructions (e.g., algorithms). The parameters may comprise the height of the layer of powder material disposed in the enclosure and/or the gap by which the cooling element (e.g., heat sink) is separated from the target surface. The target surface may be the exposed layer of the material bed.

In some embodiments, aspects of the systems, apparatuses, and/or methods provided herein, such as the computer system, are embodied in programming (e.g., using a software). Various aspects of the technology may be thought of as "product," "object," or "articles of manufacture" typically in the form of machine (or processor) executable code and/or associated data that is carried on or embodied in a type of machine-readable medium. Machine-executable code can be stored on an electronic storage unit, such memory (e.g., read-only memory, random-access memory, flash memory) or a hard disk. The storage may comprise non-volatile storage media. "Storage" type media can include any or all of the tangible memory of the computers, processors or the like, or associated modules thereof, such as various semiconductor memories, tape drives, disk drives, external drives, and the like, which may provide non-transitory storage at any time for the software programming.

In some embodiments, the memory comprises a random-access memory (RAM), dynamic random-access memory (DRAM), static random access memory (SRAM), synchronous dynamic random access memory (SDRAM), ferroelectric random access memory (FRAM), read only memory (ROM), programmable read only memory (PROM), erasable programmable read only memory (EPROM), electrically erasable programmable read only memory (EEPROM), a flash memory, or any combination thereof. The flash memory may comprise a negative-AND (NAND) or NOR logic gates. A NAND gate (negative-AND) may be a logic gate which produces an output which is false only if all its inputs are true. The output of the NAND gate may be complemented to that of the AND gate. The storage may include a hard disk (e.g., a magnetic disk, an optical disk, a magneto-optic disk, a solid-state disk, etc.), a compact disc (CD), a digital versatile disc (DVD), a floppy disk, a cartridge, a magnetic tape, and/or another type of computer-readable medium, along with a corresponding drive.

In some embodiments, all or portions of the software are communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical, and electromagnetic waves, such as used across physical interfaces between local devices, through wired and optical landline networks and over various air-links. The physical elements that carry such waves, such as wired or wireless links, optical links, or the like, also may be considered as media bearing the software. As used herein, unless restricted to non-transitory, tangible "storage" media, terms such as computer or machine "readable medium" refer to any medium that participates in providing instructions to a processor for execution.

Hence, a machine-readable medium, such as computer-executable code, may take many forms, including but not limited to, a tangible storage medium, a carrier wave medium, or physical transmission medium. Non-volatile storage media include, for example, optical or magnetic disks, such as any of the storage devices in any computer(s) or the like, such as may be used to implement the databases. Volatile storage media can include dynamic memory, such as main memory of such a computer platform. Tangible transmission media can include coaxial cables, wire (e.g., copper wire), and/or fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, any other medium from which a computer may read programming code and/or data, or any combination thereof. The memory and/or storage may comprise a storing device external to and/or removable from device, such as a Universal Serial Bus (USB) memory stick, or/and a hard disk. Many of these forms of computer readable media may be involved in carrying one or more sequences of one or more instructions to a processor for execution.

In some embodiments, the computer system includes or is in communication with an electronic display that comprises a user interface (UI) for providing, for example, a model design or graphical representation of a 3D object to be printed. Examples of UI's include, without limitation, a graphical user interface (GUI) and web-based user interface. The computer system can monitor and/or control various aspects of the 3D printing system. The control may be manual and/or programmed. The control may rely on feedback mechanisms (e.g., from the one or more sensors). The control may rely on historical data. The feedback mechanism may be pre-programmed. The feedback mechanisms may rely on input from sensors (described herein) that are connected to the control unit (i.e., control system or control mechanism e.g., computer) and/or processing unit. The computer system may store historical data concerning various aspects of the operation of the 3D printing system. The historical data may be retrieved at predetermined times and/or at a whim. The historical data may be accessed by an operator and/or by a user. The historical, sensor, and/or operative data may be provided in an output unit such as a display unit. The output unit (e.g., monitor) may output various parameters of the 3D printing system (as described herein) in real time or in a delayed time. The output unit may output the current 3D printed object, the ordered 3D printed object, or both. The output unit may output the printing progress of the 3D printed object. The output unit may output at least one of the total time, time remaining, and time expanded on printing the 3D object. The output unit may output (e.g., display, voice, and/or print) the status of sensors, their reading, and/or time for their calibration or maintenance. The output unit may output the type of material(s) used and various characteristics of the material(s) such as temperature and flowability of the pre-transformed material. The output unit may output the amount of oxygen, water, and pressure in the printing chamber (i.e., the chamber where the 3D object is being printed). The computer may generate a report comprising various parameters of the 3D printing system, method, and or objects at predetermined time(s), on a request (e.g., from an operator), and/or at a whim. The output unit may comprise a screen, printer, or speaker. The control system may provide a report. The report may comprise any items recited as optionally output by the output unit.

In some embodiments, the system and/or apparatus described herein (e.g., controller) and/or any of their components comprise an output and/or an input device. The input device may comprise a keyboard, touch pad, or microphone. The output device may be a sensory output device. The output device may include a visual, tactile, or audio device. The audio device may include a loudspeaker. The visual output device may include a screen and/or a printed hard copy (e.g., paper). The output device may include a printer. The input device may include a camera, a microphone, a keyboard, or a touch screen.

In some embodiments, the computer system includes, or is in communication with, an electronic display unit that comprises a user interface (UI) for providing, for example, a model design or graphical representation of an object to be printed. Examples of UI's include a graphical user interface (GUI) and web-based user interface. The historical and/or operative data may be displayed on a display unit. The computer system may store historical data concerning various aspects of the operation of the cleaning system. The historical data may be retrieved at predetermined times and/or at a whim. The historical data may be accessed by an operator and/or by a user. The display unit (e.g., monitor) may display various parameters of the printing system (as described herein) in real time or in a delayed time. The display unit may display the requested printed 3D object (e.g., according to a model), the printed 3D object, real time display of the 3D object as it is being printed, or any combination thereof. The display unit may display the cleaning progress of the object, or various aspects thereof. The display unit may display at least one of the total time, time remaining, and time expanded on the cleaned object during the cleaning process. The display unit may display the status of sensors, their reading, and/or time for their calibration or maintenance. The display unit may display the type or types of material used and various characteristics of the material or materials such as temperature and flowability of the pre-transformed material. The display unit may display the amount of a certain gas in the chamber. The gas may comprise oxygen, hydrogen, water vapor, or any of the gasses mentioned herein. The display unit may display the pressure in the chamber. The computer may generate a report comprising various parameters of the methods, objects, apparatuses, or systems described herein. The report may be generated at predetermined time(s), on a request (e.g., from an operator) or at a whim.

Methods, apparatuses, and/or systems of the present disclosure can be implemented by way of one or more instruction (e.g., algorithms). An instruction (e.g., algorithm) can be implemented by way of software upon execution by one or more computer processors. For example, the processor can be programmed to calculate the path of the energy beam and/or the power per unit area emitted by the energy source (e.g., that should be provided to the material bed in order to achieve the requested result). Examples of controller(s), associated methods, software, systems, devices, and apparatuses, can be found in U.S. patent application Ser. No. 16/245,183 filed Jan. 10, 2019, which is incorporated herein by reference in its entirety.

Figure 6:
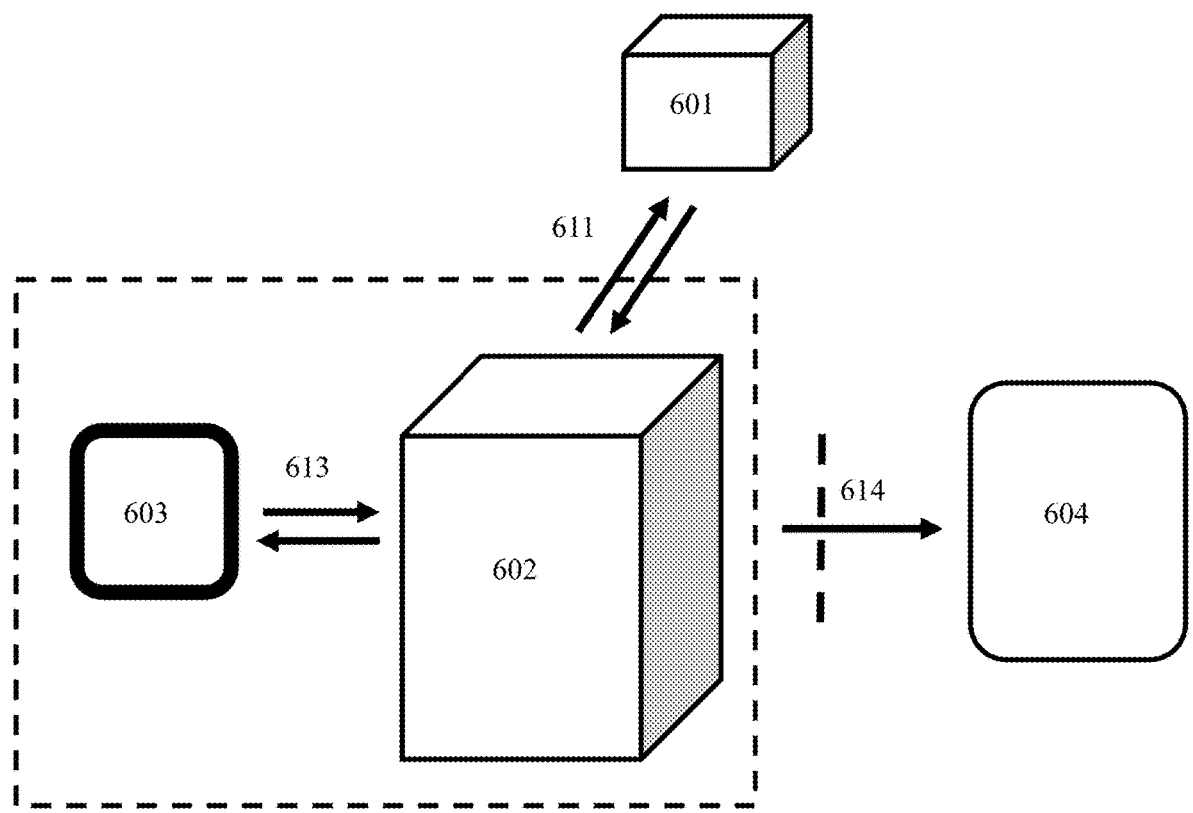
FIG. 6 schematically illustrates a processor and 3D printer architecture that facilitates the formation of one or more 3D objects.

In some embodiments, the 3D printer comprises and/or communicates with a multiplicity of processors. The processors may form a network architecture. Examples of a processor architectures is shown in FIG. 6. FIG. 6 shows an example of a 3D printer 602 comprising a processor that is in communication with a local processor (e.g., desktop) 601, a remote processor 604, and a machine interface 603. The 3D printer interface is termed herein as "machine interface." The communication of the 3D printer processor with the remote processor and/or machine interface may or may not be through a server. The server may be integrated within the 3D printer. The machine interface may be integrated with, or closely situated adjacent to, the 3D printer 602. Arrows 611 and 613 designate local communications. Arrow 614 designates communicating through a firewall (shown as a discontinuous line). A machine interface may communicate directly or indirectly with the 3D printer processor. A 3D printing processor may comprise a plurality of machine interfaces. Any of the machine interfaces may be optionally included in the 3D printing system. The communication between the 3D printer processor and the machine interface processor may be unidirectional (e.g., from the machine interface processor to the 3D printer processor), or bidirectional. The arrows in FIG. 8 illustration the directionality of the communication (e.g., flow of information direction) between the processors. The 3D printer processor may be connected directly or indirectly to one or more stationary processors (e.g., desktop). The 3D printer processor may be connected directly or indirectly to one or more mobile processors (e.g., mobile device). The 3D printer processor may be connected directly or indirectly (e.g., through a server) to processors that direct 3D printing instructions. The connection may be local (e.g., in 601) or remote (e.g., in 604). The 3D printer processor may communicate with at least one 3D printing monitoring processor. The 3D printing processor may be owned by the entity supplying the printing instruction to the 3D printer, or by a client. The client may be an entity or person that desires at least one 3D printing object.

In some embodiments, the 3D printer comprises at least one processor (referred herein as the "3D printer processor"). The 3D printer may comprise a plurality of processors. At least two of the plurality of the 3D printer processors may interact with each other. At times, at least two of the plurality of the 3D printer processors may not interact with each other. Discontinuous line 614 illustrates a firewall.

A 3D printer processor may interact with at least one processor that acts as a 3D printer interface (also referred to herein as "machine interface processor"). The processor (e.g., machine interface processor) may be stationary or mobile. The processor may be on a remote computer system. The machine interface one or more processors may be connected to at least one 3D printer processor. The connection may be through a wire (e.g., cable) or be wireless (e.g., via Bluetooth technology). The machine interface may be hardwired to the 3D printer. The machine interface may directly connect to the 3D printer (e.g., to the 3D printer processor). The machine interface may indirectly connect to the 3D printer (e.g., through a server, or through wireless communication). The cable may comprise coaxial cable, shielded twisted cable pair, unshielded twisted cable pair, structured cable (e.g., used in structured cabling), or fiber-optic cable.

At times, the machine interface processor directs 3D print job production, 3D printer management, 3D printer monitoring, or any combination thereof. The machine interface processor may not be able to influence (e.g., direct, or be involved in) pre-print or 3D printing process development. The machine management may comprise controlling the 3D printer controller (e.g., directly or indirectly). The printer controller may direct starting a 3D printing process, stopping a 3D printing process, maintenance of the 3D printer, clearing alarms (e.g., concerning safety features of the 3D printer).

At times, the machine interface processor allows monitoring of the 3D printing process (e.g., accessible remotely or locally). The machine interface processor may allow viewing a log of the 3D printing and status of the 3D printer at a certain time (e.g., 3D printer snapshot). The machine interface processor may allow to monitor one or more 3D printing parameters. The one or more printing parameters monitored by the machine interface processor can comprise 3D printer status (e.g., 3D printer is idle, preparing to 3D print, 3D printing, maintenance, fault, or offline), active 3D printing (e.g., including a build module number), status and/or position of build module(s), status of build module and processing chamber engagement, type and status of pre-transformed material used in the 3D printing (e.g., amount of pre-transformed material remaining in the reservoir), status of a filter, atmosphere status (e.g., pressure, gas level(s)), ventilator status, layer dispensing mechanism (layer forming device) status (e.g., position, speed, rate of deposition, level of exposed layer of the material bed), status of the optical system (e.g., optical window, mirror), status of scanner, alarm (boot log, status change, safety events, motion control commands (e.g., of the energy beam, or of the layer dispensing mechanism), or printed 3D object status (e.g., what layer number is being printed), At times, the machine interface processor allows monitoring the 3D print job management. The 3D print job management may comprise status of each build module (e.g., atmosphere condition, position in the enclosure, position in a queue to go in the enclosure, position in a queue to engage with the processing chamber, position in queue for further processing, power levels of the energy beam, type of pre-transformed material loaded, 3D printing operation diagnostics, status of a filter. The machine interface processor (e.g., output device thereof) may allow viewing and/or editing any of the job management and/or one or more printing parameters. The machine interface processor may show the permission level given to the user (e.g., view, or edit). The machine interface processor may allow viewing and/or assigning a certain 3D object to a particular build module, prioritize 3D objects to be printed, pause 3D objects during 3D printing, delete 3D objects to be printed, select a certain 3D printer for a particular 3D printing job, insert and/or edit considerations for restarting a 3D printing job that was removed from 3D printer. The machine interface processor may allow initiating, pausing, and/or stopping a 3D printing job. The machine interface processor may output message notification (e.g., alarm), log (e.g., other than Excursion log or other default log), or any combination thereof. The 3D printer may interact with at least one server (e.g., print server). The 3D print server may be separate or interrelated in the 3D printer.

At times, one or more users may interact with the one or more 3D printing processors through one or more user processors (e.g., respectively). The interaction may be in parallel and/or sequentially. The users may be clients. The users may belong to entities that desire a 3D object to be printed, or entities who prepare the 3D object printing instructions. The one or more users may interact with the 3D printer (e.g., through the one or more processors of the 3D printer) directly and/or indirectly. Indirect interaction may be through the server. One or more users may be able to monitor one or more aspects of the 3D printing process. One or more users can monitor aspects of the 3D printing process through at least one connection (e.g., network connection). For example, one or more users can monitor aspects of the printing process through direct or indirect connection. Direct connection may be using a local area network (LAN), and/or a wide area network (WAN). The network may interconnect computers within a limited area (e.g., a building, campus, neighborhood). The limited area network may comprise Ethernet or Wi-Fi. The network may have its network equipment and interconnects locally managed. The network may cover a larger geographic distance than the limited area. The network may use telecommunication circuits and/or internet links. The network may comprise Internet Area Network (IAN), and/or the public switched telephone network (PSTN). The communication may comprise web communication. The aspect of the 3D printing process may comprise a 3D printing parameter, machine status, or sensor status. The 3D printing parameter may comprise hatch strategy, energy beam power, energy beam speed, energy beam focus, thickness of a layer (e.g., of hardened material or of pre-transformed material).

At times, a user may develop at least one 3D printing instruction and direct the 3D printer (e.g., through communication with the 3D printer processor) to print in a requested manner according to the developed at least one 3D printing instruction. A user may or may not be able to control (e.g., locally or remotely) the 3D printer controller. For example, a client may not be able to control the 3D printing controller (e.g., maintenance of the 3D printer).

At times, the user (e.g., other than a client) processor may use real-time and/or historical 3D printing data. The 3D printing data may comprise metrology data, or temperature data. The user processor may comprise quality control. The quality control may use a statistical method (e.g., statistical process control (SPC)). The user processor may log excursion log, report when a signal deviates from the nominal level, or any combination thereof. The user processor may generate a configurable response. The configurable response may comprise a print/pause/stop command (e.g., automatically) to the 3D printer (e.g., to the 3D printing processor). The configurable response may be based on a user defined parameter, threshold, or any combination thereof. The configurable response may result in a user defined action. The user processor may control the 3D printing process and ensure that it operates at its full potential. For example, at its full potential, the 3D printing process may make a maximum number of 3D object with a minimum of waste and/or 3D printer down time. The SPC may comprise a control chart, design of experiments, and/or focus on continuous improvement.

The fundamental length scale (e.g., the diameter, spherical equivalent diameter, diameter of a bounding circle, or largest of height, width and length; abbreviated herein as "FLS") of the printed 3D object or a portion thereof can be at least about 50 micrometers ($\mu$m), 80 $\mu$m, 100 $\mu$m, 120 $\mu$m, 150 $\mu$m, 170 $\mu$m, 200 $\mu$m, 230 $\mu$m, 250 $\mu$m, 270 $\mu$m, 300 $\mu$m, 400 $\mu$m, 500 $\mu$m, 600 $\mu$m, 700 $\mu$m, 800 $\mu$m, 1 mm, 1.5 mm, 2 mm, 3 mm, 5 mm, 1 cm, 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, or 100 m. The FLS of the printed 3D object or a portion thereof can be at most about 150 $\mu$m, 170 $\mu$m, 200 $\mu$m, 230 $\mu$m, 250 $\mu$m, 270 $\mu$m, 300 $\mu$m, 400 $\mu$m, 500 $\mu$m, 600 $\mu$m, 700 $\mu$m, 800 $\mu$m, 1 mm, 1.5 mm, 2 mm, 3 mm, 5 mm, 1 cm, 1.5 cm, 2 cm, 10 cm, 20 cm, 30 cm, 40 cm, 50 cm, 60 cm, 70 cm, 80 cm, 90 cm, 1 m, 2 m, 3 m, 4 m, 5 m, 10 m, 50 m, 80 m, 100 m, 500 m, or 1000 m. The FLS of the printed 3D object or a portion thereof can any value between the afore-mentioned values (e.g., from about 50 $\mu$m to about 1000 $\mu$m, from about 500 $\mu$m to about 100 $\mu$m, from about 50 $\mu$m to about 50 cm, or from about 50 cm to about 1000 $\mu$m). In some cases, the FLS of the printed 3D object or a portion thereof may be in between any of the afore-mentioned FLS values. The portion of the 3D object may be a heated portion or disposed portion (e.g., tile).

At times, the layer of pre-transformed material (e.g., powder) is of a predetermined height (thickness). The layer of pre-transformed material can comprise the material prior to its transformation in the 3D printing process. The layer of pre-transformed material may have an upper surface that is substantially flat, leveled, or smooth. In some instances, the layer of pre-transformed material may have an upper surface that is not flat, leveled, or smooth. The layer of pre-transformed material may have an upper surface that is corrugated or uneven. The layer of pre-transformed material may have an average or mean (e.g., pre-determined) height. The height of the layer of pre-transformed material (e.g., powder) may be at least about 5 micrometers ($\mu$m), 10 $\mu$m, 20 $\mu$m, 30 $\mu$m, 40 $\mu$m, 50 $\mu$m, 60 $\mu$m, 70 $\mu$m, 80 $\mu$m, 90 $\mu$m, 100 $\mu$m, 200 $\mu$m, 300 $\mu$m, 400 $\mu$m, 500 $\mu$m, 600 $\mu$m, 700 $\mu$m, 800 $\mu$m, 900 $\mu$m, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, or 1000 mm. The height of the layer of pre-transformed material may be at most about 5 micrometers (μm), 10 μm, 20 μm, 30 μm, 40 μm, 50 μm, 60 μm, 70 μm, 80 μm, 90 μm, 100 μm, 200 μm, 300 μm, 400 μm, 500 μm, 600 μm, 700 μm, 800 μm, 900 μm, 1 mm, 2 mm, 3 mm, 4 mm, 5 mm, 6 mm, 7 mm, 8 mm, 9 mm, 10 mm, 20 mm, 30 mm, 40 mm, 50 mm, 60 mm, 70 mm, 80 mm, 90 mm, 100 mm, 200 mm, 300 mm, 400 mm, 500 mm, 600 mm, 700 mm, 800 mm, 900 mm, or 1000 mm. The height of the layer of pre-transformed material may be any number between the afore-mentioned heights (e.g., from about 5 μm to about 1000 mm, from about 5 μm to about 1 mm, from about 25 μm to about 1 mm, or from about 1 mm to about 1000 mm). The "height" of the layer of material (e.g., powder) may at times be referred to as the "thickness" of the layer of material. In some instances, the layer of hardened material may be a sheet of metal. The layer of hardened material may be fabricated using a 3D manufacturing methodology. Occasionally, the first layer of hardened material may be thicker than a subsequent layer of hardened material. The first layer of hardened material may be at least about 1.1 times, 1.2 times, 1.4 times, 1.6 times, 1.8 times, 2 times, 4 times, 6 times, 8 times, 10 times, 20 times, 30 times, 50 times, 100 times, 500 times, 1000 times, or thicker (higher) than the average (or mean) thickness of a subsequent layer of hardened material, the average thickens of an average subsequent layer of hardened material, or the average thickness of any of the subsequent layers of hardened material.

In some instances, one or more intervening layers separate adjacent components from one another. For example, the one or more intervening layers can have a thickness of at most about 10 micrometers ("microns"), 1 micron, 500 nanometers ("n"), 100 nm, 50 nm, 10 nm, or 1 nm. For example, the one or more intervening layers can have a thickness of at least about 10 micrometers ("microns"), 1 micron, 500 nanometers ("nm"), 100 nm, 50 nm, 10 nm, or 1 nm. In an example, a first layer is adjacent to a second layer when the first layer is in direct contact with the second layer. In another example, a first layer is adjacent to a second layer when the first layer is separated from the second layer by a third layer. In some instances, adjacent to may be 'above' or 'below.' Below can be in the direction of the gravitational force or towards the platform. Above can be in the direction opposite to the gravitational force or away from the platform.

As described herein, in some embodiments, the printing system can include a material dispenser having one or more material (e.g., powder) removal mechanisms (e.g., FIG. 1, 118). The material removal mechanism can be used to level (e.g., planarize) an exposed surface of the material bed (e.g., powder bed). In some embodiments, the material removal mechanism does not contact the exposed surface of the material bed. In some embodiments, the material removal mechanism moves with respect to the material bed in accordance with a material dispenser and/or a leveling mechanism. In some embodiments, the material removal mechanism is part of a unit that includes the material dispenser and/or the leveling mechanism. The unit may be a layer dispenser. In some embodiments, the material removal mechanism moves independently with respect to the material dispenser and/or the leveling mechanism. Material dispensing mechanisms, leveling mechanisms, and material removal mechanisms are described in Patent Application serial number PCT/US15/36802 filed on Jun. 19, 2015, titled "APPARATUSES, SYSTEMS AND METHODS FOR THREE-DIMENSIONAL PRINTING"; in Provisional Patent Application Ser. No. 62/317,070 filed Apr. 1, 2016, titled "APPARATUSES, SYSTEMS AND METHODS FOR EFFICIENT THREE-DIMENSIONAL PRINTING"; in Patent Application serial number PCT/US16/66000 filed on Dec. 9, 2016, titled "SKILLFUL THREE-DIMENSIONAL PRINTING"; or in Provisional Patent Application Ser. No. 62/265,817, filed Dec. 10, 2015, titled "APPARATUSES, SYSTEMS AND METHODS FOR EFFICIENT THREE-DIMENSIONAL PRINTING"; each of which is incorporated herein in its entirety.

Figure 28:
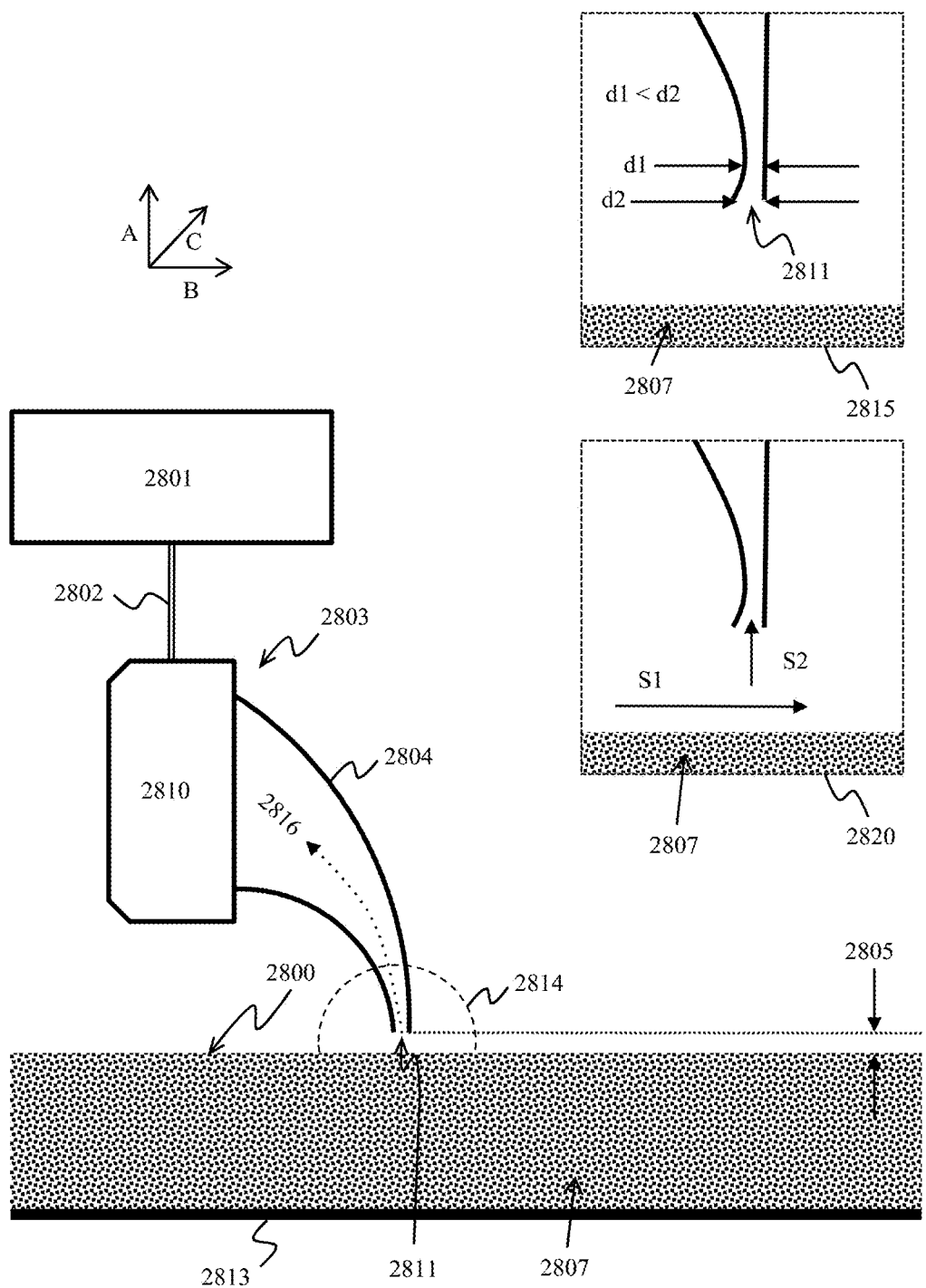
FIG. 28 schematically illustrates a component of a 3D printing system.

FIG. 28 shows an example material removal mechanism 2803. The material removal mechanism can include one or more openings (e.g., 2811) (also referred to as a material entrance opening) that can accept at least a portion of the material (e.g., pre-transformed material (e.g., powder)) from a material bed (e.g., 2807) therethrough. The removed material may comprise a pre-transformed material (e.g., powder) and/or debris generated during the printing. The pre-transformed material may be a material that, as understood herein, is a material that did not become transformed during a transformation operation in a printing process (e.g., using one or more energy beams). The material removal mechanism can be used to reduce a thickness of a dispensed layer of material (e.g., as part of a leveling process). The material removal mechanism can be operationally coupled to a recycling system such that the removed material can be recycled in one or more subsequent transforming operations (e.g., subsequently formed layers of the 3D object). The one or more material entrance openings may be included within a nozzle (e.g., 2804). The one or more material entrance openings can be adjustable (e.g., regulated by one or more controllers), e.g., before, after, and/or during the printing. The height of the material entrance opening(s) relative to an exposed surface (e.g., 2800) of the material bed may be adjustable (e.g., regulated by one or more controllers), e.g., before, after, and/or during the printing. Any of the adjustments disclosed herein may be controlled (e.g., manually and/or automatically, e.g., using a controller). The material removal mechanism can be operationally coupled to an attractive force source (e.g., 2801), which can provide an attractive force (e.g., 2816) (also referred to as a removal, pulling, or extractive force) that attracts at least a portion of the material toward the material removal mechanism (e.g., towards the reservoir). In some embodiments, the attractive force source includes one or more vacuum pumps that provides a vacuum force. In some embodiments, the attractive force source includes one or more magnets (e.g., permanent magnet, electromagnet) that provides a magnetic force (e.g., magnetic field) (e.g., if the pre-transformed material and/or debris is at least partially magnetically attractable). The attractive force can correspond to a suction force (also referred to as vacuum or sucking force), for example, if the attractive force source includes a vacuum source. The attractive force can correspond to a magnetic field (also referred to as magnetic field force or magnetic force), for example, if the attractive force source includes a magnet. The attractive force may be an electrostatic force. The attractive field may be an electrostatic field. In some embodiments, the material (e.g., pre-transformed material or debris) is attracted to the one or more openings, e.g., in an (e.g., substantially) unilateral (e.g., vertical) flow direction. The attractive flow may comprise a vertical component. The attractive flow may attract a gas. The nozzle can be a Venturi nozzle. The material removal mechanism can be coupled to the attractive force source via one or more channels (e.g., 2802) (e.g., tube and/or wire). Material (e.g., from material bed 2807) that enters the opening of the nozzle (e.g., along arrow 2804) can at least temporarily accumulate (e.g., be temporarily retained) within a reservoir (e.g., 2810). At least one portion of the nozzle may be adjustable. In some embodiments, at least one part of the nozzle is adjustable at a vertical, horizontal, or angular direction (e.g., with respect to the exposed surface of the material bed, and/or the platform (e.g., 2813)). The material removal mechanism may be translatable in vertical (e.g., A), horizontal (e.g., B), and/or at an angular (e.g., C) directions with respect to the platform or the exposed surface of the material bed.

The FLS (e.g., cross section, or diameter) of the opening (e.g., one or more openings, e.g., 2811) of the material removal mechanism (e.g., nozzle opening diameter) may be at least about 0.1 mm, 0.4 mm, 0.7 mm, 0.9 mm, 1.1 mm, 1.3 mm, 1.5 mm, 2 mm, 2.5 mm, 3 mm, 3.5 mm, 5 mm, 7 mm, or 10 mm. The FLS of the opening (e.g., one or more openings) of the material removal mechanism (e.g., nozzle diameter) may be at most about 0.1 mm, 0.4 mm, 0.7 mm, 0.9 mm, 1.1 mm, 1.3 mm, 1.5 mm, 2 mm, 2.5 mm, 3 mm, 3.5 mm, 5 mm, 7 mm, or 10 mm. The FLS of the opening (e.g., one or more openings) of the material removal mechanism (e.g., nozzle opening diameter) may be of any value between the afore-mentioned values (e.g., from about 0.1 mm to about 7 mm, from about 0.1 mm to about 0.6 mm, from about 0.6 mm to about 0.9 mm, from about 0.9 mm to about 3 mm, or from about 3 mm to about 10 mm). In some embodiments, the FLS of the opening (e.g., one or more openings) of the nozzle may be changeable (e.g., before, after, and/or during a dispensing and/or printing operation).

The nozzle can have a converging cross-section that tapers toward the opening of the nozzle. The opening of the nozzle may comprise a narrow region (e.g., a "bottle neck"). The opening can be positioned in an entrance portion (e.g., 2814) of the nozzle. In some cases, the narrow region has an opening diameter that (e.g., continuously) tends towards convergence at the opening. The narrowest portion of the opening can be at the opening. For example, the narrow region can have a larger FLS at the opening relative to an upper portion of the nozzle. In some cases, the narrow region (e.g., continuously) diverges at the opening. The narrowest portion of the opening can be away from the opening. For instance, first inset view 2815 shows an example entrance portion of a nozzle having a larger diameter "d2" near the opening 2811 compared to a diameter "d1" that is further away from the opening 2811 (e.g., towards reservoir 2810). The FLS of the narrow region may be constant or variable. The FLS of the narrow region may be varied mechanically, electronically, thermally, hydraulically, magnetically, or any combination thereof.

The shape of the nozzle may be symmetric or asymmetric. The nozzle can have a funnel shape. The nozzle can have a crooked shape. The bent shape may follow a function. The function may be exponential or logarithmic. The function may be a portion of a circle or a parabola. The bent shape can roughly resemble the letter "L" or "J." The bent shape can be a smoothly bent shape. The bent shape can be a curved shape. A vertical and/or horizontal cross section of the nozzle may be asymmetric. For example, a vertical cross section of the nozzle interior may reveal its asymmetry. The asymmetry can be in the materials from which the nozzle is composed. The asymmetry can be manifested by a lack of at least one symmetry axis. For example, a lack of n fold rotational axis (e.g., lack of $C_n$ symmetry axis, wherein n equals at least 2, 3, or 4). For example, a lack of at least one symmetry plane. For example, a lack of inversion symmetry. In some embodiments, the nozzle comprises a symmetry plane, but lack rotational symmetry. In some embodiments, the nozzle lacks both a rotational symmetry axis, and a symmetry plane. The axis of symmetry may be substantially perpendicular to the average surface of the exposed surface of the material bed, to the platform, or to a plane normal to the direction of the gravitational force. The axis of symmetry may be at an angle between 0 degrees (°) and 90° relative to the average surface of the exposed surface of the material bed, to the platform, to a plane normal to the direction of the gravitational force, to any combination thereof. The nozzle may be configured to direct laminar or chaotic (e.g., comprising turbulent) flow during its operation (e.g., suction). The magnitude of laminar flow between two sides of the nozzle (e.g., two vertical sides of the nozzle) can be the same or different. The magnitude of laminar flow between two sides of the asymmetric nozzle (e.g., the two asymmetric vertical sides of the nozzle) can be the same or different. The gas flow within the nozzle (e.g., during its operation) may comprise laminar flow. The gas flow within the nozzle (e.g., during its operation) may comprise a chaotic flow (e.g., comprising turbulence). The gas flow between the exposed surface and the nozzle entrance (e.g., during its operation) may comprise laminar flow. The gas flow between the exposed surface and the nozzle entrance (e.g., during its operation) may comprise a chaotic flow (e.g., comprising turbulence). The chaotic flow may be a requested chaotic flow. The chaotic flow may facilitate mixing of at least a portion of the material bed. The at least a portion may comprise the exposed surface of the material bed. The mixing may facilitate removal of debris from the exposed surface of the material bed and/or from the at least the portion of the material bed. The flow rate of the gas within the nozzle (e.g., suction power) may depend on the size and/or mass of the particulate material (e.g., particles forming the material bed). The chaotic flow can comprise circular, swirling, agitated, rough, irregular, disordered, disorganized, cyclonic, spiraling, vortex, or agitated flow (e.g., trajectory of flow).

The flow of material into the material removal mechanism (e.g., nozzle) can vary depending on, for example, a requested flow speed (velocity) at the opening and/or a flow dynamic (e.g., turbulent, laminar) at the exposed surface (e.g., 2800) of the material bed near the entrance portion (e.g., 2814) of the nozzle. In some embodiments, the flow speed at the opening is at least 30 meter per second (m/sec), 40 m/sec, 50 m/sec, 60 m/sec, 70 m/sec, 80 m/sec, 90 m/sec, 100 m/sec, 200 m/sec, 300 m/sec, 400 m/sec, 500 m/sec, 600 m/sec, or 700 m/sec. The flow speed at the opening may be any speed between the afore-mentioned speed values (e.g., from about 30 m/sec to about 700 m/sec, from about 30 m/sec to about 60 m/sec, from about 60 m/sec to about 500 m/sec, from about 60 m/sec to about 100 m/sec, or from about 100 m/sec to about 700 m/sec).

The flow of gas and/or material (e.g., particles) at or near the entrance portion of the nozzle can have a vertical flow component (e.g., in (e.g., substantially) the A direction) and a horizontal flow component (e.g., in (e.g., substantially) the B direction). In some embodiments, the flow of gas and/or material into the nozzle may create an area of low pressure, which may in turn generate the vertical force component which can result in the horizontal force component acting on the material (e.g., at the exposed surface of the material bed). Due to the operation of the nozzle, the material in the material bed (e.g., exposed surface thereof) may be subject to the Bernoulli principle. In FIG. 28, a second inset view 2820 shows an example entrance portion of a nozzle showing a vertical flow component S2 and a horizontal flow component S1. In some embodiments, the speed (velocity) of the vertical flow component is greater than the speed (velocity) of the horizontal flow component. In some embodiments, the speed of the vertical flow component may be greater by at least about 1.5*, 2*, 2.5*, 3*, 4*, 5*, 6*, or 10* (i.e., times) the speed of the horizontal flow component. The speed of the vertical flow component may any value between the afore-mentioned values (e.g., from about 1.5* to about 10*, from about 1.5* to about 2.5*, from about 2.5* to about 5*, or from about 5* to about 10* (wherein the symbol "*" designates the mathematical operation "times") the speed of the horizontal flow component. In some embodiments, the speed (velocity) of the vertical flow component is less than the speed (velocity) of the horizontal flow component. The vertical flow component may manifest as (e.g., create) a (e.g., substantially) laminar flow into the opening of the nozzle. The vertical and horizontal flow components may manifest as (e.g., create) a non-laminar flow into the opening of the nozzle. The vertical and/or horizontal flow components may manifest as (e.g., create) a chaotic flow, e.g., over the exposed surface (e.g., 2800) of the material bed and/or within at least a portion of the material bed that comprises the exposed surface, e.g., in an area proximate to the entrance portion of the nozzle. In some embodiments, the horizontal flow component may manifest as (e.g., create) a (e.g., substantially) laminar flow over the exposed surface (e.g., 2800) of the material bed proximate to the entrance portion of the nozzle. The chaotic flow or laminar flow may depend, e.g., on the shape of the nozzle, on the gap distance from the nozzle to the exposed surface, and/or on the power of the attractive force source. In some embodiments, the nozzle is configured to generate a chaotic flow (e.g., comprising turbulence). In some embodiments, the nozzle is configured to generate a laminar flow.

In some embodiments, the material removal mechanism (e.g., nozzle) is positioned a distance (e.g., FIG. 28, 2805) (also referred to as a gap or space) above a target surface (e.g., exposed surface of the material bed). The distance can vary depending on any of a number of factors. For example, the distance may depend on the flow speed (e.g., vertical and/or horizontal flow components) at the opening and/or the flow dynamics, as described herein. The distance may depend on a size (e.g., volume or cross sectional FLS such as a diameter) of the opening (e.g., 2811). The FLS may refer to a horizontal cross section of the opening. The distance (e.g., 2805) may be changeable (e.g., before, after, and/or during a dispensing and/or printing operation). For example, the change may occur during the operation of the material removal mechanism. For example, the change may occur before the initiation of a dispensing and/or printing operation. For example, the change may occur before, during and/or after the formation of the 3D object. In some embodiment, the distance from the exposed surface of a target surface (e.g., material bed) to the opening of the nozzle is at least about 0.05 mm, 0.1 mm, 0.25 mm, 0.5 mm, 1 mm, 2 mm, 3 mm, 4 mm, 5 mm, 6 mm, 7 mm, 8 mm, 9 mm, or 10 mm. The vertical distance of the gap from the exposed surface of the powder bed may be at most about 0.05 mm, 0.1 mm, 0.25 mm, 0.5 mm, 1 mm, 2 mm, 3 mm, 4 mm, 5 mm, 6 mm, 7 mm, 8 mm, 9 mm, 10 mm, or 20 mm. The distance may be any value between the afore-mentioned values (e.g., from about 0.05 mm to about 20 mm, from about 0.05 mm to about 0.5 mm, from about 0.2 mm to about 3 mm, from about 0.1 mm to about 10 mm, or from about 3 mm to about 20 mm). The gap between the exposed surface of a target surface (e.g., material bed) and the opening of the nozzle may comprise a gas. The gas may be the atmospheric gas (e.g., (e.g., substantially) inert gas) used during a dispensing and/or printing operation.

Figure 29A:
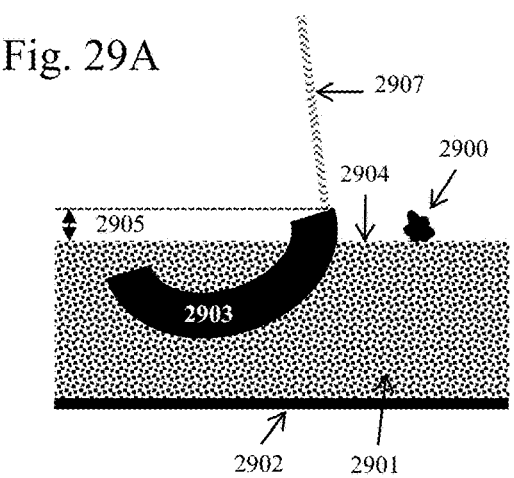
FIGS. 29A-29E schematically illustrate operations in forming a 3D object.

The material removal mechanism can be configured to create a flow of gas and/or material above a target surface (e.g., exposed surface of a material bed) that is sufficient to attract and/or reduce an amount of debris from the target surface. Sufficient to reduce an amount of debris may comprise sufficiently chaotic flow to reduce an amount of debris. The debris may comprise a hardened (e.g., transformed) or partially hardened (e.g., partially transformed) material. The debris may comprise (e.g., non-requested) spattered material resulting from the 3D printing. To illustrate, FIGS. 29A-29E show examples of various stages of a layering method described herein. FIG. 29A shows a material bed 2901 in which a 3D object 2903 is suspended in the material bed (e.g., comprising a pre-transformed material (e.g., powder)) between layering procedures of a 3D printing operation. One or more energy beams (e.g., 2907) can be used to transform at least a portion of the material bed (e.g., a layer (e.g., first layer) of pre-transformed material) to form at least a portion of the 3D object. The energy beam(s) can be directed to a target surface (e.g., surfaces of the pre-transformed material, exposed surface of the material bed, and/or a surface of the 3D object). Before and/or after the energy beam is applied, an exposed (e.g., top) surface (e.g., 2904) of the material bed can optionally be leveled (e.g., as shown in FIG. 29A, having a (e.g., substantially) planar surface 2904). Any suitable leveling technique can be used. In some embodiments, a leveling mechanism and/or a material removal mechanism is used, e.g., as described herein. In some cases, the leveling involves vibrating the material bed. In some cases, the exposed surface is not leveled. The energy beam(s) can impinge on the exposed surface of the material bed to transform a portion (e.g., a portion of a layer) of pre-transformed material to form a portion (e.g., corresponding layer) of transformed (e.g., hardened) material as part of the 3D object. Sometimes, the transformation process can cause debris (e.g., 2900) to form on and/or within the material bed and/or the 3D object. For example, an energy of the energy beam(s) may be sufficiently energetic to eject pre-transformed, transformed, and/or transforming material from the target surface and land (splatters) on surrounding regions of the material bed and/or 3D object. The target surface may be the exposed surface of the material bed (e.g., 2901) and/or 3D object (e.g., 2903). The debris can correspond to transformed (e.g., hardened) material, partially transformed (e.g., partially hardened) material, contaminants (e.g., soot), or any combination thereof. The debris can correspond to agglomerated, sintered and/or fused pre-transformed particles (e.g., powder). The debris particles can have any suitable shape and size. The debris particles can have regular and/or irregular (non-symmetric) shapes. For example, the debris particles can have globular (e.g., spherical or non-spherical) shapes. The debris particles can be smaller (e.g., have smaller FLS) than the 3D object. The debris may have a FLS that is smaller and/or larger than the average FLS of the pre-transformed material (e.g., in case of a particulate material). For example, the debris particles can be larger (e.g., have larger FLS) than the pre-transformed particles, as described herein. Larger can be by at least two times the FLS of the pre-transformed material particles. The debris particles can be smaller (e.g., have smaller cross-sections (e.g., diameters)) than a height of a layer (e.g., first layer) of pre-transformed material, as described herein. In some cases, the debris particles have an average FLS (e.g., cross-section widths (e.g., diameters) (e.g., median cross-section widths)) of at least about 50 µm, 80 µm, 100 µm, 110 µm, 120 µm, 130 µm, 140 µm, 150 µm, 200 µm, 250 µm, 300 µm, 400 µm, 500 µm, 800 µm, 1000 µm, or 2000 µm. The debris particles can have a FLS ranging between any of those listed above (e.g., from about 50 µm to about 2000 µm, from about 50 µm to about 250 µm, or from about 250 µm to about 2000 µm). Sometimes, the debris interferes with subsequent formation of the 3D object. For example, the debris may cause defects (e.g., voids, inconsistencies, and/or surface roughness) in a subsequently formed portion (e.g., subsequent layer(s)) of the 3D object. In some embodiments, a portion of the 3D object protrudes from the exposed surface of the material bed by a distance 2905. The material bed shown in FIG. 29A is disposed on a platform 2902.

Figure 29B:
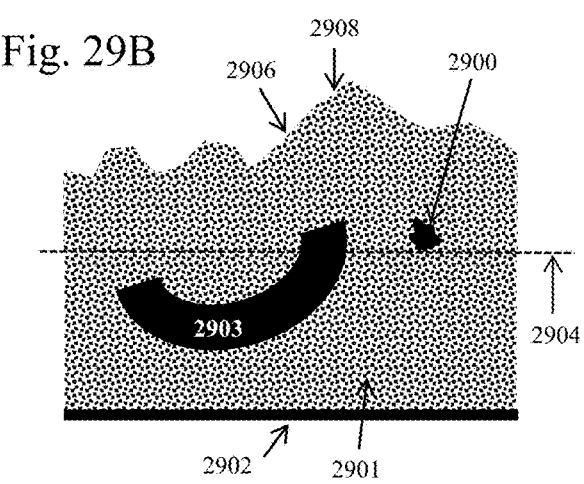
Figure 29C:
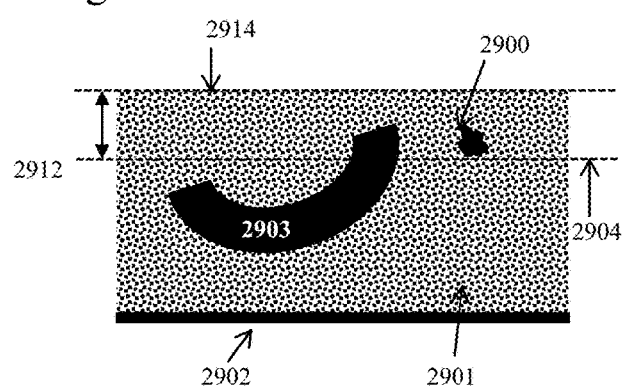

FIG. 29B shows an example of a succeeding operation where a layer 2906 (also referred to as an additional layer, new layer or a second layer) is deposited in the material bed (e.g., above the plane 2904 corresponding to the previous exposed surface of the material bed). Any suitable material deposition process can be used. In some embodiments, a material dispensing mechanism (e.g., material dispenser), as described herein, is used. The material dispensing mechanism can utilize gravitational force and/or gas flow (e.g., airflow) that also displaces (e.g., partially levels) the newly added material. The additional layer can be deposited over at least a portion of the 3D object and/or the debris. In some embodiments, the additional layer does not have a leveled top surface (e.g., 2908). FIG. 29C shows the additional layer after a succeeding optional leveling (planarization) operation. Any suitable material deposition process can be used. In some embodiments, a layer leveling mechanism (e.g., leveler), as described herein, is used. In some embodiments, the leveling mechanism contacts (e.g., by shearing) the additional layer using, for example, an edge (e.g., sharp edge, knife). The leveling mechanism may comprise a roller. In some cases, the leveling mechanism includes (or is coupled to) a vibrating mechanism that vibrates the additional layer and/or the material bed. In some cases, the leveling mechanism may or may not displace excess material (e.g., powder) to a different position in the material bed. The leveling operation can form a (e.g., substantially) planar expose surface (e.g., 2914) of the additional layer (and the material bed). The leveling operation can reduce a thickness of the additional layer to a reduced thickness (e.g., 2912). The reduced thickness can vary depending, in part, on a requested final thickness of additional layer.

Figure 29D:
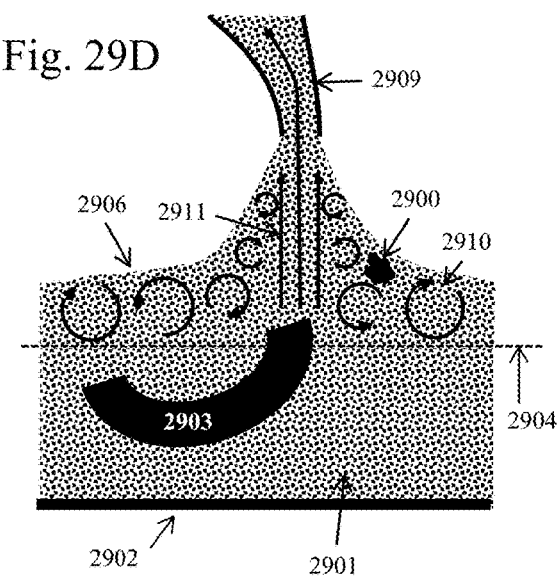

FIG. 29D shows an example of a succeeding material removal operation where a portion of the additional layer is being removed. Any suitable material removal process can be used. The material removal operation can be part of a leveling operation, as described herein. For example, the material removal can further reduce a thickness of the additional layer. The material removal can be accomplished using a material removal mechanism (e.g., material remover (e.g., nozzle)) (e.g., 2909), as described herein. The removed material can be recycled using a recycling system, as described herein. For example, the material removal mechanism can be operationally coupled to the recycling system. The removed material can be directed to the recycling system via the material removal mechanism. The material removal mechanism may contact the additional layer, or not contact (e.g., hover above) the additional layer. The material removal mechanism can provide an attractive force provided by an attractive force source (e.g., FIG. 28, 2801). The attractive force can create an attractive flow (e.g., comprising a vertical flow component) (e.g., 2911) within the material bed and/or surrounding gas proximate to the material removal mechanism. The attractive flow can remove a portion of the material from the material bed and into the material removal mechanism (e.g., nozzle). The attractive force can be any suitable type of attractive force, e.g., as described herein. In some cases, the attractive flow forms a chaotic flow (e.g., comprising turbulence), e.g., (e.g., 2910) in a proximity of the attractive flow (e.g., vertical flow) into the material removal mechanism. In some embodiments, the attractive flow forms a non-turbulent (e.g., laminar) flow in a proximity of the attractive flow (e.g., vertical flow) into the material removal mechanism. In some cases, the turbulent flow (and/or laminar flow) is on and/or in the material bed. In the material bed may comprise the additional layer (e.g., new or second layer). In some embodiments, the chaotic flow (and/or laminar flow) is within an upper portion (e.g., near or at the exposed surface) of the additional layer (e.g., new or second layer). In some cases, the chaotic flow (and/or laminar flow) is within one or more previously deposited layers of the material bed (e.g., below plane 2904) (e.g., within a first layer). In some cases, chaotic flow (and/or laminar flow) is within an atmosphere above the material bed (e.g., above the additional layer). The chaotic flow may be in a volume comprising the exposed surface of the material bed. The chaotic flow (and/or laminar flow) can introduce flows of gas (e.g., from the surrounding atmosphere) on and/or into the material bed (e.g., the additional layer). The chaotic flow (and/or laminar flow) can introduce flows of material (e.g., from the material bed) into the adjacent atmosphere. The chaotic flow (and/or laminar flow) can cause mixing (reshuffling) of at least an outermost (e.g., top) portion of the material bed (e.g., outermost (e.g., top) portion of the additional layer). In some cases, the chaotic flow (and/or laminar flow) can cause mixing only within the additional layer (or a portion thereof). In some cases, the chaotic flow (and/or laminar flow) can cause mixing within previously deposited layers of the material bed (e.g., below plane 2904). The chaotic flow (and/or laminar flow) can cause at least portion of the debris to move on and/or within the material bed. The chaotic flow (and/or laminar flow) can cause at least a portion of the debris to be removed from the material bed by the flow (e.g., vertical flow) into the material removal mechanism. For example, the chaotic flow (and/or laminar flow) can cause at least a portion of the debris to move to within a region affected by the attractive flow (e.g., vertical flow) and into the material removal mechanism. The debris can become entrained within the attractive flow and into the material removal mechanism, thereby removing at least a portion of the debris from the material bed (e.g., from the exposed surface thereof). This removal of at least a portion of the debris can reduce an occurrence of defects in and/or on the 3D object (e.g., final 3D object). In some cases where the removed material is recycled, a recycling system. The recycling system can filter out at least some of the debris (e.g., using one or more filters, e.g., sieves) such that the recycled material can (e.g., substantially) only include pre-transformed material (e.g., and used in subsequent layer forming operations).

During the layer deposition and/or 3D printing, the material bed may comprise a flowable material, and/or non-compressed material. During the 3D printing, the material bed may be (e.g., substantially) devoid of pressure gradients.

Figure 29E:
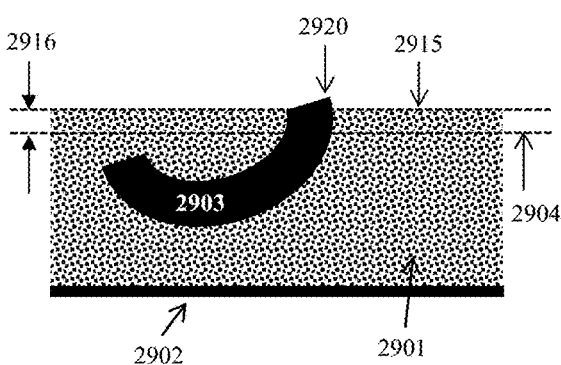

FIG. 29E shows an example of the additional layer after the material removal process. The material removal process can remove material such that the additional layer (and the material bed) has an exposed surface 2915 (also referred to a new exposed surface). In some embodiments, the material removal mechanism can remove at least about 70%, 80%, 90%, 95%, 97%, 98%, 99%, 99.5%, 99.8% or 99.9% of the debris within the material bed based on weight. In some embodiments, the percentages are calculated volume per volume. In some embodiments, the percentages are calculated weight per weight. The material removal mechanism can remove the debris within the material bed to a percentage between any of the afore-mentioned values. For example, the material removal mechanism can remove from about 70% to about 99.9%, from about 80% to about 99.9%, from about 90% to about 99.9%, from 95% to 99.9%, or from 99.0% to 99.9% of the debris within the material bed based on weight. The new exposed surface can be (e.g., substantially) planar. The (optionally) previously performed leveling operation (e.g., FIG. 29C) can facilitate forming of the (e.g., substantially) planar new exposed surface. The material removal operation may or may not expose a portion (e.g., a protruding portion (e.g., 2920)) of the 3D object. The thickness (e.g., 2916) of the additional layer after the material removal (e.g., prior to a subsequent transformation operation) can vary depending on process requirements and/or system limitations. In some embodiments, a (e.g., average) thickness of the additional layer can be at least about 5 µm, 10 µm, 50 µm, 100 µm, 150 µm, 200 µm, 250 µm, 300 µm, 350 µm, 400 µm, 450 µm, or 500 m. The average thickness of the leveled additional layer can be at most about 700 µm, 500 m, 450 µm, 400 µm, 350 µm, 300 µm, 250 µm, 200 µm, 150 µm, 100 µm, 50 µm, 10 µm, or 5 µm. The (e.g., average) thickness of the leveled additional layer can be between any of the afore-mentioned (e.g., average) thickness values. For example, the (e.g., average) thickness can be from about 5 µm to about 500 µm, from about 10 µm to about 100 µm, from about 20 µm to about 300 µm, or from about 25 µm to about 250 µm. After the additional layer is complete, another transformation operation can be performed (e.g., using an energy beam (e.g., FIG. 29A, 2907)) to form another layer of the 3D object. The sequences of FIGS. 29A-29E can be subsequently until the 3D object is complete.

In some embodiments, a 3D printing system comprises a movement system. In some embodiments, the movement system (e.g., railing, carriage, and framing) is configured to withstand the conditions prevailing in the processing chamber during 3D printing. The conditions may comprise heat above about 500° C., 1000° C., 1500° C., or 2000° C. The condition may comprise an atmosphere comprising powder, dust and/or debris. The conditions may comprise radiation of energy beam(s) (e.g., e-beam or laser). The movement system can traverse the material bed in a back-and-forth motion. The movement system may be configured to mount the material dispensing mechanism (e.g., including the recoater, leveler, and dispenser). The movement system may be configured to facilitate motion of the material dispensing mechanism in and out of a garage operatively coupled to the processing chamber.

In some embodiments, the movement system is configured for disposition in the processing chamber of the 3D printer to the extent that motion of the layer dispensing mechanism (e.g., the recoater) does not induce a (e.g., substantial and/or noticeable) effect on the pressure level in the processing chamber. The movement system may be configured to translate the layer dispensing mechanism and attach thereto. The movement speed of the movement system (e.g., and thus of the layer dispensing mechanism) is at most about 400 millimeters per second (mm/sec), 500 mm/sec, 700 mm/sec, 1000 mm/sec, 1300 mm/sec, or 1500 mm/sec. The movement speed of the movement system is of any value between the aforementioned values (e.g., from about 400 mm/sec to about 1500 mm/sec, or from about 500 mm/sec to about 1300 mm/sec). The movement system may be configured to accelerate. The acceleration may be at most about 4000 millimeters per second squared (mm/s$^2$), 8000 mm/s$^2$, 10000 mm/s$^2$, 12000 mm/s$^2$, or 15000 mm/s$^2$. The acceleration may have a value between any of the aforementioned values (e.g., from 4000 mm/s$^2$ to 15000 mm/s$^2$, or from 4000 mm/s$^2$ to 1000 mm/s$^2$). The translation of the movement system during operation should not generate (e.g., substantial and/or noticeable) obstruction on the exposed surface of the material bed (e.g., should not cause formation of ripples on the exposed surface of the material bed). The movement system may be configured to move at a distance spanning the processing chamber into the garage (e.g., and spanning the garage). For example, the linear travel distance (e.g., railing span) may be at least about 200 mm, 500 mm, 1000 mm, 1300 mm, 1600 mm, or 2000 mm. The linear travel distance of the movement system may be any distance between the aforementioned distances (e.g., from about 200 mm to about 2000 mm). The movement system coupled to the layer dispensing mechanism may be able to complete deposition of a layer of material having a planar exposed surface (e.g., at 100% duty cycle) every in at most about 5 seconds (sec), 7.5 sec, 8.5 sec, 9.5 sec, 11 sec, 12 sec, or 15 sec. The movement system coupled to the layer dispensing mechanism may be able to complete deposition of a layer of material having a planar exposed surface (e.g., at 100% duty cycle) at a period of time having a time value between the aforementioned time values (e.g., from about every 5 sec to about every 15 sec, or from about every 7.5 sec to about every 9.5 sec). Duty cycle of 100% may include no overheating (e.g., or other change) that prevents repeatable layer dispensing cycles. The movement system may generate a noise level of at most about 40 decibels (dB), 50 dB, 60 dB, 70 dB, 80 dB, or 90 dB during operation. The movement system may generate a noise level having a value between the aforementioned values (e.g., from about 40 dB to about 90 dB, or from about 40 dB to about 70 dB). When present inside the process chamber, the movement system may be devoid of any lubricants, e.g., in the rails and/or wheels. The movement system may be configured to facilitate (e.g., to allow) adjustment of the leveler (e.g., blade thereof), dispenser, and remover (e.g., nozzle thereof). The movement system should accommodate a channel (e.g., flexible hose) for removal of the removed material (e.g., removal of powder material removed through the remover) during its operation.

Figure 34:
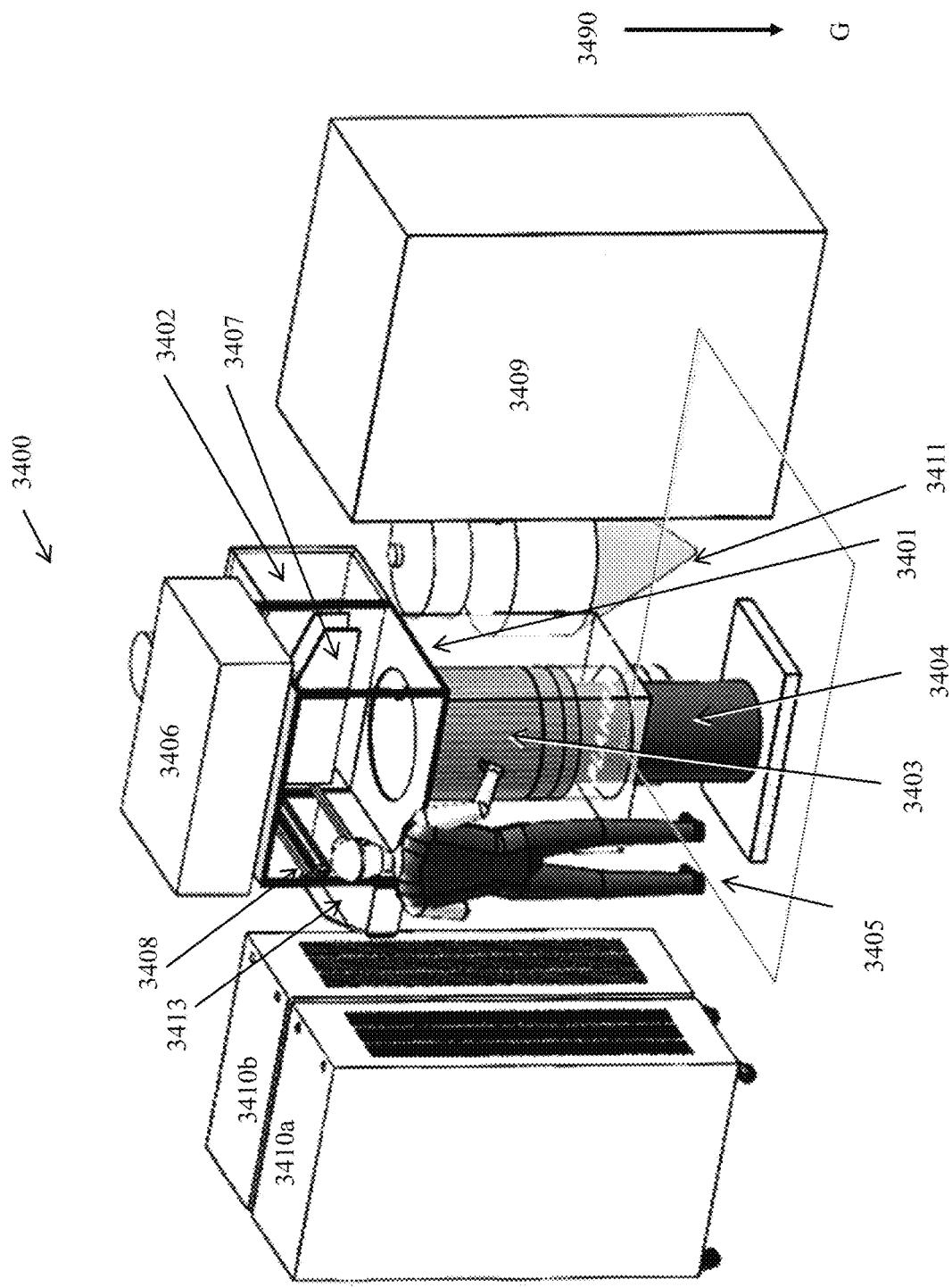
FIG. 34 schematically illustrates a 3D printing system and a user.

FIG. 34 shows an example of a 3D printing system 3400 disposed in relation of gravitational vector 3490 directed towards gravitational center G. the 3D printing system comprises processing chamber 3401 coupled to a garage 3402. The processing chamber is also coupled to a build module 3403 that can extend 3404 under-grounds. The processing chamber may comprise a door (not shown) facing user 3405. 3D printing system 3400 comprises enclosure 3406 comprises an energy beam alignment system (e.g., an optical system) and/or an energy beam directing system (e.g., scanner). A material dispensing mechanism (not shown) may be coupled to a framing 3407 as part of a movement system that facilitate movement of the material dispensing system along the material bed and garage (e.g., in a back-and-forth movement). The movement system comprises a translation inducer system (e.g., comprising a belt or a chain 3408). 3D printing system 3400 comprises a filter unit 3409 and heat exchangers 3410a and 3410b, and pre-transformed material reservoir 3411, and gas guiding system disposed in enclosure 3413. The filtering system may filter gas and/or pre-transformed material.

In some embodiments, the material dispensing mechanism (e.g., FIG. 1, 116, 117 and 118. E.g., the recoater)

comprises, or be operatively coupled to: (1) a movement system that is configured to move laterally along railings, and (2) a framing configured to mount portions of the material dispensing such as the dispenser, leveler and/or material removal mechanism (e.g., remover).

Figure 35:
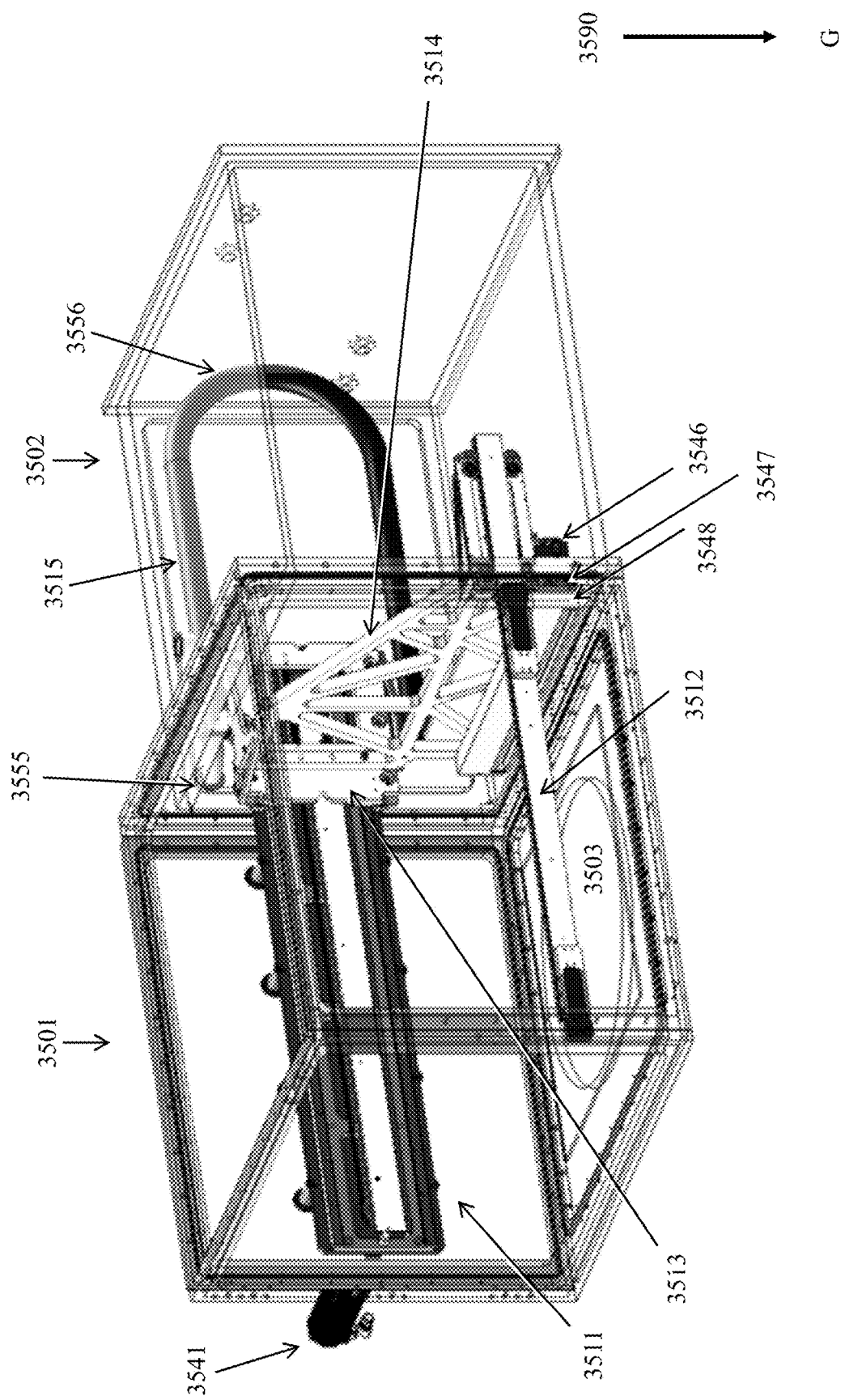
FIG. 35 schematically illustrates a portion of a 3D printing system.

FIG. 35 shows an example of components of a 3D printer that include portions of the material dispensing mechanism devoid of a dispenser 3556, a leveler 3557, and a remover 3558. FIG. 35 shows a processing chamber 3501 and a garage 3502. Processing chamber 3501 includes a base 3503 above which the material be is disposed. FIG. 35 shows an example of a first railing and a second railing disposed at processing chamber 3501 and extend into garage 3502; actuator 3541 configured to translate carriage 3513; framing 3514 mounting dispenser 3546, leveler 3547, and remover 3548; and channel configured to facilitate material removal from the material bed through the remover, the channel, and out of the garage. The channel may couple to the remover and/or to an opening in the processing chamber or in the garage. The channel can be of a single material or of various materials. The channel can be of the same flexibility or of varied flexibility. In the example shown in FIG. 35, the channel has a first section, a second section 3556, a third section 3515, and an opening 3555 coupled to an opening in the garage that is coupled to an attractive force (e.g., attractive force generator such as a vacuum pump—not shown). At least one of the first section, second section, and the third section can be flexible. At least one (e.g., two) of the first section, second section, and the third section can be rigid (e.g., less flexible than the flexible section(s), or formed from a harder material as compared to the flexible section(s)). The flexible section(s) may be bent and/or stretched, e.g., during translation of the movement system. The rigid section(s) may remain stationary, e.g., during translation of the movement system. Vector 3590 is directed towards the gravitational center G.

Figure 36:
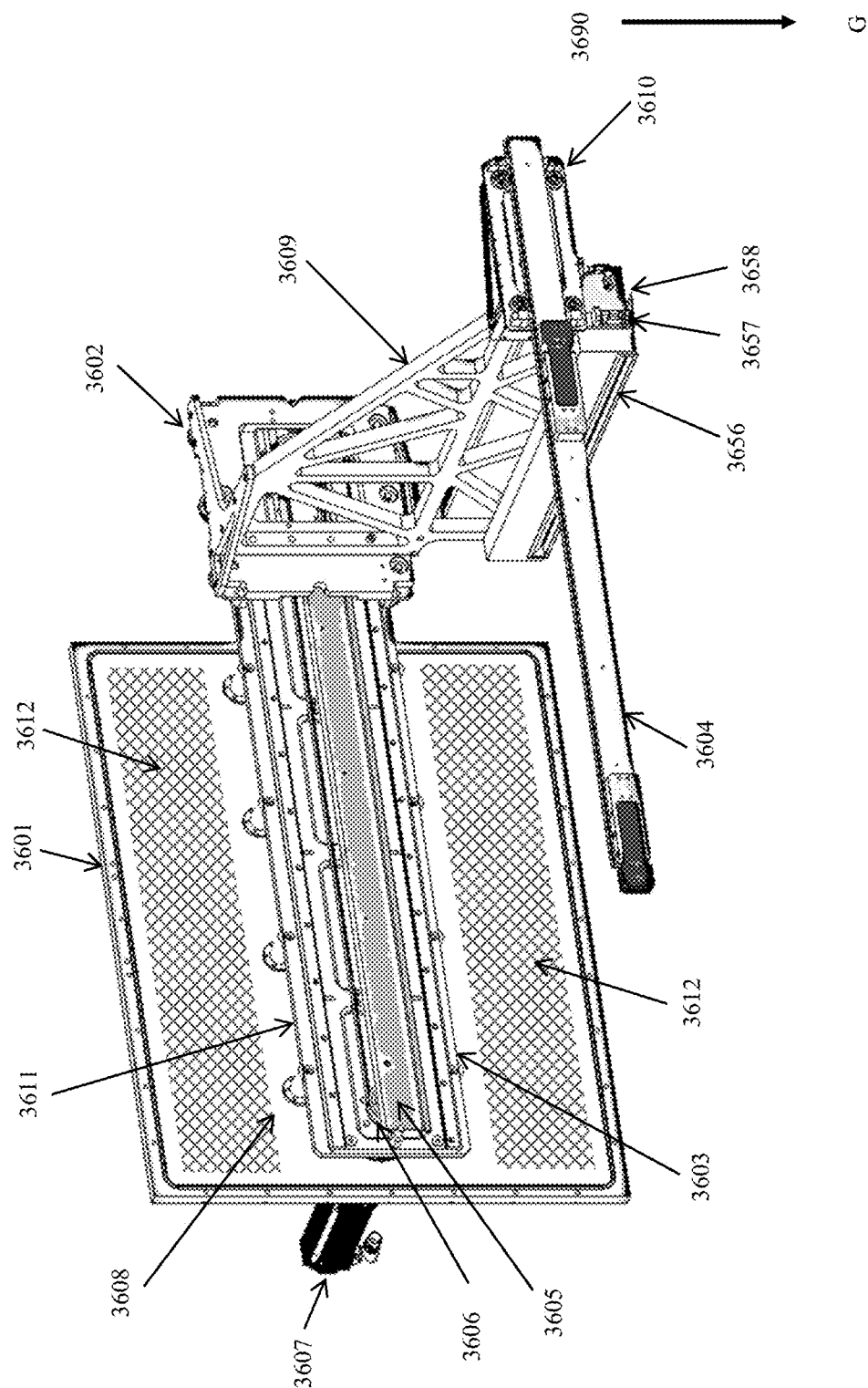
FIG. 36 schematically illustrates various components of a 3D printing system.

FIG. 36 shows an example of portions of the moving system and a processing chamber wall 3601. The moving system comprises carriage 3602; first railing 3603 having a mount plate 3611; second railing 3604; energy beam (e.g., laser) shield 3605; translation inducer (e.g., comprising a belt) 3606; actuator 3607; wall spacer mounts such as 3608; framing 3609; dispenser 3656; leveler 3657; and remover 3658; a second railing 3610; and an area having holes (e.g., inlets, or vents) 3612. The holes may be part of, or operatively coupled to, a gas directing system such as the one in enclosure 3413 of FIG. 34. FIG. 36 depicts vector 3690 directed towards a gravitational center G. The holes may be configured for gas to pass therethrough (e.g., into or out of the processing chamber) The first framing and/or second framing may comprise an outrigger. In some implementations, the carriage comprise a dual Vee track system. The railing (e.g., first railing and/or second railing) may comprise an adjustable track, e.g., to align to the base (e.g., build plate). The translation inducer may comprise a pulley system. The actuator may comprise a motor or a gearhead. The wall may comprise vent(s). The framing may comprise an arm. The framing may comprise bracing. The farming may be configured to mount the remover, dispenser, and leveler. The railing may be attached to a wall having holes or be devoid of holes. The mount plate may be at least about 1000 cm, 1100 cm, 1200 cm, 1300 cm, 1500 cm, 2000 cm, or 2500 cm long. The mount plate may have a length between any of the aforementioned values (e.g., from about 1000 cm to about 1500 cm, or from about 1000 cm to about 2500 cm)

In some embodiments, the carriage is connected to a channel, e.g., through connection of the material removal to the channel configured to remove the material from the remover. When disconnected from the channel, the carriage (also referred to herein as the carriage assembly) can enter and exit through the processing chamber door. The door may be configured to facilitate access to the processing chamber, e.g., by a user such the user depicted in FIG. 34, 3405. The framing and carriage can be disconnected from the railing, e.g., for maintenance and/or assembly.

Figure 37:
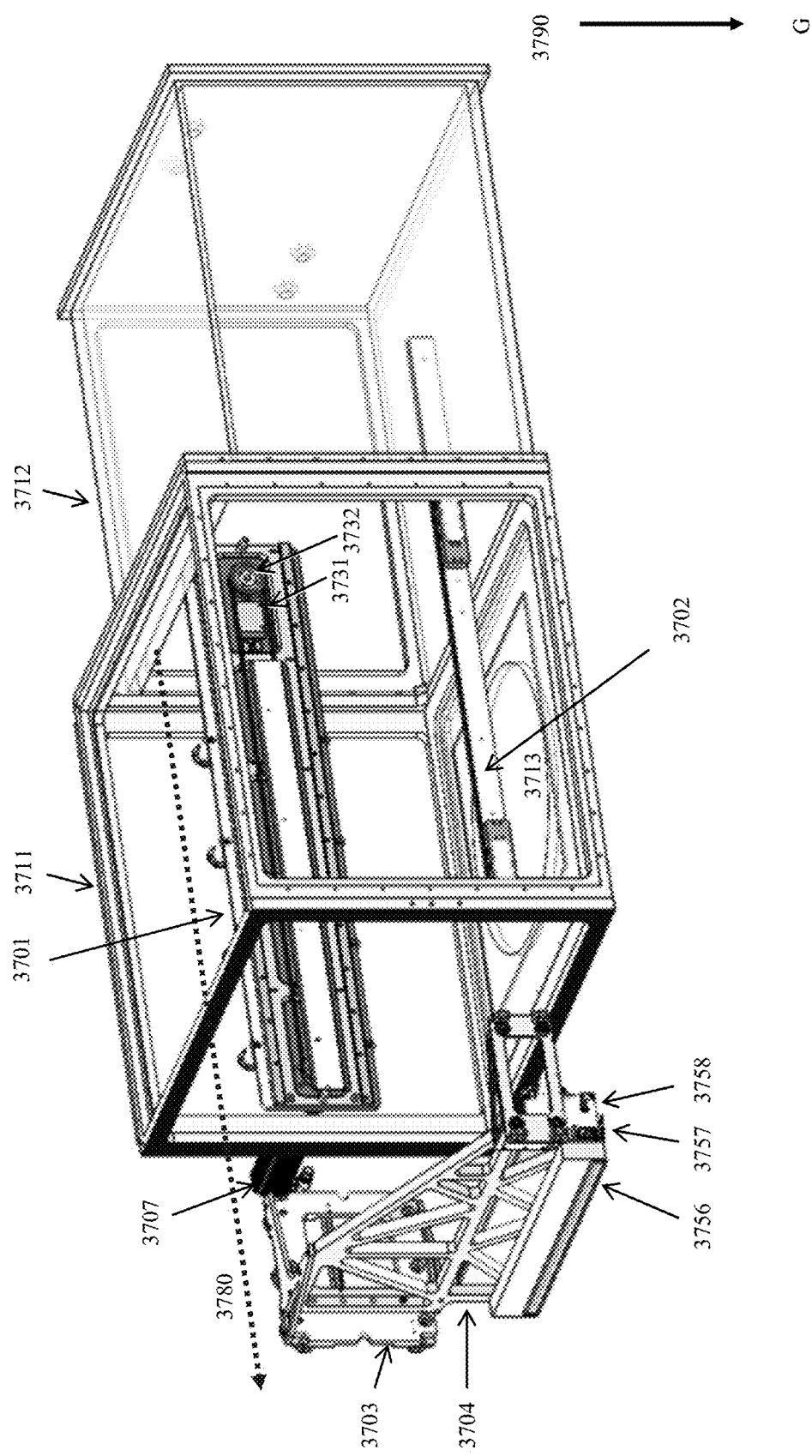
FIG. 37 schematically illustrates a portion of a 3D printing system.

FIG. 37 shows an example of a portion of the movement system extracted from a portion of a 3D printer. The movement system comprises extracted framing 3704 and carriage 3703 from processing chamber 3711. The moving system includes first railing 3701 and second railing 3702 that remains in the processing chamber that has a base (e.g., build plate) 3713. Dispenser 3756, leveler 3757, and remover 3758 are attached to the framing 3704, that is attached to the carriage 3703. Vector 3780 shows the direction of extraction. The first railing shows pulley system comprising a translation inducer (e.g., translation inducing system) comprising a wheel (e.g., gear) 3732 and a belt/chain 3731. FIG. 37 shows an example of vector 3790 directed towards gravitational center G. An actuator (not shown) may be operatively coupled, or be part of, the translation inducing system.

Figure 38:
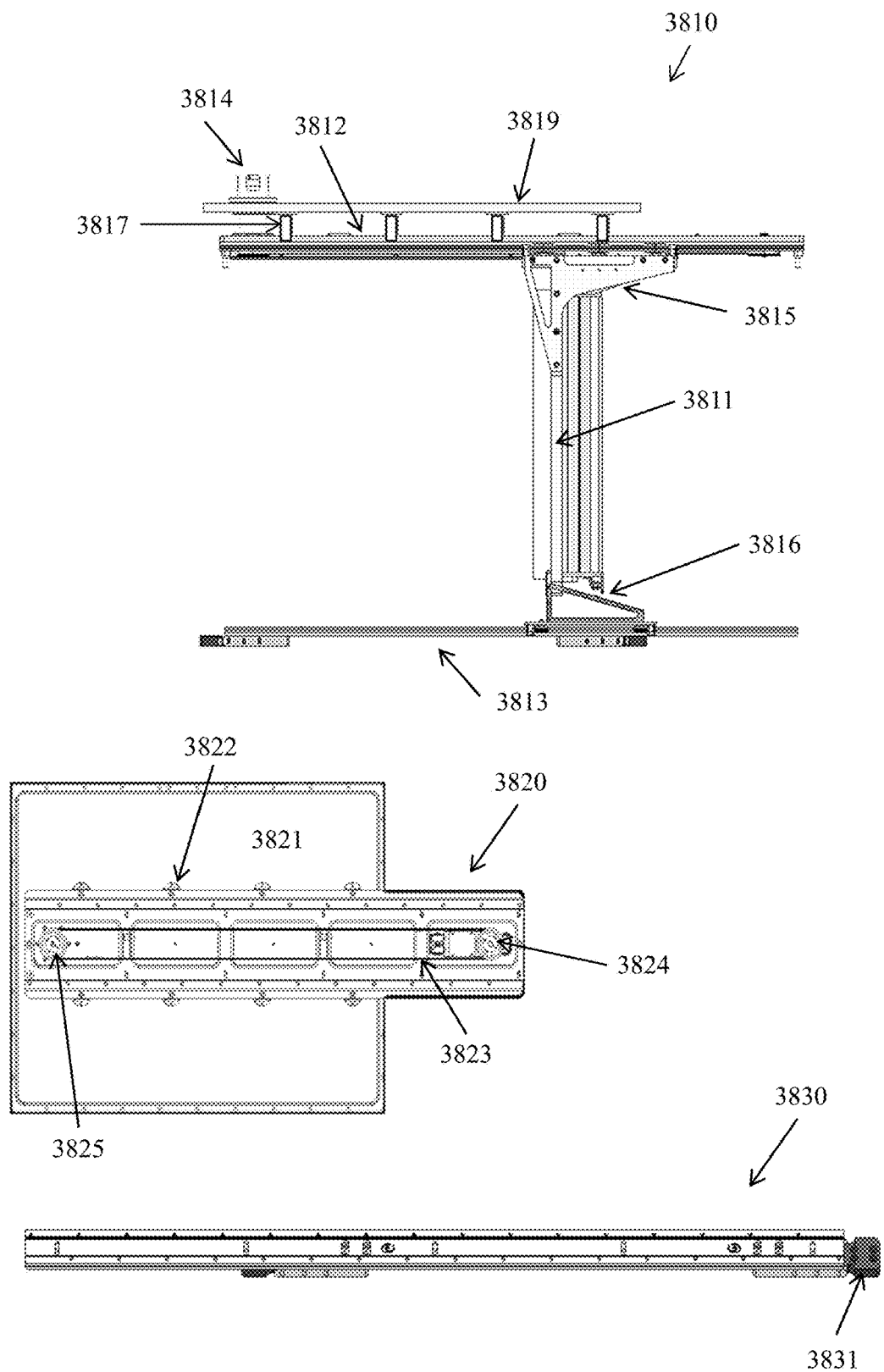
FIG. 38 schematically illustrates various components of a 3D printing system.

FIG. 38 shows in 3810 and example of a top view of the movement system comprising framing 3811 (e.g., comprising an arm and bracing); a processing chamber wall 3812; a first railing system 3812; a second railing system 3813; an actuator 3814 configured to facilitate movement of a carriage along the railing; first harness 3815 coupling a first carriage framing 3811; second harness 3816 coupling a second carriage to framing 3811. FIG. 38 shows a side view example in which the first railing 3812 is separated from wall 3819 by space defined by wall spacer mounts such as 3817. FIG. 38 shows an example of a side view of a portion of the movement system 3820 mounted to wall 3821 using wall spacer mounts such as 3822. The movement system comprises a translation inducing system comprising translation inducing system comprising (a) a belt or chain 3823, (b) a wheel (e.g., gear) 3824, and a wheel (e.g., gear) 3825 to which an actuator is coupled (actuator not shown). FIG. 38 shows a side view example of a second railing system 3830 (e.g., an outrigger rail system) having a stopper 3831. The stopper may be configured to prevent translation of a carriage coupled to the railing beyond the point of the stopper. The railing may be configured for installation from an opening (e.g., door) of the processing chamber, e.g., facing a user such as the one in FIG. 34, 3405. To ease that assembly, a temporary support system can be installed on the railing, carriage and/or framing. The temporary supports may comprise directional supports (e.g., Pokey-Yokey or fool proof supports). The temporary supports may be configured such that they would be required to be removed.

In some embodiments, the railing and/or framing is adjustable. The railing and/or framing may be vertically adjustable, e.g., with respect to the floor of the processing chamber. The railing and/or framing may be adjustable within a range span of at most 1 millimeter (mm), 2.5 mm, 5 mm, 7.5 mm, 10 mm, 12 mm, or 15 mm. The range span may be between any of the aforementioned values (e.g., from about 1 mm to about 15 mm).

Figure 39:
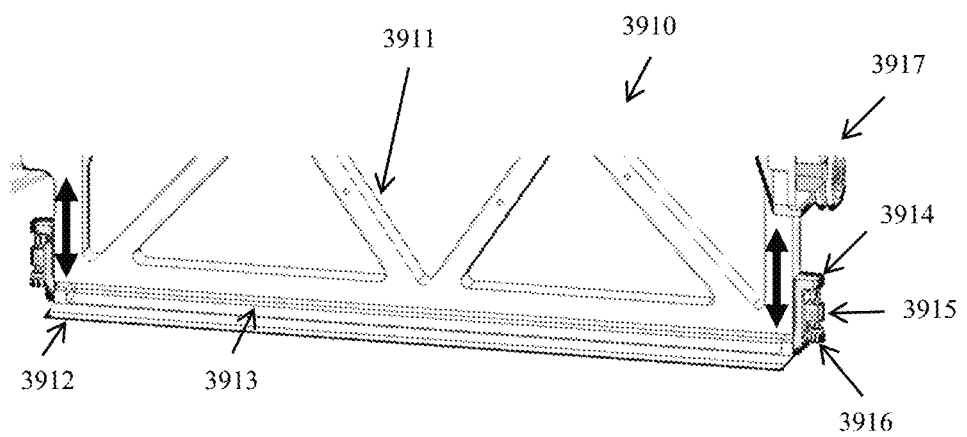
FIG. 39 schematically illustrates various components of a 3D printing system.
Figure 39:
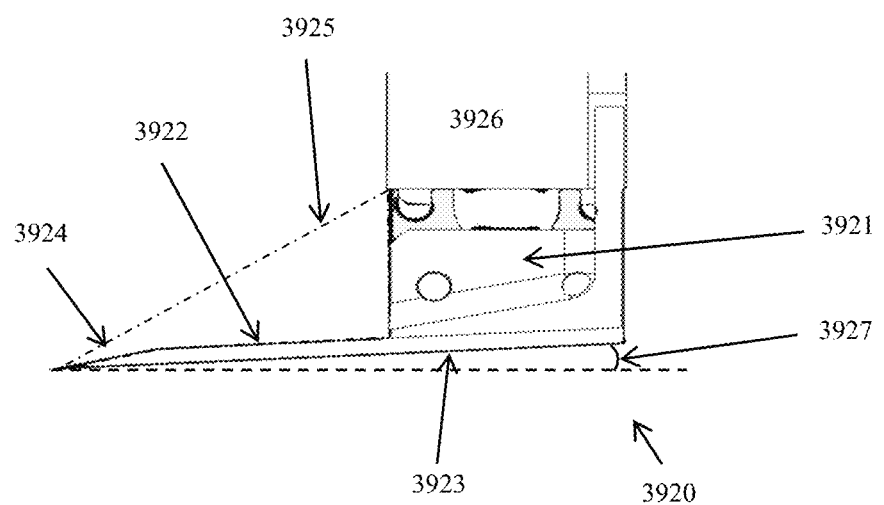

FIG. 39 shows an example of a bottom portion of framing 3910 comprises diagonal bracings such as 3911. In some embodiments, the bracings (e.g., bracing portions) are configured to facilitate structural strength to the framing while minimizing the weight of the framing. The framing configured to couple to a material dispensing mechanism (or any component thereof). For example, framing 3910 is coupled to a leveler having blade 3912 that is coupled to cavity configured to catch leveled material (e.g., powder). The framing may facilitate spatial (e.g., vertical and/or horizontal) adjustment of the material dispensing mechanism (or any component thereof) relative to the framing, the floor of a processing chamber, and/or an exposed surface of the material bed. For example, framing 3910 comprises a vertical adjuster having an adjuster mount 3915, an adjuster block 3915, and a thumb adjuster 3916. Framing 3910 is coupled to a carriage having wheel 3917. The adjuster may be coupled to the framing via a washer plate. The spatial adjuster can be configured to be manually and/or automatically adjusted. The adjuster may be configured to be accessible by a user such as one facing a door of the processing chamber (e.g., FIG. 34, 3405). FIG. 39 shows a vertical cross-sectional example of a portion of a leveler 3920 coupled to a portion 3926 of the framing. Leveler 3920 has an elongated blade having a planar bottom portion 3923 configured to face the material bed, an upper planar portion 3922 and a beveled portion 3924 extending from the upper planar portion 3922 towards planar bottom portion 3923 to form a tip. The blade is configured to deflect from the horizon by an angle 3927. The leveler comprises a cavity 3921 configured to catch a remainder of material from the leveling process, e.g., disposed in volume having a vertical cross section 3925. The blade and cavity (e.g., catch pocket) may hold a volume of at most about 90 centimeters cube (cm$^3$), 100 cm$^3$, 200 cm$^3$, 300 cm$^3$, 400 cm$^3$, 420 cm$^3$, 440 cm$^3$, 460 cm$^3$, 480 cm$^3$, 500 cm$^3$, 520 cm$^3$, 540 cm$^3$, 560 cm$^3$, 580 cm$^3$, or 600 cm$^3$ of removed material (e.g., powder). The blade and cavity can hold a volume of removed material between any of the aforementioned values (e.g., from about 90 cm$^3$ to about 600 cm$^3$, or from about 90 cm$^3$ to about 400 cm$^3$, or from about 400 cm$^3$ to about 600 cm$^3$). The blade can have an aspect ratio of 10:1, 13:1, 15:1, 16:1, 16.5:1, 17:1, 18:1, 20:1, or 20.5:1. The blade can have an aspect ration between any of the aforementioned aspect ratios (e.g., from about 10:1 to about 20.5:1). For example, the blade can have dimensions of 300 mm by 30 mm, 660 mm by 40 mm, or by 1025 mm by 50 mm. the tip of the blade may be tilted by an angle of at most about 10 degrees (°), 20°, 30°, 40°, or 50°. The tip of the blade may be tilted by an angle between any of the aforementioned angles (e.g., from 10° to 50°, or from 20° to 40°). The blade may slice off or plow a non-planar exposed surface of the material bed. The blade may cause some of the removed material to spill over sides of the blade (e.g., and of the material bed). The spilled material may be pushed (e.g., using the layer dispensing mechanism) into the garage at the end of a layer dispensing cycle.

In some embodiments, the material dispensing mechanism (e.g., FIG. 1, 116, 117 and 118. E.g., the recoater) comprises, or be operatively coupled to, a movement system that is configured to move laterally along railings. The movement may be facilitated by wheels coupled to the movement system. The wheels are configured to propagate along the railing before, during, and/or after printing of one or more 3D objects (e.g., in a print cycle). The movement system (and wheels thereof) may be configured to propagate in the processing chamber, e.g., during printing. Printing of the 3D object(s) may generate debris. Debris may be generated during the printing, e.g., as a byproduct of the printing. The 3D object(s) may be printed from a material bed that comprises powder. Powder and/or debris may accumulate on the railing and/or on the wheels to an amount that substantially (e.g., noticeably, measurable, and/or harmfully) alters movement of the movement system of the material dispensing mechanism. The railing may not be perfectly aligned to a degree that substantially (e.g., noticeably, measurable, and/or harmfully) alters, retards, or prevents movement of the material dispensing mechanism. Harmful may be to the printed 3D object(s), e.g., by generating defect(s) in the 3D object(s). Alteration of the movement may comprise altering a speed and/or a direction of the movement. For example, the accumulated debris, powder, and/or misalignment of one or more railings, may cause the material dispensing mechanism (e.g., its movement system) to vary its speed (weather faster or slower) from the prescribed (e.g., predetermined) speed. The debris may comprise soot, slag, spatter, or fused particles that do not form a 3D object.

In some embodiments, the wheel and the railing are configured to push away debris during the wheel's preparation along the railing (e.g., the horizontal railing), e.g., such that if there is any debris accumulated on the railing, it will be pushed away during translation of the wheel along the railing. For example, the railing may have a pointed cross section (e.g., substantially) complementary to the cross section of the wheel, to facilitate removal (e.g., pushing away) of the debris that is caused by preparation of the wheel along the railing. For example, the wheel may have a groove (e.g., substantially a V shaped groove) that (e.g., substantially) complements a cross section of the railing. The wheel may comprise a bearing (e.g., the wheel may be a wheel bearing). The wheel may be a dual vee wheel. The wheel may have a dovetail cross section. The wheel may include a polymer and a metal (e.g., elemental metal and/or metal alloy). The railing may comprise a vee guide track. In some embodiments, the dual vee guide wheel are designed with a contact surface of 90 degrees. The wheel cross section may comprise an internal vee or an external vee (e.g., both an external vee and an internal vee). At least part of the railing may be disposed in the processing chamber.

In some embodiments, the movement system may be coupled to, or include a carriage configured to mount wheels. The carriage may comprise the wheels (e.g., bearings). The propagation of the movement system along a rail may result in uneven wheel loading as it moves along the rail. The movement system (e.g., the carriage) may comprise a flexible portion (e.g., flexure beam). The flexible portion may facilitate evening out loading on the wheels as the movement system propagates along the rail(s). to facilitate smooth (e.g., with even, or substantially even, speed along the railing), regardless of whether the railing comprises or does not comprise debris. The flexible portion is connected to the wheels. For example, the flexible portion may have an even number of wheels, e.g., 2, 4, 6, or more wheels. The even number of wheels may be disposed at opposing sides of the flexible portion, e.g., in a symmetric fashion. The symmetry may comprise mirror symmetry. The wheels may be disposed on the same plane, e.g., of the flexible portion. At least two of the railing, flexible portion, framing, and wheel may comprise the same type of material. The framing is configured to mount portions of the material dispensing mechanism configured to generate a planar layer of powder material (e.g., material removal mechanism, leveler, and dispenser). At least two of the railing, flexible portion, framing, and wheel may comprise a different type of material. The type of material may comprise a polymer, elemental metal, metal alloy, ceramic, or an allotrope of elemental carbon. The polymer may comprise Teflon or nylon. For example, the flexible portion (e.g., spring) may comprise a material having flexible elastic properties. For example, the flexible portion may be configured to enable evening out the amount of force that that wheel places on the railing during its travel along the (e.g., horizontal) railing. For example, the flexible portion (e.g., spring) may comprise aluminum such as cast aluminum (e.g., 771.0 (71A, A07710) cast aluminum, e.g., 771 TC; 6061-T6 Aluminum; or 7075-T6 aluminum). The material may be formulated for casting, e.g., an aluminum alloy formulated for casting. The material may have a moderately high melting, e.g., among the ANSI/AA cast aluminums in the database. The material may be tempered. The material may be (e.g., artificially) aged. The flexible portion may be configured to maintain an average force as the recoater travels along the railing. The movement system (e.g., the carriage) may comprise one or more springs. The spring may be the flexible portion. The flexible portion may comprise the spring. The flexible portion may be configured to facilitate traveling on imperfectly aligned railing and/or railing with debris.

In some embodiments, the carriage is configured to remove debris from the railing. For example, the carriage may comprise rail cleaners configured to clean the railings as the wheels propagate in a direction and in its opposite direction, along the railing. The rail cleaners may comprise hairs or a cloth. For example, the rail cleaners may comprise a brush. For example, the cloth may comprise felt. The rail cleaners may comprise any material disclosed herein. The rail cleaners may comprise glass (e.g., fiberglass). A first rail cleaner may be disposed in one side of the carriage and configured to engage with a railing, and a second rail cleaner may be disposed on an opposing side of the carriage and configured to engage with the railing. The wheels coupled to the carriage and configured to propagate along the railing, may be disposed between the first rail cleaner and the second rail cleaner. The carriage may comprise a hole, e.g., to facilitate maintenance. The carriage may operatively coupled to a belt. The belt may be operatively coupled to an actuator.

Figure 40:
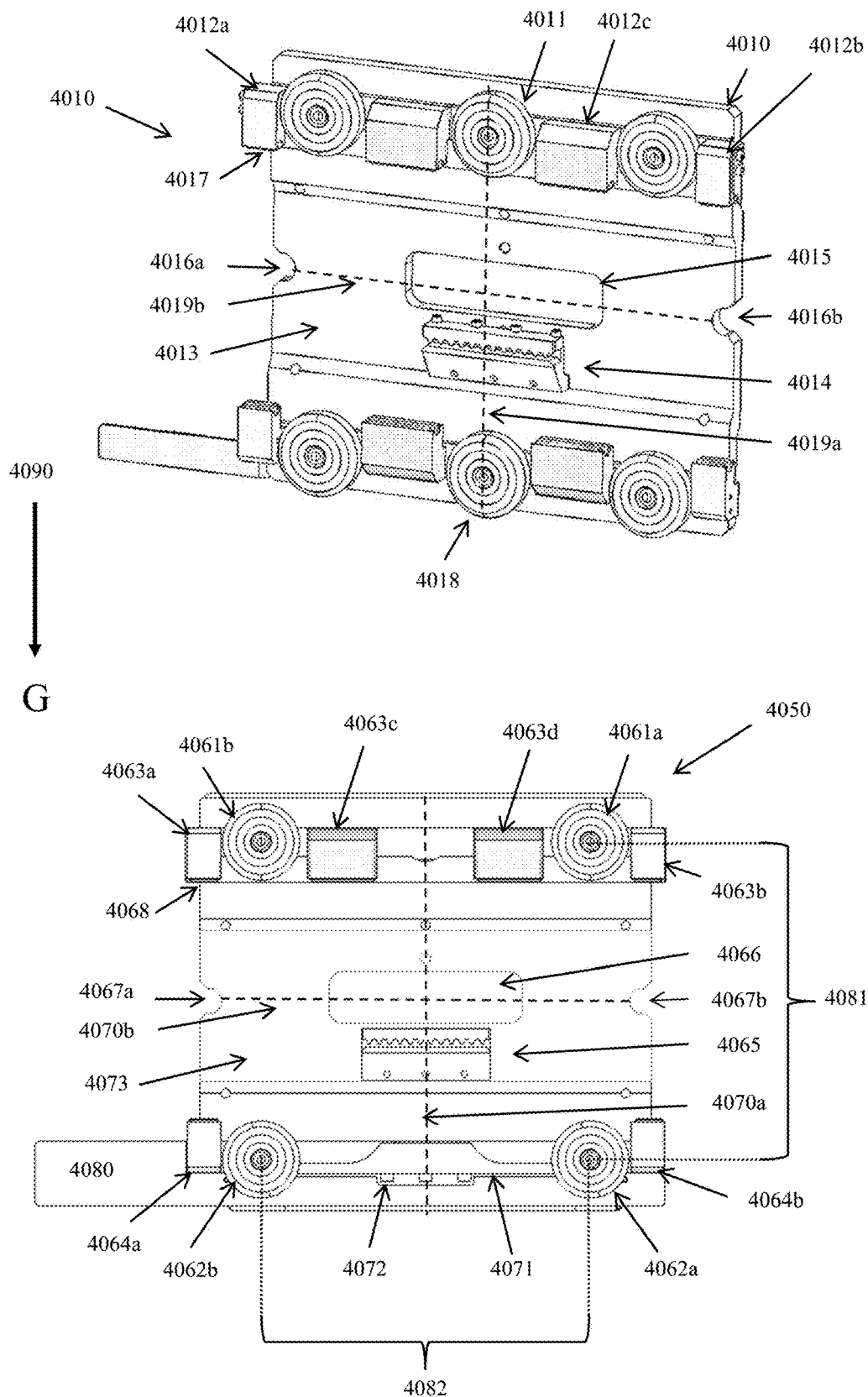
FIG. 40 schematically illustrates various carriages.

FIG. 40 shows an example side view of a carriage 4010 having six wheels such as wheel 4011, cleaners such as cleaners 4012a, 4012b, and 4012c, a body 4013, clamp 4014, an opening 4015 configured to facilitate reaching (e.g., for a user's fingers and/or an equipment to reach) therethrough, and two depressions 4016a and 4016b configured to engage with one or more stoppers. The depressions 4016a and 4016b are disposed on opposing sides of the carriage. Opening 4015 is disposed between depressions 4016a and 4016b. The opening and depressions are aligned (e.g., centrally aligned) along axis 4019b and are related by mirror symmetry along axis 4019a and 4019b. The six wheels are arranged in two sets of three wheels: one set of three wheels at the top of the carriage, with top being a side opposing to gravitational center G; and a second set of three wheels at the bottom of the carriage, with bottom being a side towards the gravitational center G along gravitational vector 4090. Cleaners (e.g., 4012c) are disposed before and after the wheel (e.g., 4011). The cleaners may be of the same type or of different type. Each set of three wheels is configured to engage with a railing (e.g., a top railing and a bottom railing). FIG. 40 shows carriage 4010 having three top wheels configured to engage with a railing disposed towards the gravitational center with respect to the wheels (e.g., railing below the wheels); and three bottom wheels configured to engage with a railing disposed in a direction against the gravitational center with respect to the wheels (e.g., railing above the wheels). FIG. 40 shows an example of cleaners of different type coupled to body 4013 of carriage 4010. For example, cleaners 4012c and 4012a are of different type. For example, cleaner 4012a has a smaller width than cleaner 4012c. The cleaner may comprise a rail wiper. The cleaner may comprise a wiper. The cleaners have a wiper such as 4017 comprising a cloth (e.g., felt) or brush. The brush may comprise bristles, hairs, fibers, or wires set into a body of the cleaner. The cloth may be woven or felted. The cloth may comprise glass (e.g., fiberglass), polymer, elemental metal, metal alloy, or any other material disclosed herein. The cleaner is configured to contact the railing during translation of the carriage along the railing. The cleaner is configured to apply minimum friction on the railing (e.g., soft contact with the railing). The cleaner is configured to facilitate long life of the cleaner, railing, and wheel(s) of the carriage. For example, the cleaner is made of a material that is softer (e.g., less hard) than the railing. The cleaner may be configured not to erode the railing during its operation. For example, the cleaner may be configured not to scratch the railing. Cleaners 4012a and 4012b are disposed at two distal ends of the carriage. The top cleaners and wheels are symmetrical to the bottom cleaners and wheels with at least one mirror symmetry plane. In the example shown in FIG. 40, the mirror symmetry plane 4019b is disposed along opening 4015 and the two depressions 4016a and 4016b; and the mirror symmetry 4019a is disposed along the center of the two central (e.g., top and bottom) wheels including top wheel 4011 and bottom wheel 4018 while traversing opening 4015. The carriage may be symmetric along any (e.g., and all) of the aforementioned symmetry planes (e.g., apart from clamp 4014). In some embodiments, the clamp is configured to engage with the translation inducer (e.g., with a chain or a belt).

FIG. 40 shows an example side view of a carriage 4050 having four wheels: two top wheels 4061a and 4061b, and two bottom wheels 4062a and 4062b, cleaners such as top cleaners 4063a, 4063b, 4063c, and 4063d; a body 4073, clamp 4065, an opening 4066 configured to facilitate reaching (e.g., for a user's fingers and/or an equipment to reach) therethrough, and two depressions 4067a and 4067b configured to engage with one or more stoppers. The depressions 4067a and 4067b are disposed on opposing sides of carriage 4050. Opening 4066 is disposed between depressions 4067a and 4067b. The opening and depressions are aligned (e.g., centrally aligned) along axis 4070b and are related by mirror symmetry along axis 4070a and 4070b. The four wheels are arranged in two sets of two wheels: one set of two wheels at the top of the carriage including wheels 4061a and 4061b, with top being a side opposing to gravitational center G; and a second set of two wheels at the bottom of the carriage including wheels 4062a and 4062b, with bottom being a side towards the gravitational center G along gravitational vector 4090. Top cleaners 4063a-d are disposed before and after the top wheels such that each of the two wheels is horizontally surrounded by cleaners. Cleaners 4064a and 4064b are disposed at two distal sides of the carriage. The cleaners are of the same type or of different type. Each set of two wheels is configured to engage with a different railing (e.g., a top railing and a bottom railing). FIG. 40 shows carriage 4050 having two top wheels configured to engage with a railing disposed towards the gravitational center with respect to the wheels (e.g., railing below the wheels); and two bottom wheels configured to engage with a railing disposed in a direction against the gravitational center with respect to the wheels (e.g., railing above the wheels). FIG. 40 shows an example of cleaners of different type coupled to body 4073 of carriage 4050. For example, cleaners 4063c and 4063a are of different type. For example, cleaner 4012a has a smaller width than cleaner 4012c. The cleaners have a wiper such as 4068 comprising a cloth (e.g., felt) or brush, e.g., similar to the ones described in the context of carriage 4050. Cleaners 4063a and 4063b are disposed at two distal ends of the carriage. The top distal cleaners and wheels are symmetrical (e.g., disposed symmetrically) to the bottom distal cleaners and wheels with at least one mirror symmetry plane. In the example shown in FIG. 40, the mirror symmetry plane 4070b is disposed along opening 4066 and the two depressions 4067a and 4067b; and the mirror symmetry 4070a is disposed along the center of opening 4066. In the example shown in FIG. 40, carriage 4050 is symmetric with respect to mirror symmetry plane 4071a. Carriage 4050 includes a flexible portion 4071 configured to couple to two wheels 4062a and 4062b, and to the carriage body 4073 with three fasteners (e.g., screws such as bearing preload clamping screws) such as 4072. A sensor flag 4080 is operatively coupled to carriage body 4073. The carriage may comprise a seal such as a felt rope wiper seal. The flexible portion may comprise a flexure beam such as a dual flexure beam. The flexible portion may comprise mirror symmetry along its center (e.g., along symmetry plane 4070a). The flexible portion may be thicker at its center than at its two distal ends coupling to the wheels, e.g., as is depicted in FIG. 40, 4071. The carriage may comprise one or more sensors, e.g., one or more sensors comprising a positional sensor, or a mounting sensor. The sensor may be configured to sense correct mounting of the wheels to the carriage, positioning of the carriage on the railing and/or mounting the carriage to the framing. The wheel may be a bearing wheel, e.g., a concentric bearing wheel. The distance (e.g., 4082) between distal wheels of the carriage configured to engage with one railing (e.g., distance from 4061a to 4061b, and/or from 4061a to 4061b) may be the same, or substantially the same as the distance (e.g., 4081) between the distal upper wheel configured to engage with a first railing and a respective distal lower wheel configured to engage with a second railing (e.g., distance from 4061b to 4062b, and/or from 4061a to 4062a). The distance (e.g., 4082) between the wheels configured to engage with one railing may differ from the distance (e.g., 4081) between the wheels configured to engage with two separate railings by at most about 5 mm, 10 mm, or 15 mm. The distance (e.g., 4082) between the wheels configured to engage with one railing may differ from the distance (e.g., 4081) between the wheels configured to engage with two separate railings by any value between the aforementioned distance values (e.g., from about 5 mm to about 15 mm).

In some embodiments, the structure of the movement system results in uneven load on its wheels. For example, the wheels (e.g., bearings) of the carriage may be over constrained in carriage that does not allow for flexibility of the wheels during travel, e.g., in designs such as depicted in FIG. 40, 4010. Such design may result in uneven wheel loading as the carriage is moved along the rails. A lower flexible portion (e.g., compliant beam, or flexure beam) may adapt to variations in rail specification without significant load changes. A lower flexible portion may allow for greater tolerance in operating the movement system for its prescribed purpose, e.g., without significant (e.g., substantial) change in its operation (e.g., without significant load changes). The wheels may require minimum force to ensure that they have sufficient contact with the rails to maintain rotation while preventing scraping under acceleration of the movement system.

Figure 42:
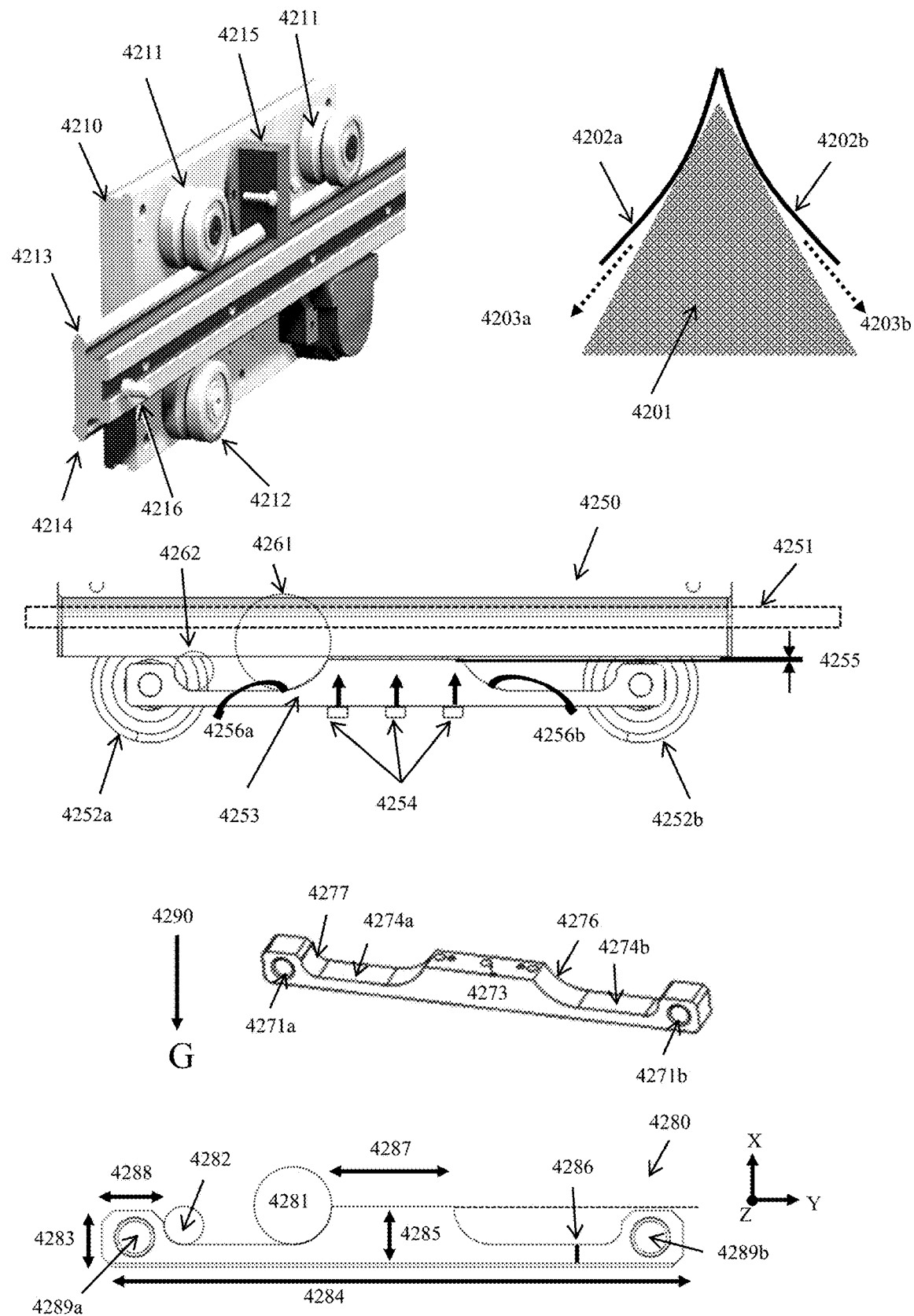
FIG. 42 schematically illustrates various components relating to carriages.

FIG. 42 shows a side view example of a portion of a carriage having a body 4250, wheels, a flexible portion 4253; three fasteners (e.g., screws) 4254 holding a position of flexible portion 4253 against carriage body 4250 such that the position allows formation of gap 4255, a rail 4251, and two wheels—wheel 4252a and wheel 4252b. The wheel may be a bearing. The wheel may be a vee bearing. The wheel may be a 2× flexure vee bearing, e.g., concentric. The flexible portion may comprise a dual flexure beam. Alignment dowels (e.g., 2× alignment dowels) may be disposed between the flexible portion and the body of the carriage to hold alignment to their mutual alignment, e.g., while providing some flexibility. Arrows 4256a and 4256b illustrate directions of movement that can materialize in the flexible portion. Arrows from fasteners 4254 designate a direction of the fastening. The gap can be at most about 1.0 millimeters (mm), 1.25 mm, 1.5 mm, 1.75 mm, or 2 mm. The carriage body may have a FLS of at most about 200 mm, 250 mm, 300 mm, or 350 mm. FIG. 42 shows an example of a flexible portion 4270 having a thick middle portion (e.g., trunk) 4273 and two symmetrical thinner portions (e.g., branches) 4274a and 4274b aligned with the bottom thick middle portion 4273. Each of the thinner portion (e.g., arms) 4274a and 4274b ends with a respective distal thicker portion configured to couple to a wheel. In the example shown in FIG. 42, thinner portion 4271a ends with a distal thicker portion having a hole 4271a configured to accommodate an axis of a wheel; and thinner portion 4271b ends with a distal thicker portion having a hole 4271b configured to accommodate an axis of a wheel. All portions of the flexible portion are aligned to its bottom (e.g., with respect to the gravitational center G towards gravitational vector 2790 points to). A vertical cross section of the flexible portion may comprise straight sections (e.g., of portion 4274a) and/or curved section(s) (e.g., 4277 and 4276). FIG. 42 shows one example of a flexible portion in 4250 and another example of a flexible portion (e.g., flexure) in 4280. The flexible component 4280 has a middle portion of height 4285 and width 4287, two distal symmetrical portions having a height 4283 and a width 4288 and thinner elongated portions each connecting the middle portion and one of the distal portions. The total length of the flexible portion (e.g., flexure) is 4284. The flexible portion has a front side onto which the wheels couple to the distal portions, and an opposing back side. The bottom of the flexible portion (e.g., flexure) aligns the middle portion, the two distal portions and the thinner middle portions to the bottom in one plane having length 4284. The middle portion connects to each of the thinner elongated portions in a curvature having radius of circle 4281 (R1). The distal portion connects to a thinner elongated portions in a curvature having radius of circle 4282 (R2). The flexible portion can have two symmetrical planes and one nonsymmetrical plane. The flexible portion can have one symmetrical plane and two non-symmetrical planes. For example, one mirror symmetrical plane is along the ZX axis as depicted in the example of FIG. 42, 4280, and runs through the middle portion having height 4285. For example, a second nonsymmetrical plane runs along the YZ plane. The XY plane may or may not be symmetrical. The XY symmetry plane may run in the middle of the flexure's width along the Z axis. Whether the XY middle plane is or is not symmetrical depends on the structure of the holes (e.g., 4289a and 4989b) configured to engage wheels of the carriage. Apart from the possibly different hole structure in the front and back of the flexure, the flexure has a mirror symmetry plane along XY that runs the middle of the width of the flexure, which width is along the Z direction.

The length (e.g., 4284) of the flexure may be at least about 3, 4, 5, 6, 7, or 8 times as long as the length (e.g., 4287)

of the middle portion. The length of the flexure may have a value that is a multiplicity of the value of a length of the middle portion, by any of the aforementioned values (e.g., from about 3 times to about 8 times). For example, FIG. 42 shown in 4280 an example where the length 4284 of the flexture is about five times as long as length 4287 of the middle portion. The height (e.g., 4285) of the middle portion of the flexture may be at least about 1.5, 2, 2.5, 3, 3.5, 4, 4.5, 5, 5.5, or 6 times as high as the height (e.g., 4286) of the thinner portion. The height of the middle portion can have a value that is a multiplicity of the value of a height of the thinner portion, by any of the aforementioned values (e.g., from about 1.5 times to about 6 times). For example, FIG. 42 shown in 4280 an example where the height 4285 of the middle portion of the flexture is about three times as high as the height 4286 of the thinner portion. The height of the distal portion may be about the same height, or slightly smaller than the height, of the middle portion. Slightly smaller may be by at most about 1%, 5% or 10%. The distal portion may be configured to couple with an axis of a wheel (e.g., wheel bearing). The length (e.g., 4287) of the middle portion is at least about 1.5, 2, 2.5, or 3 times the height (e.g., 4285) of the middle portion. The length of the middle portion can have a value that is a multiplicity of the value of its height, by any of the aforementioned values (e.g., from about 1.5 times to about 3 times). For example, FIG. 42 shown in 4280 an example where length 4287 of middle portion is about twice height 4285 of middle portion. The middle portion connects to each of the thinner elongated portions in a curvature having radius of circle R1. The distal portion connects to a thinner elongated portions in a curvature having radius of circle R2, wherein R1 is larger than R2. Larger may be by at least about 1.5, 2, 2.5, 3, 3.5, 4, 4.5, 5, 5.5 or 6 times. Larger may be by any value between the aforementioned values (e.g., from 1.5 times to 6 times, or from 2 times to 4 times). For example, FIG. 42 shown in 4280 an example where the middle portion connects to each of the thinner elongated portions in a curvature having radius of circle 4281 (R1), and the distal portion connects to a thinner elongated portions in a curvature having radius of circle 4282 (R2), where 4281 (R1) is larger than 4282 (R2) by about two times. For example, FIG. 42 shown in 4250 an example where the middle portion connects to each of the thinner elongated portions in a curvature having radius of circle 4261 (R1), and the distal portion connects to a thinner elongated portions in a curvature having radius of circle 4262 (R2), where 4261 (R1) is larger than 4262 (R2) by about 2.5 times. The distal portions have a size configured to accommodate an axis of a wheel. The height and length of the distal portion may or may not be (e.g., substantially) identical. FIG. 42 shows an example where the height 4283 of the distal portion and the length 4288 of the distal portion are similar but not identical. Similar may be by at most about 1%, 5%, 10%, 15%, 20%, or 25%. Similar may be in a percentage range between any of the aforementioned percentages (e.g., from 1% to 25%). The height of the flexure may be the same, or similar to the width of the flexure. Similar may be by at most about 1%, 5%, 10%, 15%, 20%, or 25%. Similar may be in a percentage range between any of the aforementioned percentages (e.g., from 1% to 25%). For example, the width of the flexure may be at least about 15 mm, 19 mm, 20 mm, 25 mm, or 26 mm. The width (e.g., thickness) of the flexure may be at most about 10 mm, 11.5 mm, 15 mm, 17.5 mm, 19 mm, 20 mm, 22.5 mm, or 25 mm. The width of the flexure may be between any of the aforementioned values (e.g., from about 10 mm to about 26 mm). For example, the length of the flexure may be at least about 200 mm, 250 mm, 280 mm, 300 mm, or 350 mm. The length of the flexure may be at most about 150 mm, 152 mm, 156 mm, 200 mm, 235 mm, 250 mm, 280 mm, 285 mm, 300 mm, or 330 mm. The length of the flexture may be between any of the aforementioned values (e.g., the height of the flexure may be at least about 20 mm, 24 mm, 28 mm, or 32 mm. The height of the flexure may be at most about 15 mm, 16 mm, 18.5 mm, 20 mm, 24 mm, 24.5 mm, 27.5 mm, 28 mm, or 30 mm. The height of the flexure may be between any of the aforementioned values (e.g., from about 15 mm to about 30 mm). An aspect ratio of the flexure (e.g., width to length, or height to length such as height 4285 and length 4284) can be at least about 1:2, 1:3, 1:4, 1:5, 1:6, 1:7, 1:8, 1:9, or 1:10. The aspect ratios of the flexture can be between any of the aforementioned aspect ratios (e.g., from about 1:2 to about 1:10, from about 1:2 to about 1:7, or from about 1:5 to about 1:7, or from about 1:5 to about 1:10). The thickness to height aspect ratio can be (e.g., substantially) 1:1.

In some embodiments, the flexible portion facilitates greater tolerance of the carriage to traveling on railing(s) that deviate from a designated specification. In some embodiments, a carriage comprises a flexible portion. In some embodiments the movement system comprises two carriages. One of the carriages may have a flexible portion, while the other of the carriages is devoid of a flexible portion. The two carriages may each have a flexible portion. The flexible portions of the two carriages may be of the same type or of a different type.

Figure 43:
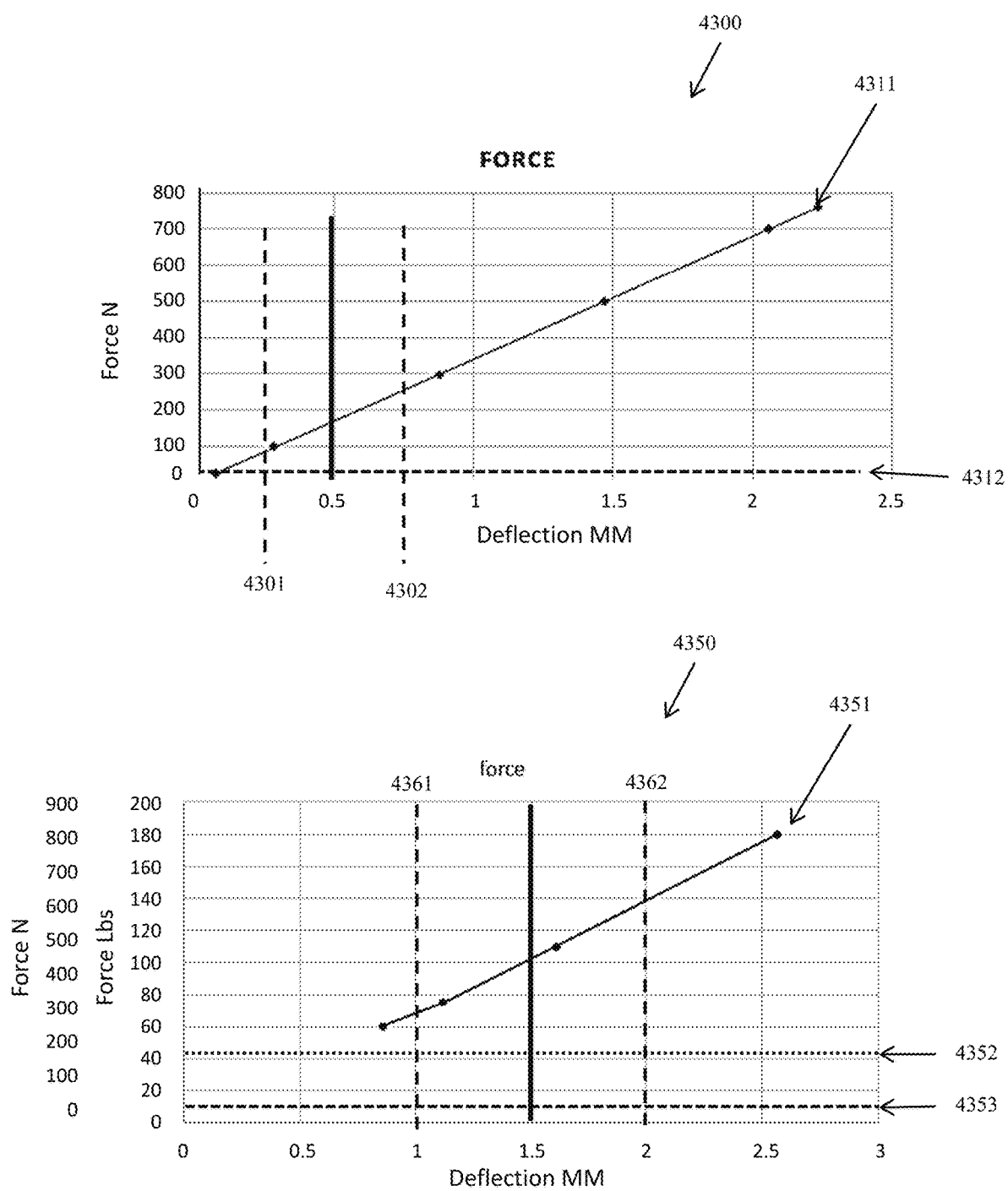
FIG. 43 schematically illustrates graphs of deflection dependencies with force.

FIG. 43 depicts specifications in relation to two different flexible portions. The different portions may be of two flexible portions, each in another carriage of the movement system. The different portions may be of flexible portions relating to different movement systems. FIG. 43 shows in 4300 an example of a graph depicting the relationship between deflection of the thin portions of the flexible portion (e.g., arms or branches) measured in millimeters (mm) as a function of force applied on them, which force is measured in Newtons (N). Point 4311 designates the yield point, dotted line 4312 designates the minimum wheel (e.g., bearing) preload. Dotted line 4301 designates the lower specification limit and dotted line 4302 the upper specification limit. FIG. 43 shows in 4350 an example of a graph depicting the relationship between deflection of the thin portions of the flexible portion (e.g., arms or branches) measured in millimeters (mm) as a function of force applied on them, which force is measured in Newtons (N) or pound-force (Lbs). Point 4351 designates the yield point, dotted line 4352 designates the minimum wheel (e.g., bearing) preload, and 4353 designates the minimum flexure force required to impact a doser (e.g., of powder). Dotted line 4361 designates the lower specification limit and dotted line 4362 the upper specification limit. The graphs in FIG. 43 may aid in assessing various dimensions of the flexure.

The minimum preload force required on the wheel may be at most about 10 Newtons (N), 20N, 50N, 70N, 100 N, 150N, 200N, or 250 N. The minimum preload force required on the wheel may be between any of the aforementioned values (e.g., from 10 N to about 250N). The minimum flexure force required to impact the doser may be at most about 30N, 40N, 50N, 60N, or 70N. The minimum flexure force required to impact the doser may be between any of the aforementioned force values (e.g., from 30N to 70N). The arm deflection tolerated by the flexible portion may have a range of at most about 4 millimeters (mm), 2 mm, 1.5 mm, 0.5 mm, 0.25 mm, 0.2 mm or 0.1 mm. The arm deflection tolerated by the flexible portion may have a range having a value between any of the above-mentioned values (e.g., from about 4 mm to about 0.25 mm). The yield point may be at a force of at least about 700N, 730N, 750N, 760N, 770N, 780N, or 800N. The yield point may be at a force having any value between the aforementioned values (e.g., from about 700N to about 800N, from about 700N to about 780N, or from about 750N to about 800N). The target force that the wheels (e.g., bearings) should withstand may be at least about 50N, 80N, 100N, 140N, 400N, 450N, or 500N. The target force that the wheels (e.g., bearings) should withstand may be of any value between the aforementioned values.

In some embodiments, the carriage may tolerate changes associated with its propagation along the railings. For example, at least two of the rails may be parallel to each other. There may be at least two, or three rails to which the movement system couples to (e.g., using two carriages). At least two rails may deviate from being parallel to each other by at most about 0.02, millimeters (mm), 0.04 mm, 0.05 mm, 0.06 mm or 0.07 mm, while retaining proper (e.g., requested) operation of the movement system. The deviation from parallel may be between any of the aforementioned values (e.g., from about 0.02 mm to about 0.07 mm), while retaining proper (e.g., requested) operation of the movement system. In some embodiments, the deviation from parallel delineates the tolerance of the movement system while retaining proper (e.g., requested) operation.

For example, at least one of the rails may deviate from being straight (e.g., linear). At least one rail may deviate from being linear by at most about 0.02, millimeters (mm), 0.04 mm, 0.05 mm, 0.06 mm or 0.07 mm, while retaining proper (e.g., requested) operation of the movement system. The deviation from linearity may be between any of the aforementioned values (e.g., from about 0.02 mm to about 0.07 mm), while retaining proper (e.g., requested) operation of the movement system. In some embodiments, the deviation from linearity delineates the tolerance of the movement system while retaining proper (e.g., requested) operation.

For example, at least one of the rails may deviate from a prescribed (e.g., requested) thickness. At least one rail may deviate from its prescribed thickness by at most about 0.02, millimeters (mm), 0.04 mm, 0.05 mm, 0.06 mm or 0.07 mm, while retaining proper (e.g., requested) operation of the movement system. The deviation from prescribed thickness may be between any of the aforementioned values (e.g., from about 0.02 mm to about 0.07 mm), while retaining proper (e.g., requested) operation of the movement system. In some embodiments, the deviation from prescribed thickness delineates the tolerance of the movement system while retaining proper (e.g., requested) operation.

For example, at least one of the wheels may deviate from a prescribed (e.g., requested) rotation. At least one of the wheels may runout (e.g., rotate inaccurately). For example, the wheel may not rotate exactly in line with its axis. At least one wheels may deviate from its prescribed rotation (e.g., may runout) by at most about 0.002, millimeters (mm), 0.004 mm, 0.005 mm, 0.006 mm or 0.007 mm, while retaining proper (e.g., requested) operation of the movement system. The deviation from prescribed thickness may be between any of the aforementioned values (e.g., from about 0.002 mm to about 0.007 mm), while retaining proper (e.g., requested) operation of the movement system. In some embodiments, the deviation from prescribed thickness delineates the tolerance of the movement system while retaining proper (e.g., requested) operation. The overall total tolerance of the carriage and railing system may be at most about at most about 0.2, millimeters (mm), 0.3 mm, 0.4 mm, 0.5 mm, 0.6 mm or 0.7 mm, while retaining proper (e.g., requested) operation of the movement system. The overall tolerance of the movement system may be between any of the aforementioned values (e.g., from about 0.2 mm to about 0.7 mm), while retaining proper (e.g., requested) operation of the movement system.

Figure 41:
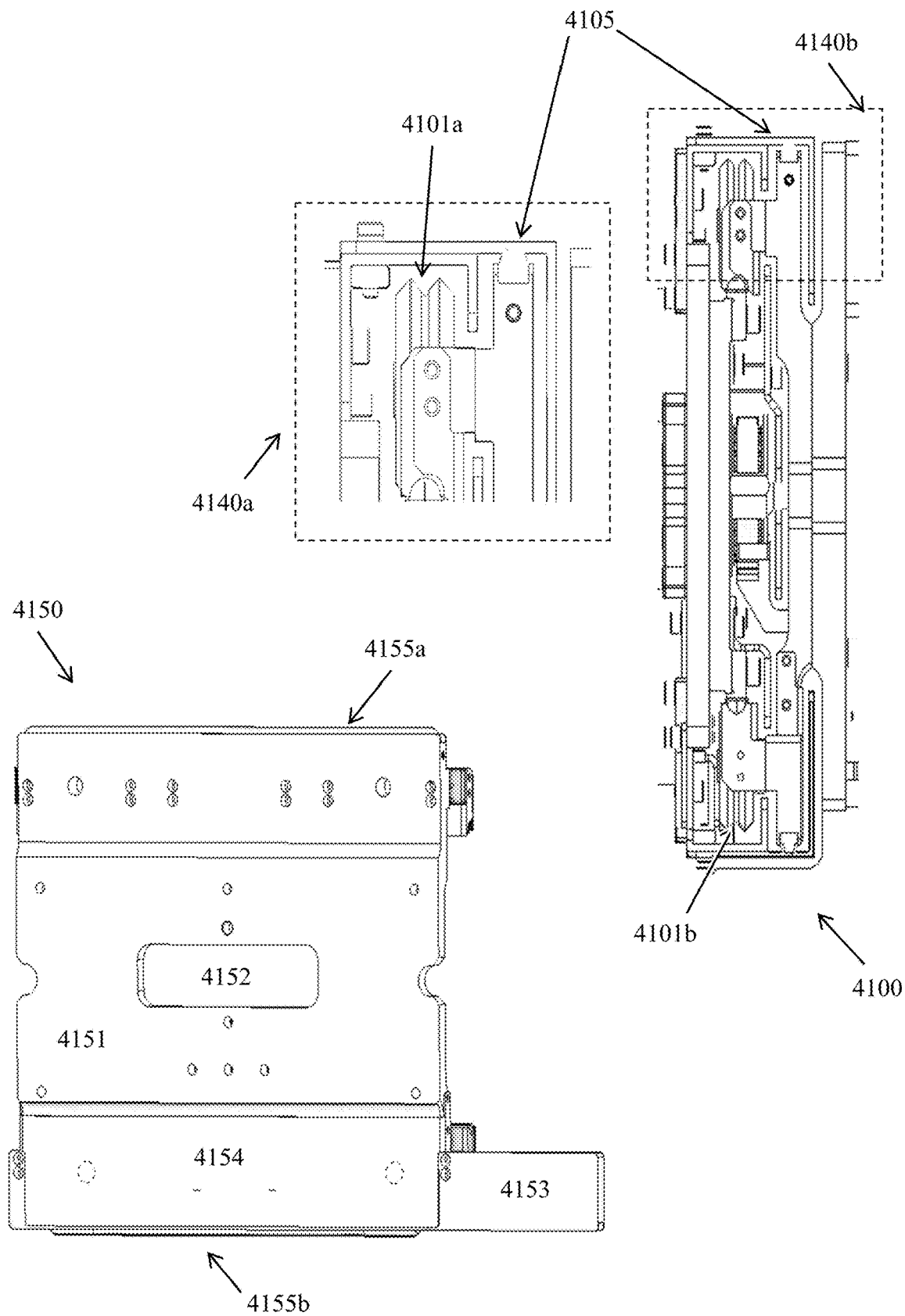
FIG. 41 schematically includes various illustrations relating to wheels.

In some embodiments, the carriage comprises one or more seals. The seal may be contact shield covers. The seal comprise a rope seal, a felt seal, or a felt rope seal. FIG. 41 shows in 4100 a horizontal view of the carriage, with 4140a being an enlarged view of 4140b. The carriage includes seal 4105 and wheels 4101a and 4101b operatively coupled (e.g., physically coupled) to the body of the carriage. FIG. 41 shows in 4150 a side view example of a body of a carriage having an opening 4152; a sensor flag portion 4153; shield (e.g., covering) 4154 configured to shield opening from debris and/or powder; and seals 4155a and 4155b (e.g., felt rope seals).

In some embodiments, the wheel is a vee wheel (e.g., a vee bearing). The vee bearing may comprise a double vee bearing or a single vee bearing. The vee bearing may have minimal contact with the railing during its propagation. For example, the vee railing may have planar sides, while the vee wheel surface may comprise a curvature. FIG. 42 shows a vertical cross-sectional example of a railing tip 4201 engaged with two external surface portions of a wheel, which external surface portions are 4202a and 4202b. Dotted arrows 4203a and 4203b denote optional debris and/or powder being pushed from the cavity between the railing 4201 and the surface portions 4202a and 4202b of the wheel. FIG. 42 shows an example of carriage body 4210 connected to two upper wheels 4211 and lower wheel 4212, which wheels traverse on top railing 4213 and bottom railing 4214. The top and bottom railing may be connected to one piece of railing as is shown in the example in FIG. 42 for railing 4213 and 4214, or be two separate railings. A cleaner 4215 is engaged with railing 4213 and coupled to body 4210. Railings 4213 and 4214 are assembled in a single piece.

In some embodiments, the movement system comprises an uneven number of wheels. In some embodiments, the movement system comprises an even number of wheels. The wheels may be coupled to the carriage. The movement system may comprise one or more carriages. For example, the movement system may comprise two carriages. The two carriages may be configured to couple the same, or different, number of wheels. The two carriages may be configured to engage with the same, or different, number of railings. At least one of the carriages may comprise the flexible portion (e.g., spring or flexure). A first carriage may comprise at least 2, 3, or 4 times more wheels than a second carriage. A first carriage may be configured to engage with a number of railings that is at least 2, 3, or 4 times more than a second carriage. The first wheel amount and the second carriage may be included in the movement system of the material dispensing mechanism. The first carriage may be disposed on an opposite side of a framing than the second carriage. The first carriage may be configured to engage with railing (s) disposed on one side of the processing chamber, and the second carriage may be configured to engage with railing(s) disposed on a second side of the processing chamber opposing the first side.

In some embodiments, the railing, material dispensing mechanism and its movement system may be disposed in the processing chamber, e.g., during printing. In some embodiments, an actuator causes translation of the movement system. For example, the movement system (e.g., the carriage) may be operatively coupled to a translation inducer.

The translation inducer may comprise a chain, belt, or an actuator (e.g., motor). For example, the translation inducer can comprise a belt or a chain, e.g., operatively coupled to an actuator (e.g., motor). The belt (e.g., conveyor belt) may comprise teeth. The belt may be cleated. The actuator may be disposed externally to the processing chamber. For example, the actuator may be disposed on an opposing side of the wall as the railing. The actuator may be disposed on a side closer to the processing chamber door, or far from the processing chamber door.

Figure 44:
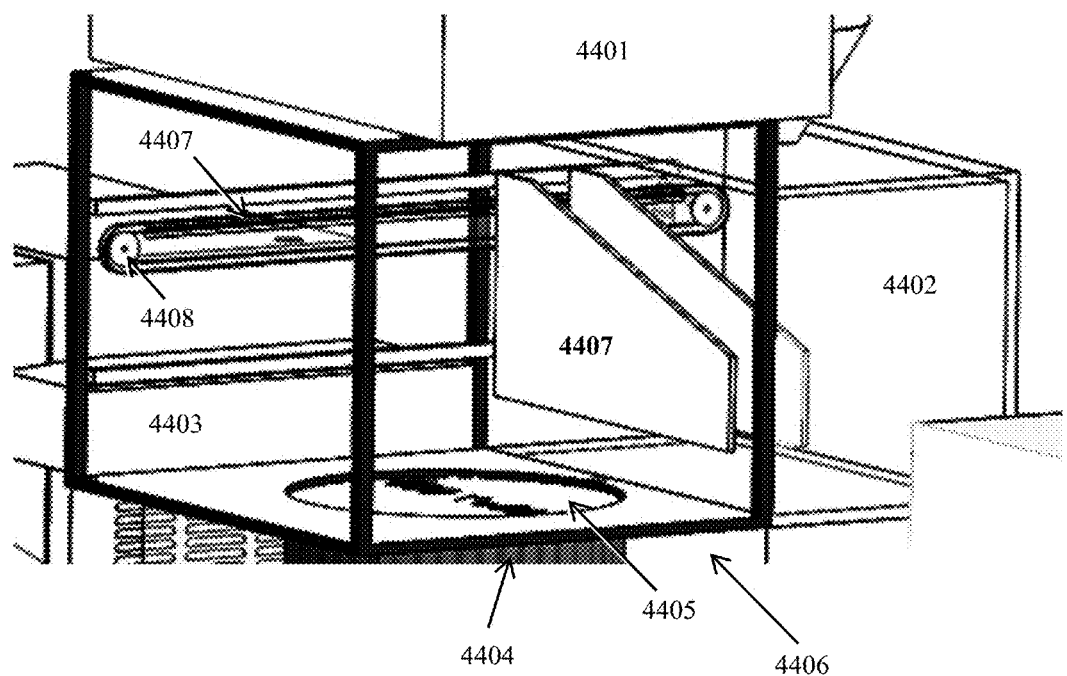
FIG. 44 schematically illustrates a portion of a 3D printing system and components thereof.
Figure 44:
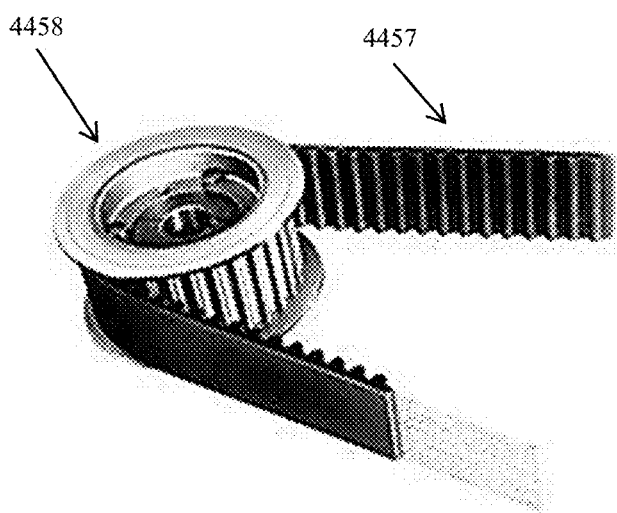

FIG. 44 shows an example of a portion of a 3D printing system comprising an enclosure 4401 hosing a guidance system of the energy beam (e.g., optical system of at least one laser), garage 4402, processing chamber 4406, base (e.g., build plate 4405), portion of a build module 4404, gas flow area 4403 and translation facilitator having a belt/chain 4407 guided by a rotating wheel (e.g., gear) 4408. A magnified image of the wheel (e.g., gear) is depicted in 4458, which wheel is engaged with a portion of a cleated belt 4457 having teeth complementary to teeth of the gear of wheel 4458.

In some embodiments, the railing comprises a protective covering (e.g., a guard such as a labyrinth protective covering) that obstruct the railing from the powder and/or generated debris, e.g., to prevent their accumulation on the railing. The protective covering may also be referred to herein as a "shield" or a "protective shield". For example, the railing may be disposed on a horizontal portion, and the protective covering(s) may comprise several overlapping sections disposed vertically.

Figure 45:
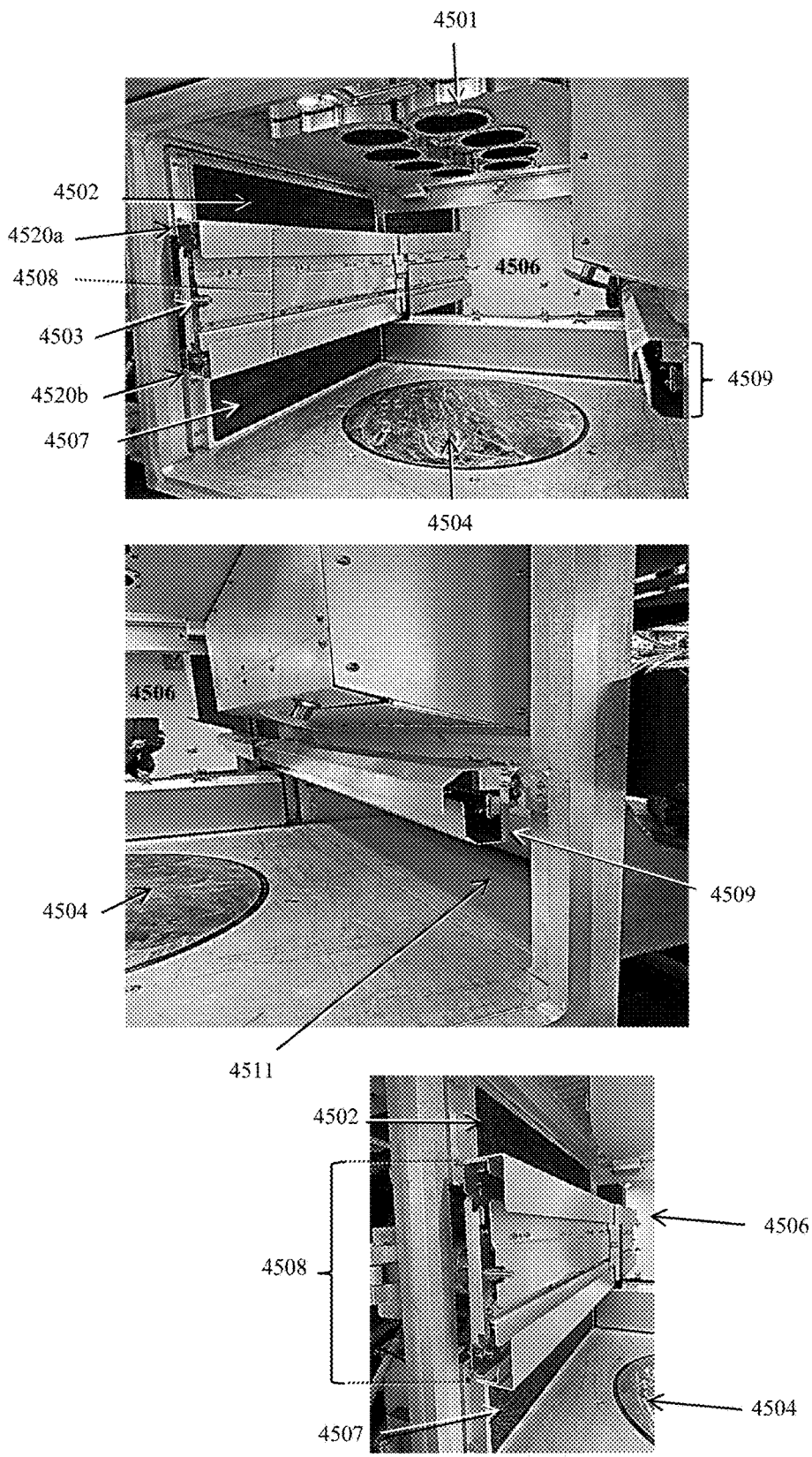
FIG. 45 illustrates various portions of a 3D printing system.

FIG. 45 shows different views of an example processing chamber having a base (e.g., build plate) 4504, gas entrances 4502 and 4507, gas exit 4511, a labyrinth cover 4508 of a two rail structure having a stopper 4503, railings 4520a & 4520b, and a labyrinth cover 4509 of a one rail structure. The processing chamber shown in the example of FIG. 45 includes a garage door (e.g., a mirror door) 4506 that is shut, and optical windows such as 4501. The optical window is designated to facilitate one or more optical energy beams (e.g., lasers) to pass therethrough, e.g., without substantial attenuation of the energy beam. The garage door may comprise a mirror. The mirror may allow extended visibility of the processing chamber to a user located in front of the processing chamber (e.g., as in FIG. 34, 3405). For example, when unpacking of the printed 3D objects(s) is performed in the processing chamber, the mirror aids in viewing their rear side that is otherwise not viewable to the user.

In some embodiments, the carriage is connected to a channel, e.g., through connection of the material removal to the channel configured to remove the material from the remover. The channel may be a flexible hose. The channel may have a diameter of at most about 1.0 inch ("), 2.0", 2.25", 2.5", 2.75", 3.0". The channel may have a diameter having a value between any of the aforementioned values (e.g., from about 1" to about 3.0"). The channel may be connected to the remover and to the processing chamber or garage wall. The material can be removed through the remover using an attraction force (e.g., vacuum pump). Since the remover is mounted to the moving system an is moving during operation, the channel should be flexible to allow smooth movement of the remover. The channel may have portions that are harder than others. For example, the portion directly connected to the remover and/or to the exit opening form the garage/processing chamber can be harder than a flexible portion that allows folding and unfolding to the channel during movement of the layer dispensing mechanism (e.g., that includes the remover).

Figure 46:
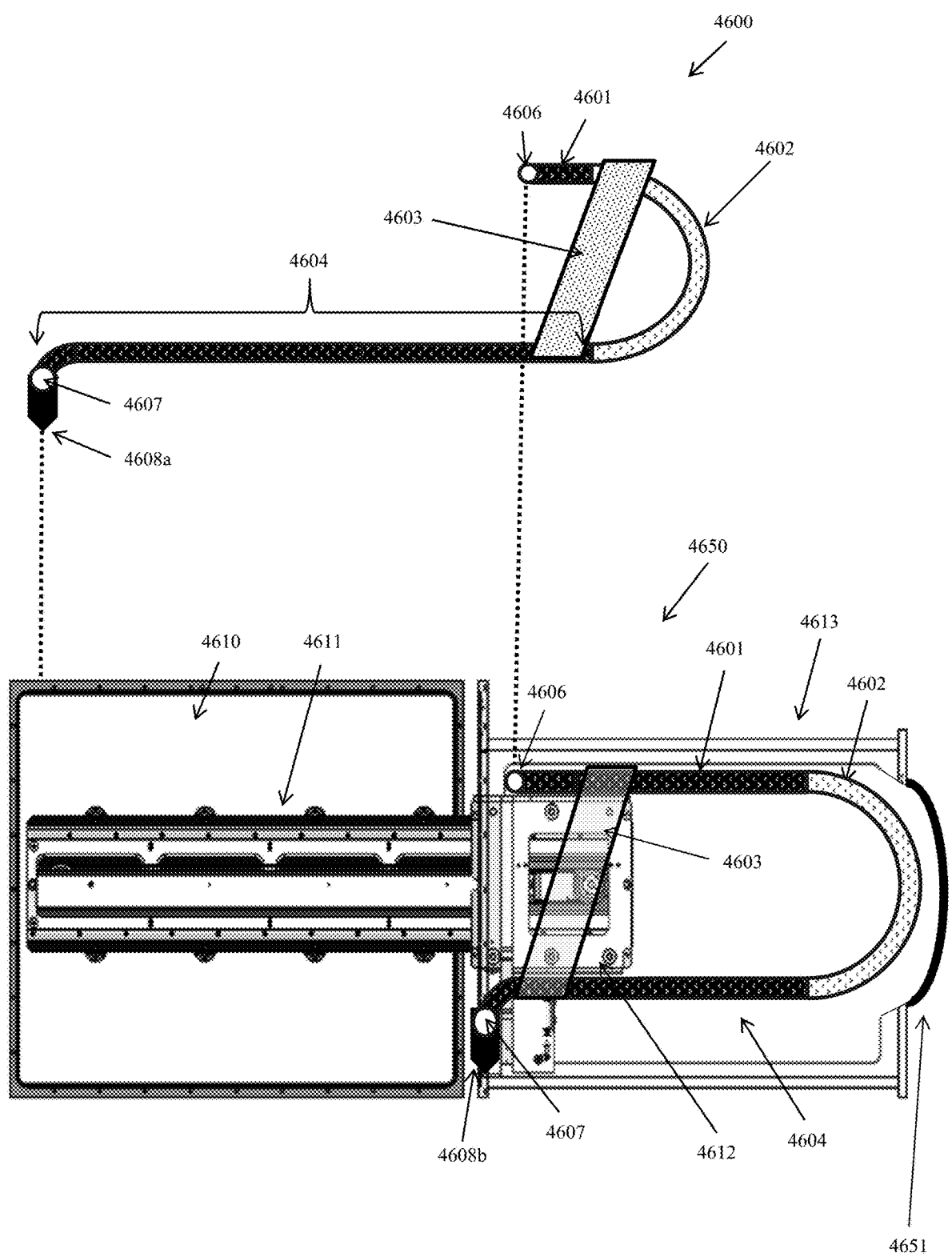
FIG. 46 schematically illustrates various components a 3D printing system.

FIG. 46 shows a side view example of a channel having three section: a first (e.g., upper) rigid section 4601, a flexible section 4602, a second (e.g., lower) rigid section 4604, a first (e.g., upper) opening 4606 configured to couple to an attractive force generator, and a second (e.g., lower) opening 4607 coupled to the remover as part of the layer dispensing mechanism, which remover is configured to attract material from the material bed through its head 4608a (e.g., vacuum head, also 4608b). For example, the channel (e.g., the lower opening) may be coupled (e.g., attached) to the movement system (e.g., to the framing). The coupling of the channel opening(s) to movement system, to the layer dispensing mechanism (e.g., to the remover), and/or to the wall opening may be adjustable. The wall opening may be an opening in the garage wall or in the processing chamber wall. The flexible section may comprise a hose. The rigid section may comprise a pipe. The flexible section of the channel may be made of material comprising a flexible polymer or a flexible resin. The rigid section of the channel may be made of material comprising elemental metal, metal alloy, ceramic, an allotrope of elemental carbon, a rigid polymer, or a rigid resin. The channel may be configured to facilitate movement of the layer dispensing mechanism (i) to the end of the material bed closest to the processing chamber opening, and (ii) to the interior of the garage, e.g., such that the garage door may close and the layer dispensing mechanism (E.g., the dispenser) will be able to receive material from a reservoir (e.g., a doser) 4603. For example, 4600 shows an example of a side view of an extended (e.g., stretched) channel, and 4650 shows a side view example of a retracted (e.g., folded) channel where in the flexible section reaches the end of the garage. The garage may have an extension such as 4651 to accommodate the channel as in the example of 4650, or be overall larger to accommodate the folded hose at its most folder portion in the garage (e.g., 4613). The example shown in FIG. 46, 4650 shows a wall 4610 of a processing chamber to which railing 4611 is attached to, and carriage 4612 to which the layer dispensing mechanism (e.g., remover 4608) is coupled to (e.g., through a framing). The openings in the garage of channels in examples 4600 and 4650 are aligned, and the remover head (e.g., nozzle) 4608a in example 4600 is aligned with the end of the processing chamber while remover having head (e.g., nozzle) 4608b is aligned with the front of the garage facing the processing chamber. The channel in example 4600 is at its most outstretched position, while the channel in example 4650 is at its most folded position. In the example shown in FIG. 46 the channel occupies various horizontal planes.

In some embodiments, the channel is disposed in one or more planes. For example, the channel may be disposed in one vertical plane and in a plurality of horizontal planes. For example, the channel may be disposed in one horizontal plane and in a plurality of vertical planes. For example, the channel may be disposed in a plurality of horizontal planes and in a plurality of vertical planes. In some embodiments, a hard portion (e.g., pipe) of the channel is disposed in the same horizontal plane. In some embodiments, a hard portion (e.g., pipe) of the channel traverses between horizontal planes, for example, a hard portion may start an upper horizontal plane and end at a lower horizontal plane, or vice versa. The channel may have at least one hard portion within a horizontal plane. The channel may have at least one hard portion traversing horizontal planes.

Figure 47:
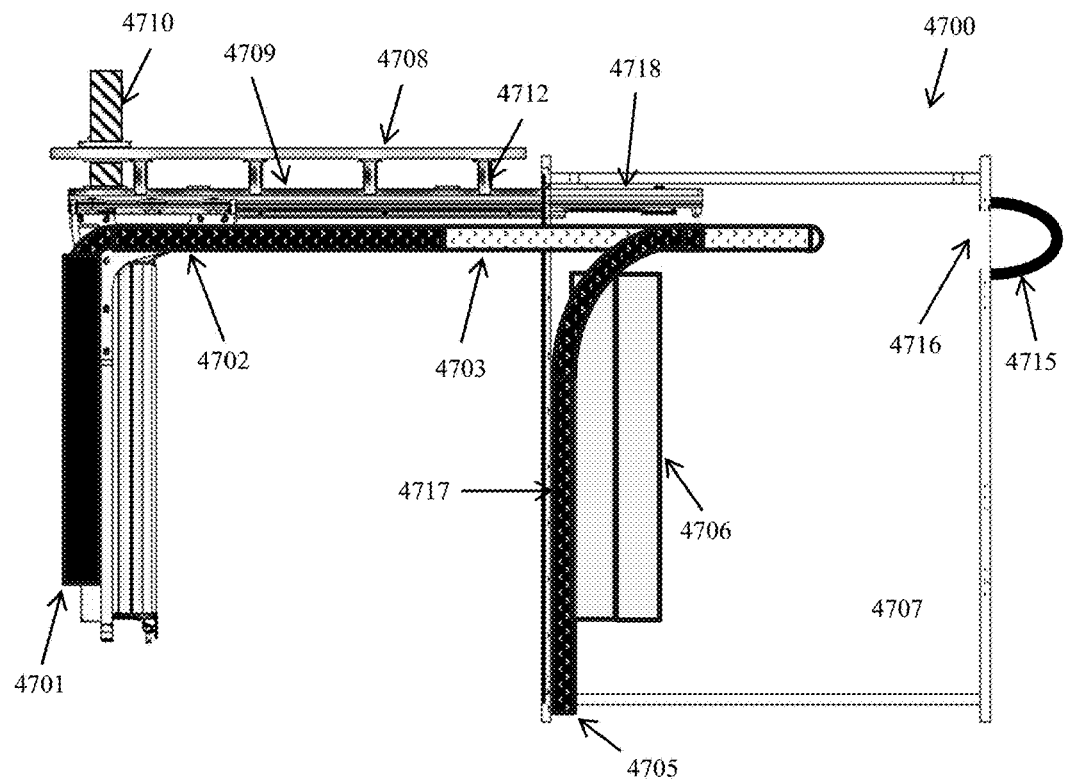
FIG. 47 schematically illustrates various components a 3D printing system.
Figure 47:
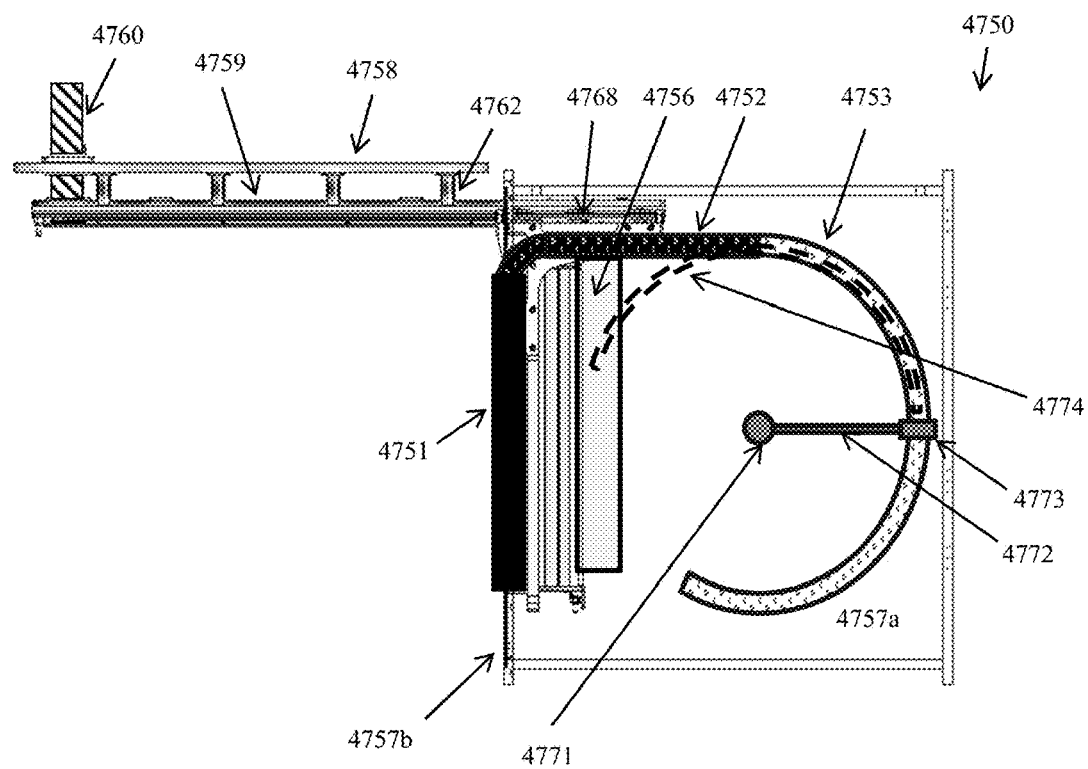

In some embodiments, the channel is operatively coupled to a guiding arm to guide its folding during operation, e.g., during traversal of the material dispensing mechanism into the garage. FIG. 47 shows a horizontal top view in example 4700 of an extended (e.g., stretched such as maximally stretched) channel having a lower harder section 4702 (e.g., pipe), a flexible (e.g., softer) section 4703 (e.g., hose), an upper harder section 4717 (e.g., pipe), an exit 4705 of upper hard section 4717 from garage 4707. The channel is coupled to a remover 4701 disposed in the processing chamber having wall 4708 to which railing portion 4709 is connected to with a gap structured by spacers (e.g., screws) such as 4712, and a material dispensing reservoir (e.g., a doser) 4706. disposed above garage 4707. The railing, having portion 4709, extends to the garage in railing portion 4718. The material reservoir can dispense a prescribed dose of pre-transformed material into the dispenser of the layer dispensing mechanism, when at the designated position in the garage. FIG. 47 also shows an example of an actuator 4710 extending from one side of wall 4708 to its opposing side, which actuator is configured to move a chain/belt to move a carriage. The garage may be extended, e.g., having a wall portion 4715 and being devoid of wall portion 4716 depicted in dotted lines; or be large enough to accommodate the folded channel and thus, be devoid of wall portion 4715 and keep wall portion 4716 intact. FIG. 47 shows a horizontal top view in example 4750 a retracted (e.g., folded such as maximally folded) channel having a lower harder section 4752 (e.g., pipe), a flexible (e.g., softer) section 4753 (e.g., hose). The channel is coupled to a remover 4751 disposed in garage enclosure 4757b having interior space 4757a. The processing chamber includes wall 4758 to which railing portion 4759 is connected to with a gap structured by spacers (e.g., screws) such as 4762, and a material dispensing reservoir (e.g., a doser) 4756. The railing, having portion 4759, extends into the garage in portion. The material reservoir can dispense a prescribed dose of pre-transformed material into the dispenser of the layer dispensing mechanism at the designated position in the garage that is the position of layer dispensing mechanism including remover 4751, which position is depicted in the example of 4750. FIG. 47 shows an example of an actuator 4760 extending from one side of wall 4758 to its opposing side, which actuator is configured to move a chain/belt to move a carriage. FIG. 47 shows an example of a swing arm pivot 4771 configured to connect to a swing arm 4772 ending in a swing arm attachment 4773 configured to operatively coupled (e.g., attach or connect) to flexible section 4753 and guide it during its folding process to be folded along dotted line 4774. The exit from the garage (e.g., exit opening) is not shown for didactive purposes but its position is indicated by arrow 4757b. The upper harder section of the channel (e.g., analogous to 4717) is omitted in example 4750, e.g., for didactive purposes since, for example, it may obstruct the remover. FIG. 47 shows in 4750 a retracted channel. In the example shown in FIG. 47 the channel occupies various vertical planes.

In some embodiments, a guiding arm attached to a pivot guides the channel, e.g., during its retraction (e.g., folding), e.g., while the layer dispensing mechanism retracts into the garage from the processing chamber. The arm may be configured to swing in a circle having a radius of at most about 150 millimeters (mm), 180 mm, 200 mm, 220 mm, 250 mm, 280 mm, or 300 mm. The circle may occupy at most about 98%, 95%, 90%, 80%, 70%, 60%, or 50% of the horizontal cross-sectional area of the garage enclosure. The circle may occupy a cross sectional area of the garage having percentage values between any of the aforementioned values (e.g., from 90% to 50%). In some embodiments, the channel (e.g., flexible portion thereof) may droop. The drooping of the channel (or at least one section thereof) may be controlled, e.g., using one or more springs. The vertical orientation of the channel's path may be controlled (e.g., by a user and/or automatically, e.g., using a controlled actuator). In some embodiments, the material reservoir that supplies material to the dispenser has a central axis that is (e.g., substantially) vertical. In some embodiments, the material reservoir that supplies material to the dispenser (e.g., the doser) has a central axis tilted from a vertical axis.

Figure 48:
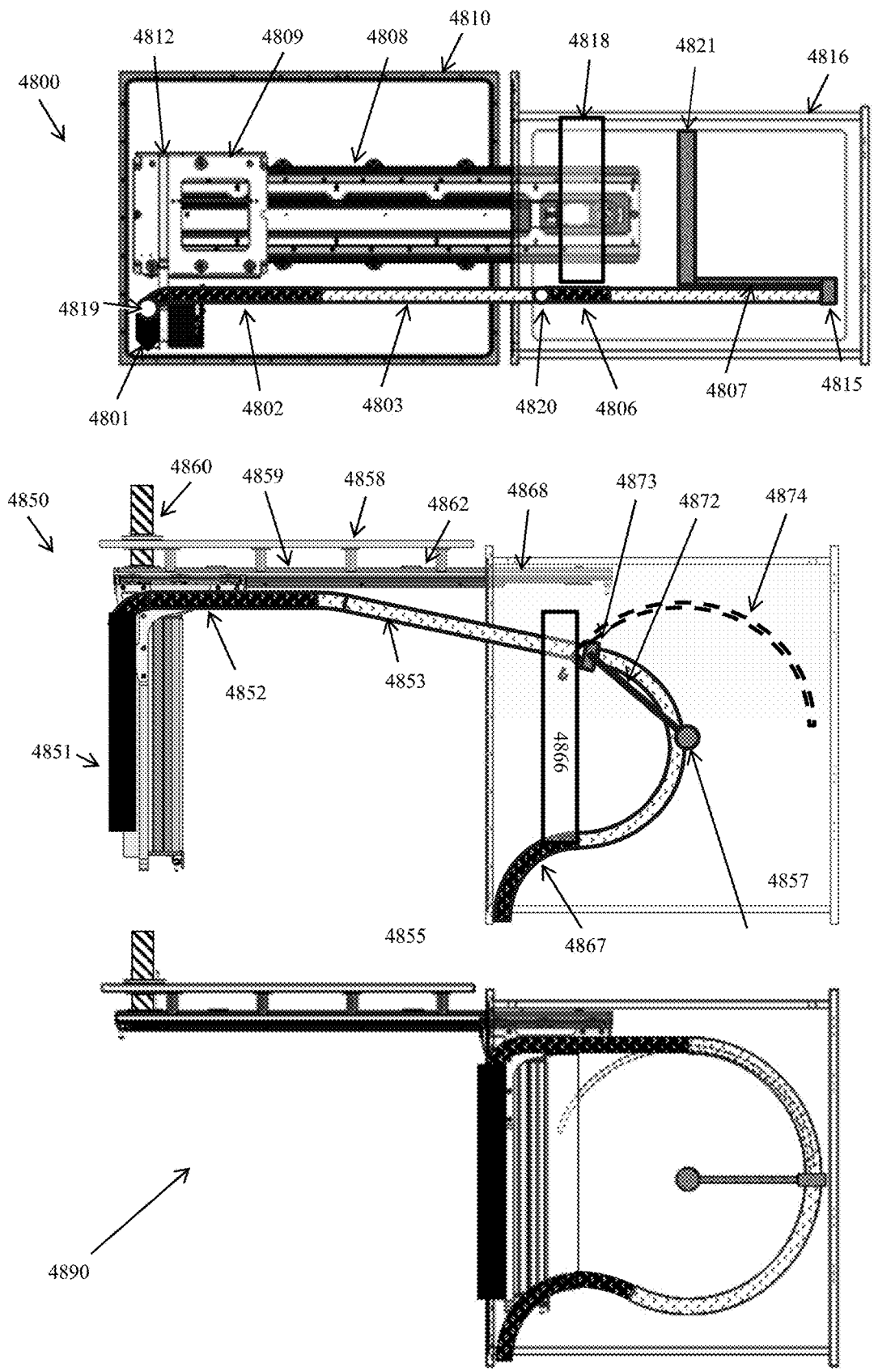
FIG. 48 schematically illustrates various components a 3D printing system.

FIG. 48 shows in example 4800 a side view of wall 4810 of a processing chamber to which railing 4808 is attached. A carriage 4809 is mounted on the railing and connected to framing 4812 on which a remover 4801 is mounted. A channel extends from the processing chamber having wall 4810 to the garage having wall 4816. The channel has a hard section 4802, a hard section 4806, and a flexible section 4808 between hard section 4802 and 4807 and extending from the processing chamber to the end of the garage to swing arm attachment 4815. The channel has one exit 4819 connected to remover 4801, and another exit 4820 connected to a garage wall (not shown) opposing wall 4816. Example 4800 shows a material dispensing reservoir (e.g., doser) 4818 disposed above the garage. Example 4800 shows a swing arm pivot 4821, a swing arm 4807 and a swing arm attachment configured to couple to the channel (e.g., flexible portion 4803). In the example of 4800 the channel is disposed in one horizontal plane. FIG. 48 shows a horizontal view from the bottom up in example 4850 of a maximally stretched channel having a first harder section 4852 (e.g., pipe), a flexible (e.g., softer) section 4853 (e.g., hose), a second harder section 4867 (e.g., pipe), a material dispensing reservoir 4866, a channel exit 4855 from garage 4857. The channel is coupled to a remover 4851 disposed in the processing chamber having wall 4858 to which railing portion 4859 is connected to with a gap structured by spacers (e.g., screws) such as 4862, and a material dispensing reservoir (e.g., a doser) 4856 disposed above garage 4857. The railing, having portion 4859, extends to the garage in railing portion 4868. FIG. 48 also shows an example of an actuator 4860 extending from one side of wall 4858 to its opposing side, which actuator is configured to move a chain/belt to move a carriage. A swing arm pivot 4871 is coupled to a swing arm 4872 ending with a swing arm attachment 4873 that is configured to couple to flexible section 4853. The swing arm can swing in path 4874, e.g., during folding of the channel while retracting remover 4851 into garage 4857 from the processing chamber having wall 4858. FIG. 48 shows in 4890 a top view example of a retracted channel similar to the one shown in FIG. 47, 4750. The example in FIG. 48 shows the channel being in various vertical planes.

In some embodiments, a hard portion (e.g., pipe) of the channel is disposed in the same horizontal plane. In some embodiments, a hard portion (e.g., pipe) of the channel traverses between horizontal planes, for example, a hard portion may start an upper horizontal plane and end at a lower horizontal plane, or vice versa. The channel may have at least one hard portion within a horizontal plane. The channel may have at least one hard portion traversing horizontal planes.

Figure 49:
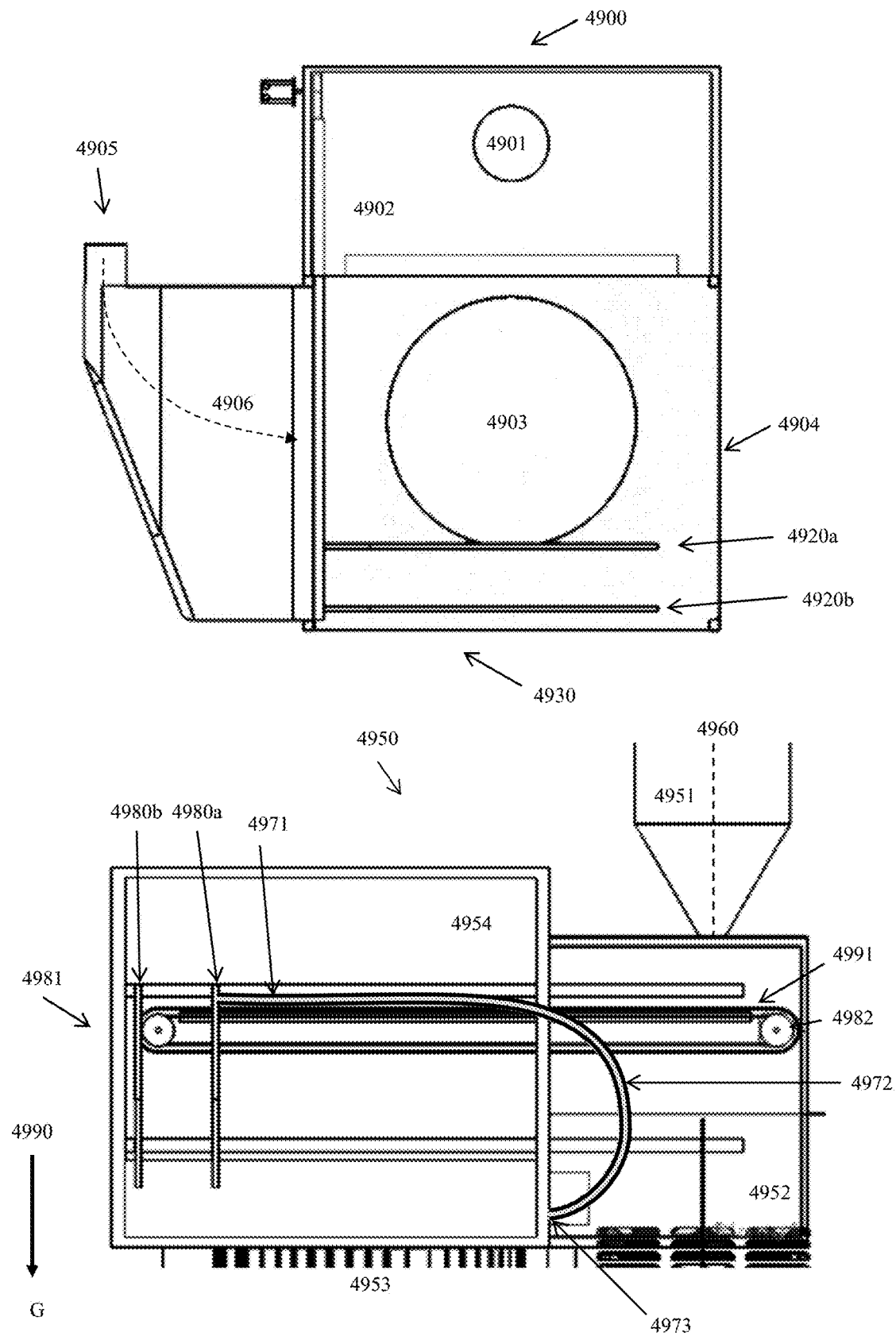
FIG. 49 schematically illustrates various portions of a 3D printing system.

FIG. 49 shows in 4900 an example of a top view of a portion of a 3D printing system including a processing chamber 4904 having garage 4902 attached in one of its sides and gas guide having entrance 4905 from its adjacent side, which gas guide guides gas generally along path 4906 and into processing chamber 4904 having base 4903 (e.g., build plate) flush with its floor. A doser opening 4904 is depicted in the ceiling of garage 4902. Positions 4920a and 4920b designate various positions until which a layer dispensing mechanism and/or the movement system can traverse to, with the opening of the processing chamber (e.g., door or window) being referred to by numeral 4930. FIG. 49 shows in 4950 an example of a side view of a portion of a 3D printing system having a material reservoir 4951 (e.g., doser) having a central axis 4960, which material reservoir is configured to dispense (e.g., a measured amount of pre-transformed material) to the layer dispensing mechanism, once it is in a designated portion (e.g., below material reservoir 4951) in garage 4952. A movement facilitator having a belt/chain 4991 is engaged with its guides such as 4982. FIG. 49 shows in 4950 an example of a channel having a harder section 4971, a softer (e.g., flexible) section 4972 and an exit opening 4973. A build module 4953 is engaged with the processing chamber 4952, which build module include a substrate and a base, e.g., 4903. Positions 4980a and 4980b designate various positions until which the layer dispensing mechanism and/or the movement system can traverse to, with the opening of the processing chamber (e.g., door or window) being referred to by numeral 4981. FIG. 49 shows in 4950 a portion of the 3D printing system in relation to gravitational vector 4990 pointing to gravitational center G.

Examples. The following are illustrative and non-limiting examples of methods of the present disclosure.

Example 1: In a processing chamber, Inconel-718 powder having a diameter distribution of from about 15 micrometers to about 45 micrometers was dispensed by a layer dispensing mechanism (e.g., recoater), the powder being dispensed above a build plate having a diameter of about 600 mm to form a powder bed. The processing chamber was under an atmosphere that is less reactive with the powder than the ambient atmosphere external to the processing chamber. The internal processing chamber atmosphere comprised argon, oxygen, and humidity. The oxygen as at a concentration of at most about 1000 ppm, and the humidity had a dew point from about −55° C. to about −15° C. The internal processing chamber atmosphere had a pressure of about 16 KPa above atmospheric pressure (e.g., above 101 KPa), and was at ambient temperature. The layer dispensing mechanism traveled along railings depicted in FIG. 45 using a carriage as in FIG. 40, 4050 coupled to a framing similar to the one shown in FIG. 36, 3609. The processing chamber was equipped with eight optical windows configured to each allow a laser beam traversed into the processing chamber from a fiber laser to print one or more 3D objects above the build plate during a 3D printing process. The layer dispensing mechanism traveled at a speed of about 1000 millimeters per second (mm/sec) along the build plate with a total deflection from linearity of its theoretical horizontal travel path, the deflection (positive and/or negative deflection) of linearity being at most about 0.050 millimeters. When idle, the layer dispensing mechanism parked in an ancillary chamber (e.g., garage) coupled to the processing chamber in which the build plate was disposed, the ancillary chamber separated from the processing chamber by a door 4506 of FIG. 45. The layer dispensing mechanism comprised a powder dispenser and a powder remover. The powder remover was configured to attract a portion of the dispensed powder to form a planar exposed surface of the powder bed using vacuum. Usage of the vacuum was such that the pressure in the processing chamber remained above ambient atmosphere during removal of the powder with the powder remover.

While preferred embodiments of the present invention have been shown, and described herein, it will be obvious to those skilled in the art that such embodiments are provided by way of example only. It is not intended that the invention be limited by the specific examples provided within the specification. While the invention has been described with reference to the afore-mentioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations, or relative proportions set forth herein which depend upon a variety of conditions and variables. It should be understood that various alternatives to the embodiments of the invention described herein might be employed in practicing the invention. It is therefore contemplated that the invention shall also cover any such alternatives, modifications, variations, or equivalents. It is intended that the following claims define the scope of the invention and that methods and structures within the scope of these claims and their equivalents be covered thereby.

What is claimed is:

1. A device for directional traversal in an environment contaminated by debris of three-dimensional printing, the device comprising: a flexible coupler configured to couple wheels including a first wheel and a second wheel, the flexible coupler configured to facilitate travel of the wheels along a long axis of a railing that is imperfect and/or is contaminated by the debris, the wheels being (i) coupled to a carriage by the flexible coupler and (ii) configured to engage with the railing along which the wheels are configured to directionally traverse, the flexible coupler is configured to facilitate bearing loads that are even or substantially even, the bearing loads being on the wheels as they travel along the railing, the device being comprised in, or being operatively coupled to, a three-dimensional printer.

2. The device of claim 1, wherein the railing has (a) a variability in linearity of at most about 0.05 millimeters and/or (b) a variability in planarity of at most about 0.05 millimeters.

3. The device of claim 1, wherein the flexible coupler comprises (a) a first arm ending by a first end, and (b) a second arm ending by a second end opposing the first end, the first arm being separated from the second arm by a middle section configured to couple to the carriage.

4. The device of claim 3, wherein (I) the middle section is taller than the arms comprising the first arm and the second arm, (II) the flexible coupler has one width, one length, and a variability in height, the variability being along its length, and/or (III) the flexible coupler comprises at least one dimension comprising a width or a height, with each of the at least one dimension being smaller than a length of the flexible coupler.

5. The device of claim 1, wherein (I) the railing has a vertical cross section that is convex and/or (II) a wheel of the wheels has a concave crevice along a curved external surface to compliment, or substantially complement, with the railing.

6. The device of claim 5, wherein complementing the railing facilitates pushing away any debris accumulated on the railing during traversal of the wheel along the railing.

7. The device of claim 1, wherein the railing is configured to protect a wheel of the wheels from the debris during its displacement along the railing, including when the wheel is not displaced along the railing.

8. The device of claim 1, wherein the carriage is configured to carry a layer dispensing mechanism configured to dispense a planar layer of pre-transformed material as part of a material bed from which one or more three-dimensional objects are printed in a printing cycle; and optionally wherein the layer dispensing mechanism is configured to move abruptly to remove excess of pre-transformed material collected during operation.

9. The device of claim 1, wherein the carriage is configured to carry one or more mechanisms comprising: a material dispenser, a material leveler, or a material remover.

10. The device of claim 1, wherein the carriage is configured to connect two sets of wheels comprising the wheel.

11. The device of claim 1, wherein the carriage comprises a window that facilitates maintenance.

12. The device of claim 1, wherein the carriage comprises wipers disposed at opposing sides of a wheel of the wheels, the wipers being configured to wipe away the debris from the railing.

13. The device of claim 1, wherein the carriage is operatively coupled to an actuator; and wherein the actuator is disposed externally to the environment, and wherein the carriage comprises a clamp configured to engage with a belt that engages with a gear coupled to the actuator, and optionally wherein the actuator comprises a motor.

14. The device of claim 1, wherein the debris comprises an elemental metal, metal alloy, an allotrope of elemental carbon, or a ceramic; and wherein the device is configured to operate under an atmosphere depleted of a reactive agent relative to its concentration in an ambient atmosphere external to the device, the reactive agent being configured to react with a reactive species at least during three-dimensional printing, the reactive species comprising the debris, a starting material of the three-dimensional printing, or a product of the three-dimensional printing.

15. The device of claim 1, wherein the environment is of a processing chamber that is (I) is coupled to an ancillary chamber attached to it, the carriage being configured to be disposed in the ancillary chamber when idle, (II) is operatively coupled to a filtering system comprising a high-efficiency particulate arrestance filter, (III) is operatively coupled to a port flushing component configured to provide a flow of gas to flush material through the port lushing component, or (IV) any combination of (I) (II) and (III).

16. The device of claim 1, wherein the carriage is configured to couple to a dispenser configured to dispense pre-transformed material, and wherein the dispenser is configured to dispense the pre-transformed material to generate, or add to, a powder bed; and wherein the dispenser utilizes a vibrational movement during operation to dispensed pre-transformed material.

17. A method of the directional traversal in the environment contaminated by the debris of the three-dimensional printing, the method comprising: (a) providing the device of claim 1; and (b) using the device for the directional traversal in the environment contaminated by the debris of the three-dimensional printing.

18. An apparatus for the directional traversal in the environment contaminated by debris of three-dimensional printing, the apparatus comprising at least one controller configured to (a) operatively couple to a power source and to the device of claim 1; and (b) direct the device to directionally traverse in the environment contaminated by the debris of the three-dimensional printing.

19. A system for the directional traversal in the environment contaminated by the debris of the three-dimensional printing, the system comprising (a) a layer dispensing mechanism coupled to the device of claim 1, the layer dispensing mechanism being configured to couple with the device of claim 1 to dispense a material bed; and (b) an energy source configured to transform at least a portion of the material bed to print one or more three-dimensional objects during the three-dimensional printing.

20. Non-transitory computer readable printing instructions that, when read by one or more processors operatively coupled to the device of claim 1, direct the one or more processors to execute one or more operations for the directional traversal of the device of claim 1 in the environment contaminated by the debris of the three-dimensional printing, the program instructions begin inscribed on one or more media.

* * * * *